(12) United States Patent
De Corral

(10) Patent No.: US 12,243,731 B2
(45) Date of Patent: Mar. 4, 2025

(54) TECHNIQUES FOR MASS SPECTROMETRY PEAK LIST COMPUTATION USING PARALLEL PROCESSING

(71) Applicant: WATERS TECHNOLOGIES CORPORATION, Milford, MA (US)

(72) Inventor: Jose De Corral, Grafton, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 424 days.

(21) Appl. No.: 17/682,391

(22) Filed: Feb. 28, 2022

(65) Prior Publication Data
US 2022/0406584 A1  Dec. 22, 2022

Related U.S. Application Data

(63) Continuation of application No. 13/702,169, filed as application No. PCT/US2011/001029 on Jun. 7, 2011, now abandoned.
(Continued)

(51) Int. Cl.
*H01J 49/00* (2006.01)
*G01N 30/86* (2006.01)
(Continued)

(52) U.S. Cl.
CPC .......... *H01J 49/0036* (2013.01); *G01N 30/86* (2013.01); *G06F 17/00* (2013.01);
(Continued)

(58) Field of Classification Search
CPC . H01J 49/0036; G01N 30/86; G01N 30/7233; G01N 30/8617; G01N 2030/8831; G06F 17/00
See application file for complete search history.

(56) References Cited

U.S. PATENT DOCUMENTS 5,525,303 A    6/1996 Ford et al.
2005/0253061 A1 11/2005 Cameron et al.
(Continued)

OTHER PUBLICATIONS

International Search Report and Written Opinion for International Patent Application No. PCT/US2011/001029, mailed Sep. 29, 2011.
(Continued)

*Primary Examiner* — Walter L Lindsay, Jr.
*Assistant Examiner* — Geoffrey T Evans
(74) *Attorney, Agent, or Firm* — Goodwin Procter LLP

(57) ABSTRACT

Described are techniques for processing data. Sample analysis is performed generating scans of data. Each scan comprises a set of data elements each associating an ion intensity count with a plurality of dimensions including a retention time dimension and a mass to charge ratio dimension. The scans are analyzed to identify one or more ion peaks. Analyzing includes filtering a first plurality of the scans producing a first plurality of filtered output scans. The filtering including first filtering producing a first filtering output, wherein the first filtering includes executing a plurality of threads in parallel which apply a first filter to the first plurality of scans to produce the first filtering output. Each of the plurality of threads computes at least one filtered output point for at least one corresponding input point included in the plurality of scans. Analyzing includes detecting one or more peaks using the filtered output scans.

20 Claims, 60 Drawing Sheets

Related U.S. Application Data

(60) Provisional application No. 61/437,841, filed on Jan. 31, 2011, provisional application No. 61/397,512, filed on Jun. 11, 2010.

(51) Int. Cl.
*G06F 17/00* (2019.01)
*G01N 30/72* (2006.01)
*G01N 30/88* (2006.01)

(52) U.S. Cl.
CPC ..... *G01N 30/7233* (2013.01); *G01N 30/8617* (2013.01); *G01N 2030/8831* (2013.01)

(56) References Cited

U.S. PATENT DOCUMENTS

| | | |
|---|---|---|
| 2007/0136017 A1 | 6/2007 | Wang et al. |
| 2007/0158542 A1 | 7/2007 | Bauer et al. |
| 2008/0070314 A1 | 3/2008 | Geromanos et al. |
| 2008/0091359 A1* | 4/2008 | Oresic ................ G01N 30/8624 702/27 |
| 2008/0185512 A1 | 8/2008 | Miller et al. |
| 2009/0294645 A1 | 12/2009 | Gorenstein et al. |
| 2010/0097599 A1 | 4/2010 | Lewis et al. |
| 2010/0178663 A1 | 7/2010 | Graham |
| 2010/0288918 A1 | 11/2010 | Satulovsky |
| 2010/0332953 A1 | 12/2010 | Webb et al. |

OTHER PUBLICATIONS

International Preliminary Report on Patentability for International Patent Application No. PCT/US2011/001029, mailed Dec. 27, 2012.
Waters, "The Implementation of High-Performance GPU Computing to Revolutionize LC/MSE Data Processing," May 2010.

* cited by examiner

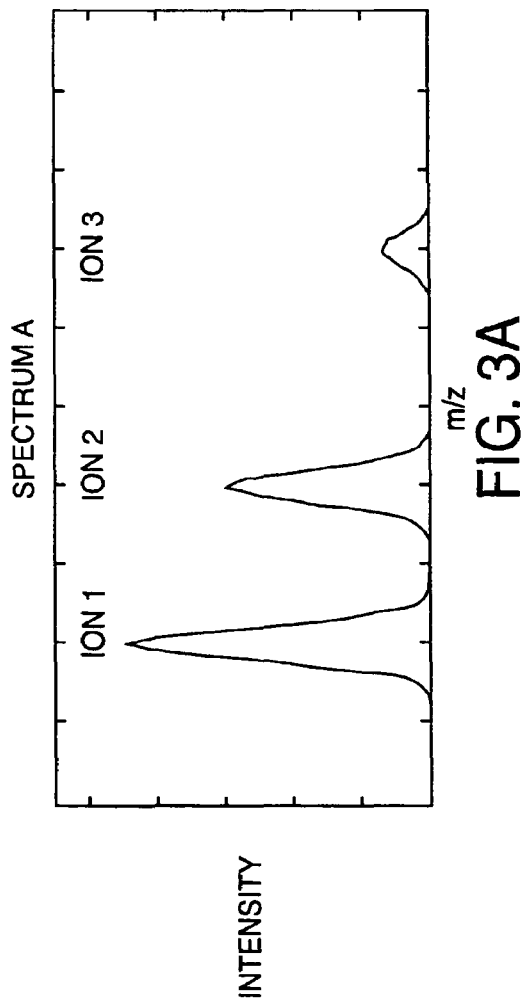 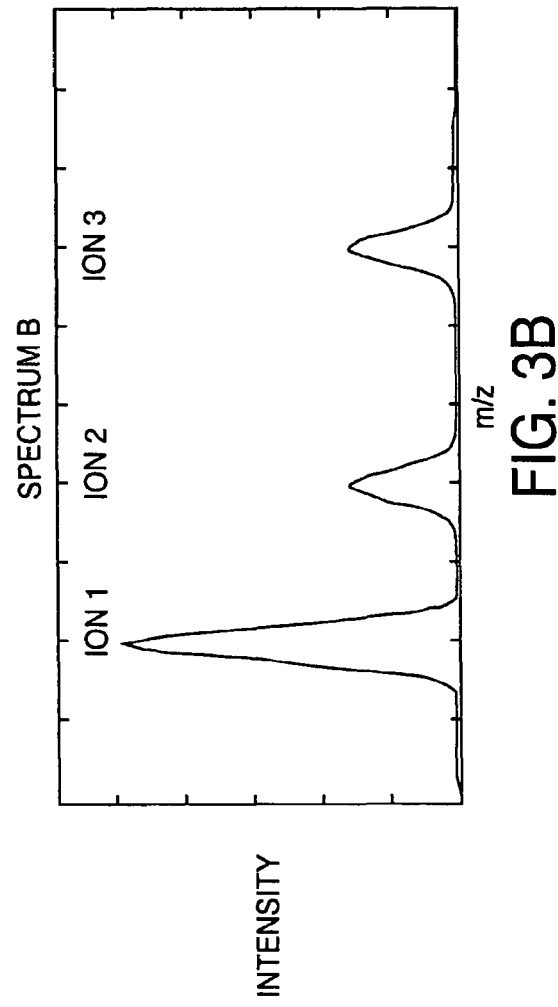

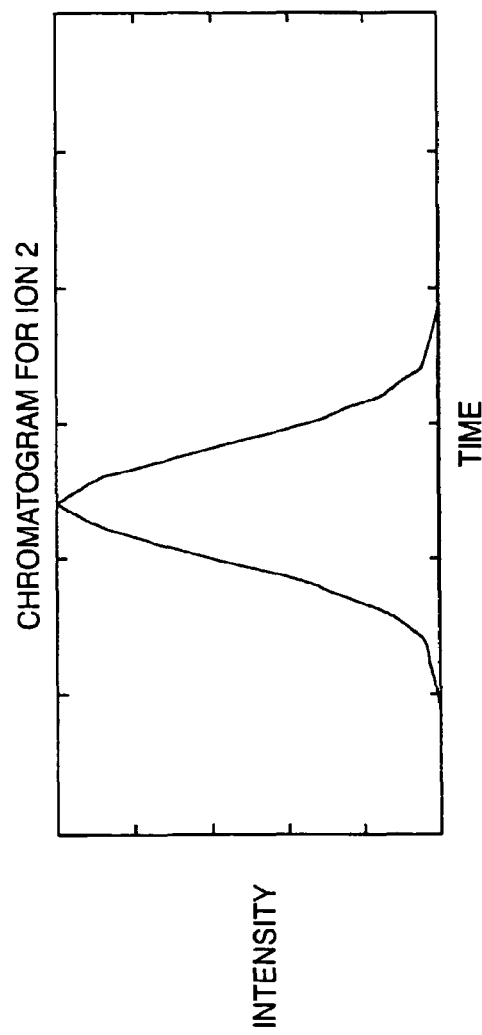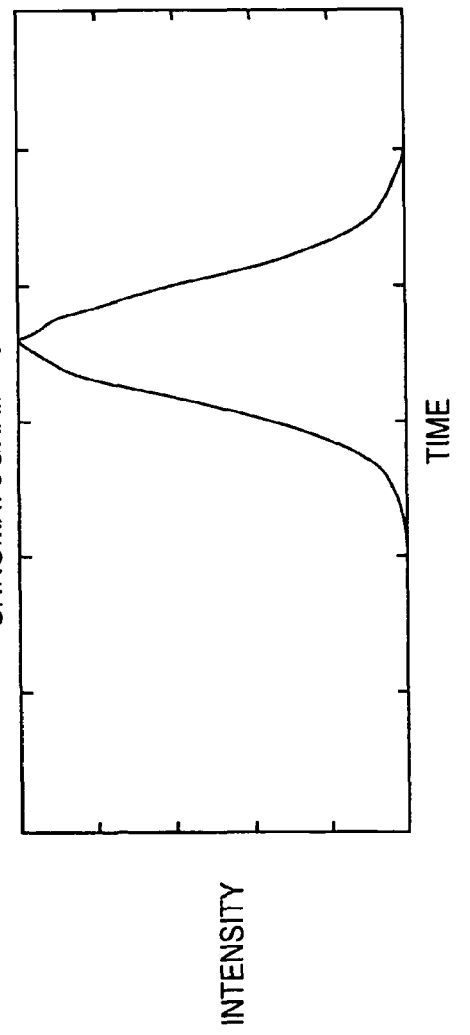

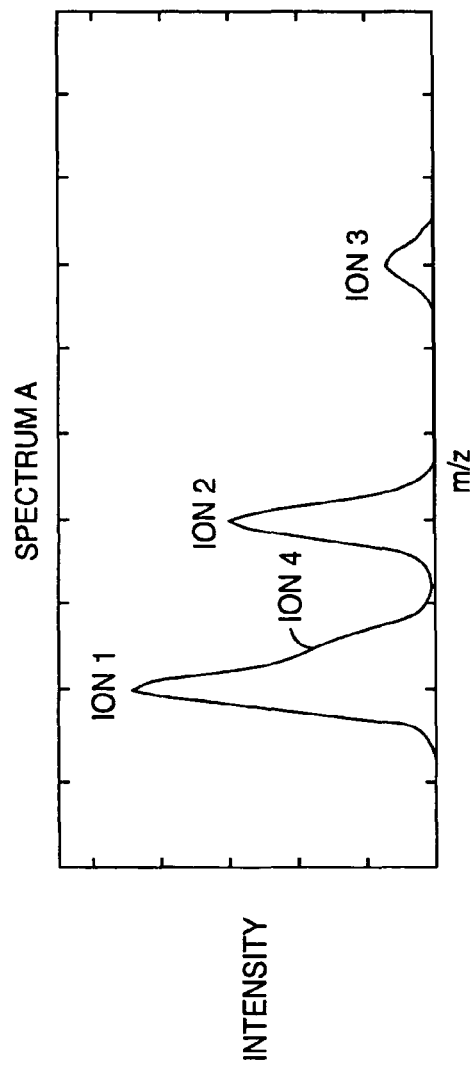
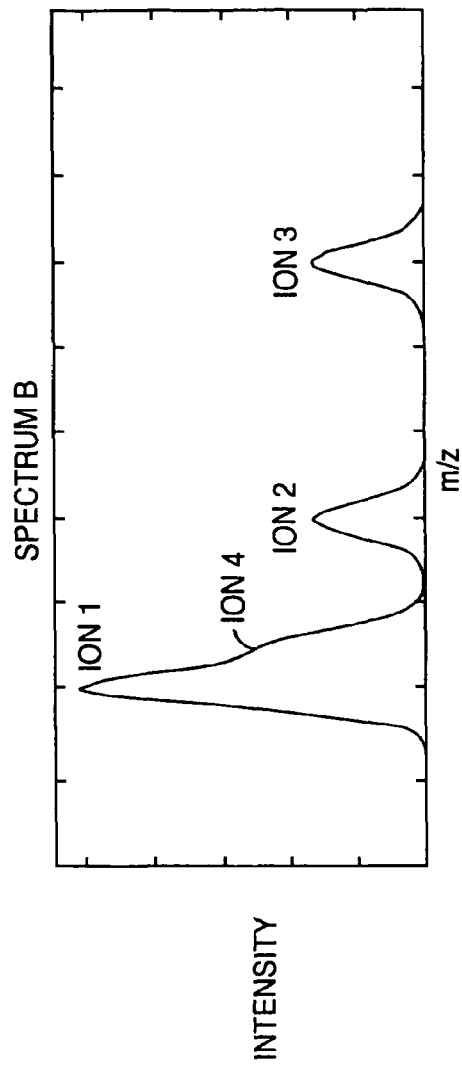

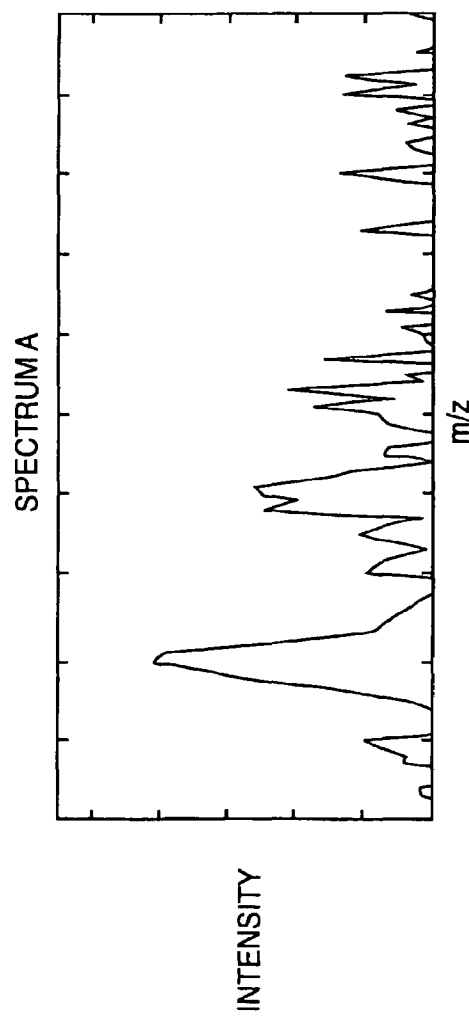

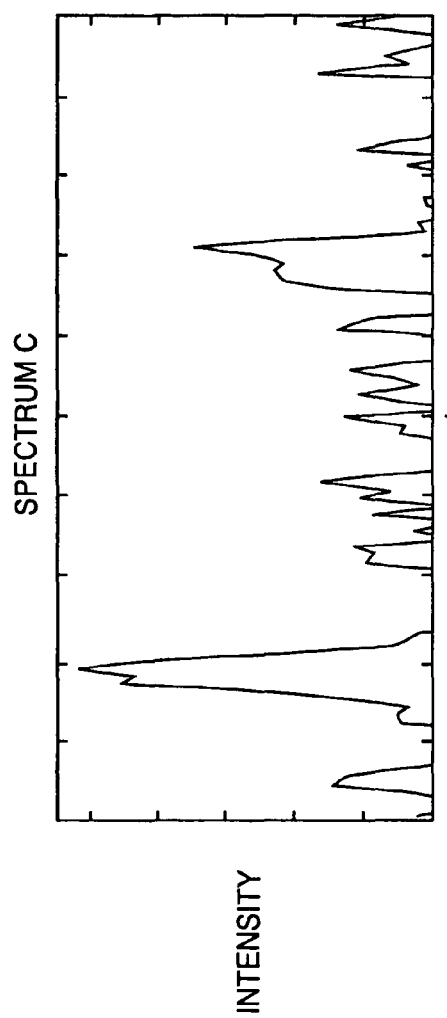

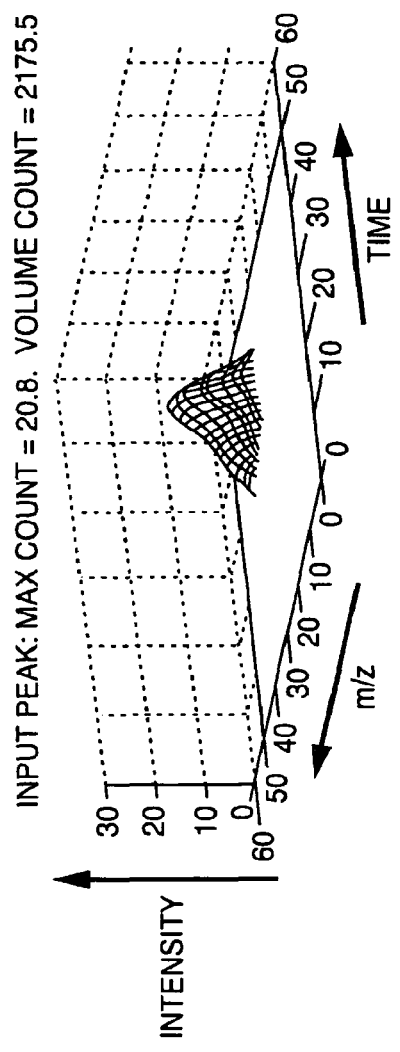
FIG. 17C
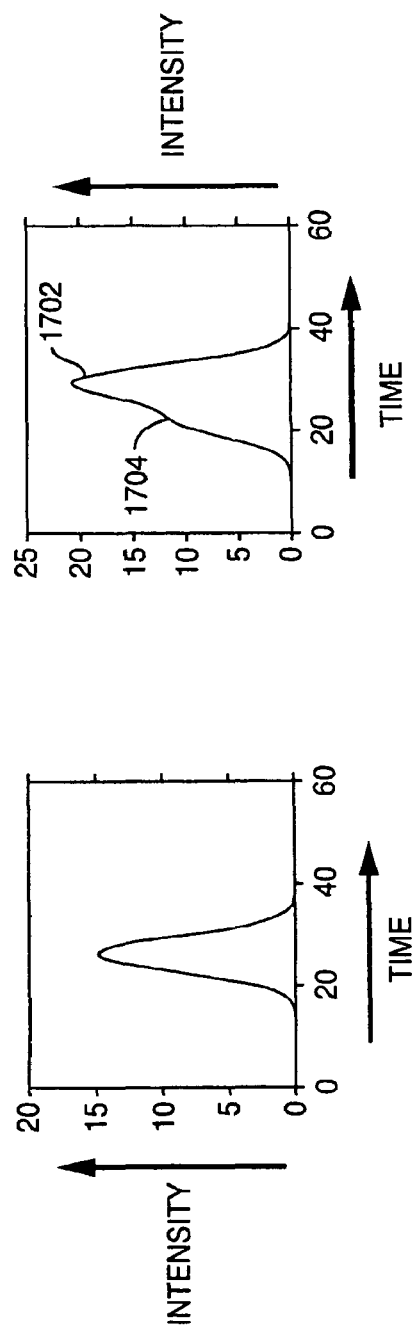
FIG. 17E
FIG. 17D

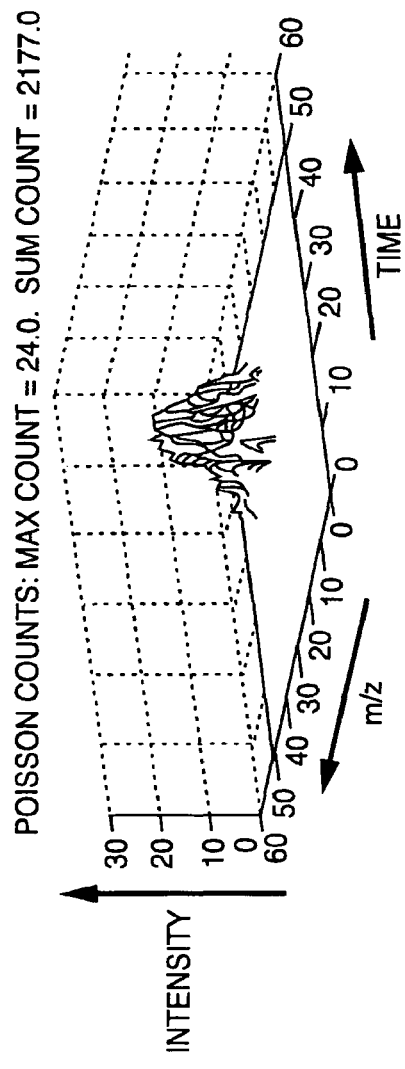
FIG. 17F
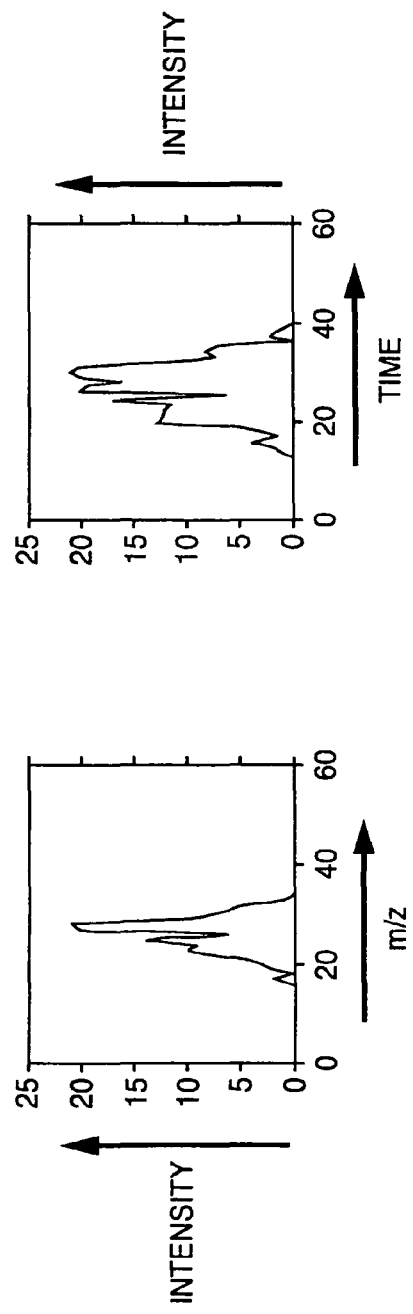
FIG. 17H
FIG. 17G

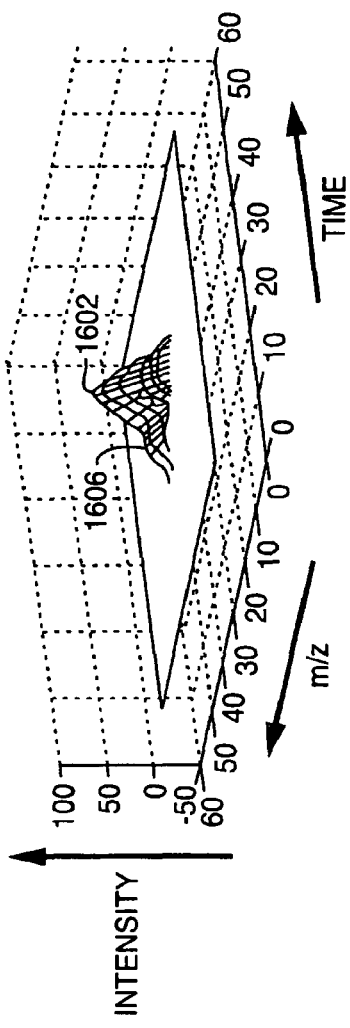
FIG. 17I
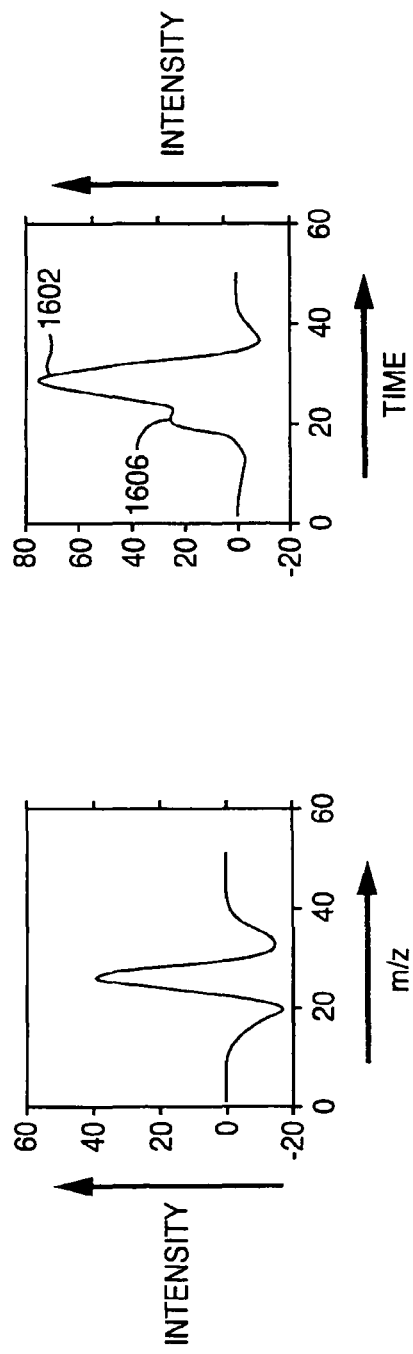
FIG. 17K
FIG. 17J

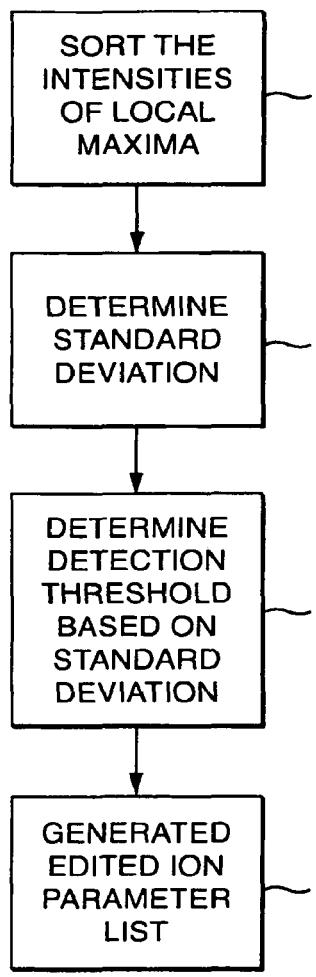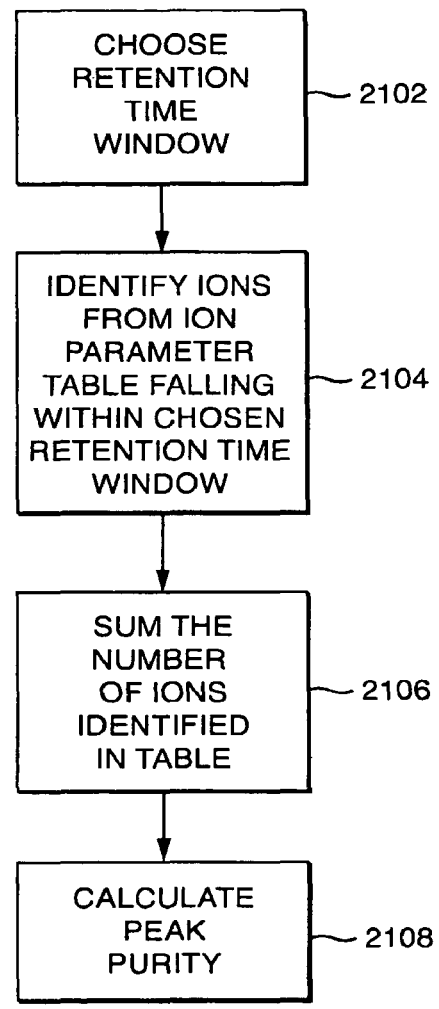
FIG. 20
FIG. 21

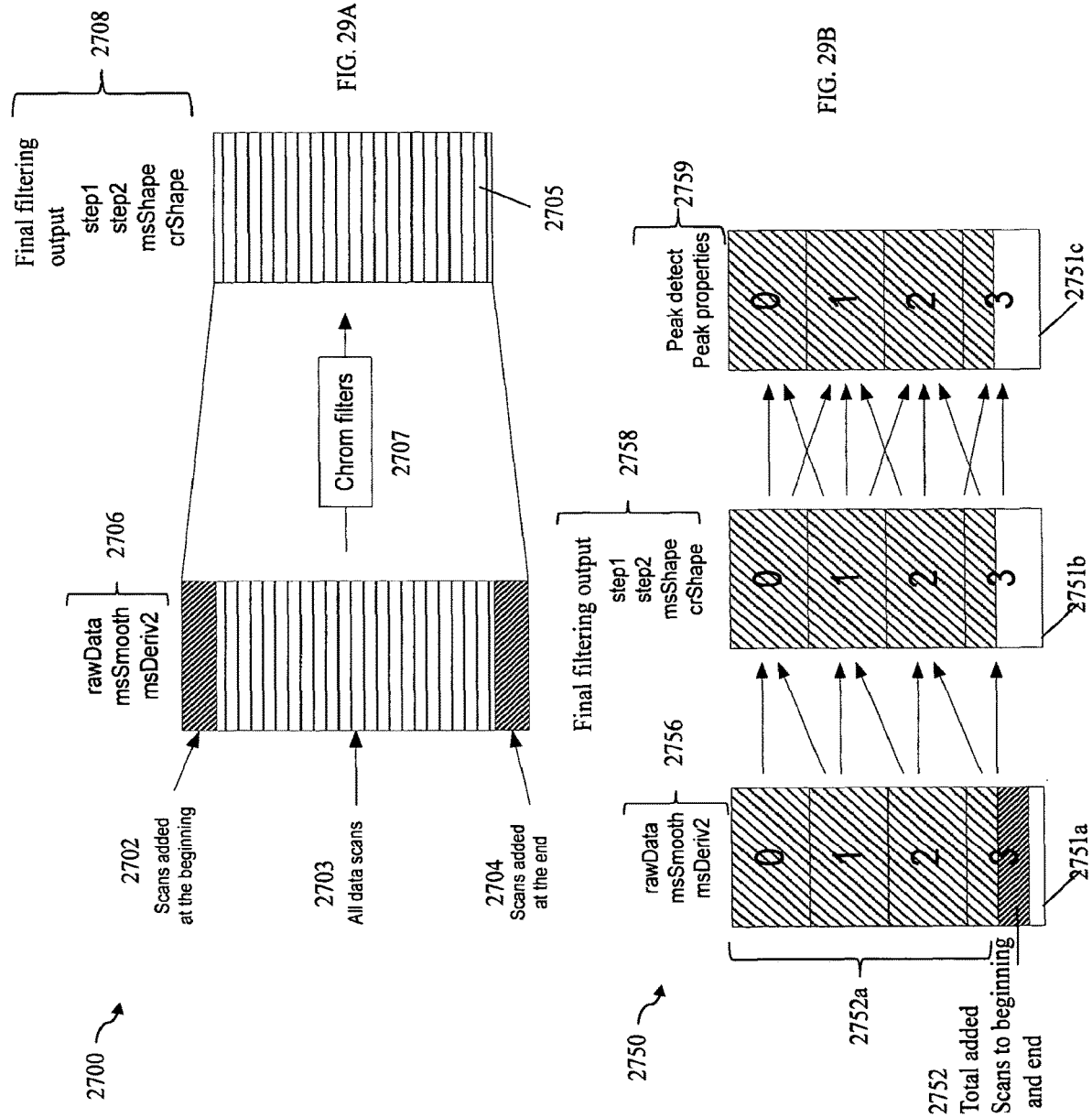

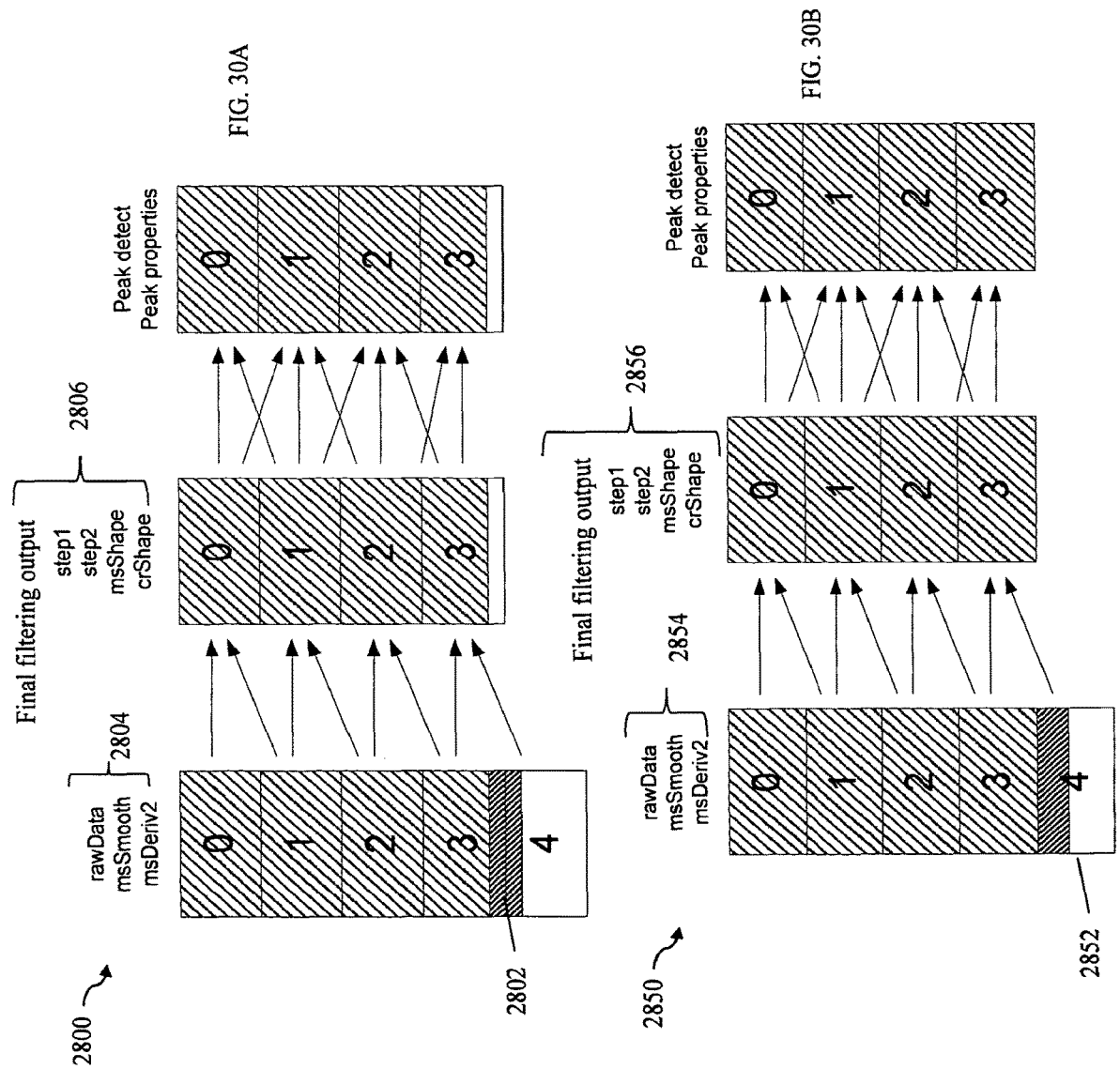

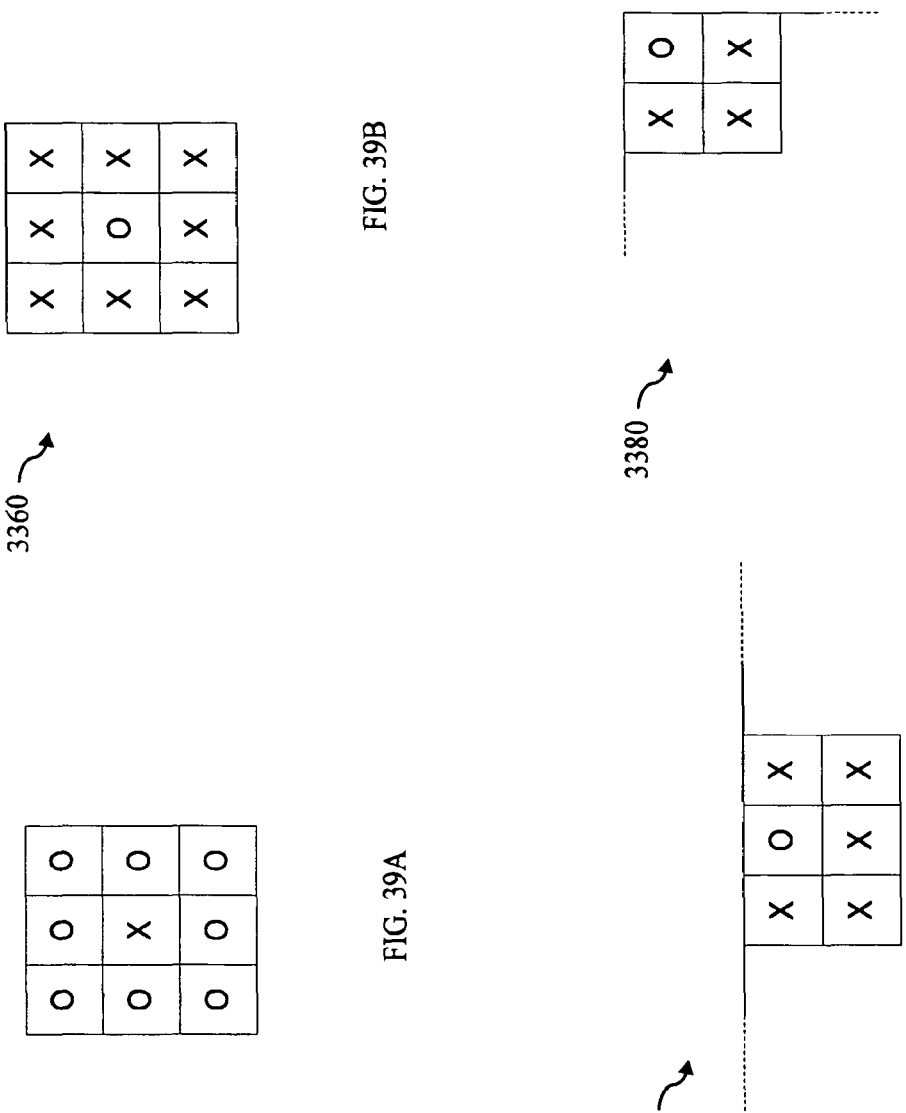
FIG. 39B
FIG. 39D
FIG. 39A
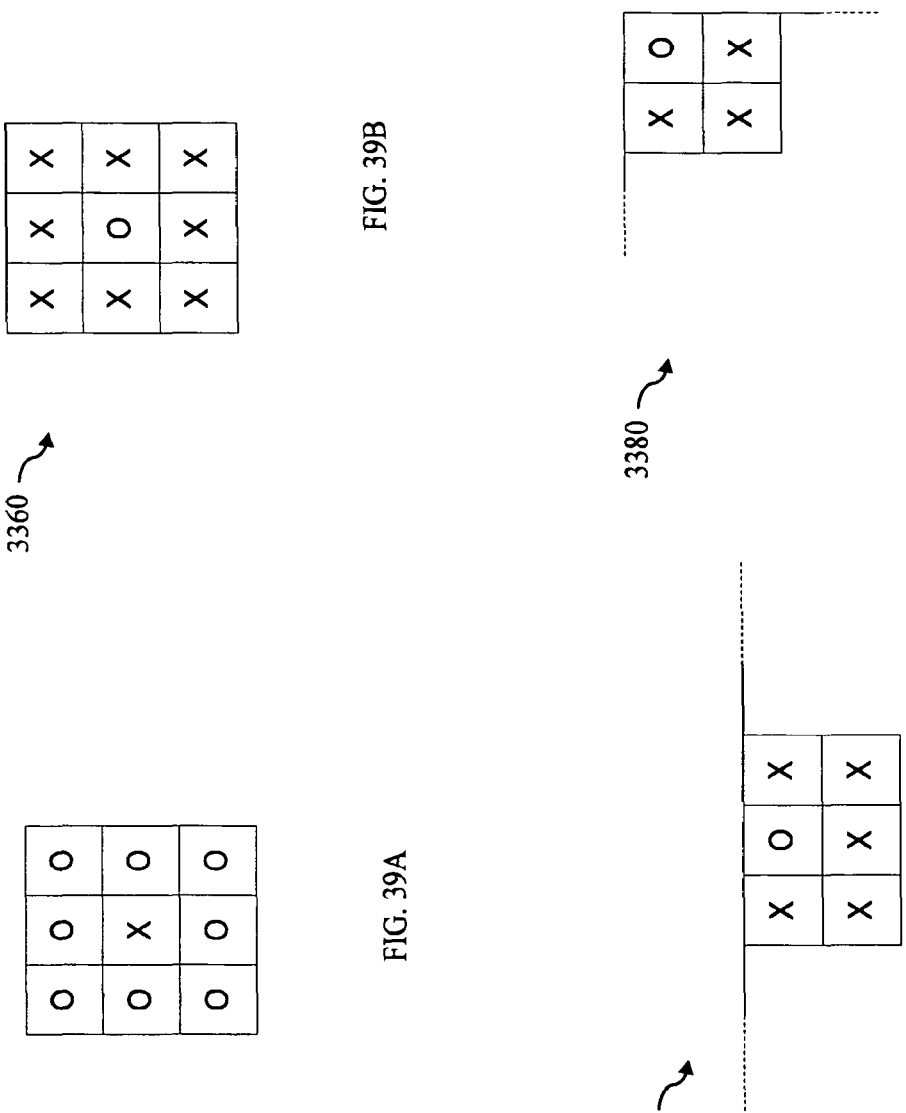
FIG. 39C

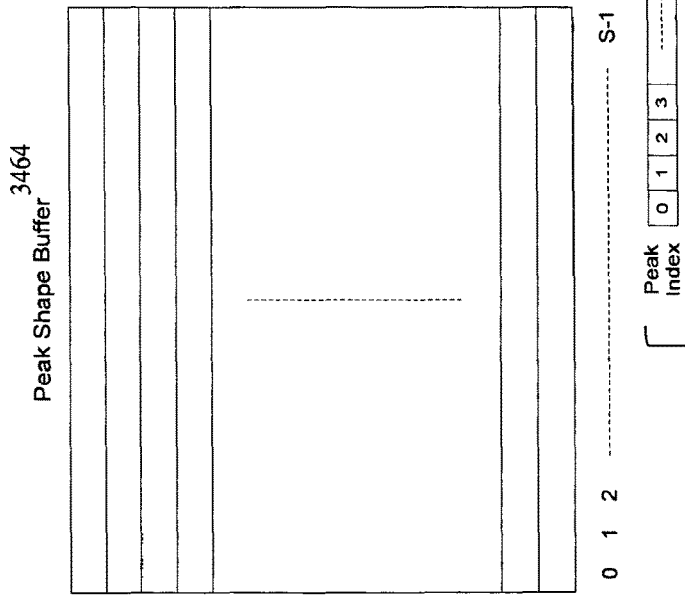
FIG. 42
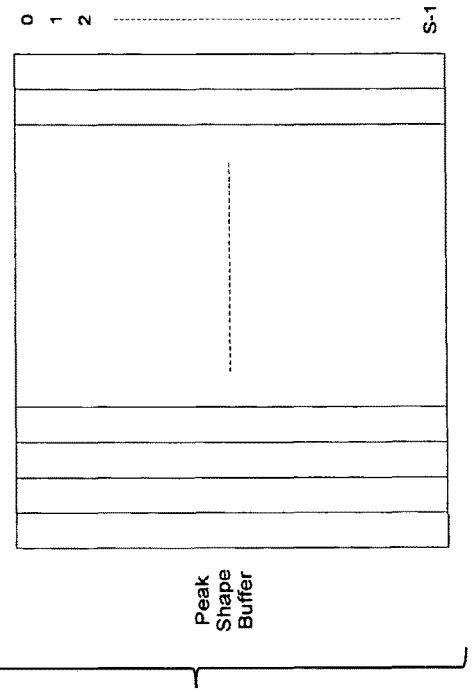
FIG. 43
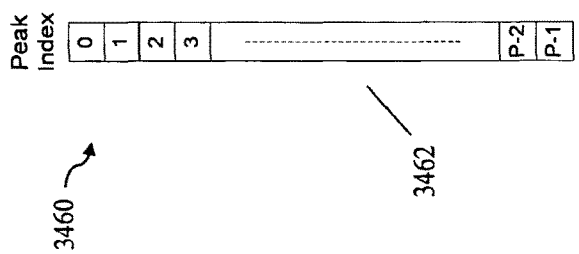

3500

3510

| Num coeffs | Center coeff | | | | Second half of coeffs | | | |
|---|---|---|---|---|---|---|---|---|
| 3 | $C_{30}$ | $C_{31}$ | | | | | | |
| 5 | $C_{50}$ | $C_{51}$ | $C_{52}$ | | | | | |
| 7 | $C_{70}$ | $C_{71}$ | $C_{72}$ | $C_{73}$ | | | | |
| 9 | $C_{90}$ | $C_{91}$ | $C_{92}$ | $C_{93}$ | $C_{94}$ | | | |

3520

| Coeff array | $C_{30}$ | $C_{31}$ | $C_{50}$ | $C_{51}$ | $C_{52}$ | $C_{70}$ | $C_{71}$ | $C_{72}$ | $C_{73}$ | $C_{90}$ | $C_{91}$ | $C_{92}$ | $C_{93}$ | $C_{94}$ |

FIG. 44

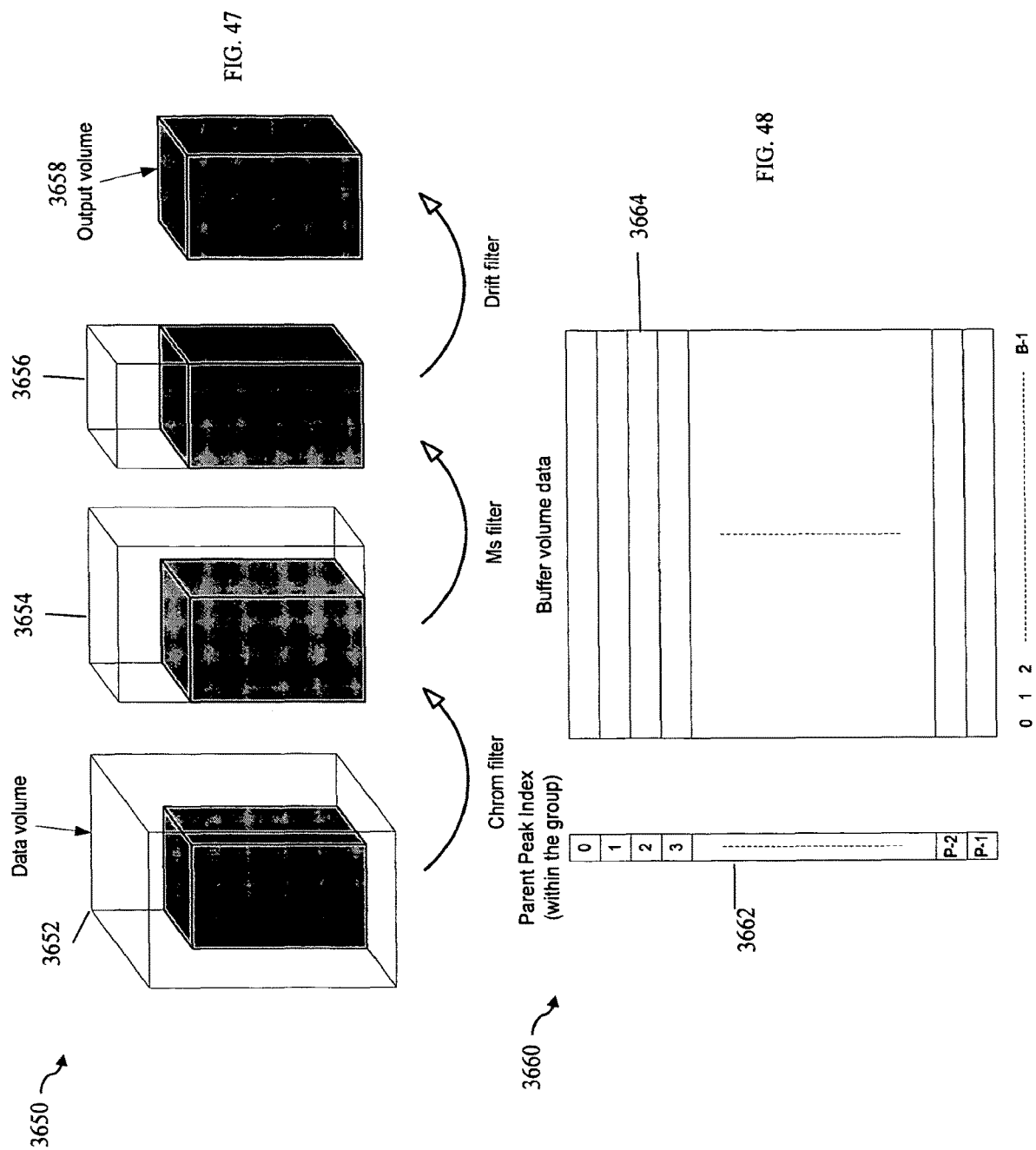

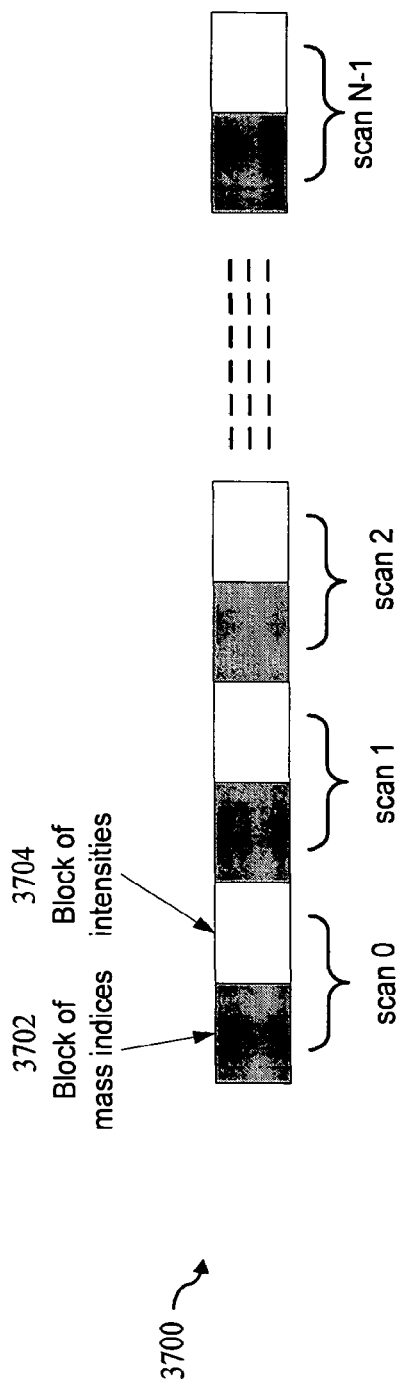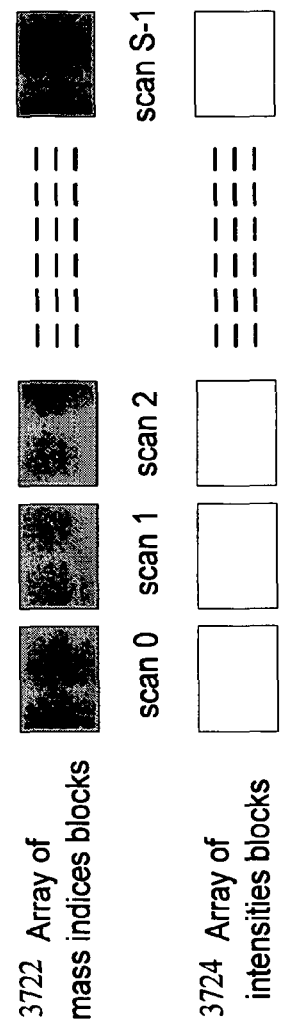
FIG. 50A
FIG. 50B

TECHNIQUES FOR MASS SPECTROMETRY PEAK LIST COMPUTATION USING PARALLEL PROCESSING

CROSS-REFERENCE TO RELATED APPLICATIONS

This application is a continuation of U.S. application Ser. No. 13/702,169, filed Dec. 5, 2012, which is U.S. National Phase filing claiming the benefit of and priority to International Patent Application No. PCT/US11/01029, filed Jun. 7, 2011, which claims priority from and the benefit of U.S. Provisional Patent Application No. 61/437,841, filed Jan. 31, 2011 and U.S. Provisional Patent Application No. 61/397,512, filed Jun. 11, 2010. The entire content of these applications are incorporated herein by reference.

BACKGROUND

Technical Field

This application relates generally to analysis of compounds, and, more particularly, to detection and quantification of ions collected by liquid chromatography, ion-mobility spectrometry and mass spectrometry.

Description of Related Art

Mass spectrometers (MS) are used widely for identifying and quantifying molecular species in a sample. During analysis, molecules from the sample are ionized to form ions that are introduced into the mass spectrometer for analysis. The mass spectrometer measures the mass-to-charge ratio (m/z) and intensity of the introduced ions.

Mass spectrometers are limited in the number of different ions reliably detected and quantified within a single sample spectrum. As a result, samples containing many molecular species may produce spectra that are too complex for interpretation or analysis using conventional mass spectrometers.

In addition, the concentration of molecular species often varies over a wide range. Biological samples, for example, typically have a greater number of molecular species at lower concentrations than at higher concentrations. Thus, a significant fraction of ions appear at low concentration. The low concentration is often near the detection limit of common mass spectrometers. Moreover, at low concentration, ion detection suffers from background noise and/or interfering background molecules. Consequently, detection of such low abundance species can be improved by removing as much of the background noise as possible and reducing the number of interfering species that are present in the spectrum.

A chromatographic separation, prior to injecting the sample into the mass spectrometer, is commonly used to reduce the complexity of such spectra. For example, peptides or proteins often produce clusters of ions that elute at a common chromatographic retention time and thus produce peaks that overlap in a spectrum. Separating the clusters from the different molecules, in time, helps to simplify interpretation of the spectra produced by such clusters.

Common chromatographic separation instruments include gas chromatographs (GC) and liquid chromatographs (LC). When coupled to a mass spectrometer, the resulting systems are referred to as GC/MS or LC/MS systems. GC/MS or LC/MS systems are typically on-line systems in which the output of the GC or LC is coupled directly to the MS.

A combined LC/MS system provides an analyst with a powerful means to identify and to quantify molecular species in a wide variety of samples. Common samples contain a mixture of a few or thousands of molecular species. The molecules often exhibit a wide range of properties and characteristics, and each molecular species can yield more than one ion. For example, the mass of a peptide depends on the isotopic forms of its nucleus, and an electrospray interface can ionize peptides and proteins into families of charge states.

In an LC/MS system, a sample is injected into the liquid chromatograph at a particular time. The liquid chromatograph causes the sample to elute over time resulting in an eluent that exits the liquid chromatograph. The eluent exiting the liquid chromatograph is continuously introduced into the ionization source of the mass spectrometer. As the separation progresses, the composition of the mass spectrum generated by the MS evolves and reflects the changing composition of the eluent.

Typically, at regularly spaced time intervals, a computer-based system samples and records the spectrum. In conventional systems, the acquired spectra are analyzed after completion of the LC separation.

After acquisition, conventional LC/MS systems generate one-dimensional spectra and chromatograms. The response (or intensity) of an ion is the height or area of the peak as seen in either the spectrum or the chromatogram. To analyze spectra or chromatograms generated by conventional LC/MS systems, peaks in such spectra or chromatograms that correspond to ions must be located or detected. The detected peaks are analyzed to determine properties of the ions giving rise to the peaks. These properties include retention time, mass-to-charge ratio and intensity.

Mass or mass-to-charge ratio (m/z) estimates for an ion are derived through examination of a spectrum that contains the ion. Retention time estimates for an ion are derived by examination of a chromatogram that contains the ion. The time location of a peak apex in a single mass-channel chromatogram provides an ion's retention time. The m/z location of a peak apex in a single spectral scan provides the ion's m/z value.

A conventional technique for detecting ions using an LC/MS system forms a total ion chromatogram (TIC). Typically, this technique is applied if there are relatively few ions requiring detection. A TIC is generated by summing, within each spectral scan, all responses collected over all m/z values and plotting the sums against scan time. Ideally, each peak in a TIC corresponds to a single ion.

Co-elution of peaks from multiple molecules is one possible problem with this method of detecting peaks in a TIC. As a result of co-elution, each isolated peak seen in the TIC may not correspond to a unique ion. A conventional method for isolating such co-eluted peaks is to select the apex of one peak from the TIC and collect spectra for the time corresponding to the selected peak's apex. The resulting spectral plot is a series of mass peaks, each presumably corresponding to a single ion eluting at a common retention time.

For complex mixtures, co-elution also typically limits summing of spectral responses to sums only over a subset of collected channels, e.g., by summing over a restricted range of m/z channels. The summed chromatogram provides information about ions detected within the restricted m/z range. In addition, spectra can be obtained for each chromatographic peak apex. To identify all ions in this manner, multiple summed chromatograms are generally required.

Another difficulty encountered with peak detection is detector noise. A common technique for mitigating detector noise effects is to signal-average spectra or chromatograms. For example, the spectra corresponding to a particular chromatographic peak can be co-added to reduce noise effects. Mass-to-charge ratio values as well as peak areas and heights can be obtained from analyzing the peaks in the averaged spectrum. Similarly, co-adding chromatograms centered on the apex of a spectral peak can mitigate noise effects in chromatograms and provide more accurate estimates of retention time as well as chromatographic peak areas and heights.

Aside from these problems, additional difficulties are encountered when conventional peak detection routines are used to detect chromatographic or spectral peaks. If performed manually, such conventional methods are both subjective and tedious. When performed automatically, such methods can still be subjective, due to a subjective selection of thresholds for identification of peaks. Further, these conventional methods tend to be inaccurate because they analyze data using only a single extracted spectrum or chromatogram, and do not provide ion parameter estimates having the highest statistical precision or lowest statistical variance. Finally, conventional peak-detection techniques do not necessarily provide uniform, reproducible results for ions at low concentration, or for complex chromatograms, where co-elution and ion interference tend to be common problems.

SUMMARY OF THE INVENTION

In accordance with one aspect of the invention is a method for processing data comprising performing sample analysis and generating scans of data, each of said scans comprising a set of data elements each associating an ion intensity count with a plurality of dimensions including a retention time dimension and a mass to charge ratio dimension; and analyzing said scans to identify one or more ion peaks, said analyzing including filtering a first plurality of said scans producing a first plurality of filtered output scans, said filtering including first filtering producing a first filtering output, wherein said first filtering includes executing a plurality of threads in parallel which apply a first filter to said first plurality of scans to produce said first filtering output, wherein each of said plurality of threads computes at least one filtered output point for at least one corresponding input point included in said plurality of scans; and detecting one or more peaks using said filtered output scans. The filtering may include performing first processing by a first of said plurality of threads, said first processing including applying a smoothing filter to a first input point in a mass-to-charge ratio dimension to produce a first filtered output point and applying a second derivative filter to the first input point in a mass-to-charge ratio dimension to produce a second filtered output point; and performing second processing by a second of said plurality of threads, said second processing including applying said smoothing filter to a second input point in a mass-to-charge ratio dimension to produce a third filtered output point and applying the second derivative filter to the second input point in a mass-to-charge ratio dimension to produce a fourth filtered output point, wherein said first thread and said second thread execute concurrently and said first thread and said second thread are included in a same block of threads accessing a plurality of input points including said first point and said second point from a portion of memory shared by said block of threads. The first plurality of threads may be included in a two-dimensional grid of thread blocks. Each of the thread blocks may include a two-dimensional configuration of threads in which each of the thread blocks is identified in said grid using a thread block identifier having an "x" dimension indexing said each thread block along the mass to charge ratio axis and having a "y" dimension indexing said each thread block along the retention time axis. The first thread may determine a first input point to which said smoothing filter is applied by said first thread. The first thread may determine a first output point identifying a location at which a corresponding filtered output point for said first input is stored. The first input point may be identified in said first plurality of scans in accordance with coordinates (m, s), wherein "m" is a mass coordinate mapping to a mass to charge ratio of said first input point and "s" identifies a scan in which said first input point is included. The first output point may also be identified using the coordinates (m,s). The first thread may be included in a first thread block having a first thread block identifier. The first thread may have a first thread identifier identifying a position of said first thread within said first thread block. The first thread may determine the coordinates (m,s) using said first thread block identifier and said first thread identifier. The first filtering may use filtering coefficients bound to a texture. The filtering coefficients may be used in connection with filtering a portion of less than all mass to charge ratio values in said first plurality of scans. The filtering may include executing a second plurality of threads concurrently, wherein each of said second plurality of threads applies a second filter in a retention time dimension to at least one data point. The second filter may be any of a smoothing filter and second derivative filter. The second filter may use a same set of filter coefficients for all data points to which the second filter is applied. The filter coefficients may be stored in constant memory used by a graphics processing unit. The graphics processing unit and said constant memory may be included in a separate device configured for used with a computer. The second plurality of threads may be included in a two-dimensional grid of thread blocks, each of said thread blocks being a two-dimensional block of threads. The method may also include determining first thread block dimensions of a first block of threads configured for parallel execution and each thread in said first block configured to apply a filter in a mass to charge ratio dimension to at least one data point; determining second thread block dimensions of a second block of threads configured for parallel execution and each thread in said second block configured to apply a filter in a retention time dimension to at least one data point; determining third thread block dimensions, wherein each dimension of said third thread block is a least common multiple of corresponding ones of said each dimension of said first thread block and said second thread block; and selecting scan pack dimensions in accordance with said third block dimensions, wherein said scan pack dimensions indicate sizing with respect to a number of said scans of data and a number of mass to charge ratio values per scan, wherein said analyzing is performed on a first scan pack before performing said analyzing with respect to a second scan pack, said first scan pack including a first portion of said scans of data and having said scan pack dimensions, said second scan pack including a second portion of said scans of data and having said scan pack dimensions. The first scan pack may include said first plurality of scans, and the method may further include reading, by executing code on a processing unit of a computer which executes instructions serially, said first scan pack; storing said first scan pack in a first memory of said computer; copying said first scan pack into a second memory of a device, said device including a graphics processing unit that performs parallel processing, wherein said second memory is configured for use by said graphics processing unit when performing parallel processing and wherein said first memory is not configured for use by said graphics processing unit; performing said first filtering by executing said plurality of threads in parallel on said graphics processor using said first scan pack to identify one or more peaks in said first scan pack; storing, by said graphics processing unit in said second memory, output data identifying said one or more peaks; and copying said output data from said second memory to said first memory. The step of detecting one or more peaks may be performed by concurrently executing threads included in a two-dimensional grid of thread blocks. Each of the thread blocks may include a two-dimensional configuration of threads. Threads included in a same first thread block may have access to data stored in a portion of memory shared by all threads in the first thread block. Each of the threads included in said two-dimensional grid may determine whether at least one filtered output point included in said filtered output scans is a peak. Each of the thread blocks may have first dimensions selected in accordance with utilization of a processing unit which performs concurrent processing, a number of threads included in said thread block having said first dimensions, and an approximation of said first dimensions to a square. The one or more peaks identified by said detecting may be identified with respect to retention time and mass to charge ratio dimensions. The plurality of dimensions may include an ion mobility dimension and the method may include identifying peaks with respect the ion mobility dimension. The analyzing may include identifying one or more properties for each of said one or more ion peaks identified. At least a first of said properties may be determined by concurrently executing threads included in a grid of thread blocks. Each of the threads may determine the first property for at least one of peaks identified by said detecting. The method may be performed in real-time while said scans are generated as a result of sample analysis by a mass spectrometer. The one or more peaks may be a first set of peaks and said analyzing may further comprise determining a scan pack size comprising a number of scans having different retention times; determining, for each peak in said first set, a data volume having dimensions in accordance with data used for filtering with respect to said each peak and an output volume having dimensions in accordance with said a starting and ending location of said each peak with respect to retention time and m/z dimensions and covering an ion mobility range; determining a buffer volume having each dimension thereof which is at least a same size as a largest corresponding dimension with respect to all data volumes for all peaks in said first set; determining a first portion of peaks of said first set which are included in a first scan pack of said scan pack size, said first scan pack including a partition of said scans; partitioning said first portion into one or more groups of peaks and, for each group, performing first processing. The first processing may include reading, for each peak in said each group, first data from said first scan pack in accordance with the data volume for said each peak and storing the first data into a buffer having a size in accordance with said buffer volume; filtering the first data for each peak in said each group, wherein said filtering the first data includes a second plurality of threads executing concurrently, wherein for said each peak, each of said second plurality of threads applies a filter and computes a single filtered output point for a corresponding data point in the buffer for said each peak if said corresponding data point is in included within appropriate ones of the output volume and the data volume for said each peak; and identifying child peaks for said each group. If the filter is applied in a retention time dimension, each of said second plurality of threads may compute a single filtered output point for a corresponding data point in the buffer for said each peak if said corresponding data point is within the output volume with respect to the retention time axis and within the data volume with respect to the m/z and the ion mobility axes. If the filter is applied in a retention time dimension, each of said second plurality of threads may compute a single filtered output point for a corresponding data point in the buffer for said each peak if said corresponding data point is within the output volume with respect to the retention time and the m/z axes and within the data volume with respect to the ion mobility axis. If the filter is applied in a retention time dimension, each of said second plurality of threads may compute a single filtered output point for a corresponding data point in the buffer for said each peak if said corresponding data point is within the output volume with respect to the retention time, the m/z, and the ion mobility axes. Analyzing, for a first peak, may further comprise applying a smoothing filter in the retention time dimension to first data stored in the first buffer to produce second data stored in a second buffer; applying a second derivative filter in the retention time dimension to the first data stored in the first buffer to produce third data stored in a third buffer; applying, after producing said second data and said third data, a smoothing filter in the mass to charge ratio dimension to the third data to produce fourth data stored in said first buffer; applying, after producing said fourth data, a smoothing filter in the ion mobility dimension to the fourth data to produce fifth data stored in said third buffer; applying, after producing said fifth data, a second derivative filter in the mass to charge ratio dimension to said second data to produce sixth data stored in the first buffer; applying, after producing said sixth data, a smoothing filter in the ion mobility dimension to said sixth data to produce seventh data which is combined with said fifth data to produce a first combined result stored in said third buffer; applying, after producing said first combined result, a smoothing filter in the mass to charge ratio dimension to the second data to produce eighth data stored in the first buffer; and applying, after producing said eighth data, a second derivative filter in the ion mobility dimension to the eighth data to produce ninth data which is combined with said first combined result to produce a second combined result stored in the third buffer. The filtering of the first data for each peak may include applying a sequence of three filters, a first of the filters being applied with respect to a first dimension or first axis to the first data to produce a first output, a second of the filters being applied with respect to a second dimension or second axis to the first output to produce a second output, and a third of the filters being applied with respect to a third dimension or third axis to the second output to produce a third output. The first output may have a first size with respect to said first dimension which is less than a second size of the first data with respect to the first dimension. The second output may have a third size with respect to said second dimension which is less than fourth size of the first output with respect to the second dimension. The third output may have a fourth size with respect to said third dimension which is less than fifth size of the second output with respect to the third dimension.

In accordance with another aspect of the invention is a method for processing data from sample analysis comprising: performing mass spectrometry and generating one or more spectra; and analyzing the one or more spectra to generate a peak list of one or more ion peaks identified in the one or more spectra, said analyzing including performing, in parallel, at least a first filtering step and a second filtering step. Analyzing may include filtering the one or more spectra and the first filtering step may computes a first filtered output point and said second filtering step may computes a second filtered output point. The filtering may be performed in one of a plurality of dimensions, said plurality of dimensions including retention time, mass or m/z, and ion mobility.

In accordance with another aspect of the invention is a system that performs mass spectrometry comprising: a parallel processing unit; and a computer readable medium comprising code stored thereon which, when executed, performs steps including: receiving one or more spectra produced as a result of mass analyzing a sample; and analyzing the one or more spectra to generate a peak list of one or more ion peaks identified in the one or more spectra, said analyzing including performing, in parallel using said parallel processing unit, at least a first filtering step and a second filtering step. The analyzing may include filtering the one or more spectra and the first filtering step may compute a first filtered output point and said second filtering step may compute a second filtered output point. The filtering may perform filtering in one of a plurality of dimensions, said plurality of dimensions including retention time, mass or m/z, and ion mobility. The system may also include a processor which executes instructions serially. The computer readable medium may further include code for: performing preprocessing; obtaining said one or more spectra as input from a memory; performing peak detection to identify said one or more peaks; performing peak properties computation on said one or more peaks included in said peak list to generate peak property information; and writing said peak list and said peak property information to a memory. The steps of preprocessing, said obtaining, and said writing may be performed by code executing in said processor and wherein said performing peak detection, said performing peak property computation may be performed by code executing in the parallel processing unit. In connection with performing said obtaining, said processor may execute code that reads said one or more spectra, stores said one or more spectra in a first memory that is configured for access by said processor and is not configured for access by the parallel processing unit, and copies said one or more spectra from said first memory to a second memory included on a device comprising said parallel processing unit. The system may output the peak list and may store the peak list to non-volatile memory. The one or more spectra may be stored in volatile memory during said analyzing and said one or more spectra may not be stored to non-volatile memory for output as a result of said analyzing.

BRIEF DESCRIPTION OF THE DRAWINGS

Features and advantages of the present invention will become more apparent from the following detailed description of exemplary embodiments thereof taken in conjunction with the accompanying drawings in which:

FIGS. 3A-3C illustrate exemplary spectra for three ions produced during an exemplary LC/MS experiment for three times.

FIGS. 4A-4C illustrate chromatograms corresponding to the exemplary ions of FIG. 3.

FIGS. 12A-12C illustrate a "shoulder" effect of a co-eluting ion on the exemplary data illustrated in FIG. 3.

FIGS. 14A-14C illustrate spectra for three ions corresponding to the exemplary data illustrated in the data matrix shown in FIG. 13.

FIGS. 14D-14F illustrate chromatograms for three ions corresponding to the exemplary data illustrated in the data matrix shown in FIG. 13.

FIG. 17C illustrates a simulation of two LC/MS peaks having equal mass and that are nearly, but not identically, co-incident in time.

FIG. 17D illustrates the peak cross section in mass of the two-peak simulation of FIG. 17C.

FIG. 17E illustrates the peak cross section in time of the two-peak simulation of FIG. 17C.

FIG. 17F illustrates the effect of adding counting (shot) noise to the two-peak simulation of FIG. 17C.

FIG. 17G illustrates the peak cross section in mass of the added noise two-peak simulation of FIG. 17F.

FIG. 17H illustrates the peak cross section in time of the added noise two-peak simulation of FIG. 17F.

FIG. 17I illustrates the result convolving a rank-2 filter with simulated data of FIG. 17F.

FIG. 17J illustrates the peak cross section in mass of the result illustrated in FIG. 17I.

FIG. 17K illustrates the peak cross section in time of the result illustrated in FIG. 17I.

FIG. 20 is a flow chart for a method for determining appropriate thresholds according to an embodiment of the present invention.

FIG. 21 is a flow chart for a method for determining a peak purity metric according to an embodiment of the present invention.

FIGS. 28A, 28B 29A, 29B, 30A, 30B and 31 illustrate data that may be used in connection with various processing aspects in an embodiment in accordance with techniques herein FIG. 28C illustrates an example of determining reflected points as may be performed in an embodiment in accordance with techniques herein

FIGS. 39A-D are examples illustrating neighboring points considered for use with peak detection in an embodiment in accordance with techniques herein.

FIGS. 42 and 43 are example arrangements of peak shape information in an embodiment in accordance with techniques herein.

FIG. 44 is an example of coefficient sets that may be used in an embodiment in accordance with techniques herein.

FIGS. 45, 46 and 47 are examples of different volumes of data that may be used in connection with detected peaks for 4D processing in an embodiment in accordance with techniques herein.

FIG. 48 is an example arrangement of buffer volume data for parent peaks in an embodiment in accordance with techniques herein.

FIGS. 50A and 50B illustrated how raw data may be arranged in an embodiment in accordance with techniques herein.

DETAILED DESCRIPTION OF EMBODIMENT(S)

Definitions

Figure 1:
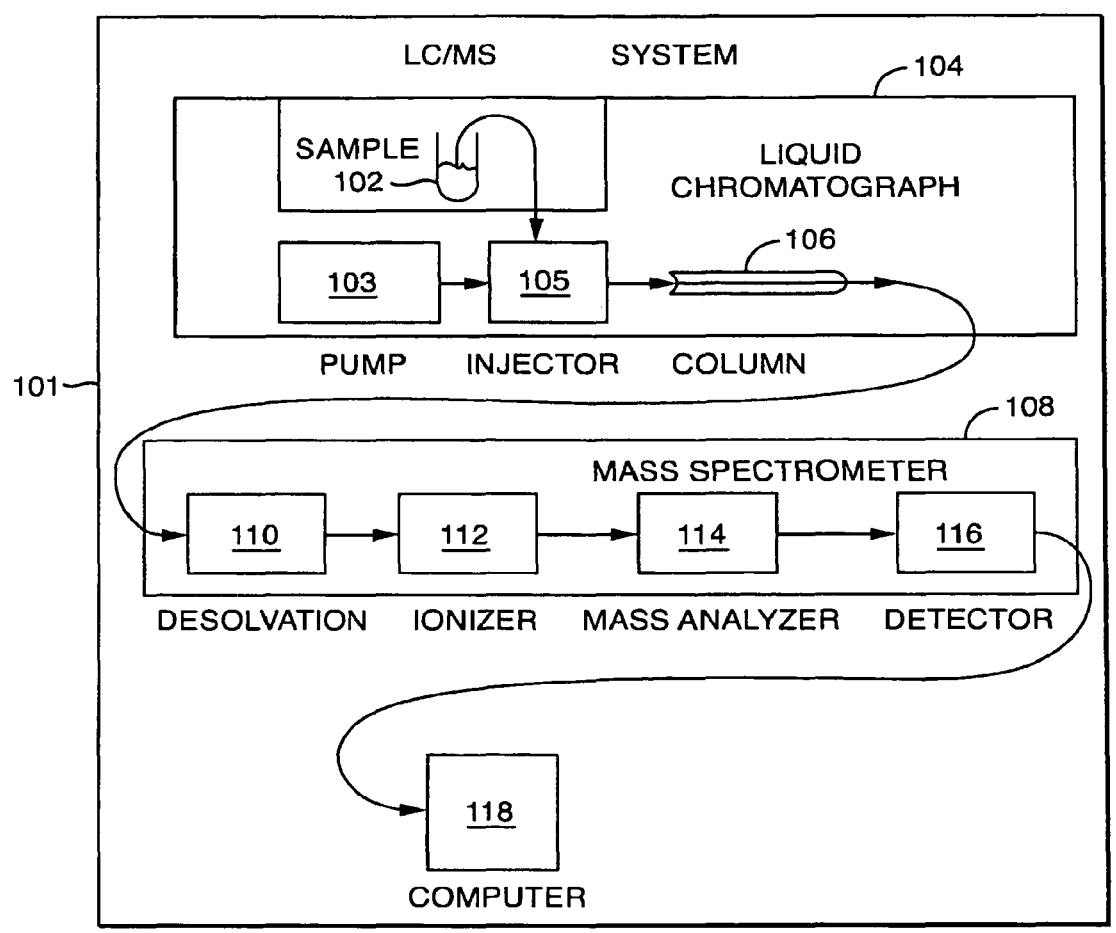
FIG. 1 is a schematic diagram of an exemplary LC/MS system according to an embodiment of the present invention.

"Chromatography"—refers to equipment and/or methods used in the separation of chemical compounds. Chromatographic equipment typically moves fluids and/or ions under pressure and/or electrical and/or magnetic forces. The word "chromatogram," depending on context, herein refers to data or a representation of data derived by chromatographic means. A chromatogram can include a set of data points, each of which is composed of two or more values; one of these values is often a chromatographic retention time value, and the remaining value(s) are typically associated with values of intensity or magnitude, which in turn correspond to quantities or concentrations of components of a sample.

The invention supports the generation and analysis of chromatographic data. Some embodiments of the invention involve instruments that include a single module that separates sample compounds while other embodiments involve multiple modules. For example, principles of the invention are applicable to liquid chromatography apparatus as well as to, for example, apparatus that include liquid chromatography, ion-mobility spectrometry and mass spectrometry modules. In some multi-module-based embodiments, a chromatographic module is placed in fluidic communication with an ion-mobility spectrometry module through an appropriate interface; the IMS module is, in turn, interfaced to a mass-spectrometry module through use of an appropriate interface, such as an electrospray-ionization interface. Some appropriate interfaces at times create or maintain separated materials in an ionic form. A stream of sample fluid is typically vaporized, ionized, and delivered to an inlet orifice of a mass-spectrometry module.

Thus, some embodiments produce multi-dimensional data composed of sets of data elements, each of which has valves associated with measurement dimensions such as retention time (derived from a chromatography module), ion mobility and mass-to-charge ratio. A unique set of dimensional valves is experimentally linked to, for example, a valve of ion intensity as measured in a mass spectrometry module.

Protein—herein refers to a specific primary sequence of amino acids assembled as a single polypeptide.

Peptide—herein refers to a specific sequence of amino acids assembled as a single polypeptide contained within the primary sequence of a protein.

Precursor peptides—tryptic peptides (or other protein cleavage products) that are generated using a protein-cleavage protocol. The precursors are optionally separated chromatographically and passed to a mass spectrometer. An ion source ionizes these precursor peptides to typically produce a positively charged, protenated form of the precursor. The mass of such positively charged protenated precursor ion is herein referred as the "mwHPlus" or "MH+" of the precursor. In the following, the term "precursor mass" refers generally to the protenated, mwHPlus or MH+ mass of the ionized, peptide precursor.

Fragments—Multiple types of fragments can occur in LC/MS analyses. In the case of tryptic peptide precursors, fragments can include polypetide ions that are produced from collisional fragmentation of the intact peptide precursors and whose primary amino acid sequence is contained within the originating precursor peptide. Y-ions and B-ions are examples of such peptide fragments. Fragments of tryptic peptides can also include immonium ions, functional groups such as a phosphate ion ($PO_3$), mass tags cleaved from a specific molecule or class of molecules, or "neutral loss" of water ($H_2O$) or ammonia ($NH_3$) molecules from the precursor.

Y-ions and B-ions—If a peptide fragments at the peptide bond, and if a charge is retained on the N terminal fragment, that fragment ion is termed a B-ion. If the charge is retained on the C terminal fragment, the fragment ion is termed a Y-ion. A more comprehensive list of possible fragments and their nomenclature is provided in Roepstorff and Fohlman, Biomed Mass Spectrom, 1984; 11(11):601 and Johnson et al, Anal. Chem 1987, 59(21): 2621:2625.

Retention time—in context, typically refers to the point in a chromatographic profile at which an entity reaches its maximum intensity.

Ions—a peptide, for example, typically appears in an LC/MS analysis as an ensemble of ions due to the natural abundance of the isotopes of the constituent elements. An ion has, for example, a retention time and an m/z value. The mass spectrometer (MS) detects only ions. The LC/MS technique produces a variety of observed measurements for every detected ion. This includes: the mass-to-charge ratio (m/z), mass (m), the retention time, and the signal intensity of the ion, such as a number of ions counted.

Noise—used herein to refer to a raw-data component arising from sources such as detector noise, including Poisson noise due to counting statistics and Gaussian, Johnson noise due to thermal effects, and other noise sources that tend to hide real ion peaks or produce false ion peaks.

Artifact—refers herein to false peaks in raw data, as arise from, for example, noise, peak interference and peak overlap.

Generally, an LC/IMS/MS analysis optionally provides an empirical description of, for example, a peptide in terms of its mass, charge, retention time, mobility and total intensity. When a peptide elutes from a chromatographic column, it elutes over a specific retention time period and reaches its maximum signal at a single retention time. After ionization and (possible) fragmentation, the peptide appears as a related set of ions. The different ions in the set correspond to different isotopic compositions and charges of the common peptide. Each ion within the related set of ions produces a single peak retention time and peak shape. Since these ions originate from a common peptide, the peak retention time and peak shape of each ion is identical, within some measurement tolerance. The MS acquisition of each peptide produces multiple ion detections for all isotopes and charge states, all sharing the same peak retention-time and peak shape within some measurement tolerance.

In an LC/MS separation, a single peptide (precursor or fragment) produces many ion detections, which appear as a cluster of ions, having multiple charge states. Deconvolution of these ion detections from such a cluster, indicates the presence of a single entity of a unique monoisotopic mass, at a specific retention time, of a measured signal intensity, in a charge state.

Embodiments of the present invention can be applied to a variety of applications including large-molecule, non-volatile analytes that can be dissolved in a solvent. Although embodiments of the present invention are described hereinafter with respect to LC, LC/MS or LC/IMS/MS systems, embodiments of the present invention can be configured for operation with other analysis techniques, including GC, GC/MS and GC/IMS/MS systems. For context, embodiments that utilize 1-D and 2-D matrices for analysis of LC/MS data are described first, with reference to FIGS. 1-23. Subsequently, some preferred embodiments of the present invention, relating to LC/IMS/MS and higher dimensional techniques, are described with reference to FIG. 24.

FIG. 1 is a schematic diagram of an exemplary LC/MS system 101 according to an embodiment of the present invention. LC/MS analysis is performed by automatically or manually injecting a sample 102 into a liquid chromatograph 104. A high pressure stream of chromatographic solvent provided by pump 103 and injector 105 forces sample 102 to migrate through a chromatographic column 106 in liquid chromatograph 104. Column 106 typically comprises a packed column of silica beads whose surface comprises bonded molecules. Competitive interactions between the molecular species in the sample, the solvent and the beads determine the migration velocity of each molecular species.

A molecular species migrates through column 106 and emerges, or elutes, from column 106 at a characteristic time. This characteristic time commonly is referred to as the molecule's retention time. Once the molecule elutes from column 106, it can be conveyed to a detector, such as a mass spectrometer 108.

Figure 2:
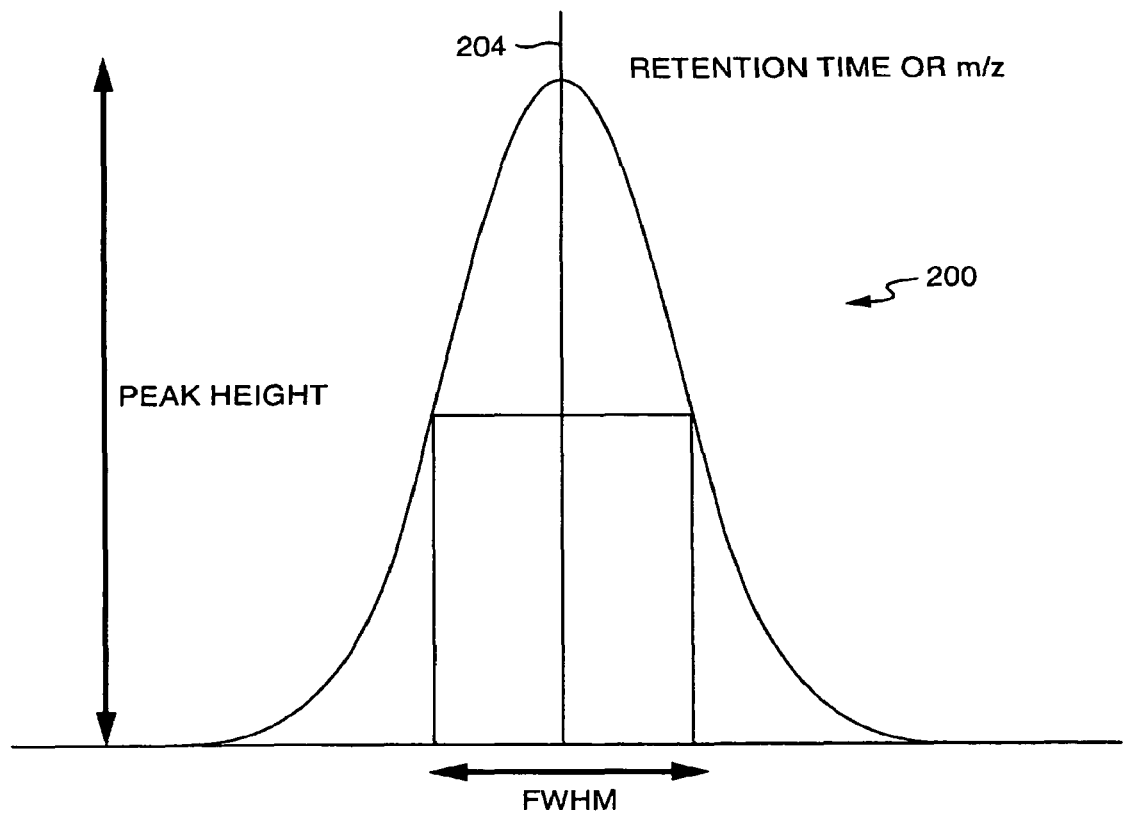
FIG. 2 is a diagram of an exemplary chromatographic or spectral peak.

A retention time is a characteristic time. That is, a molecule that elutes from a column at retention time t in reality elutes over a period of time that is essentially centered at time t. The elution profile over the time period is referred to as a chromatographic peak. The elution profile of a chromatographic peak can be described by a bell-shaped curve. The peak's bell shape has a width that typically is described by its full width at half height, or half-maximum (FWHM). The molecule's retention time is the time of the apex of the peak's elution profile. Spectral peaks appearing in spectra generated by mass spectrometers have a similar shape and can be characterized in a similar manner. FIG. 2 illustrates an exemplary chromatographic or spectral peak 202 having a peak apex 204. The FWHM and height or the peak 202 are also illustrated in FIG. 2.

For purposes of subsequent description, peaks are assumed to have a Gaussian profile as shown in FIG. 2. For a Gaussian profile, the FWHM is approximately 2.35 times the standard deviation σ of the Gaussian profile.

Chromatographic peak width is independent of peak height and is substantially a constant characteristic of a molecule for a given separation method. In the ideal case, for a given chromatographic method all molecular species would elute with the same peak width. However, typically peak widths change as a function of retention time. For example, molecules that elute at the end of a separation can display peak widths that are several times wider than peak widths associated with molecules that elute early in the separation.

In addition to its width, a chromatographic or spectral peak has a height or area. Generally, the height and area of the peak are proportional to the amount or mass of the species injected into the liquid chromatograph. The term intensity commonly refers to either the height or area of the chromatographic or spectral peak.

Although chromatographic separation is a substantially continuous process, detectors analyzing the eluent typically sample the eluent at regularly spaced intervals. The rate at which a detector samples the eluent is referred to as the sample rate or sample frequency. Alternatively, the interval at which a detector samples the eluent is referred to as the sampling interval or sample period. Because the sample period must be long enough so that the system adequately samples the profile of each peak, the minimum sample period is limited by the chromatographic peak width. As an example, the sample period can be set so that approximately five (5) measurements are made during the FWHM of a chromatographic peak.

In an LC/MS system, the chromatographic eluent is introduced into a mass spectrometer (MS) 108 for analysis as shown in FIG. 1. MS 108 comprises a desolvation system 110, an ionizer 112, a mass analyzer 114, a detector 116, and a computer 118. When the sample is introduced into MS 108, desolvation system 110 removes the solvent, and ionizing source 112 ionizes the analyte molecules. Ionization methods to ionize molecules that evolve from LC 104 include electron-impact (EI), electrospray (ES), and atmospheric chemical ionization (APCI). Note that in APCI, the order of ionization and desolvation is reversed.

The ionized molecules are then conveyed to mass analyzer 114. Mass analyzer 114 sorts or filters the molecules by their mass-to-charge ratio. Mass analyzers, such as mass analyzer 114 that are used to analyze ionized molecules in MS 108 include quadrupole mass analyzers (Q), time-of-flight (TOF) mass analyzers, and Fourier-transform-based mass spectrometers (FTMS).

Mass analyzers can be placed in tandem in a variety of configurations, including, e.g., quadrupole time-of-flight (Q-TOF) mass analyzers. A tandem configuration enables on-line collision modification and analysis of an already mass-analyzed molecule. For example, in triple quadrupole based massed analyzers (such as Q1-Q2-Q3 or Q1-Q2-TOF mass analyzers), the second quadrupole (Q2), imports accelerating voltages to the ions separated by the first quadrupole (Q1). These ions, collide with a gas expressly introduced into Q2. The ions fragment as a result of these collisions. Those fragments are further analyzed by the third quadrupole (Q3) or by the TOF. Embodiments of the present invention are applicable to spectra and chromatograms obtained from any mode of mass-analysis such as those described above.

Molecules at each value for m/z are then detected with detection device 116. Exemplary ion detection devices include current measuring electrometers and single ion counting multi-channel plates (MCPs). The signal from an MCP can be analyzed by a descriminator followed by a time-domain-converter (TDC) or by an analog to digital (ATD) converter. For purposes of the present description, an MCP detection-based system is assumed. As a result, detector response is represented by a specific number of counts. This detector response (i.e., number of counts) is proportional to the intensity of ions detected at each mass-to-charge-ratio interval.

An LC/MS system outputs a series of spectra or scans collected over time. A mass-to-charge spectrum is intensity plotted as a function of m/z. Each element, a single mass-to-charge ratio, of a spectrum is referred to as a channel. Viewing a single channel over time provides a chromatogram for the corresponding mass-to-charge ratio. The generated mass-to-charge spectra or scans can be acquired and recorded by computer 118 and stored in a storage medium such as a hard-disk drive that is accessible to computer 118. Typically, a spectrum or chromatogram is recorded as an array of values and stored by computer system 118. The array can be displayed and mathematically analyzed.

The specific functional elements that make up an MS system, such as MS 108, can vary between LC/MS systems. Embodiments of the present invention can be adapted for use with any of a wide range of components that can make up an MS system.

After chromatographic separation and ion detection and recordation, the data is analyzed using a post-separation data analysis system (DAS). In an alternate embodiment of the present invention, the DAS performs analysis in real-time or near real-time. The DAS is generally implemented by computer software executing on a computer such as computer 118 shown in FIG. 1. Computers that can be configured to execute the DAS as described herein are well known to those skilled in the art. The DAS is configured to perform a number of tasks, including providing visual displays of the spectra and/or chromatograms as well as providing tools for performing mathematical analysis on the data. The analyses provided by the DAS include analyzing the results obtained from a single injection and/or the results obtained from a set of injections to be viewed and further analyzed. Examples of analyses applied to a sample set include the production of calibration curves for analytes of interest, and the detection of novel compounds present in the unknowns, but not in the controls. A DAS according to embodiments of the present invention is described herein.

Figure 3C:
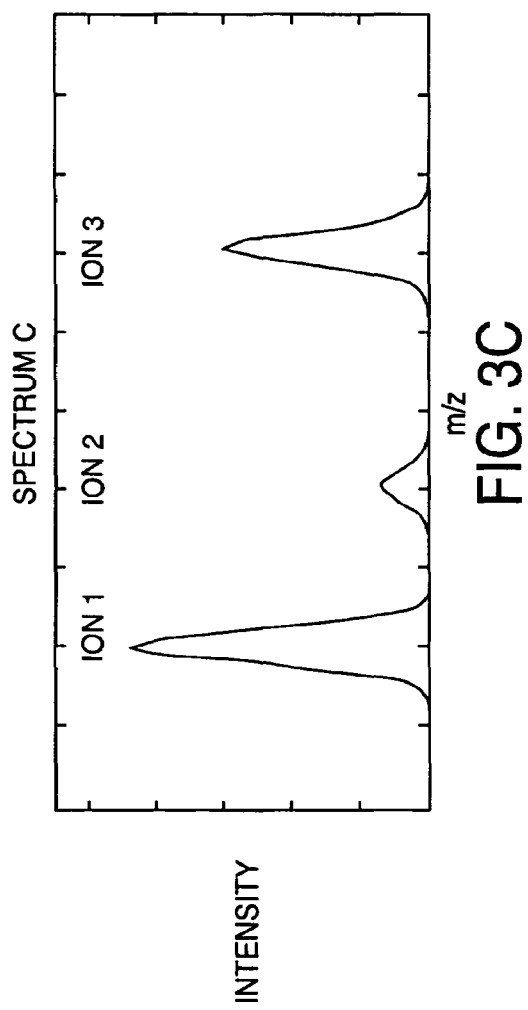

FIGS. 3A-3C illustrate exemplary spectra for three ions (ion 1, ion 2 and ion 3) produced during an exemplary LC/MS experiment. Peaks associated with ion 1, ion 2 and ion 3 appear within a limited range of retention time and m/z. For the present example, it is assumed that the mass-to-charge ratios of ion 1, ion 2 and ion 3 are different, and that the molecular parents of the ions eluted at nearly, but not exactly, identical retention times. As a result, the elution profiles of the respective molecules overlap or co-elute. Under these assumptions, there is a time when all three molecules are present in the ionizing source of the MS. For example, the exemplary spectrum illustrated in FIGS.

3A-3C were collected when all three ions were present in the MS ionization source. This is apparent because each spectrum exhibits a peak associated with each of ions 1, 2 and 3. As can be seen in the exemplary spectra illustrated in FIG. 3A-3C, there is no overlap of spectral peaks. The lack of overlap indicates that the mass spectrometer resolved these spectral peaks. The location of the apex of the peaks corresponding to each of ions 1, 2 and 3 represents its mass-to-charge ratio.

It is not possible to determine precise retention times or even relative retention times at which ions in a spectrum elute using only a single spectrum. For example, it can be seen that at the time the data for Spectrum B was collected, all three molecules associated with ions 1, 2 and 3 were eluting from the column. However, analyzing only Spectrum B, it is not possible to determine a relationship between the elution times of ions 1, 2 and 3. Thus, Spectrum B could have been collected at a time corresponding to the beginning of a chromatographic peak, as the molecule began to elute from the column, or from the end of the chromatographic peak, when the molecule was nearly finished eluting or at some time in between.

More accurate information related to retention time can be obtained by examining successive spectra. This additional information can include the retention time of the eluting molecules or at least the elution order. For example, assume Spectra A, B, and C shown in FIGS. 3A-3C were collected successively such that Spectrum A was collected at time tA; Spectrum B was collected at a later time tB; and Spectrum C was collected at time tC, which is a time later than time tB. Then, the elution order of the respective molecules can be determined by examining the relative heights of the peaks appearing in spectra successively collected as time progresses from tA to tC. Such examination reveals that as time progresses ion 2 decreases in intensity relative to ion 1, and that ion 3 increases in intensity relative to ion 1. Therefore, ion 2 elutes before ion 1, and ion 3 elutes after ion 1.

Figure 4A:
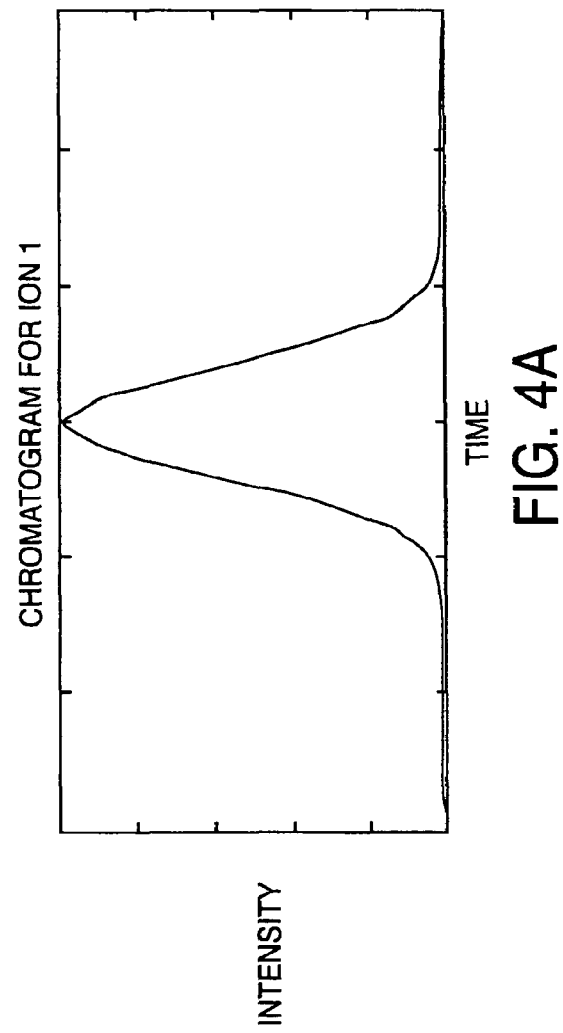

This elution order can be verified by generating chromatograms corresponding to each peak found in a spectrum. This can be accomplished by obtaining the m/z value at the apex of each of the peaks corresponding to ions 1, 2 and 3. Given these three m/z values, the DAS extracts from each spectrum the intensity obtained at that m/z for each scan. The extracted intensities are then plotted versus elution time. Such a plot is illustrated in FIGS. 4A-4C. It can be seen that the plots in FIG. 4 represent the chromatograms for ions 1, 2, and 3 at the m/z values obtained by examining the peaks in FIGS. 3A-3C. Each chromatogram contains a single peak. Examination of the chromatograms for ions 1, 2 and 3 as illustrated in FIGS. 4A-4C confirms that ion 2 elutes at the earliest time and that ion 3 elutes at the latest time. The apex location in each of the chromatograms shown in FIGS. 4A-4C represents the elution time for the molecule corresponding to the respective ions.

With this introduction in mind, embodiments of the present invention relate to analyzing experimental analysis outputs, such as spectra and chromatograms, to optimally detect ions and quantify parameters related to the detected ions. Moreover, embodiments of the present invention can provide significantly simplified spectra and chromatograms.

Figure 5:
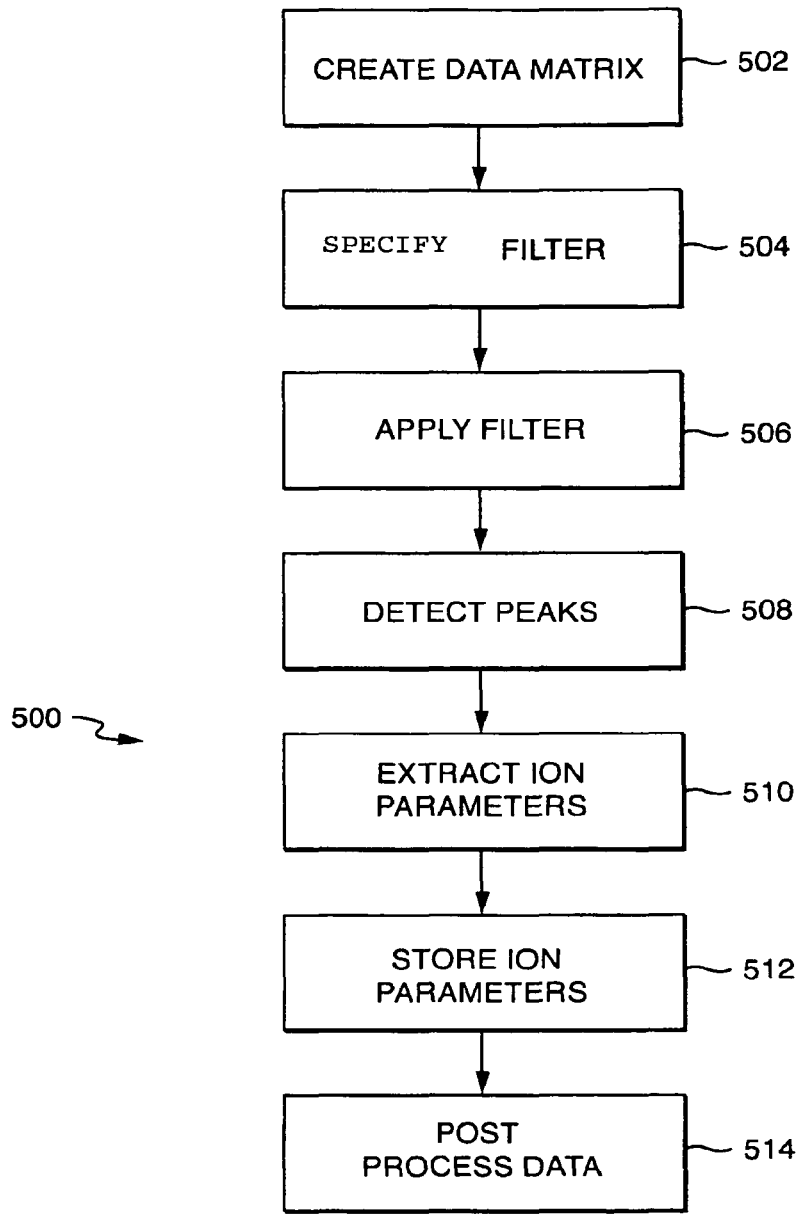
FIG. 5 is a flow chart for a method for processing data according to an embodiment of the present invention.

FIG. 5 is a flow chart 500 for processing experimental analysis output, such as spectra and chromatograms. Flow chart 500 can be embodied in a number of ways including in the DAS described above. In the embodiment of the present invention illustrated in FIG. 5, analysis proceeds as follows:

STEP 502: Create a two-dimensional data matrix having chromatographic and spectral data.

STEP 504: Specify a two-dimensional convolution filter to apply to the data matrix.

STEP 506: Apply the two-dimensional convolution filter to the data matrix. For example, the data matrix can be convolved with the two-dimensional filter.

STEP 508: Detect peaks in the output of the application of the two-dimensional filter to the data matrix. Each detected peak is deemed to correspond to an ion. Thresholding can be used to optimize peak detection.

STEP 510: Extract ion parameters for each detected peak. The parameters include ion characteristics such as retention time, mass-to-charge ratio, intensity, peak width in the spectral direction and/or peak width in the chromatographic direction.

STEP 512: Store the ion parameters associated with extracted ions in a list or table. Storage can be performed as each peak is detected or after a plurality or all of the peaks have been detected.

STEP 514: Use the extracted ion parameters to post-process the data. For example, the ion parameter table can be used to simplify the data. Such simplification can be accomplished, for example, by windowing to reduce spectral or chromatographic complexity. Properties of the molecules can be inferred from the simplified data.

Figure 6:
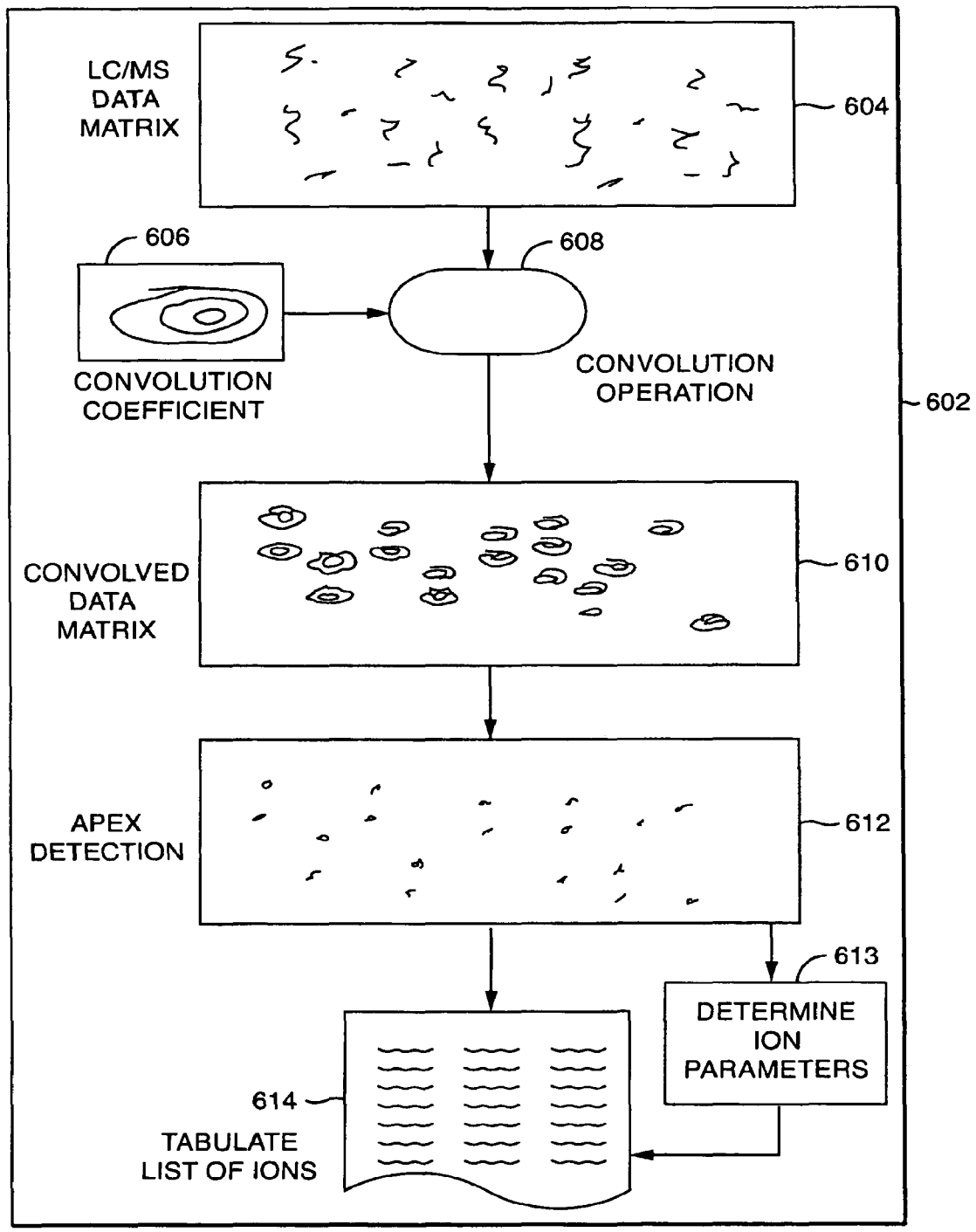
FIG. 6 is a graphical flow chart for a method for processing data according to an embodiment of the present invention.
Figure 7:
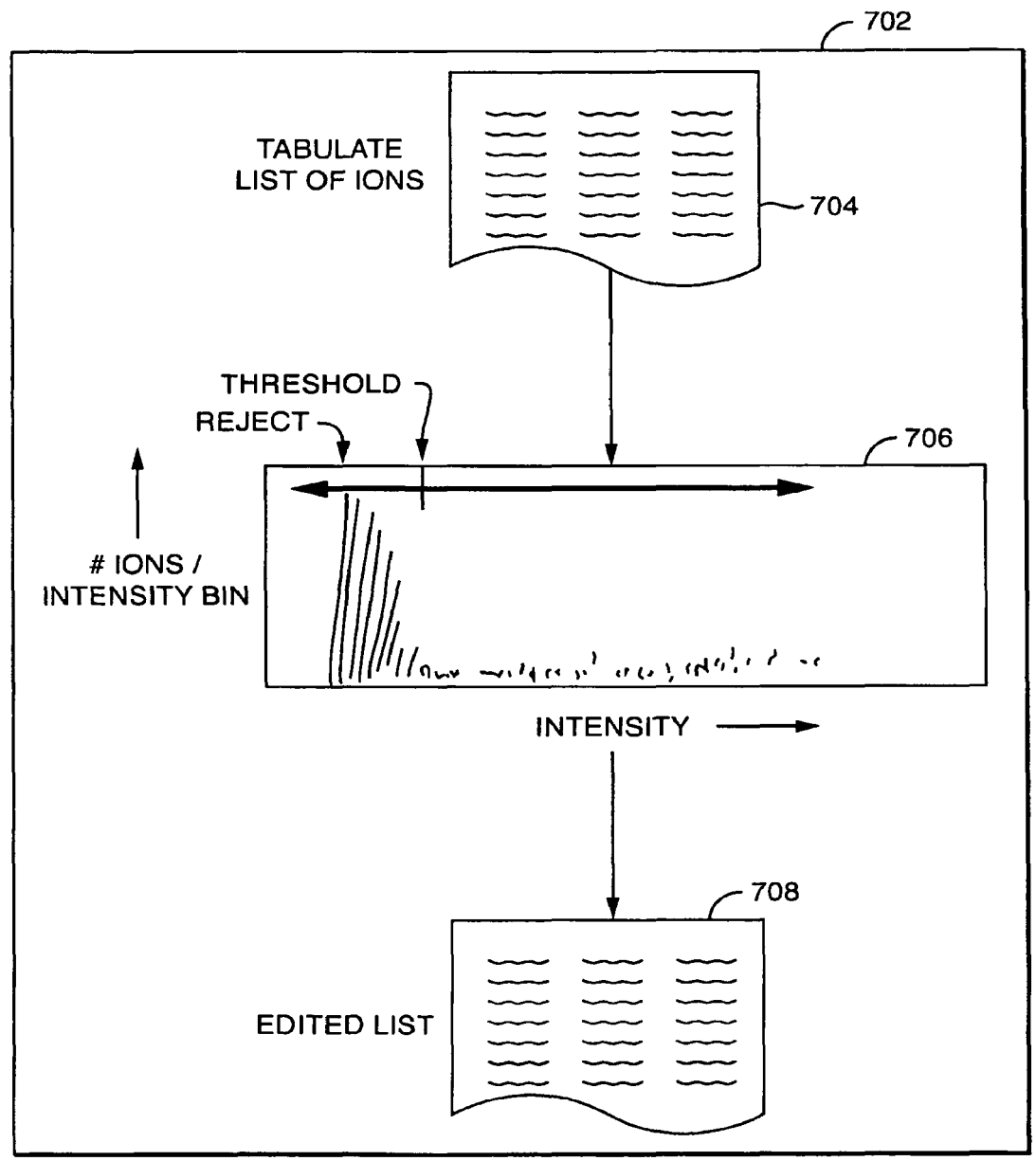
FIG. 7 is a graphical flow chart for a method for determining thresholds for use in detecting ions according to an embodiment of the present invention.

FIGS. 6 and 7 are graphical flow charts describing the foregoing steps of flow chart 500. FIG. 6 is a graphical flowchart 602 of a method for processing LC/MS data according to an embodiment of the present invention. More particularly, each element of graphical flowchart 602 illustrates the result of a step according to an embodiment of the present invention. Element 604 is an exemplary LC/MS data matrix created according to an embodiment of the present invention. As described below, the LC/MS data matrix can be created by placing LC/MS spectra collected at successive times in successive columns of a data matrix. Element 606 is an exemplary two-dimensional convolution filter that can be specified according to desired filtering characteristics. Considerations for specifying the two-dimensional filter are described in more detail below. Element 608 represents application of the two-dimensional filter of element 606 to the LC/MS data matrix of element 604 according to an embodiment of the present invention. An exemplary such application of the two-dimensional filter to the LC/MS data matrix is a two-dimensional convolution wherein the LC/MS data matrix is convolved with the two-dimensional convolution filter. The output of the filtering step is the output data matrix, an example of which is illustrated as element 610. Where the application of the filter to the data matrix comprises a convolution, the output is an output convolved matrix.

Element 612 illustrates an exemplary result of performing peak detection on the output data matrix to identify or detect peaks associated with ions. Thresholding can be used to optimize the peak detection. At this point, the ions are considered detected. Element 614 is an exemplary list or table of the ion properties created using the detected ions.

FIG. 7 is a graphical flowchart 702 illustrating results of determining a detection threshold and its application to further consolidate the ion parameter table according to an embodiment of the present invention. Element 706 represents exemplary peak data accessed from the ion parameter list, Element 704. Element 706 illustrate results of determining a detection threshold using the accessed data. The determined threshold is applied to the ion parameter list generated as Step 704 to generate an edited ion parameter list an example of which is illustrated as Step 708. The foregoing steps are now explained in more detail.

Step 1: Create Data Matrix

Figure 8:
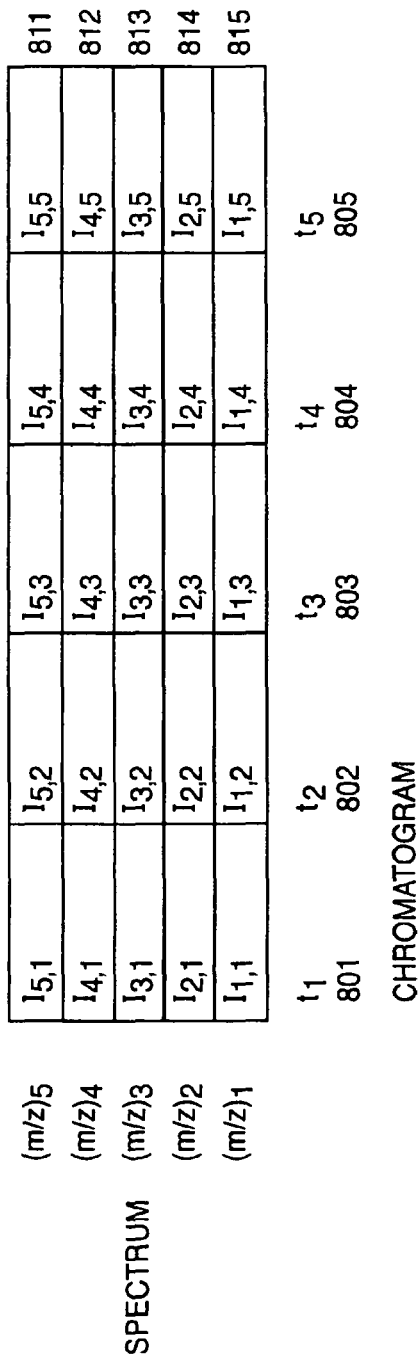
FIG. 8 illustrates an exemplary data matrix according to an embodiment of the present invention.

Rather than view the output of an LC/MS analysis as distinct series of spectra and chromatograms, it is advantageous to configure the LC/MS output as a data matrix of intensities. In an embodiment of the present invention, the data matrix is constructed by placing the data associated with each successive spectrum collected at increasing time in successive columns of a data matrix thereby creating a two-dimensional data matrix of intensities. FIG. 8 illustrates an exemplary such data matrix 800 in which five (5) spectra successively collected in time are stored in successive columns 801-805 of data matrix 800. When the spectra are stored in this manner, the rows of data matrix 800 represent chromatograms at corresponding m/z values in the stored spectra. These chromatograms are indicated by rows 811-815 in data matrix 800. Thus, in matrix form, each column of the data matrix represents a spectrum collected at a particular time, and each row represents a chromatogram collected at a fixed m/z. Each element of the data matrix is an intensity value collected at a particular time (in the corresponding chromatogram) for a particular m/z (in the corresponding spectrum). Although the present disclosure assumes column-oriented spectral data and row-oriented chromatographic data, in alternate embodiments of the present invention, the data matrix is oriented such that rows represent spectra and columns represent chromatograms.

Figure 9:
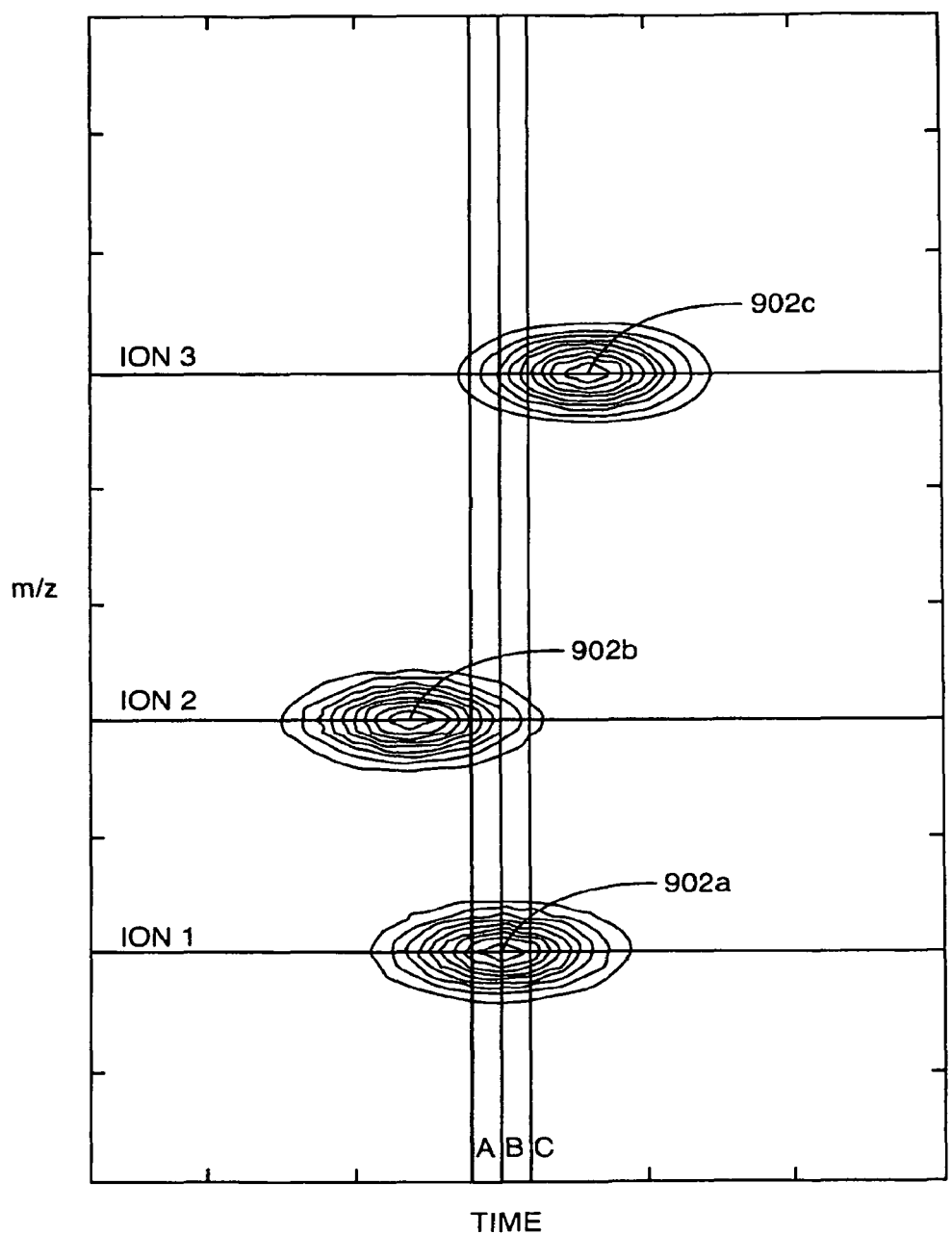
FIG. 9 illustrates a contour plot representation of an exemplary data matrix created from the data of FIGS. 3 and 4 according to an embodiment of the present invention.

FIG. 9 is an exemplary graphical representation (in particular, a contour plot) of a data matrix generated as described above by storing spectral data in successive columns of the data matrix. In the contour plot illustrated in FIG. 9, each of ions 1, 2 and 3 appears as an island of intensity. The contour plot distinctly shows not only the presence of the three ions, but also that the elution order is ion 2, followed by ion 1, followed by ion 3. FIG. 9 also shows three apices 902a, 902b and 902c. Apex 902a corresponds to ion 1, apex 902b corresponds to ion 2 and apex 902c corresponds to ion 3. The locations of apices 902a, 902b, and 902c correspond to the m/z and retention time for ions 1, 2 and 3 respectively. The height of the apex above the zero value floor of the contour plot is a measure of the ion's intensity. The counts or intensities associated with a single ion are contained within an ellipsoidal region or island. The FWHM of this region in the m/z (column) direction is the FWHM of the spectral (mass) peak. The FWHM of this region in the row (time) direction is the FWHM of the chromatographic peak.

The innermost of the concentric contours forming an island identifies the element having the highest intensity. This local maximum or maximal element has an intensity greater than its nearest neighbors. For example, for two-dimensional data contours, a local maximum or apex is any point whose amplitude is greater than its nearest-neighbor elements. In one embodiment of the present invention, a local maximum or apex must be greater than eight (8) nearest neighbor elements. For example in the Table 1, the central element is a local maximum because each of the 8 adjoining elements has a value less than 10.

TABLE 1

| Example showing maximum | | |
|---|---|---|
| 8.5 | 9.2 | 6.8 |
| 9.2 | 10.0 | 8.4 |
| 7.9 | 8.5 | 7.2 |

There are six lines drawn through the contour plot of FIG. 9. The three horizontal lines, labeled ion 1, ion 2 and ion 3, identify cross sections corresponding to the chromatograms for ions 1, 2 and 3 respectively as illustrated in FIGS. 4A-4C. The three vertical lines, labeled A, B and C, identify cross sections corresponding to the mass spectra 3A, 3B and 3C respectively as illustrated in FIGS. 3A-3C.

After the data matrix is created, ions are detected. For each detected ion, ion parameters, such as retention time, m/z and intensity, are obtained. If the data matrix is free of noise and if the ions do not interfere with one another (e.g., by chromatographic co-elution and spectral interference), then each ion produces a unique, isolated island of intensity, as illustrated in the contour plot of FIG. 9.

As shown in FIG. 9, each island contains a single maximal element. Where there is no noise, co-elution or interference, ion detection and parameter quantification according to an embodiment of the present invention proceeds as follows as shown in flow chart 1000 in FIG. 10:

STEP 1001: Form Data Matrix
STEP 1002: Interrogate each element in the data matrix.
STEP 1004: Identify all elements that are local maxima of intensity and have positive values.
STEP 1006: Label each such local maximum as an ion.
STEP 1008: Extract ion parameters.
STEP 1010: Tabulate ion parameters.
STEP 1012: Post-process ion parameters to obtain molecular properties.

In Step 1008, the parameters of each ion are obtained by examining the maximal element. An ion's retention time is the time of the scan containing the maximal element. The ion's m/z is the m/z for the channel containing the maximal element. The ion's intensity is the intensity of the maximal element itself, or alternatively, the intensity can be the sum of intensities of elements surrounding the maximal element. Interpolation techniques, described below, can be used to better estimate these parameters. Secondary observable parameters, including for example, the widths of the peak in the chromatographic and spectral directions, can also be determined.

Steps 2 and 3: Specification and Application of Filter

Need for Filters

Rarely, if ever, is co-elution, interference, or noise absent in LC/MS experiments. The presence of co-elution, interference, or noise can severely reduce the ability to accurately and reliably detect ions. Consequently, the simple detection and quantification procedure illustrated by flow chart 1000 may not be adequate in all circumstances.

Coelution

Figure 11:
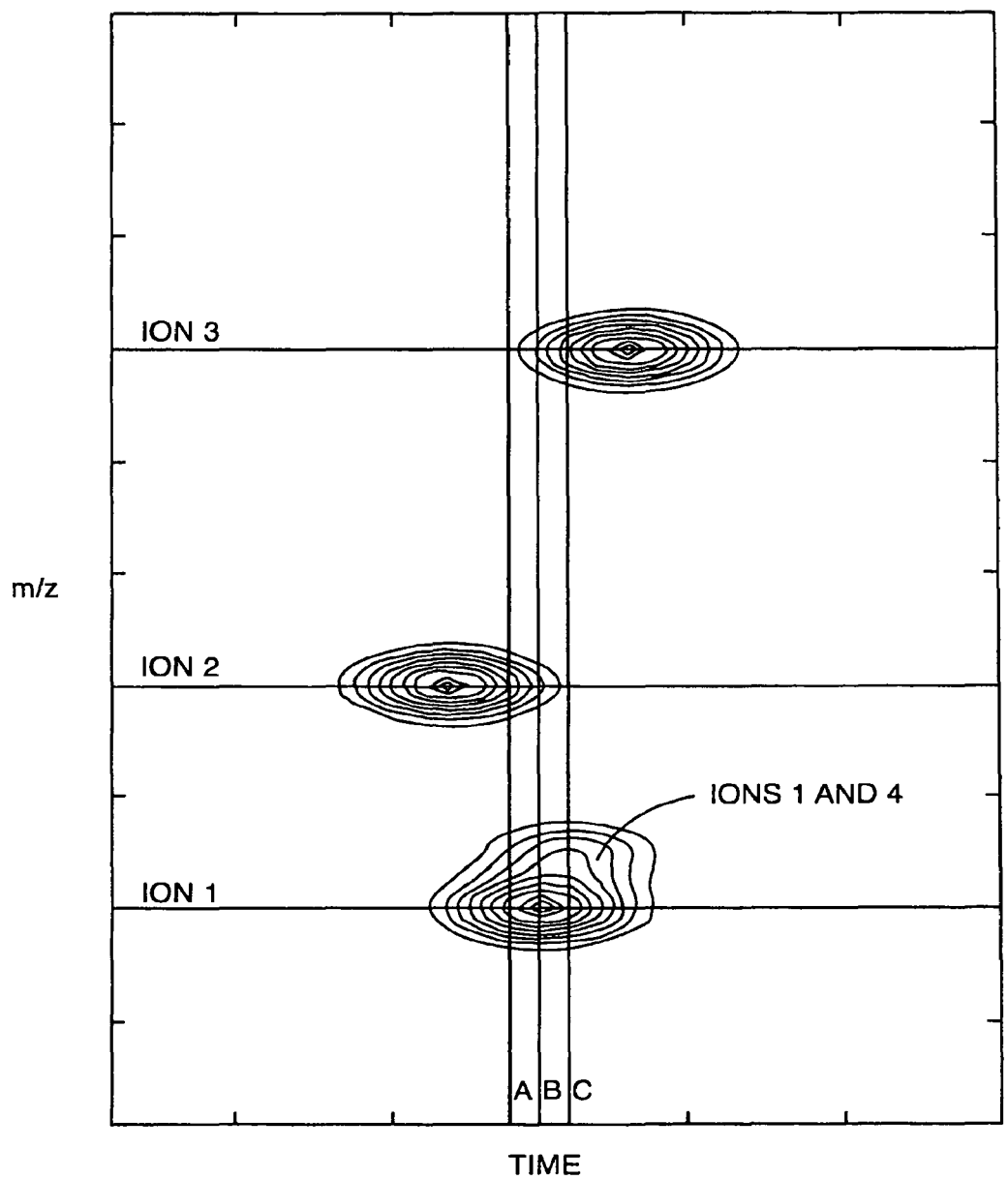
FIG. 11 illustrates an effect of a co-eluting ion on the exemplary data matrix of FIG. 9.

FIG. 11 is an exemplary contour plot showing the effects of co-elution and interference due to finite peak widths. In the example illustrated in FIG. 11, another ion, ion 4, is assumed to have m/z and retention time values somewhat larger than that of ion 1 as well as have an apex in both the spectral and chromatographic directions lying within the FWHM of the apex of ion 1. As a result, ion 4 is co-eluted with ion 1 in the chromatographic direction and interferes with ion 1 in the spectral direction.

Figure 12C:
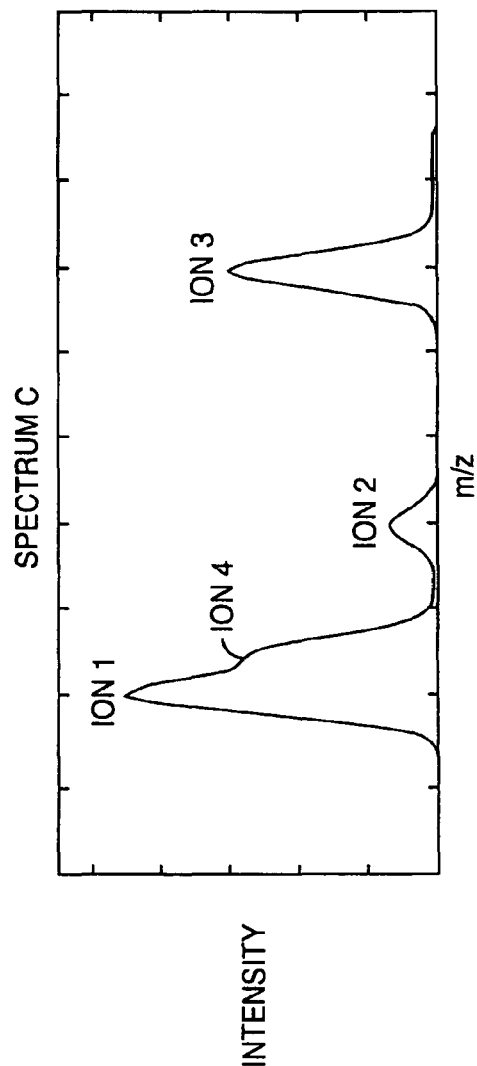

FIGS. 12A-12C illustrate the spectral effects due to co-elution of ion 4 at the times indicated by lines A, B, and C of FIG. 11. In each spectrum shown in FIGS. 12A-12C, ion 4 appears as a shoulder to ion 1. This is also apparent from the contour plot shown in FIG. 11 because there is no distinct apex associated with ion 4.

Thus one problem with detection in LC/MS systems is that pairs of ions may co-elute in time and interfere spectrally such that the pair of ions produces only a single local maximum, not two. Co-elution or interference can cause true ions, having significant intensity in the data matrix, to be missed, i.e., not detected. Such missed detection of a true peak as an ion is referred to as a false negative.

Noise

Noise encountered in LC/MS systems typically falls into two categories: detection noise and chemical noise. Detector and chemical noise combine to establish a baseline noise background against which the detection and quantitation of ions is made.

Detection noise, also known as shot or thermal noise, is inherent in all detection processes. For example, counting detectors, such as MCPs, add shot noise, and amplifiers, such as electrometers, add thermal or Johnson noise. The statistics of shot noise are generally described by Poisson statistics. The statistics of Johnson noise are generally described by Gaussian statistics. Such detection noise is inherent in the system and cannot be eliminated.

The second kind of noise encountered in LC/MS systems is chemical noise. Chemical noise arises from several sources. For example, small molecules that are inadvertently caught up in the process of separation and ionization can give rise to chemical noise. Such molecules can be a constant presence, each producing an essentially constant background intensity at a given mass-to-charge ratio, or each such molecule can be separated thereby producing a chromatographic profile at a characteristic retention time. Another source of chemical noise is found in complex samples, which can contain both molecules whose concentrations vary over a wide dynamic range and interfering elements whose effects are more significant at lower concentrations.

Figure 13:
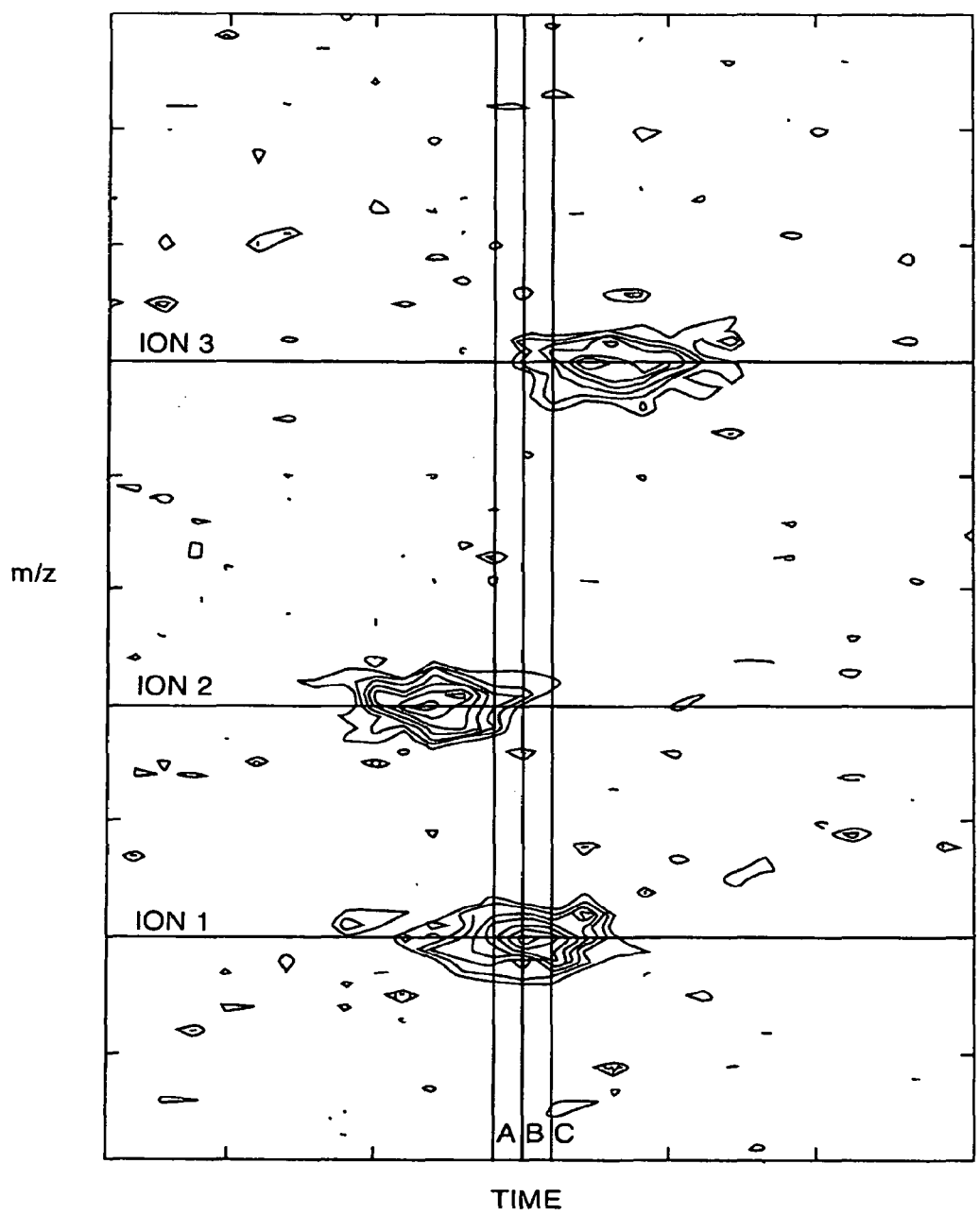
FIG. 13 illustrates how noise affects exemplary data in a data matrix created according to embodiments of the present invention.
Figure 14E:
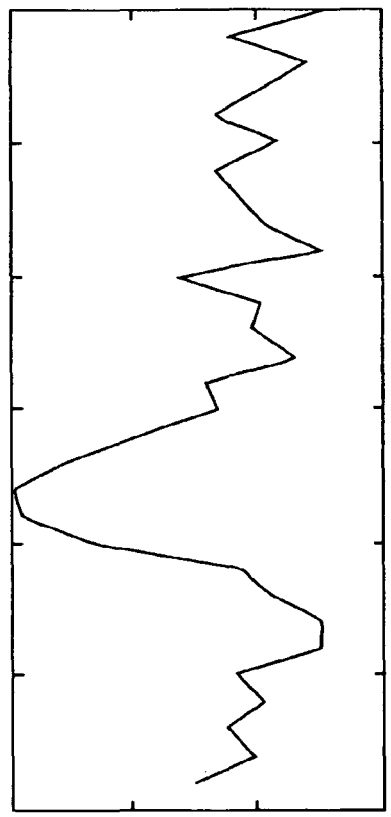
Figure 14F:
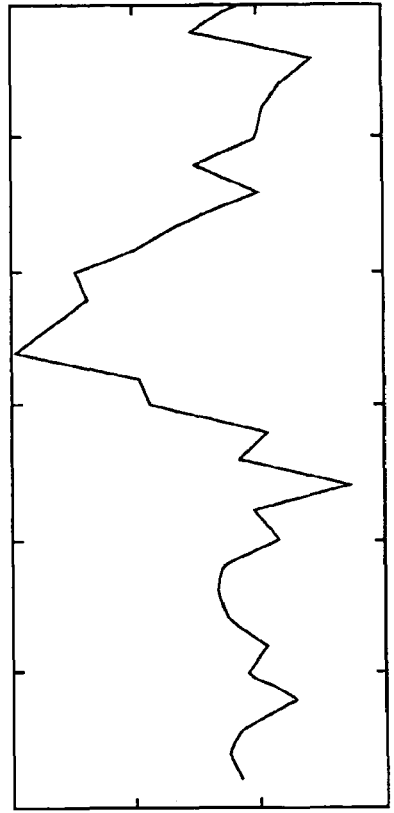

FIG. 13 is an exemplary contour plot illustrating the effects of noise. In FIG. 13, numerically generated noise is added to an ion peak contour plot to simulate the effects of chemical and detector noise. FIGS. 14A-14C illustrate mass spectra (Spectra A, B and C) corresponding to lines A, B and C respectively in FIG. 13, FIGS. 14D-14F illustrate chromatograms for ions 1, 2, 3 corresponding to lines labeled ion 1, ion 2 and ion 3 respectively in FIG. 13. As can be seen in FIG. 13, one detrimental effect of the additive noise is that it causes apices to appear throughout the plot, including within the FWHM of the nominal apex locations associated with ions 1 and 2. These noise-induced apices can be erroneously identified as peaks corresponding to ions, thereby resulting in false positive ion detections.

Thus, local maxima may be due to the noise rather than ions. As a result, false peaks, i.e., peaks not associated with an ion, may be counted as an ion. Moreover, noise might produce more than one multiple local maximum for an ion. These multiple maxima could result in detection of peaks that do not represent true ions. Thus, peaks from a single ion could be multiply counted as separate ions when in fact the multiple peaks are due only to a single ion. Such detection of false peaks as ions is referred to as false positives.

Figure 10:
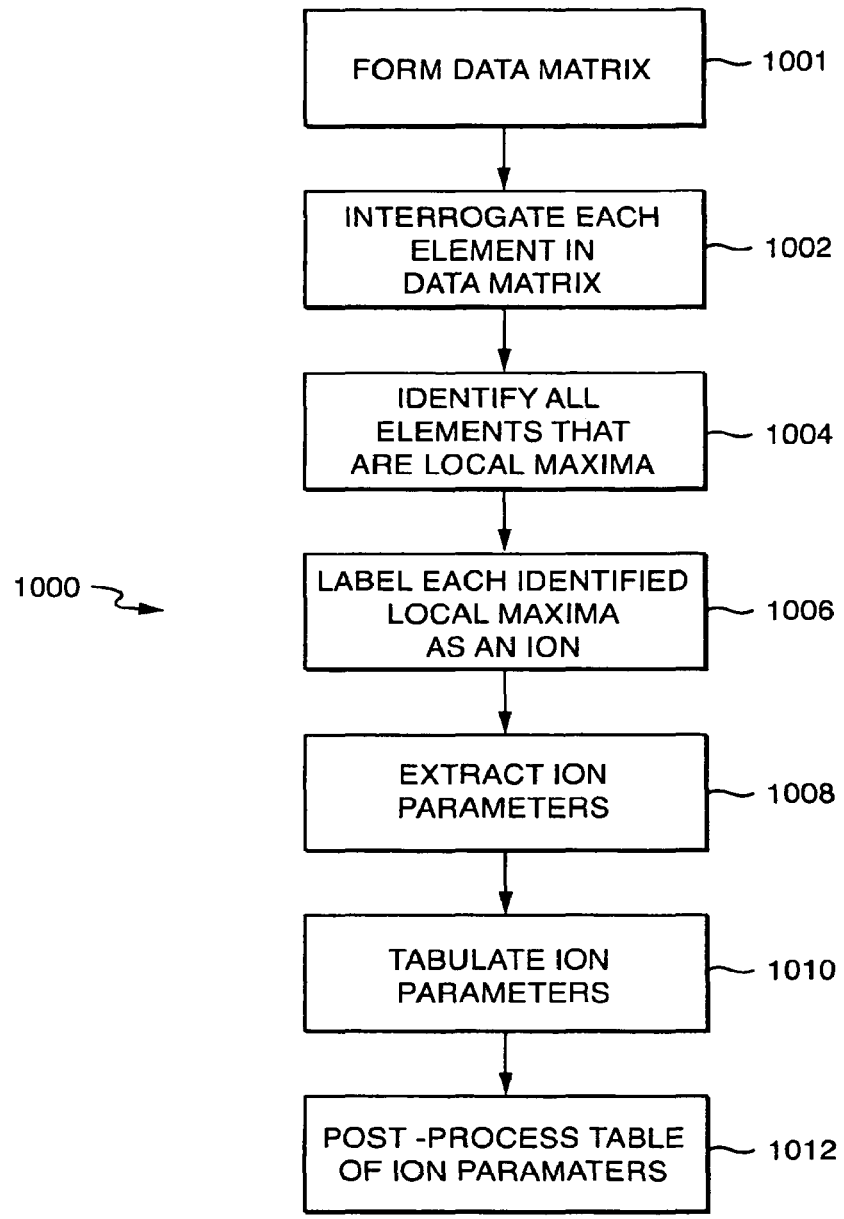
FIG. 10 is a flow chart for a simplified method of processing data in the absence of noise according to an embodiment of the present invention.

In addition to disregarding noise effects, the simple ion detection algorithm described in FIG. 10 is generally not statistically optimal. This is because the variance in the estimates of retention time, m/z and intensity are determined by the noise properties of a single maximal element. The simplified algorithm does not make use of the other elements in the island of intensities surrounding the maximal element. As described in more detail below, such neighboring elements can be used to reduce variance in the estimate.

Role of Convolution

According to embodiments of the present invention, the LC/MS data matrix is a two-dimensional array. Such a data matrix can be processed by convolving it with a two-dimensional array of filter coefficients.

The convolution operation employed in embodiments of the present invention provides a more general and powerful approach to peak detection than the simple signal-averaging schemes employed in conventional systems. The convolution operation employed in embodiments of the present invention addresses the limitations of the method described in FIG. 10.

The filter coefficients can be chosen to provide estimates of ion parameters that have better signal-to-noise ratios than those obtained from analyzing single channels or scans.

The convolution filter coefficients can be chosen to produce estimates of ion parameters that have the greatest precision or least statistical variance for a particular data set. These benefits of embodiments of the present invention provide more reproducible results for ions at low concentration than do conventional systems.

Another advantage of embodiments of the present invention is that filter coefficients can be chosen to resolve ions that are co-eluted and interfering. For example, the apices of ions appearing as shoulders to other ions in a mass spectrum can be detected using appropriately specified filter coefficients in embodiments of the present invention. Such detection overcomes limitations associated with conventional techniques in analyzing complex chromatograms, where co-elution and ion-interference are a common problem.

Another advantage of embodiments of the present invention is that filter coefficients can be chosen to subtract baseline signals, producing more accurate estimates of ion intensity.

Another advantage of embodiments of the present invention is that filter coefficients can be chosen to minimize the computation burden of convolution, resulting in high-speed operation of peak detection and the estimation of ion parameters.

In general, numerous filter shapes can be used in the convolution, including, for example, Savitzky-Golay (SG) smoothing and differentiating filters. The filter shapes can be chosen to perform a number functions including smoothing, peak identification, noise reduction and baseline reduction. Filter shapes used in preferred embodiments of the present invention are described below Implementation of Convolution The convolution operation according to embodiments of the present invention is linear, non-iterative and not dependent on the values of the data in the data matrix. In an embodiment of the present invention, the convolution operation is implemented by means of a general purpose programming language using a general purpose computer such as computer 118. In an alternate embodiment of the present invention, the convolution operation is implemented in a special purpose processor known as digital-signal-processor (DSP). Typically, DSP-based filtering provides enhanced processing speed over general purpose computer-based filtering.

In general, convolution combines two inputs to produce one output. Embodiments of the present invention employ a two-dimensional convolution. One input to the two-dimensional convolution operation is the data matrix of intensities created from the spectral output of an LC/NIS experiment. The second input to the two-dimensional convolution operation is a matrix of filter coefficients. The convolution operation outputs an output convolved matrix. Generally, the output convolved matrix has the same number of rows and column elements as the input LC/MS matrix.

For simplicity in the present description, assume that the LC/MS data matrix is rectangular and that the size of the matrix of filter coefficients is comparable to the size of a peak. In this case the size of the filter coefficient matrix is smaller than the size of the input data matrix or output convolved matrix.

An element of the output matrix is obtained from the input LC/NIS data matrix as follows: the filter matrix is centered on an element in the input data matrix, and then the input data matrix elements are multiplied by the corresponding filter matrix elements and the products are summed, producing an element of the output convolved data matrix. By combining neighboring elements, convolution filters reduce variance in the estimates of an ion's retention time, mass-to-charge ratio, and intensity.

The edge-values of the output convolved matrix are those elements that are within half the filter width from the edge of the output convolved matrix. Generally these elements can be set to an invalid value in embodiments of the present invention to indicate invalid filtering values. Generally, ignoring these edge values is not a significant limitation for embodiments of the present invention and these invalid values can be ignored in subsequent processing.

One-Dimensional Convolution

Convolution for a one-dimensional case is clearly described in detail. This description is followed by generalizing convolution to the two-dimensional case. It is useful to first describe the one-dimensional case because the two-dimensional convolution operation that is used in the preferred embodiment of the present invention is implemented by applying a series of one-dimensional convolutions to the data matrix.

In one dimension, the convolution operation is defined as follows. Given a one-dimensional, N-element, input array of intensities $d_i$ and a one-dimensional, M-element, array of convolution filter coefficients $f_j$, the convolution operation is defined as:

$$c_i = \sum_{j=-h}^{h} f_j d_{i-j} \tag{1}$$

where $c_i$ is the output convolved array, and $i=1, \ldots, N$. For convenience, M is chosen to be an odd number. The index j varies from $j=-h, \ldots, 0, \ldots h$, where h is defined as $h=(M-1)/2$.

Thus, the value of $c_i$ corresponds to a weighted sum of the h elements surrounding $d_i$. Spectra and chromatograms are examples of one-dimensional input arrays that contain peaks. The width of the convolution filter f is set to be approximately the width of a peak. Thus, M is on the order of the number of array elements that span the width of a peak. Peaks have a width which typically is much smaller than the length N of the input array, so that in general M☐N.

Although the index i for $d_i$ ranges from 1 to N, in some embodiments of the present invention, $c_i$ is defined only for i>h or i≤(N−h) to account for edge effects. The value for $c_i$ near the array boundaries, i.e. when i≤h or i>(N−h), is not defined for the summation. Such edge effects can be handled by limiting the values for $c_i$ to be i>h or i≤(N−h), where the summation is defined. In this case, the summation applies only to those peaks far enough away from the array edges so that the filter $f_j$ can be applied to all points within the neighborhood of the peak. That is, filtering is not performed at the edges of the data array $d_i$. Generally, ignoring edge effects is not a significant limitation for embodiments of the present invention.

If filtered values are needed near the edge for 1<i<h or N≥i>(N−h), either the data array and/or the filter coefficients can be modified for these edge elements. The data matrix can be modified by append h elements to each end the array, and apply the M coefficient filter to an array that contains N+2h elements.

Alternatively, edge effects can be considered by appropriately modifying the limits of the filtering function to account for there being less than M points for filtering near the edges.

Two-Dimensional Convolution

The one-dimensional convolution operation described above can be generalized to the case of two-dimensional data for use in embodiments of the present invention. In the two-dimensional case, one input to the convolution operation is a data matrix $d_{i,j}$ subscripted by two indices, (i, j), wherein $i=1, \ldots, M$ and $j=1, \ldots, N$. The data values of the input data matrix can vary from experiment to experiment. The other input to the convolution is a set of fixed filter coefficients, $f_{p,q}$, that is also subscripted by two indices. The filter coefficients matrix, $f_{p,q}$, is a matrix that has P×Q coefficients. Variables h and l are defined as $h=(P-1)/2$ and $l=(Q-1)/2$. Thus, $p=-h, \ldots, h$, and $q=-l, \ldots, l$.

Convolving $d_{i,j}$ with $f_{p,q}$ yields the output convolved matrix $c_{i,j}$:

$$c_{i,j} = \sum_{p=-h}^{h} \sum_{q=-l}^{l} f_{p,q} d_{i-p, j-q}. \tag{2}$$

Generally, the size of the filter is much less than the size of the data matrix, so that P<<M and Q<<N. The above equation indicates that $c_{i,j}$ is computed by centering $f_{p,q}$ on the (i,j) th element of $d_{i,j}$ and then using the filter coefficients $f_{p,q}$ to obtain the weighed sum of the surrounding intensities. Thus, each element of the output matrix $c_{i,j}$ corresponds to a weighted sum of the elements of $d_{i,j}$, wherein each element $d_{i,j}$, is obtained from a region centered on the i,jth element.

Although the index i and j for $d_{i,j}$ ranges from 1=1 to N, and j from 1 to M, in some embodiments of the present invention, $c_{i,j}$ is defined only for i≥h or i≤(N−h) and j≥l or j≤(M−l) to account for edge effects. The value for $c_i$ near the array boundaries, i.e. when i<h or i>(N−h) and/or j≥l or j≤(M−l) is not defined for the summation. Such edge effects can be handled by limiting the values for $c_{i,j}$ to be those where the summation is defined. In this case, the summation applies only to those peaks far enough away from the array edges so that the filter $f_{p,q}$ can be applied to all points within the neighborhood of the peak. That is, filtering is not performed at the edges of the data array $d_{i,j}$. Generally, ignoring edge effects is no a significant limitation for embodiments of the present invention.

If filtered values are needed near the edge for 1≤i<h and N≥i>(N−h), either the data matrix and/or the filter coefficients marix can be modified for these edge elements. One approach is to append h elements to the end of each row, and l elements to the end of each column. The two-dimensional convolution filter is then applied to a data matrix that contains (N+2h)×(M+2l) elements.

Alternatively, edge effects can be considered by appropriately modifying the limits of the filtering function to account for there being less than P points for filtering near the row edges and Q points for filtering near the column edges.

The computational burden for implementation of equation (2) can be determined as follows. If $f_{p,q}$ contains P×Q coefficients then the number of multiplications needed to compute a value for $c_{i,j}$ is P×Q. For example, where P=20 and Q=20, it follows that 400 multiplications are needed to determine each output point $c_{i,j}$ in the output convolved matrix. This is a high computation burden that can be eased by other approaches to two-dimensional convolution.

Two-Dimensional Convolution with Rank-1 Filters

The two-dimensional convolution filter described in equation (2) applies a filter matrix that contains P×Q independently specified coefficients. There are other ways for specifying the filter coefficients. Although the resulting convolution coefficients are not as freely specified, the computation burden is eased.

One such alternate way of specifying the filter coefficients is as a rank-1 filter. To describe a rank-1 convolution filter, consider that a two-dimensional convolution of the LC/MS data matrix can be accomplished by the successive application of two one-dimensional convolutions. See for example, in JOHN H. KARL, INTRODUCTION TO DIGITAL SIGNAL PROCESSING, PG. 320 (ACADEMIC PRESS 1989) ("KARL"), which is hereby incorporated by reference herein. For example, a one-dimensional filter, $g_q$, is applied to each row of the LC/MS data matrix, producing an intermediate convolved matrix. To this intermediate convolved matrix, a second one-dimensional filter, $f_p$, is applied to each column. Each one-dimensional filter can be specified with a different set of filter coefficients. Equation (3) illustrates how the filters comprising a rank-1 convolution filter are applied in succession, wherein the intermediate matrix is enclosed in the parentheses.

$$c_{i,j} = \sum_{p=-h}^{h} f_p \left( \sum_{q=-l}^{l} g_q d_{i-p,j-q} \right) \quad (3)$$

$$= \sum_{p=-h}^{h} \sum_{q=-l}^{l} f_p g_q d_{i-p,j-q}. \quad (4)$$

The computational burden for implementation of equation (3) can be determined as follows. If $f_p$ contains P coefficients and $g_q$ contains Q coefficients, then the number of multiplications needed to compute a value for $c_{i,j}$ is P+Q. For example, where P=20 and Q=20, only 40 multiplications are needed to determine each output point $c_{i,j}$ the output convolved matrix. As can be seen, this is more computationally efficient than the general case of two-dimensional convolution described in Eq. (2) where 20×20=400 are required to determine each $c_{i,j}$.

Equation (4) is a rearrangement of equation (3) that illustrates that the successive operations are equivalent to a convolution of the data matrix with a single coefficient matrix whose elements are pair-wise products of the one dimensional filters. An examination of equation (4) shows that in using the rank-1 formulation, the effective two-dimensional convolution matrix is a rank-1 matrix formed by the outer product of two one-dimensional vectors. Thus, equation (4) can be rewritten as:

$$c_{i,j} = \sum_{p=-h}^{h} \sum_{q=-l}^{l} F_{pq} d_{i-p,j-q} \quad (5)$$

$$F_{pq} \equiv f_p g_q. \quad (6)$$

The two-dimensional coefficient matrix $F_{pq}$ emerges from the convolution operation. $F_{pq}$ has the form of a rank-1 matrix, where a rank-1 matrix is defined as the outer product of a column vector (here, $f_p$) and a row vector (here, $g_q$). See for example, in GILBERT STRANG, INTRODUCTION TO APPLIED MATHEMATICS, 68FF (WELLESLEY-CAMBRIDGE PRESS 1986) ("STRANG"), which is hereby incorporated by reference herein.

In embodiments of the present invention using a rank-1 filter implementation, the rank-1 filter is characterized by two orthogonal cross sections, one for each filter. The filter for each orthogonal cross-section is specified by a one-dimensional filter array.

Two-Dimensional Convolution with Rank-2 Filters

A two-dimensional convolution operation can be carried out with a rank-2 filter. Two-dimensional convolution with a rank-2 filter is carried out by computing two rank-1 filters and summing their result. Thus, four filters: $f_p^1$, $g_q^1$, $f_p^2$, and $g_q^2$ are required to implement a rank-2 filter for the two-dimensional convolution performed in embodiments of the present invention. Two of the filters $f_p^1$ and $g_q^1$ are associated with the first rank-1 filter and two of the filters $f_p^2$ and $g_q^2$ are associated with the second rank-1 filter. These four filters $f_p^1$, $f_p^2$ and $g_q^1$, $g_q^2$ are implemented as follows:

$$c_{i,j} = \sum_{p=-h}^{h} f_p^1 \left( \sum_{q=-l}^{l} g_q^1 d_{i-p,j-q} \right) + \sum_{p=-h}^{h} f_p^2 \left( \sum_{q=-l}^{l} g_q^2 d_{i-p,j-q} \right) \quad (7)$$

$$= \sum_{p=-h}^{h} \sum_{q=-l}^{l} (f_p^1 g_q^1 + f_p^2 g_q^2) d_{i-p,j-q} \quad (8)$$

Filters $f_p^1$ and $f_p^2$, are applied in the spectral direction (along the columns) and filters $g_q^1$ and $g_q^2$ are applied in the chromatographic direction (along the rows). Equation (7) illustrates how each filter pair can be applied in succession, where the intermediate matrix is enclosed in the braces, and how the results from the two rank-1 filters are summed. Equation (7) shows the preferred manner of implementing the rank-2 filter according to embodiments of the present invention.

Equation (8) is a rearrangement of equation (7) to show that the successive operations in the rank-2 filter configuration are equivalent to a convolution of the data matrix with a single coefficient matrix whose elements are the sum of pair-wise products of the two one-dimensional filter pairs.

To analyze the computational requirements of a rank-2 filter, consider that if $f_p^1$ and $f_p^2$ both contain P coefficients and $g_q^1$ and $g_q^2$ both contain Q coefficients, then the number of multiplications needed to compute a value for an element of the output convolution matrix $c_{i,j}$ is 2(P+Q). Thus, in the case where P=20 and Q=20, only 80 multiplications are needed to compute each element of the output convolution matrix, whereas in the general case as shown in equation (2), 20×20=400 are required to compute each $c_{i,j}$.

Thus, an embodiment of the present invention employing a rank-2 filter, the effective two-dimensional convolution matrix is formed from the sum of the outer product of two pairs of one-dimensional vectors. Equation (8) can be rewritten as $$c_{i,j} = \sum_{p=-h}^{h} \sum_{q=-l}^{l} F_{pq} d_{i-p, j-q} \qquad (9)$$

$$F_{pq} \equiv f_p^1 g_q^1 + f_p^2 g_q^2. \qquad (10)$$

Two-dimensional coefficient matrix $F_{pq}$ emerges from the convolution operation. The two-dimensional coefficient matrix $F_{pq}$ has the form of a rank-2 matrix, where a rank-2 matrix is defined as the sum of two linearly independent rank-1 matrices as described in STRANG. Here $f_p^1 g_q^1$ and $f_p^2 g_q^2$ are each rank-1 matrices.

Filter Specifications

Equations (2), (3), and (7) are all embodiments of two-dimensional convolution filters of the present invention. Equation (2) specifies the filter coefficients as a matrix $f_{p,q}$, equation (3) specifies the filter coefficients as a set of two one-dimensional filters, $f_p$ and $g_q$, and equation (7) specifies the filters as a set of four one-dimensional filters, $f_p^1$, $g_q^1$ and $f_p^2$, $g_q^2$.

Equations (2), (3), and (7) do not specify the preferred values of these coefficients. The values of the filter coefficients for the present invention are chosen to address the limitations of the method of FIG. 10. The filter coefficients are chosen to accomplish several goals which include the reduction of the effects of detector and chemical noise, the partial resolution of coeluted and interfered peaks, the subtraction of baseline noise, and achievement of computational efficiency and high-speed operation.

The Matched Filter Theorem (MFT) is a prescriptive method, known in the prior art, to obtain filter coefficients than can be implemented using Equation (2). See for example, KARL at 217; BRIAN D. O. ANDERSON & JOHN B. MOORE, OPTIMAL FILTERING 223ff (PRENTICE-HALL INC. 1979)("ANDERSON") at 223ff which is hereby incorporated by referral herein. Filters obtained from the MFT are designed to detect the presence of signals and to reduce the effects of detector noise. Such filters can then be used to detect ions in the LC/MS data matrix and can be used to determine the retention time, mass-to-charge ratio, and intensity of ions. A filter obtained from the MFT is an improvement over the method of FIG. 10. In particular such filters reduce variance and improve precision by combining data from elements within a peak that neighbor the peak apex. However, such filters are not designed to subtract baseline noise or to resolve coeluted and interfered peaks. Filters obtained from the MFT and are not designed to achieve high speed operation.

The MFT and a set of filter coefficients that can be obtained from it represent an improvement over the method of FIG. 10 are described, then modified filters that subtract baselines, reduce the effects of coelution and interference, while still reducing the effect of detector and chemical noise are described. Such filters employ a combination of smoothing and second-derivative filters and are implemented using Equations (3) and (7). The preferred embodiment uses equation (7) with a combination of smoothing and second-derivative filters that together reduce noise, resolve interfering peaks, subtract baselines, and reduce the computational burden to allow for high-speed operation.

Matched Filter Theorem for One-Dimensional Convolution

The MFT is first described for one-dimensional convolution. It is then generalized to two-dimensional convolution.

Coefficients for $f_j$ are chosen to perform a detection function. For example, the matched filter theorem (MFT) provides a set of filter coefficients known as a matched filter that can be used to perform the detection function.

The MFT assumes that the data array $d_i$ can be modeled as a sum of a signal $r_o s_i$ plus additive noise, $n_i$:

$$d_i = r_o s_{i-i_o} + n_i.$$

The shape of the signal is fixed and described by a set of coefficients, $s_i$. The scale factor $r_o$ determines the signal amplitude. The MFT also assumes that the signal is bounded. That is, the signal is zero (or small enough to be ignored) outside some region. The signal is assumed to extend over M elements. For convenience, M is typically chosen to be odd and the center of the signal is located at $s_o$. If h is defined as $h=(M-1)/2$, then $s_i=0$ for $i<-h$ and for $i>h$. In the above expression, the center of the signal appears at $i=i_o$.

For purposes of simplifying the present description the noise elements $n_i$ are assumed to be uncorrelated Gaussian deviates, with zero mean and a standard deviation of $\sigma_o$. More general formulations for the MFT accommodate correlated or colored noise. See example, ANDERSON at 288-304.

Under these assumptions, the signal-to-noise ratio (SNR) of each element is $r_o s_i / \sigma_o$. The SNR of a weighted sum of the data that contains the signal $s_i$ can be determined by considering an M-element set of weights $w_i$, centered to coincide with the signal where $h=(M-1)/2$, and $i=-h, \ldots, 0, \ldots h$. Assuming the weights are centered to coincide with the signal, the weighted sum S is defined as:

$$S = \sum_{i=-h}^{h} w_i d_{i-i_o} = r_o \sum_{i=-h}^{h} w_i s_i + \sum_{i=-h}^{h} w_i n_{i-i_o}.$$

The mean value of the noise term in an ensemble average is zero. Consequently, the average value of S over an ensemble of arrays, where the signal in each array is the same, but the noise is different is:

$$\langle S \rangle = r_o \sum_{i=-h}^{h} w_i s_i.$$

To determine the noise contribution, the weights are applied to a region containing only noise. The ensemble mean of the sum is zero. The standard deviation of the weighted sum about the ensemble mean is:

$$\sigma \equiv \sqrt{\langle (S - \langle S \rangle)^2 \rangle} = \sigma_o \sqrt{\sum_{i=-h}^{h} w_i^2}.$$

Finally, the SNR is determined as:

$$\frac{\langle S \rangle}{\sigma} = \frac{r_o}{\sigma_o} \frac{\left( \sum_{i=-h}^{h} w_i s_i \right)}{\sqrt{\sum_{i=-h}^{h} w_i^2}}.$$

This result is for a general set of weighting coefficients $w_i$.

The MFT specifies values for $w_i$ that maximize the SNR. If the weighting factors $w_i$ are regarded as elements of an M dimensional vector w of unit length, i.e., the weighting factors are normalized so that $$\sqrt{\sum_{i=-h}^{h} w_i^2} = 1,$$

then the SNR is maximized when the vector w points in the same direction as the vector s. The vectors point in the same direction when respective elements are proportional to each other i.e., when $w_i \propto s_i$. Consequently, the MFT implies that the weighted sum has the highest signal-to-noise when the weighting function is the shape of the signal itself.

If $w_i$ is chosen such that $w_i = s_i$, then for noise with unit standard deviation, the SNR reduces to:

$$\frac{\langle S \rangle}{\sigma} = \frac{r_o}{\sigma_o} \frac{\left(\sum_{i=-h}^{h} s_i^2\right)}{\sqrt{\sum_{i=-h}^{h} s_i^2}} = \frac{r_o}{\sigma_o} \sqrt{\sum_{i=-h}^{h} s_i^2}.$$

This formulation of SNR corresponds to the signal properties of the weighted sum when the filter coefficients are centered on the signal and the noise properties when the filter is in a noise-only region.

Matched Filter Theorem for Two-Dimensional Convolution

The MFT discussed above for the one-dimensional case can also be generalized to the two-dimensional case for a bounded, two-dimensional signal embedded in a two-dimensional array of data. As before, the data is assumed to be modeled as a sum of signal plus noise:

$$d_{i,j} = r_o s_{i-i_o, j-j_o} + n_{i,j},$$

wherein the signal $S_{i,j}$ is limited in extent and whose center is located at $(i_o, j_o)$ with amplitude $r_o$. Each noise element $n_{i,j}$ is an independent Gaussian deviate of zero mean and standard deviation $\sigma_o$.

To determine the SNR of a weighted sum of the data that contains the signal $S_{i,j}$ consider a P×Q-element set of weights $w_{i,j}$, wherein $h=(P-1)/2$ and $l=(Q-1)/2$, such that $i=-h, \ldots, h$, and $j=-l, \ldots, l$. The weights are centered to coincide with the signal. The weighted sum S is:

$$S = \sum_{i=-h}^{h} \sum_{j=-l}^{l} w_{i,j} d_{i-i_o, j-j_o}$$

$$= r_o \sum_{i=-h}^{h} \sum_{j=-l}^{l} w_{i,j} s_{i,j} + \sum_{i=-h}^{h} \sum_{j=-l}^{l} w_{i,j} n_{i-i_o, j-j_o}.$$

The average value of S over the ensemble is:

$$\langle S \rangle = r_o \sum_{i=-h}^{h} \sum_{j=-l}^{l} w_{i,j} s_{i,j}.$$

The standard deviation of the noise is:

$$\sigma = \sigma_o \sqrt{\sum_{i=-h}^{h} \sum_{j=-l}^{l} w_{i,j}^2}.$$

and the signal-to-noise ratio is:

$$\frac{\langle S \rangle}{\sigma} = \frac{r_o}{\sigma_o} \frac{\sum_{i=-h}^{h} \sum_{j=-l}^{l} w_{i,j} s_{i,j}}{\sqrt{\sum_{i=-h}^{h} \sum_{j=-l}^{l} w_{i,j}^2}}$$

As in the one-dimensional case described above, the SNR is maximized when the shape of the weighting function is proportional to the signal, that is when $w_{i,j} \propto s_{i,j}$. The signal properties of the weighted sum correspond to where the filter coefficients are centered on the signal, and the noise properties of the weighted sum correspond to where the filter is in the noise-only region.

The Matched Filter achieves maximum signal-to-noise by optimally combining neighboring elements. Convolution filters that employ matched filter coefficients produce minimum variance in the estimates of an ion's retention time, mass-to-charge ratio, and intensity.

Matched Filters Guaranteed to Produce Unique Maximum

In general, signal detection using convolution proceeds by moving the filter coefficients along the data array and obtaining a weighted sum at each point. For example, where the filter coefficients satisfy MFT, i.e., $w_i = s_i$ (the filter is matched to the signal) then in the noise-only region of the data, the amplitude of the output is dictated by the noise. As the filter overlaps the signal, the amplitude increases, and must reach a unique maximum when the filter is aligned in time with the signal.

One-Dimensional Gaussian Matched Filter

As an example of the foregoing technique for one-dimensional convolution, consider the case where the signal is a single peak resulting from a single ion. The peak (spectral or chromatographic) can be modeled as a Gaussian profile whose width is given by the standard deviation $\alpha_p$, where the width is measured in units of sample elements. The signal is then:

$$r_i = r_o \exp\left(-\frac{1}{2} \frac{(i - i_o)^2}{\sigma_p^2}\right).$$

Assume the filter boundary is set to $\pm 4\sigma_p$. According to the Matched Filter Theorem, the filter is the signal shape itself, i.e., a Gaussian, centered on zero and bounded by $\pm 4\sigma_p$. The coefficients of such a matched filter are given by:

$$f_i = \exp\left(-\frac{1}{2} \frac{i^2}{\sigma_p^2}\right), \text{ for } i > -4\sigma_p \text{ and } i < 4\sigma_p.$$

Assume further that the system samples four points per standard deviation. As a result, $\sigma_p = 4$, so $i = -16, \ldots, 16$, and the filters are 33 points wide for the present example. For the Gaussian matched filter (GMF) in one-dimension, the maximum signal of the convolved output array is 7.09 $r_o$, and the noise amplitude is 2.66 $\sigma_o$. The SNR associated with using the matched filter is 2.66 ($r_o/\sigma_o$).

Gaussian Matched Filter Contrasted with Boxcar Filter in One Dimension

We contrast the GMF with a simple boxcar filter in one-dimension. Again, the signal is assumed to be a peak that is modeled by Gaussian shape described above. Assume the filter boundary for the boxcar is also set to $\pm 4\sigma_p$. The coefficients of the boxcar filter are given by:

$$f_i = \frac{1}{M} = \frac{1}{8\sigma_p + 1}.$$

The output of the boxcar filter is the average value of the input signal over M points ($M=8\sigma_p+1$).

Again, assume further that the system samples four points per standard deviation, so the boxcar filter is 33 points wide. For a Gaussian peak of unit height, the average signal over the peak using the boxcar filter is 0.304 $r_o$, and the standard deviation of the noise is $\sigma_o/=0.174\ \sigma_o$. The SNR using the boxcar filter is 1.75 ($r_o/\sigma_o$).

Thus, the SNR of the Gaussian matched filter relative to the boxcar is 2.66/1.75=1.52, or more than 50% higher than that provided by the boxcar filter.

Both the matched filter and the boxcar filter are linear. The convolution of either of these filters with the Gaussian peak shape produces an output that has a unique maximum value. Thus, either of these filters can be used in the convolution of embodiments of the present invention. However, in the case of Gaussian noise, because of its higher SNR at the local maximum, the matched filter is preferred.

Gaussian Noise and Poisson Noise

The Gaussian Matched Filter is an optimum filter when the noise has Gaussian statistics. For counting detectors the boxcar filter will be optimal because it is simply a sum of all counts associated with a peak. In order to sum all the counts associated with a peak the width of the boxcar filter should be related to the width of the peak. Typically the width of the boxcar filter will be between 2 and 3 times the FWHM of the peak.

Two-Dimensional Gaussian Matched Filter

As an example of the Matched Filter technique for two-dimensional convolution, consider the case where the signal is a single peak resulting from a single ion. The peak can be modeled as a Gaussian profile in both the spectral and chromatographic directions. The spectral width is given by the standard deviation $\sigma_p$, where the width is measured in units of sample elements, and the chromatographic width is given by the standard deviation $\sigma_q$, where the width is measured in units of sample elements. The signal, centered on data matrix element $i_o$, $j_p$ is then:

$$r_{i,j} = r_0 \exp\left(-\frac{1}{2}\frac{(i-i_o)^2}{\sigma_p^2}\right)\exp\left(-\frac{1}{2}\frac{(j-j_0)^2}{\sigma_q^2}\right).$$

Assume the filter boundary is set to $\pm 4\sigma_p$ and $\pm 4\sigma_q$. According to the Matched Filter Theorem, the filter is the signal shape itself, i.e., a Gaussian, centered on zero and bounded by $\pm 4\sigma_p$ and $\pm 4\sigma_q$ The coefficients of such a matched filter are given by:

$$f_{p,q} = \exp\left(-\frac{1}{2}\frac{p^2}{\sigma_p^2}\right)\exp\left(-\frac{1}{2}\frac{q^2}{\sigma_q^2}\right),$$

for $p > -4\sigma_p$ and $p < 4\sigma_p$ and $q > -4\sigma_q$ and $q < 4\sigma_q$.

Assume further that the system samples four points per standard deviation for both the spectral and chromatographic directions. As a result, $\sigma_p=4$ and $\sigma_q=4$, so that p=−16, ..., 16 and q=−16, ..., 16, and the filters are 33×33 points for the present example. For the Gaussian matched filter (GMF) in two-dimensions, the maximum signal in the convolved output matrix is 50.3 $r_o$, and the noise amplitude is 7.09 $\sigma_o$. The SNR associated with using the matched filter is 7.09 ($r_o/\sigma_o$).

A two-dimensional convolution filter performs a filter operation on the LC/MS data matrix in both the chromatographic and in the mass spectrometric directions. As a result of the convolution operation, the output convolution matrix will contain peaks whose shapes are, in general, widened or other wise distorted relative to the input LC/MS data matrix. In particular the Matched Gaussian Filter will always produce peaks in the output convolution matrix that are widened by a factor of $\sqrt{2}$ in both the chromatographic and spectral directions relative to the input peaks.

At first glance, it may seem that the widening produced by the GMF may be detrimental to the accurate estimate of critical parameters of retention time, mass-to-charge ratio, or intensity. But the Matched Filter Theorem shows that two-dimensional convolution produces apex values whose retention time, mass-to-charge ratio and intensity result form the effective combination of all spectral and chromatographic elements associated with the peak such that the resulting apex-associated values produce statistically optimum estimates of retention time, m/z, and intensity for that peak.

Gaussian Matched Filter Contrasted with Boxcar Filter in Two-Dimensions

We contrast the GMF with a simple boxcar filter in two-dimension. Again, the signal is assumed to be a peak that is modeled by Gaussian shape described above. Assume the filter boundary for the boxcar is also set to $\pm 4\sigma_p$. The coefficients of the boxcar filter are given by:

$$f_{i,j} = \frac{1}{M \times N} = \frac{1}{8\sigma_p + 1} \times \frac{1}{8\sigma_q + 1}.$$

The output of the boxcar filter is the average value of the input signal over M×N points.

Again, assume further that the system samples four points per standard deviation, so the boxcar filter is 33×33 points wide. For a Gaussian peak of unit height, the average signal over the peak using the boxcar filter is 0.092 $r_o$, and the standard deviation of the noise is 0.303 $\sigma_o$. The SNR using the boxcar filter is 3.04 ($r_o/\sigma_o$).

Thus, the SNR of the Gaussian matched filter relative to the boxcar is 7/3=2.3, or more than twice that provided by the boxcar filter.

Both the matched filter and the boxcar filter are linear. The convolution of either of these filters with the Gaussian peak shape produces an output that has a unique maximum value. Thus, either of these filters can be used in the convolution of embodiments of the present invention. However, in the case of Gaussian noise, because of its higher SNR at the local maximum, the matched filter is preferred.

Gaussian Noise and Poisson Noise

The Gaussian Matched Filter in two-dimensions is an optimum filter when the noise has Gaussian statistics. For counting detectors the boxcar filter will be optimal because it is simply a sum of all counts associated with a peak. In order to sum all the counts associated with a peak the widths of the boxcar filter should be related to the width of the peak in the spectral and chromatographic directions. Typically the widths of the boxcar filter will be between 2 and 3 times the respective FWHMs of the peak in the spectral and chromatographic directions.

Gaussian Matched Filter for the Detection of Ions in LC/MS Data Matrix

For the Gaussian Matched Filter, the specification (Step 2) of the two-dimensional convolution filter is the coefficients are Gaussian filter coefficients f as described above, and the application (Step 3) of the filter is then according to Eq. (2) using these filter coefficients. This embodiment of Step 2 and Step 3 then provides a method to detect ions, and to determine their retention time, mass-to-charge ratio, and intensity. The results from such a method reduce the effects of detector noise and are an improvement over the method of FIG. 10.

Filters Coefficients that are not Matched Filters.

Linear weighting coefficients other than those that follow the signal shape can also be used. While such coefficients may not produce the highest possible SNR, they may have other counter-balancing advantages. The advantages include the ability to partially resolve coeluted and interfered peaks, the subtraction of baseline noise, and computational efficiency leading to high-speed operation. We analyze the limitations of the Gaussian Matched Filter and describe linear filter coefficients that address these limitations.

Issues with Gaussian Matched Filters

For a Gaussian peak, the Matched Filter Theorem (MFT) specifies the Gaussian Matched Filter (GMF) as the filter whose response has the highest signal-to-noise ratio as compared to any other convolution filter. However, the Gaussian Matched Filter (GMF) may not be optimal in all cases.

One disadvantage of the GMF is that it produces a widened or broadened output peak for each ion. To help explain peak broadening, it is well known that if a signal having positive values and a standard width, $\sigma_s$, is convolved with a filter having positive values and a standard width, $\sigma_f$, the standard width of the convolved output is increased. The signal and filter width combine in quadrature to produce an output width of $\sigma_o = \sqrt{\sigma_s^2 + \sigma_f^2}$. In the case of the GMF, where the widths of the signal and filter are equal, the output peak is wider than the input peak by a factor of approximately $\sqrt{2} \approx 1.4$, i.e., 40%.

Peak broadening can cause the apex of a small peak to be masked by a large peak. Such masking could occur, for example, when the small peak is nearly co-eluted in time and nearly coincident in mass-to-charge with the larger peak. One way to compensate for such co-elution is to reduce the width of the convolution filter. For example, halving the width of the Gaussian convolution filter produces an output peak that is only 12% more broad than the input peak. However, because the peak widths are not matched, the SNR is reduced relative to that achieved using a GMF. The disadvantage of reduced SNR is offset by the advantage of increased ability to detect nearly coincident peak pairs.

Another disadvantage of the GMF is that it has only positive coefficients. Consequently, the GMF preserves the baseline response underlying each ion. A positive-coefficient filter always produces a peak whose apex amplitude is the sum of the actual peak amplitude plus the underlying baseline response. Such background baseline intensity can be due to a combination of detector noise as well as other low-level peaks, sometimes termed chemical noise.

To obtain a more accurate measure of amplitude, a baseline subtraction operation is typically employed. Such an operation typically requires a separate algorithm to detect the baseline responses surrounding the peak, interpolate those responses to the peak center, and subtract that response from the peak value to obtain the optimal estimate of the peak intensity.

Alternately, the baseline subtraction can be accomplished by specifying filters that have negative as well as positive coefficients. Such filters are sometimes referred to as deconvolution filters, and are implemented by filter coefficients that are similar in shape to filters that extract the second derivatives of data. Such filters can be configured to produce a single local-maximum response for each detected ion. Another advantage of such filters is that they provide a measure of deconvolution, or resolution enhancement. Thus, not only do such filters preserve the apex of peaks that appear in the original data matrix, but they can also produce apices for peaks that are visible only as shoulders, not as independent apices, in the original data. Consequently, deconvolution filters can address problems associated with co-elution and interference.

A third disadvantage of the GMF is that it generally requires a large number of multiplications to compute each data point in the output convolved matrix. Thus, convolution using a GMF is typically more computationally expensive and slower than convolution using other filters. As described below, filter specifications other than the GMF can be used in embodiments of the present invention.

Advantages of Second Derivative Filters

Filters that extract the second derivative of a signal are of particular use in detecting ions according to embodiments of the present invention. This is because the second derivative of a signal is a measure of the signal's curvature, which is the most prominent characteristic of a peak. Whether considered in one or two, or more, dimensions, a peak's apex is generally the point of the peak that has the highest magnitude of curvature. Shouldered peaks are also represented by regions of high curvature. Consequently, because of their responsiveness to curvature, second derivative filters can be used to enhance peak detection as well as provide improved detection for the presence of a shouldered peak against the background of a larger, interfering peak.

The second derivative at the apex of a peak has a negative value, because the curvature of a peak at its apex is maximally negative. Some illustrative, non-limiting embodiments of the present invention will use inverted second derivative filters. Inverted second derivative filters are second derivative filters all of whose coefficients have been multiplied by −1. The output of an inverted second derivative filters is positive at a peak apex. Unless otherwise specified, all second derivative filters referred to in some examples of the present invention are taken to be inverted second derivative filters. All plots of second derivative filters are inverted second derivative filters.

Figure 15:
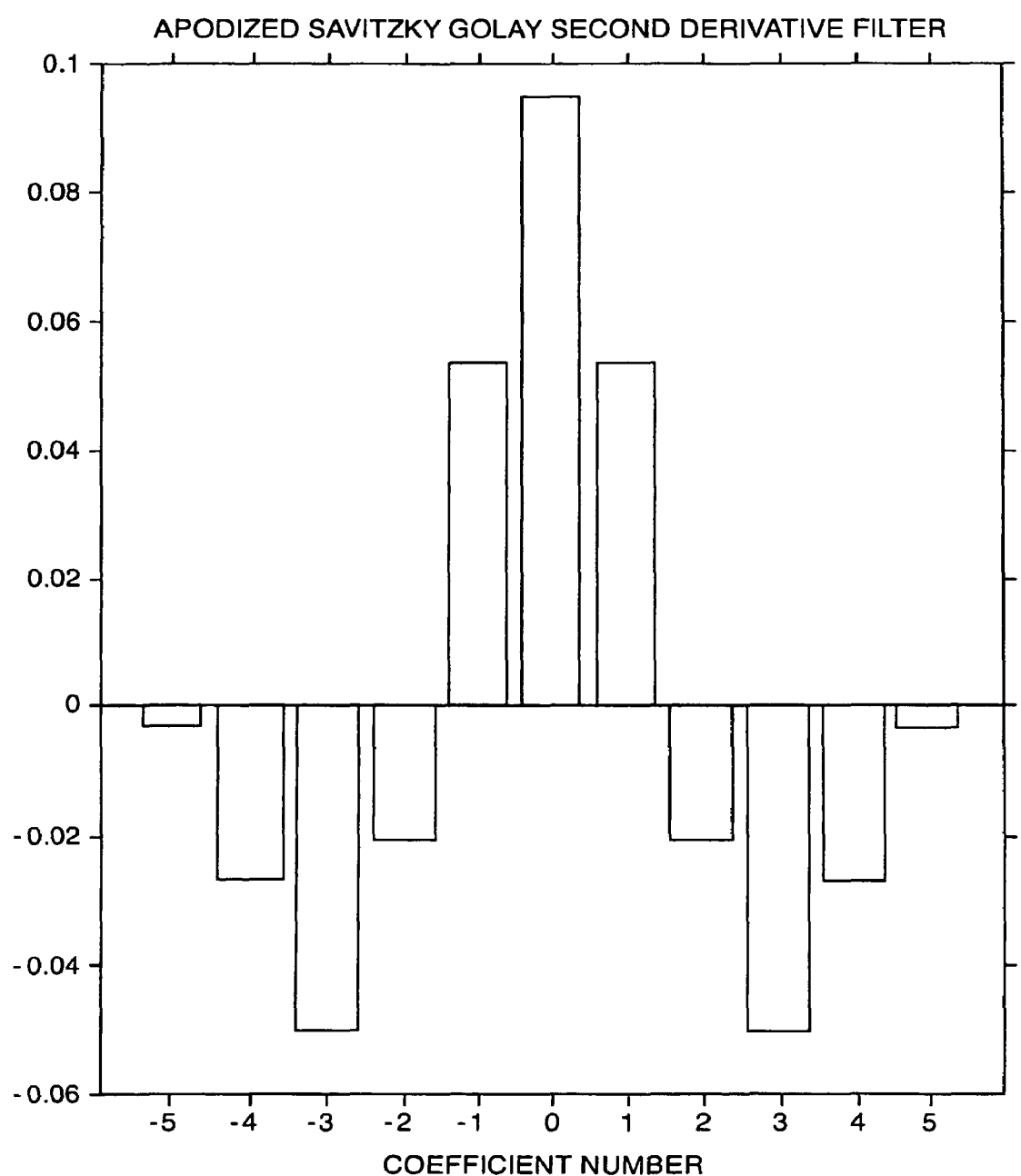
FIG. 15 illustrates an exemplary one-dimensional apodized Savitzky-Golay second-derivative filter according to an embodiment of the present invention.

The response of a second derivative filter to a constant or straight line (having zero curvature) is zero. Thus the second derivative filter has zero response to the baseline response underlying a peak. The second derivative filter responds to the curvature at the apex of the peak and not to the underlying baseline. Thus the second derivative filter carries out, in effect, the baseline subtraction. FIG. 15 illustrates the cross section of an exemplary second derivative filter that can be applied in either or both the chromatographic and spectral directions.

Second Derivative Filters in One-Dimension

In a one-dimensional case, a second derivative filter is advantageous over a smoothing filter because the amplitude of the second derivative filter at the apex is proportional to the amplitude of the underlying peak. Moreover, the second derivative of the peak does not respond to the baseline. Thus, in effect, a second derivative filter performs the operation of baseline subtraction and correction automatically.

A disadvantage of second derivative filters is that they can have the undesirable effect of increasing noise relative to the peak apex. This noise-increasing effect can be mitigated by pre-smoothing the data or increasing the width of a second-derivative filter. For example, in one embodiment of the present invention, the width of the second-derivative convolution filter is increased. Increasing the width of the second-derivative convolution filter improves its ability to smooth the data in the input data matrix during convolution.

Savitzky-Golay Filters for Smoothing and Obtaining a Second-Derivative

For a single-channel of data (spectrum or chromatogram), a conventional method for smoothing data (i.e., reducing the effects of noise) or for differentiating data is through the application of a filter. In an embodiment of the present invention, smoothing or differentiating is performed on a one-dimensional data array by convolving that data array corresponding to the single spectrum or chromatogram with a set of fixed-value filter coefficients.

For example, well-known finite impulse response (FIR) filters can be specified with appropriate coefficients to perform a variety of operations including those of smoothing and differentiation. See example, KARL. Suitable smoothing filters generally have a symmetric, bell shaped curve, with all positive values, and a single maximum. Exemplary smoothing filters that can be used include filters having Gaussian, triangular, parabolic, trapezoidal shapes and co-sinusoidal shapes, each of which is characterized as a shape having a single maximum. Smoothing filters having asymmetric, tailed curves can also be used in embodiments of the present invention.

A family of FIR filters that can be specified to smooth or differentiate one-dimensional arrays of data is the well-known Savitzky-Golay filters. See example, in A. SAVITZKY & M. J. E. GOLAY, ANALYTICAL CHEMISTRY, VOL. 36, PP. 1627-1639 which is hereby incorporated by reference herein. The Savitzky-Golay (SG) polynomial filters provides a suitable family of smoothing and differentiating filters that are specified by sums of weighted polynomial shapes. The 0th order smoothing filter in this family of filters is a flat top (boxcar) filter. The second order smoothing filter in this family of filters is a parabola that has a single, positive maximum. The second order filter that obtains a second derivative in this family of filters is a parabola that has a single, negative maximum with zero mean. The corresponding inverted second derivative SG filter has a positive maximum.

Apodized Savitsky-Golay Filters

A modification of SG filters yields a class of smoothing and second derivative filters that work well in the present invention. These modified SG filters are known as Apodized Savitksy-Golay (ASG) filters. The term apodization refers to filter coefficients that are obtained by applying an array of weight coefficients to a least-squares derivation of SG filter coefficients. The weight coefficients are the apodization function. For the ASG filter used in embodiments of the present invention, the apodization function is a cosine window (defined by COSINEWINDOW) in the software code below. This apodization function is applied, via weighted least-squares to a box-car filter to obtain the ASG smoothing filter, and to a second derivative SG quadratic polynomial, to obtain the ASG second derivative filter. The box car filter and second derivative quadratic are, by themselves, examples of Savitzky-Golay polynomial filters.

Every SG filter has a corresponding Apodized Savitzky-Golay (ASG) filter. An ASG filter provides the same basic filter function as the corresponding SG filter, but with higher attenuation of unwanted high-frequency noise components. Apodization preserves the smoothing and differentiation properties of SG filters, while producing much improved high-frequency cutoff characteristics. Specifically, apodization removes sharp transitions of the SG filter coefficients at the filter boundaries, and replaces them with smooth transitions to zero. (It is the cosine apodization function that forces the smooth transition to zero). Smooth tails are advantageous because they reduce the risk of double counting due to high-frequency noise described above. Examples of such ASG filters include cosine smoothing filters and cosine-apodized second order polynomial Savitzky-Golay second derivative filters.

In the preferred embodiment of the present invention, these smoothing and second derivative ASG filters are specified for application to the column and rows of the LC/MS data matrix.

Example of Rank-1 Filter for Two-Dimensional Convolution

As an example of the application of a rank-1 formulation for two-dimensional convolution, we could choose $f_p$ and $g_q$ in Eq. (3) to have Gaussian profiles. The resulting $F_{pq}$ has a Gaussian profile in each row and column. The values for $F_{pq}$ will be close, but not identical to $f_{p,q}$ for the two-dimensional GMF. Thus, this particular rank-1 formulation will perform similarly to the GMF, but with a reduction in computation time. For example, in the example provided above, for example, where P and Q were equal to 20, computational load by using the rank-1 filter computational requirements reduced by a factor of 400/40=10.

The choice of $f_p$ and $g_p$ to have Gaussian profiles and the application of these filters according to Eq. (3) constitutes one embodiment of Step 2 and Step 3 according to the present invention.

But for other embodiments of the present invention, we can apply separate filters for each dimension of a rank-1 filter. In an embodiment of the present invention, for example, $f_p$ (the filter applied in the spectral direction) is a smoothing filter and $g_q$ (the filter applied in the chromatographic direction) is a second derivative filter. Through such filter combinations, different rank-1 filter implementations can be specified that overcome problems typically associated with filtering. For example, the filters comprising a rank-1 filter can be specified to address the aforementioned problems associated with GMFs.

The aforementioned rank-1 filters, implemented by Eq. 3 are more computationally efficient and therefore faster than the GMF implemented by Eq. 2. Moreover, the specified combination of filters provides a linear, baseline corrected response that can be used for quantitative work.

Furthermore, the combination of filters sharpens, or partially deconvolves fused peaks in the chromatographic direction.

An exemplary rank-1 filter for use in embodiments of the present invention that has the aforementioned advantages comprises a first filter, $f_p$, that is a co-sinusoidal ASG smoothing filter, whose FWHM is about 70% of the FWHM of the corresponding mass peak and a second filter, $g_q$, that is an ASG second-derivative filter, whose zero crossing width is about 70% of the FWHM of the corresponding chromatographic peak. Other filters and combinations of filters can be used as the rank-1 filters in other embodiments of the present invention.

Figure 16A:
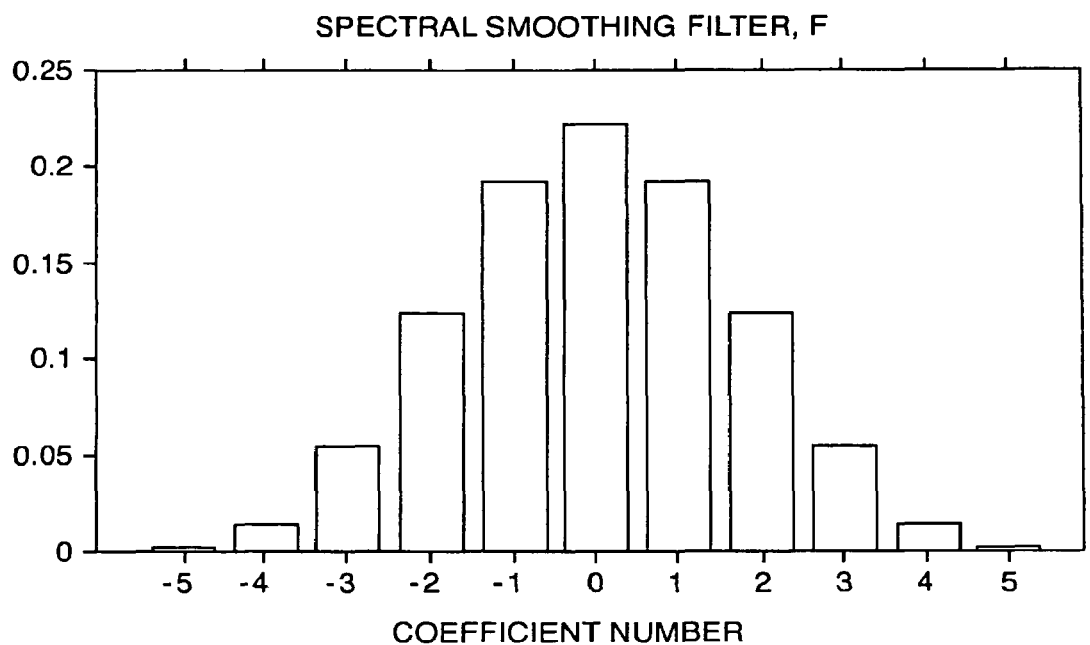
FIG. 16A illustrates the cross section of an exemplary one-dimensional filter in the spectral (m/z) direction according to an embodiment of the present invention.
Figure 16B:
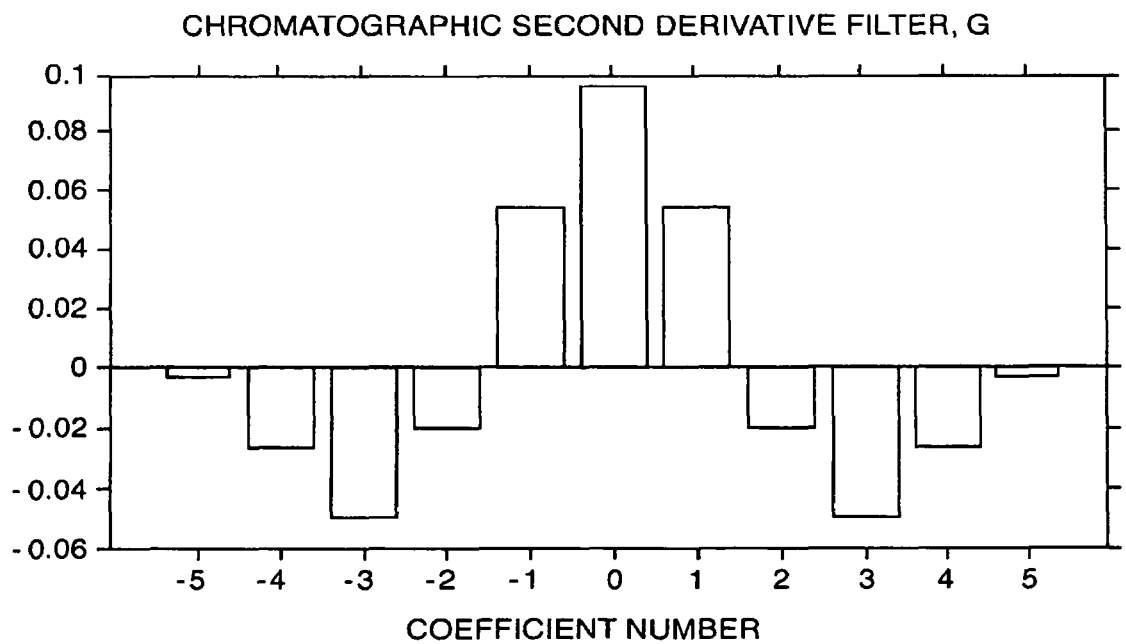
FIG. 16B illustrates the cross section of an exemplary one-dimensional filter in the chromatographic (time) direction according to an embodiment of the present invention.
Figure 16D:
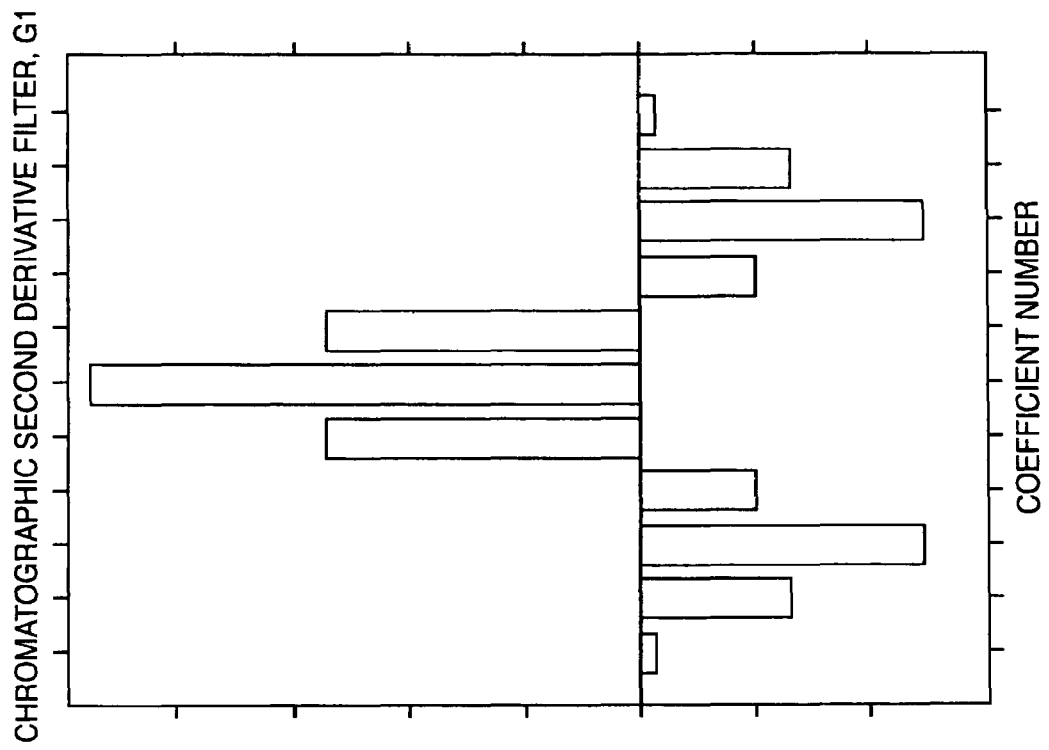
FIG. 16D illustrates the cross section of an exemplary one-dimensional second derivative filter g1 in the chromatographic direction according to an embodiment of the present invention.
Figure 16C:
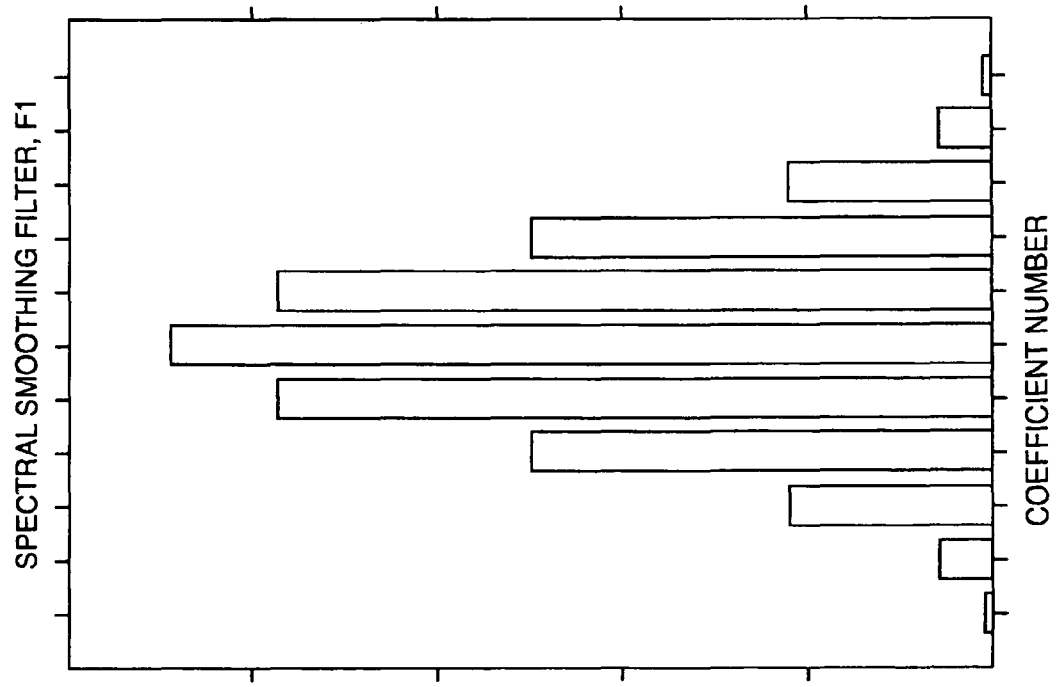
FIG. 16C illustrates the cross section of an exemplary one-dimensional smoothing filter f1 in the spectral (m/z) direction according to an embodiment of the present invention.
Figure 16F:
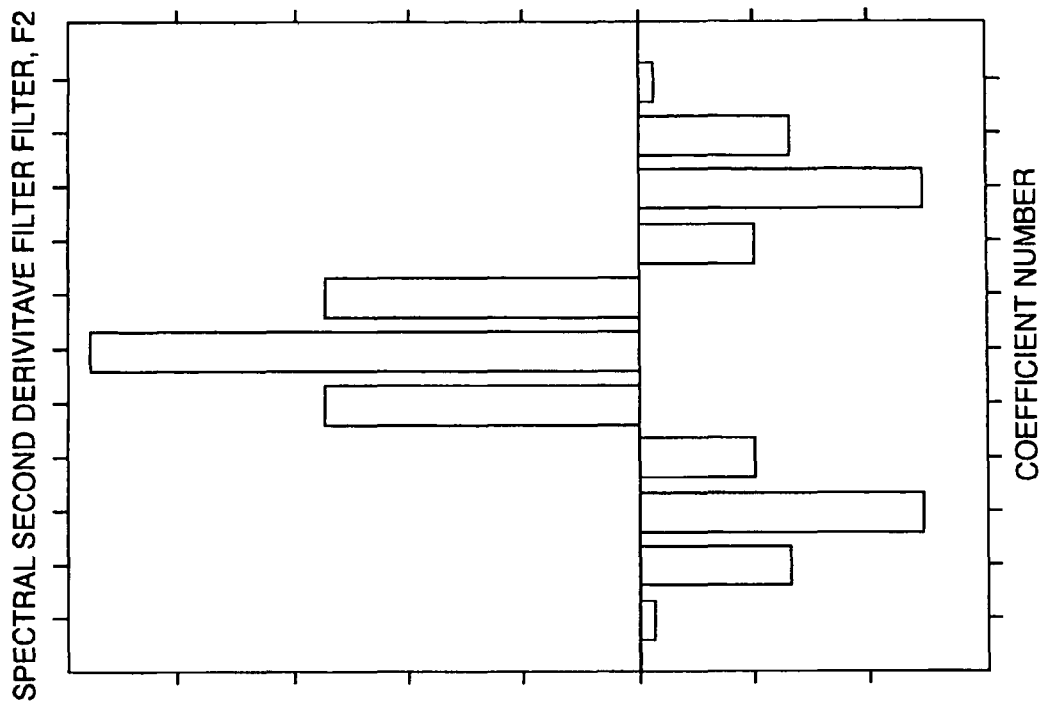
FIG. 16F illustrates the cross section of an exemplary one-dimensional second-derivative filter f2 in the spectral (m/z) direction according to an embodiment of the present invention.
Figure 16E:
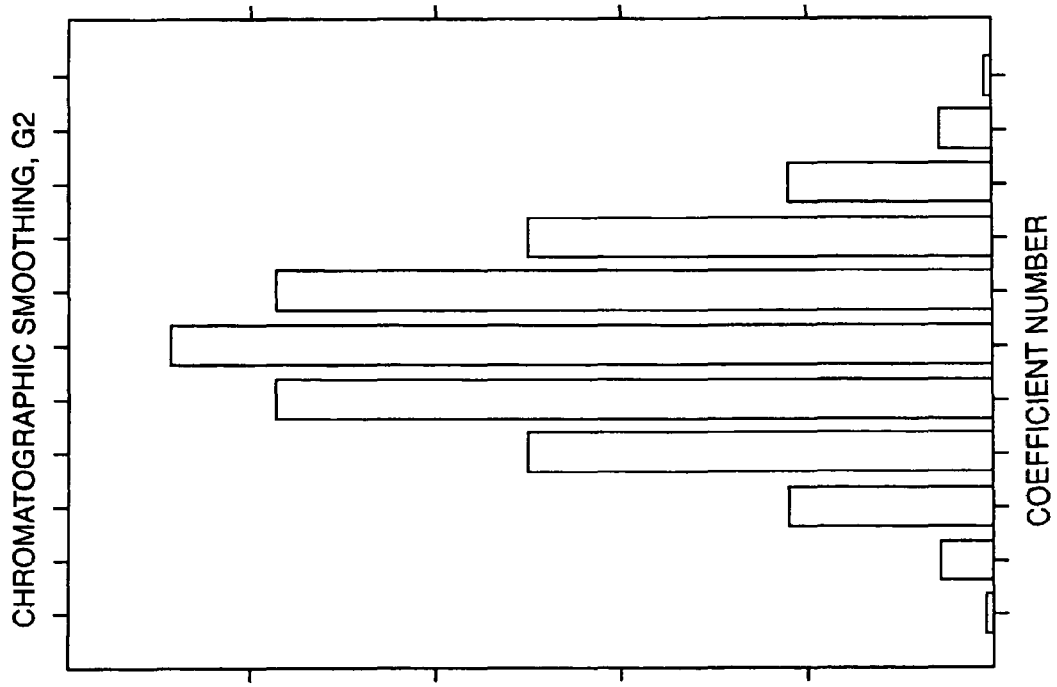
FIG. 16E illustrates the cross section of an exemplary one-dimensional smoothing filter g2 in the chromatographic direction according to an embodiment of the present invention.

FIG. 16A illustrates a cross section in the spectral direction of an exemplary co-sinusoidal ASG smoothing filter for use in a rank-1 filter to apply to the columns of the LC/MS data matrix to form an intermediate matrix. FIG. 16B illustrates a cross section in the chromatographic direction of an exemplary, ASG second derivative filter to apply to the rows of the generated intermediate matrix.

The filter functions of $f_p$ and $g_q$ can be reversed. That is, $f_p$ can be the second derivative filter and $g_q$ can be the smoothing filter. Such a rank-1 filter deconvolves shouldered peaks in the spectral direction, and smoothes in the chromatographic direction.

Note that both $f_p$ and $g_q$ should not be second derivative filters. The rank-1 product matrix resulting where both $f_p$, and $g_q$ are second derivative filters contains not one, but a total of five, positive local maxima when convolved with an ion peak. The four additional positive apices are side-lobes that arise from the products of the negative lobes associated with these filters. Thus, this particular combination of filters results in a rank-1 filter that is not suitable for the proposed method.

The rank-2 formulation described below implements a filter that has properties of smoothing filters and second-derivative filters in both the spectral and chromatographic directions.

Several filter combinations for embodiments of the present invention that use a rank-1 convolution filters are provided Table 2.

TABLE 2

Filter combinations for rank-1 filter

| m/z | Time |
|---|---|
| Smoothing | Smoothing |
| Smoothing | $2^{nd}$ derive |
| $2^{nd}$ derive | Smoothing |

Each filter combination is an embodiment of Step 2, and each, being a rank-1 filter, is applied using Eq. (3), thereby embodying Step 3. Other filters and combinations of filters can be used as the rank-1 filters in other embodiments of the present invention.

Example of Rank-2 Filter for Two-Dimensional Convolution, which is the Preferred Embodiment The rank-2 filter requires specification of two filters for each of two dimensions. In a preferred embodiment of the present invention, the four filters are specified to address the problems associated with the GMF as described above in a computationally efficient manner.

For example, in an embodiment of the present invention, the first rank-1 filter comprises a spectral smoothing filter as $f_p^1$ and a chromatographic second derivative filter as $g_q^1$. An exemplary such smoothing filter is a co-sinusoidal filter, whose FWHM is about 70% of the FWHM of the corresponding mass peak. An exemplary such second-derivative filter is ASG second-derivative filter, whose zero crossing width is about 70% of the FWHM of the corresponding chromatographic peak. The second rank-1 filter comprises a spectral second derivative filter as $f_p^2$ and a chromatographic smoothing filter as $g_q^2$. An exemplary such second derivative filter is a second derivative ASG filter, whose zero-crossing width is about 70% of the FWHM of the corresponding mass peak. An exemplary such smoothing filter is a co-sinusoidal filter, whose FWHM is about 70% of the FWHM of the corresponding chromatographic peak. Other filters and filter combinations can be used in embodiments of the present invention. The cross sections of such filters are illustrated in FIGS. 16C, 16D, 16E, and 16F respectively.

The rank-2 filter described above has several advantages over the GMF. Because it is a rank-2 filter, it is more computationally efficient then the GMF and consequently faster in execution. Moreover, because each cross-section is a second derivative filter whose coefficients sum to zero, it provides a linear, baseline corrected response that can be used for quantitative work and it sharpens, or partially deconvolves, fused peaks in the chromatographic and spectral directions.

In a preferred rank-2 filter embodiment of the present invention, the filter widths of each of the column filters (in terms of number of coefficients) are set in proportion to the spectral peak width and the filter widths of each of the row filters (in terms of number of coefficients) are set in proportion to the chromatographic peak width. In the preferred embodiment of the present invention, the widths of the column filters are set equal to each other, and in proportion to the FWHM of a spectral peak. For example, for a spectral peak width FWHM of 5 channels, the filter width may be set to 11 points, so the filter width of both the smoothing and second derivative spectral filter will be set to the same value of 11 points. Analogously, in the preferred embodiment, the widths of the row filters are set equal to each other, and in proportion to the FWHM of a chromatographic peak. For example, for a chromatographic peak width FWHM of 5 channels, the filter width can be set to 11 points, so the filter width of both the smoothing and second derivative spectral filters will be set to the same value of 11 points. Choosing the filter widths in this manner results in rank-1 filters comprising the rank-2 filter having equal dimensions. That is, if the first rank-1 filter has dimension M×N, then the dimension of the second rank-1 filter also has dimension M×N. It should be noted that the rank-2 filter need not be comprised of rank-1 filters having equal dimensions and that any suitable rank-1 filters can be summed to produce a rank-2 filter.

The rank-1 filters are summed to construct the rank-2 filter, therefore the filters must be normalized in a relative sense prior to summing. In the preferred embodiment, the first rank-1 filter is a smoothing filter in the spectral direction and is a second derivative filter in the chromatographic direction. If this filter is weighted more than the second rank-1 filter, then the combined filter gives more emphasis to smoothing in the spectral direction and baseline-subtraction and deconvolution of peaks in the chromatographic direction. Thus the relative normalization of the two rank-1 filters determines the relative emphasis of smoothing and differentiation in the chromatographic and spectral directions.

For example, consider two rank-1 filters:

$$F_{p,q}^1 = f_p^1 g_q^1 \tag{11}$$

$$F_{p,q}^2 = f_p^2 g_q^2 \tag{12}$$

where, equation (11) is the first rank-1 filter, and equation (12) is the second rank-1 filter. In a preferred embodiment of the present invention, each rank-1 filter is normalized so that the sum of its coefficients squared equals one. This normalization gives equal weight for smoothing and differentiation to the spectral and chromatographic directions. That is, for rank-1 filters, each having dimensions of M×N:

$$\sum_{q=1}^{N}\sum_{p=1}^{M}(f_p^1 g_q^1)^2 = 1$$

$$\sum_{q=1}^{N}\sum_{p=1}^{M}(f_p^2 g_q^2)^2 = 1.$$

The smoothing filters and second derivative filters of the preferred embodiments can be normalized to satisfy this criterion by applying an appropriate scaling factor to the coefficients of the respective rank-1 matrices.

Moreover, in the preferred embodiment, the row dimension of each rank-1 filter is the same, and the column dimensions of each rank-1 filter is the same. As a result, the coefficients can be added to obtain the rank-2 convolution filter's point source as follows:

$$F_{p,q} f_p^1 g_q^1 + f_p^2 g_q^2 \quad (13)$$

From equation (13), it can be seen that the relative normalization of the two rank-1 filters is needed to determine the two-dimensional convolution filter $F_{p,q}$.

Filter Coefficients for Preferred Embodiment of Two-Dimensional Convolution Filter An exemplary rank-2 filter is described with respect to FIGS. 17A-K. This filter is an embodiment of Step 2 and Step 3 that can be used to detect ions, subtract baseline response, resolved partially fused peaks, and perform with high computational efficiency.

In particular, this rank-2 filter is useful for detecting shouldered peaks. A rank-2 filter according to embodiments of the present invention can comprise a second derivative filter in both the chromatographic and spectral directions. Due to the responsive nature of second derivatives filters to curvature, such a rank-2 filter can detect shouldered peaks wherein the apex of the shouldered peak may not be evident in the data. Given that the rank-2 filter comprises a second derivative filter, which measures curvature, the apex of the second peak, which is not seen in the data directly, can be detected as a separate apex in the output convolved matrix.

Figure 17A:
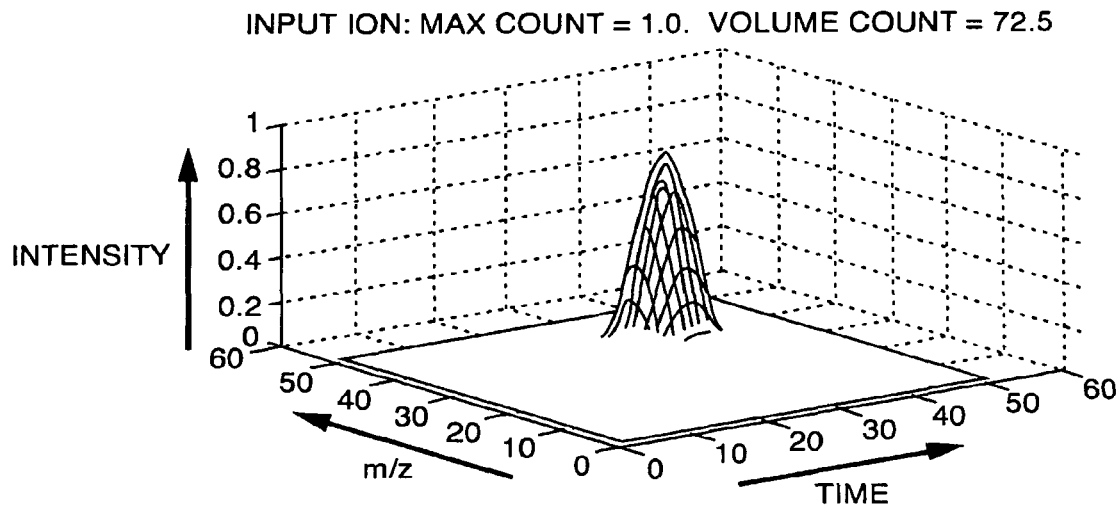
FIG. 17A illustrates an exemplary peak that can be generated by LC/MS data as stored in a data matrix according to embodiments of the present invention.
Figure 17B:
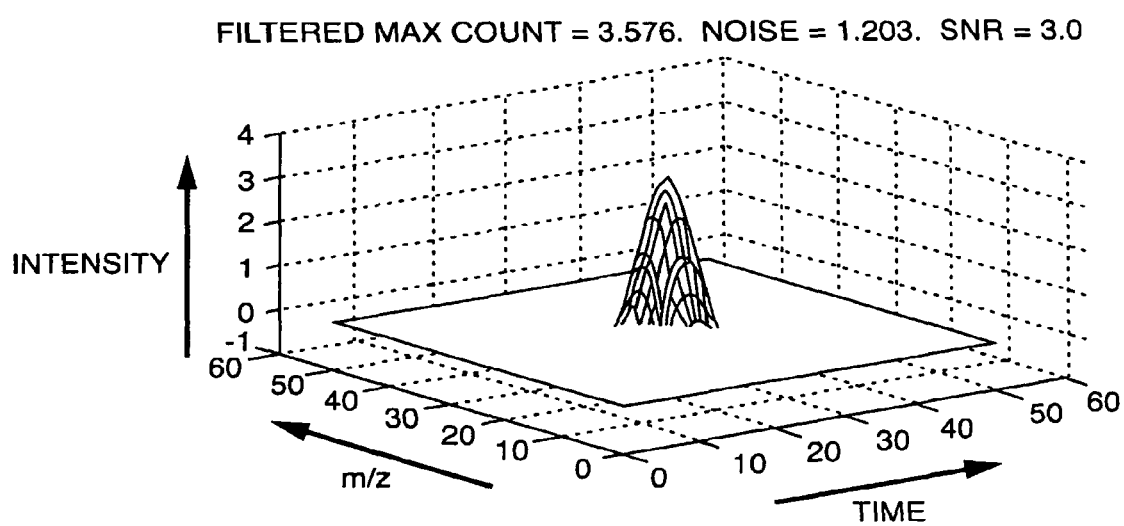
FIG. 17B illustrates a point-source response (finite impulse response) of an exemplary rank-2 filter according to an embodiment of the present invention.

FIG. 17A is a graphical representation of a simulated peak that can be generated in LC/MS data, wherein the horizontal axes represent time of scan and m/z channel as shown, and the vertical axis represents intensity. FIG. 17B illustrates the convolution filter matrix corresponding to the rank-2 filter, according to a preferred embodiment of the present invention.

In this simulation, the spectral and chromatographic peak widths of all ions are 8 points, FWHM. The number of filter coefficients for all four filters is 15 points.

FIG. 17C illustrates a simulation of two LC/MS peaks that have the same mass, and are nearly, but not identically, co-incident in time. FIG. 17D illustrates that the peak cross section is a pure peak in mass, and FIG. 17E illustrates that the peak cross section exhibits a shoulder 1704 in time. FIGS. 17F through 17H illustrate the effect of simulated counting (shot noise) on each sampled element comprising the shouldered peak illustrated in FIGS. 17D-17E. FIGS. 17G and 17 H illustrate the cross sections arising due to the added counting noise. As can be seen in both FIGS. 17G and 17H, many local maxima are generated as a result of the counting noise. Thus, it can be seen that even though only two ions are present, counting noise can produce numerous spurious local maxima that could cause false positive ion detection.

FIGS. 17I-K illustrates the results of convolving a rank-2 filter with the simulated data. The resultant output convolved matrix (represented by the contour plot of FIG. 17I) comprises two distinct peaks 1702 and 1706. Peak 1702 is the peak associated with the more intense of the two ions, and peak 1706 is the peak of the less intense shouldered ion. FIG. 17J is a cross section of the output convolved matrix in the spectral (mass-to-charge ratio) direction. FIG. 17K is a cross section of the output convolved matrix in the chromatographic (time) direction.

What is observed by reviewing FIGS. 17I-K is that a rank-2 filter-based embodiment of the present invention reduces the effect of counting noise and deconvolutes shouldered peaks to produce multiple local maxima. Each local maximum is associated with an ion. As a result, this embodiment of the present invention also reduces the false positives rate. The ion parameters, m/z, retention time and intensity are obtained by analyzing the detected local maxima as described above.

Any Filter can be Used if it Produces a Single Local Maximum

The filters and convolution methods described above can be used to detect ions in an LC/MS data matrix. Other sets of filter coefficients can be chosen as embodiments of Step 2.

The input signal is a peak in the LC/MS data matrix that has a unique maximum, so the convolution filter of Step 2 must faithfully maintain that unique positive maximum through the convolution process. The general requirement that a convolution filter must satisfy for it to be an embodiment of Step 2 is as follows: the convolution filter must have an output that produces a unique maximum when convolved with an input having a unique maximum.

For an ion that has a bell-shaped response, this condition is satisfied by any convolution filter whose cross sections are all bell-shaped, with a single positive maximum. Examples of such filters include inverted parabolic filters, triangle filters, and co-sinusoidal filters. Specifically, any convolution filter that has the property that it has a unique, positive valued apex makes that filter a suitable candidate for use in embodiments of the present invention. A contour plot of the filter coefficients can be used to examine the number and location of the local maxima. All row, column and diagonal cross sections through the filter must have a single, positive, local maximum. Numerous filter shapes meet this condition and can therefore be employed in embodiments of the present invention.

Boxcar can be Used Because it Produces a Single Local Maximum

Another filter shape that is acceptable is a filter having a constant value (i.e., a boxcar filter). This is because convolution of a peak with a boxcar filter produces an output that has a single maximum. A well-known characteristic of boxcar filters that is advantageous in embodiments of the present invention is that such a shape produces minimum variance for a given number of filter points. Another advantage of boxcar filters is that in general they can be implemented with fewer multiplications than filters having other shapes such as Gaussian or co-sinusoidal filters.

The dimensions of the boxcar should match the extent of the peak in both the spectral and chromatographic directions. If the boxcar is too small, not all counts associated with a peak will be summed. If the boxcar is too large, then counts from other, neighboring peaks may be included.

However, boxcar filters also have distinct disadvantages for some applications to which the present invention might be applied. For example, the transfer function of boxcar filters reveals that they pass high frequency noise. Such noise can increase the risk of double counting peaks for low amplitude signals (low SNR), which might be undesirable in some applications of the present invention. Consequently, filter shapes other than boxcar shapes are generally preferred in applications of the present invention.

Second Derivative Filters can Produce a Single Local Maximum

Another suitable class of convolution filters that have an output that produces a unique maximum when convolved with an input having a unique maximum are filters that have a single, positive local maximum, but have negative sidelobes. Examples of such filters include second derivative filters, which are responsive to curvature. A suitable second derivative filter can be specified by subtracting the mean from a smoothing filter. Though such filters can be assembled from combinations of boxcar, triangular and trapezoidal shapes, the most common specification of filters that differentiate data are Savitzky-Golay polynomial filters.

Gaussian Noise and Poisson Noise

The Gaussian Matched Filter is an optimum filter when the noise has Gaussian statistics. The noise from counting detectors has Poisson statistics. In the case of Poisson noise the boxcar filter may be an optimal filter for use in detection because the boxcar simply sums all counts associated with a peak. However, many of the limitations described for GMF still apply to the boxcar filter, even in the case of Poisson noise. The boxcar filter cannot subtract baseline noise and cannot resolve interfered and coeluted peaks. In addition, the transfer function of the boxcar filter may allow for double counting for peak apices.

The rank-2 filter of the preferred embodiments is a compromise in SNR for both the case of Gaussian noise and Poisson noise. This rank-2 this filter has the advantage of baseline subtraction and partial resolution of overlapped peaks.

Role of Peak Width in Determining Filter Coefficients

In embodiments of the present invention, the coefficients of the convolution filter F to be convolved with the input matrix D are chosen to correspond to the typical shape and width of a peak corresponding also to an ion. For example, the cross section of the central row of filter F matches the chromatographic peak shape; the cross section of the central column of filter F matches the spectral peak shape. It should be noted that although the width of the convolution filter can be matched to the FWHM of the peak (in time and in mass-to-charge), such width matching is not required.

Interpretation of Ion Intensity and Scaling of Filter Coefficients

In the present invention, the intensity measurement estimate is the response of the filter output at the local maximum. The set of filter coefficients with which the LC/MS data matrix is convolved determines the scaling of the intensity. Different sets of filter coefficients result in different intensity scalings, so this estimate of intensity of the present invention does not necessarily correspond exactly to peak area or peak height.

However, the intensity measurement is proportioned to peak area or to peak height since the convolution operation is a linear combination of intensity measurements. Thus the response of the filter output at local maximum is in proportion to the molecule's concentration in the sample that gave rise to the ion. The response of the filter output at local maximum can then be used for the purpose of quantitative measurement of molecules in the sample in the same was as the area of height of the peak of the ion's response.

Provided a consistent set of filters is used to determine the intensities of standards, calibrators and sample, the resulting intensity measurements produce accurate, quantifiable results regardless of the intensity scaling. For example, intensities generated by embodiments of the present invention can be used to establish concentration calibration curves which can thereafter be used to determine the concentration of analytes.

Asymmetric Peak Shapes

The examples above have assumed that an ion's peak shapes in the spectral and in the chromatographic directions are Gaussians, and therefore symmetric. In general, peak shapes are not symmetric. A common example of an asymmetric peak shape is that of a tailed Gaussian; a Gaussian convolved with a step-exponential. The methods described here still apply to peak shapes that are asymmetric. In the case where a symmetric filter is applied to an asymmetric peak, the location of the apex in the output convolved matrix will not, in general, correspond exactly to the apex location of the asymmetric peak. However, any offset originating from peak asymmetry (in either the chromatographic or the spectral direction) will be, effectively a constant offset. Such an offset is easily corrected for by conventional mass spectrometric calibration, and by retention time calibration using an internal standard.

According to The Matched Filter Theorem, the optimum shape for detection for an asymmetric peak will be the asymmetric peak shape itself. However, provided the width of the symmetric filter matches the width of the asymmetric peak, the difference in detection efficiency between a symmetric filter and a matched asymmetric filter will be minimal for the purposes of this invention.

Changing Filter Coefficients to Interpolate and Offset Data

Another use of coefficient modification is to provide interpolation to account for small changes due to calibration of the mass spectrometer. Such coefficient modification can occur from spectrum to spectrum. For example, if a change in mass calibration causes an offset of a fraction of a channel by 0.3, then column filters (both smoothed and second derivative) can be derived that estimate what the output would be in the absence of such a mass offset. In this manner, a real-time mass correction can be made. Typically, the resulting filter is slightly asymmetric.

Dynamic Filtering

Filter characteristics such as the filter width scaling can be changed in response to known changing characteristics of the LC separation or of the MS scans. For example, in a TOF mass spectrometer, the peak width (FWHM) is known to change from low values (such as 0.010 amu) to wider values (such as 0.130 amu) over the course of each scan. In a preferred embodiment of the present invention, the number of coefficients of the smoothing and differentiating filters is set equal to approximately twice the FWHM of the spectral peak. As the MS scan progresses, for example, from low to high mass, the filter width of both the smoothing and second derivative column filters employed by the preferred embodiment can be expanded accordingly to preserve the relationship between filter width and peak width. Analogously, if the width of the chromatographic peak is known to change during a separation, the width of the row filters can be expanded or contracted to preserve the relationship between filter width and peak width.

Real-Time Embodiments of Rank-1 and Rank-2 Filters

In conventional LC/MS systems, spectra are acquired as the separation progresses. Typically spectra are written to computer memory at a constant sample rate (e.g., at a rate of once per second). After one or more complete spectra are collected, they are written to more permanent storage, such as to a hard disk memory. Such post collection processing can be performed in embodiments of the present invention as well. Thus, in one embodiment of the present invention, the convolution matrix is generated only after the acquisition is complete. In such an embodiment of the present invention, the original data and the convolved matrix itself are stored as is the ion parameter list obtained from analyzing the detected local maxima.

In addition, embodiments of the present invention using rank-1 and rank-2 filters can be configured to operate in real time. In a real-time embodiment of the present invention, the columns of the convolution matrix are obtained while the data is being acquired. Thus, the initial columns (corresponding to spectra) can be obtained, analyzed, and have their ion parameters written to disk before the acquisition of all spectra is complete.

This real-time embodiment of the present invention essentially analyzes the data in computer memory, writing only the ion parameter list to the permanent hard disk drive. In this context, real time means that rank-1 and rank-2 filtering is performed on the spectra in computer memory as the data is being acquired. Thus, ions detected by the LC/MS in the beginning of the separation are detected in the spectra written to disk, and the portion of the ion parameter list containing parameters associated with these ions is also written to disk as the separation proceeds.

There is typically a time delay associated with beginning real-time processing. The spectra that contain ions that elute in a chromatographic peak at time, t, and width, $\Delta t$, can be processed as soon as they are collected. Typically, real-time processing begins at time $t+3\Delta t$ i.e., after 3 spectra are initially collected. Ion parameters determined by analysis of this chromatographic peak are then appended to an ion parameters list being created and stored in permanent storage, such as a computer disk. The real-time processing proceeds according to the techniques described above.

Advantages of real-time processing include: (1) quick acquisition of the ion parameter list; (2) triggering real-time processes based upon information in the ion parameter list. Such real-time processes include fraction collection and stop flow techniques to store eluent for analysis. An exemplary such stop-flow technique traps the eluent in a nuclear-magnetic-resonance (NMR) spectral detector.

Figure 18:
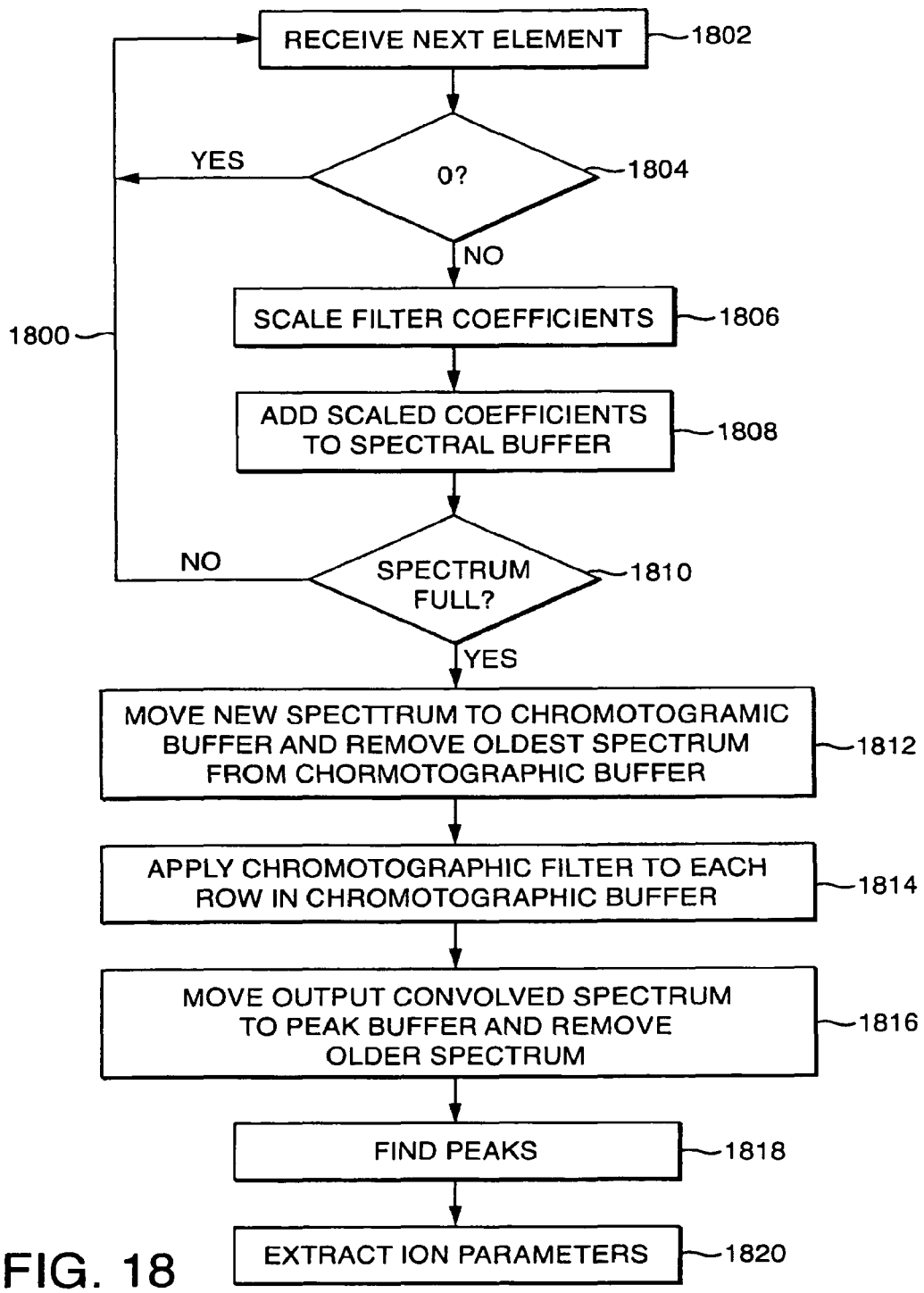
FIG. 18 illustrates a flow chart for performing real-time processing of data according to an embodiment of the present invention.
Figure 19A:
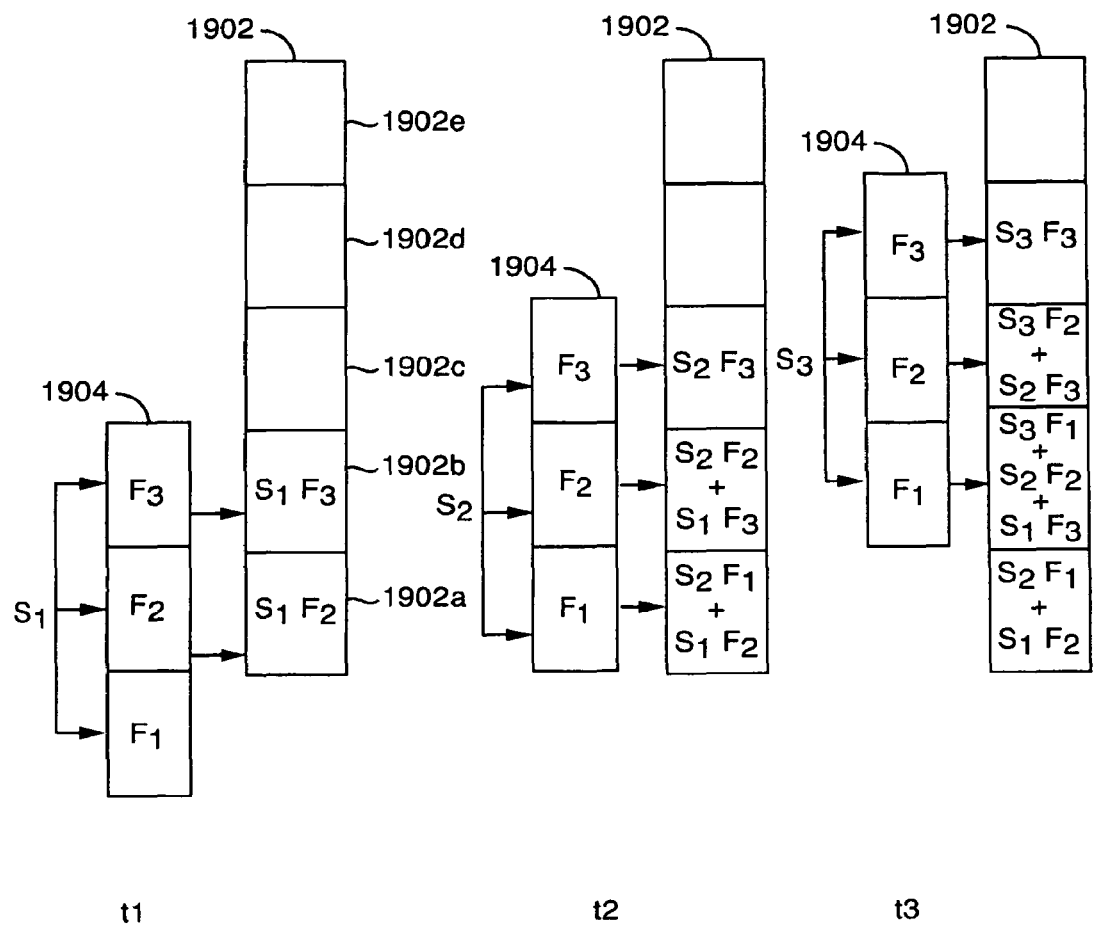
FIGS. 19A-19B are graphical illustrations of a method for performing real-time processing of a data according to the method of the flow chart of FIG. 18.
Figure 19B:
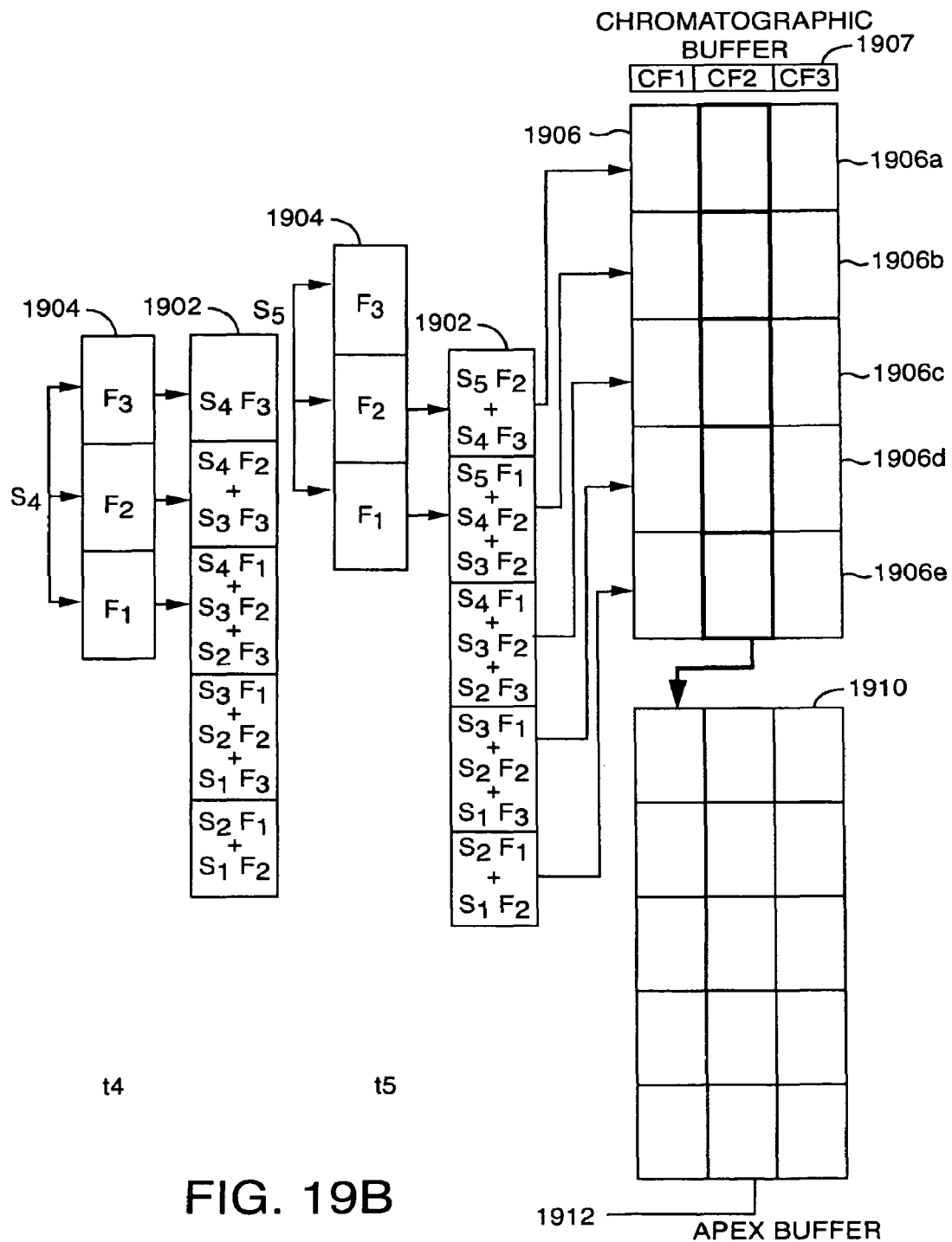

FIG. 18 is a flow chart 1800 illustrating a method for real-time processing according to a preferred embodiment of the present invention. The method can be executed in hardware, for example, for example in a DSP-based design or in software, such as in the DAS described above. It would be apparent to those skilled in the art how to configure such hardware or software based on the following description. For ease of description, the method is described as if performed by the DAS executing software. FIGS. 19A-19B illustrate a spectral buffer 1902, chromatographic buffer 1906 and an apex buffer 1910 and how they are manipulated in performing the method illustrated in flow chart 1800.

The DAS begins the method in step 1802 by receiving the next spectral element. In FIGS. 19A-19B, these spectral elements are shown as S1, S2, S3, S4 and S5 and correspond to spectral elements received at times T1, T2, T3, T4 and T5 respectively. In step 1804, the DAS determines whether the received spectral element is 0 or not. If the received spectral element is 0, the DAS continues the method in step 1802 by receiving the next spectral element. If the spectral element is not zero, its intensity is used to scale the coefficients of a spectral filter 1904. In the example illustrated in FIGS. 19A-19B, spectral filter 1904 is a 3-element filter having filter coefficients F1, F2 and F3. The scaling can be accomplished by multiplying each filter coefficient by the intensity of the received spectral element.

In step 1808, the scaled spectral filter coefficients are added to a spectral buffer. The spectral buffer is an array. The number of elements in the spectral buffer equals the number of elements in each spectrum.

For performing the summation, filter 1904 is aligned so that the element of the spectral buffer corresponding to the received spectral element is aligned with the center of filter 1904. Thus, at time T1, when spectral element S1 is received, the center of filter 1904, F2, is aligned with spectral buffer element 1902a; at time T2, when spectral element S2 is received, the center of filter 1904, F2, is aligned with spectral buffer element 1902b, and so on. These steps are illustrated in FIGS. 19A-19B, wherein the scaling of filter coefficients F1, F2, and F3 and addition to spectral buffer 1902 is illustrated for times, T1, T2, T3, T4 and T5, which, in the present example, is the time required to receive sufficient spectral elements to fill spectral buffer 1902. The resulting scaled sums are also shown in the spectral buffer elements of FIGS. 19A-19B.

In step 1810, the DAS determines whether the spectral buffer is full, that is, whether the number of spectral elements received and processed is the same as the number of elements in the spectral filter. If not, then the DAS continues the method in step 1802 by waiting for the next spectral element. If the spectral buffer is full, the DAS continues the method in step 1812.

In step 1812, the DAS moves the new spectrum to chromatographic buffer 1906. Chromatographic buffer 1906 contains N-spectra, where N is the number of coefficients in the chromatographic buffer. In the present example, N is 3. Chromatographic buffer 1906 is configured as a first in, last out (FILO) buffer. Consequently, when a new spectrum is added, the oldest spectrum is dropped. When a new spectrum is added in step 1812, the oldest spectrum is discarded. In step 1814, the DAS applies a chromatographic filter 1907 to each row of chromatographic buffer 1906. After application of the filter, central column 1908 corresponds to a single column convolved spectrum of the output convolved matrix. In step 1816, the DAS transfers the convolved spectrum to an apex buffer 1910.

In an embodiment of the present invention, apex buffer 1910 is three spectra in width, that is, apex buffer 1910 comprises three columnar spectra. Each of the spectral columns preferably has the length of a complete spectrum. Apex buffer 1910 is a FILO buffer. Thus, when the new column from chromatographic buffer 1906 is appended to apex buffer 1910 in step 1816, the oldest columnar spectrum is discarded.

Peak detection algorithms as described below can be performed on the central column 1912 of apex buffer 1910. Central column 1912 is used to provide more accurate analysis of peaks and ion parameters by using nearest neighbor values. Analysis of the peaks allows the DAS to extract ion parameters (such as retention time, m/z and intensity) in step 1820 to store in the ion parameter list. Moreover, spectral peak width information can also be obtained by examining points adjacent to the local maxima along the column.

Apex buffer 1910 can also be expanded beyond 3 spectra in width. For example, to measure chromatographic peak width, it would be necessary to expand the apex buffer to include a number of spectra at least equal to the FWHM of the chromatographic peak, for example twice the FWHM of a chromatographic peak.

In a real-time embodiment of the present invention, original spectra need not be recorded. Only the filtered spectra are recorded. Thus, the mass storage requirements for a real time embodiment of the present invention are reduced. Generally, however, additional storage memory, for example, RAM, is required for real-time embodiments of the present invention. For a rank-1 filter-based real time embodiment of the present invention, only a single spectrum buffer is needed. For rank-2 filter-based real time embodiment of the present invention, two spectral buffers are needed, one for the smoothing, and one for the second derivative spectral filters.

Step 4: Peak Detection

The presence of an ion produces a peak having a local maximum of intensity in the output convolved matrix. The detection process of embodiments of the present invention detects such peaks. In one embodiment of the present invention, the detection process identifies those peaks whose maximal intensity satisfy a detection threshold as peaks that correspond to ions. As used herein, satisfaction of a detection threshold is defined as meeting any criterion for overcoming the detection threshold. For example, the criterion could be meeting the detection threshold or meeting or exceeding the detection threshold. In addition in some embodiments of the present invention, the criterion may be falling below a detection threshold or meeting or falling below a detection threshold.

Each local maximum of intensity in the output convolved matrix is a candidate for a peak that corresponds to an ion. As described above, in the absence of detector noise, every local maximum would be deemed to correspond to an ion. However, in the presence of noise, some local maxima (especially low-amplitude local maxima) are due only to the noise, and do not represent genuine peaks corresponding to detected ions. Consequently, it is important to set the detection threshold to make it highly unlikely that a local maximum that satisfies the detection threshold is due to noise.

Each ion produces a unique apex or maximum of intensity in the output convolved matrix. The characteristics of these unique maxima in the output convolved matrix provide information on the number and properties of the ions present in the sample. These characteristics include location, width and other properties of the peaks. In one embodiment of the present invention, all local maxima in the output convolved matrix are identified. Subsequent processing eliminates those determined not to be associated with ions.

According to embodiments of the present invention, a local maximum of intensity is deemed to correspond to a detected ion only if the value of the local maximum satisfies a detection threshold. The detection threshold itself is an intensity against which local maxima of intensities are compared. The value of the detection threshold can be obtained by subjective or objective means. Effectively, the detection threshold divides the distribution of true peaks into two classes: those that satisfy the detection threshold and those that do not satisfy the detection threshold. Peaks that do not satisfy the detection threshold are ignored. Consequently, true peaks that do not satisfy the detection threshold are ignored. Such ignored true peaks are referred to as false negatives.

The threshold also divides the distribution of noise peaks into two classes: those which satisfy the detection threshold and those which do not satisfy the detection threshold. Any noise peaks that satisfy the detection threshold are deemed ions. Noise peaks that are deemed ions are referred to as false positives.

In embodiments of the present invention, the detection threshold typically is set to achieve a desired false positive rate, which is usually low. That is, the detection threshold is set so that the probability that a noise peak will satisfy the detection threshold in a given experiment is unlikely.

To obtain a lower false positive rate, the detection threshold is set to a higher value. Setting the detection threshold to a higher value to lower the false positive rate has the undesirable effect of raising the false negative rate, i.e., the probability that low-amplitude, true peaks corresponding to ions will not be detected. Thus, the detection threshold is set with these competing factors in mind.

The detection threshold can be determined subjectively or objectively. The goal of any thresholding method, whether subjective or objective is to determine a detection threshold to use to edit the ion list. All peaks whose intensities do not satisfy the detection threshold are considered noise. These "noise" peaks are rejected and not included in further analysis.

A subjective method for setting the detection threshold is to draw a line that is close to the maximum of the observed noise. Any local maxima satisfying the detection threshold are considered peaks corresponding to ions. And any local maxima not satisfying the detection threshold are considered noise. Although the subjective method for determining threshold can be used, objective techniques are preferred.

One objective method for selecting the detection threshold according to embodiments of the present invention uses a histogram of the output convolved matrix data. FIG. 20 is a flow chart for a method for objectively determining a detection threshold according to an embodiment of the present invention. The method is also graphically illustrated in FIG. 7. The method proceeds according to the following steps:

STEP 2002: Sort the intensities of all positive local maxima found in the output convolved matrix in ascending order STEP 2004: Determine standard deviation of intensity data in output convolved data matrix as the intensity that is at the 35.1 percentile in the list.

STEP 2006: Determine the detection threshold based on a multiple of the standard deviation.

STEP 2008: Generate edited ion list or ion parameter list using peaks satisfying the detection threshold.

The above method is applicable when most of the local maxma are due to Gaussian noise. For example, if there 1000 intensities, then Step 2004 would determine that the 351th intensity represents a Gaussian standard deviation. If the distribution of maximal intensities were due only to Gaussian noise processes, then local maxima whose values exceeded the 351st intensity would occur at frequency that is predicted by a Gaussian noise distribution.

The detection threshold is then a multiple of the 351th intensity. As an example, consider two detection thresholds. One corresponds to 2 standard deviations. One corresponds to 4 standard deviations. The 2-deviation threshold yields few false negatives, but a large number of false positives. From the properties of a Gaussian noise distribution a 2-standard deviation threshold means that about 5% of peaks would be falsely identified as ions. The 4-deviation threshold yields more false negative, but significantly fewer false positives. From the properties of a Gaussian noise distribution a 4-standard deviation threshold means that about 0.01% of peaks would be falsely identified as ions.

Rather than sorting the list of intensities of all local maxima, a histogram display can be used where the number of intensities per interval of intensities are recorded. A histogram is obtained by selecting a series of uniformly spaced intensity values, each pair of values defining an interval, and counting the number of maximal intensities that fall within each bin. The histogram is the number of intensities per bin versus the mean intensity value defining each bin. The histogram provides a graphical method for determining the standard deviation of the distributions of intensities.

A variation of the empirical method uses the relationship between the standard deviation $\sigma$ of the convolved output noise and the standard deviation $\sigma_o$ of the input noise to set the detection threshold. From the filter analysis above, this relationship is given as $$\sigma = \sigma_o \sqrt{\sum_{j=-l}^{l} \sum_{i=-h}^{h} F_{i,j}^2}$$

assuming that the input noise is uncorrelated Gaussian deviates. The input noise $\sigma_o$ can be measured from the input LCL/MS data matrix as the standard deviation of the background noise. A region of the LC/MS containing only background noise can be obtained from a blank injection, that is LC/MS data is obtained from a separation with no sample injected.

Thus, the standard deviation of the output can be inferred using only the values of the filter coefficients $F_{i,j}$ and the measured background noise $\sigma_o$. The detection threshold can then be set based upon the derived output noise standard deviation $\sigma$.

Step 5: Peak Parameter Extraction

After identifying those local maxima that are peaks corresponding to ions, parameters for each peak are estimated. In one embodiment of the present invention the parameters that are estimated are the retention time, mass-to-charge ratio, and intensity. Additional parameters such as chromatographic peak width (FWHM) and mass-to-charge peak width (FWHM) can also be estimated.

The parameters of each identified ion are obtained from the characteristics of the local maximum of the detected peaks in the output convolved data matrix. In an embodiment of the present invention, these parameters are determined as follows: (1) the ion's retention time is the time of the (filtered) scan containing the (filtered) maximal element (2) The ion's m/z is the m/z of the (filtered) channel containing the (filtered) maximal element; (3) The ion's intensity is the intensity of the (filtered) maximal element itself.

The width of a peak in the spectral or chromatographic directions can be determined by measuring the distance between the locations of the nearest zero crossing points that straddle the peak or by measuring the distance between the nearest minima that straddle a peak. Such peak widths can be used to confirm that a peak is resolved from its neighbors. Other information can be gathered by considering peak width. For example, an unexpectedly large value for a peak width may indicate coincident peaks. Consequently, the locations of zero crossings or local minima can be used as inputs to estimate the effect of interfering coincidence or to modify parameter values stored in the ion parameter list.

The parameters determined by analyzing the peaks can be further optimized by considering the neighboring elements. Because the elements of the convolved matrix represent a digital sample of data, the true apex of a peak in the chromatographic (time) dimension may not coincide exactly with a sample time and the true apex of a peak in the spectral (mass-to-charge ratio) dimension may not coincide exactly with a mass-to-charge ratio channel. As a result, typically the actual maximum of the signal in the time and mass-to-charge ratio dimensions is offset from the available sampled values by a fraction of the sample period or the mass-to-charge ratio channel interval. These fractional offsets can be estimated from the values of the matrix elements surrounding the element having the local maximum corresponding to the peak using interpolation, such as curve fitting techniques.

For example, a technique for estimating the fractional offset of the true apex from an element of the output convolved matrix containing a local maxima corresponding to an ion in the two-dimensional context is to fit a two-dimensional shape to the elements of the data matrix containing a local maxima and its nearest neighbors. In embodiments of the present invention, a two-dimensional parabolic shape is used because it is a good approximation to the shape of the convolved peak near its apex. For example, a parabolic shape can be fit to a nine element matrix comprising the peak and its 8 nearest neighbors. Other fits can be used for this interpolation, within the scope and spirit of the present invention.

Using the parabolic fit an interpolated value of the peak apex is calculated from which to determine the ion parameters. The interpolated value provides more accurate estimates of retention time, m/z and intensity than those obtained by reading values of scan times and spectral channels. The value of the parabola at the maximum, and its interpolated time and m/z values corresponding to that maximum, are the estimates of ion intensity, retention time and m/z.

The interpolated location in the row direction of the maximum of the two-dimensional parabolic fit is an optimal estimate of retention time. The interpolated location in the column direction of the maximum of the two-dimensional parabolic fit gives an optimum estimate of mass-to-charge ratio. The interpolated height of the apex above baseline gives an optimum estimate (scaled by filter factors) of ion intensity or concentration.

Embodiments of the present invention can also be configured to extract peak parameters from the results of intermediate convolved matrices. For example, the methods discussed above for locating a single peak corresponding to a detected ion can also be used to locate peaks in each row or column of the matrix. These peaks may be useful to store a spectra or chromatograms at known times or mass values.

For example, spectra or chromatograms obtained from the second derivative filters can be obtained for each row and column from the intermediate convolved matrices described above. These intermediate results can be examined for local maxima as well. These maxima are, in effect smoothed versions of the chromatograms and spectra. Local maxima can be extracted and saved, giving additional detail as to the spectral content of the sample at a particular time or time range, or the chromatographic content at a typical mass or mass range.

Measurement Error

Because each ion parameter measurement produced by embodiments of the present invention is an estimate, there is a measurement error associated with each such measurement. These associated measurement errors can be statistically estimated.

Two distinct factors contribute to the measurement errors. One factor is a systematic or calibration error. For example, if the mass spectrometer m/z axis is not perfectly calibrated, then any given m/z value contains an offset. Systematic errors typically remain constant. For example, calibration error remains essentially constant over the entire m/z range. Such an error is independent of signal-to-noise or amplitude of a particular ion. Similarly, in the case of mass-to-charge ratio, the error is independent of the peak width in the spectral direction.

The second factor contributing to measurement error is the irreducible statistical error associated with each measurement. This error arises due to thermal or shot-noise related effects. The magnitude or variance of this error for a given ion depends on the ion's peak width and intensity. Statistical errors measure reproducibility and therefore are independent of calibration error. Another term for the statistical error is precision.

The statistical error associated with each measurement can in principle be estimated from the fundamental operating parameters of the instrument on which the measurement is made. For example in a mass spectrometer, these operating parameters typically include the ionization and transfer efficiency of the instrument coupled with the efficiency of the micro-channel counting plate (MCP). Together, these operating parameters determine the counts associated with an ion.

The counts determine the statistical error associated with any measurement using the mass spectrometer. For example, the statistical error associated with the measurements discussed above typically follows a Poisson distribution. A numerical value for each error can be derived from counting statistics via the theory of error propagation. See example, in P. R. BEVINGTON, DATA REDUCTION AND ERROR ANALYSIS FOR THE PHYSICAL SCIENCES at 58-64 (McG$_{RAW}$-H$_{ILL}$ 1969).

In general, statistical errors also can be inferred directly from the data. One way to infer statistical errors directly from the data is to investigate the reproducibility of the measurements. For example, replicate injections of the same mixture can establish the statistical reproducibility of m/z values for the same molecules. Differences in the m/z values through the injections are likely due to statistical errors.

In the case of errors associated with retention time measurements, statistical reproducibility is more difficult to achieve because systematic errors arising from replicate injections tend to mask the statistical error. A technique to overcome this difficulty is to examine ions at different m/z values that were produced from a common parent molecule. Ions that originate from a common molecule would be expected to have identical intrinsic retention times. As a result, any difference between measurements of the retention times of molecules originating from a common parent is likely due to statistical errors associated with the fundamental detector noise associated with measurements of peak properties.

Each measurement made and stored using an embodiment of the present invention can be accompanied by estimates of its associated statistical and systematic errors. Though these errors apply to the parameter estimates for each detected ion, their values can be inferred generally by analyzing sets of ions. After a suitable error analysis, the errors associated with each measurement for a detected ion can be included in each row of the table corresponding to the detected ion measurement. In such an embodiment of the present invention, each row of the table can have fifteen measurements associated with each ion. These measurements are the five measurements for the detected ion corresponding to the row and their associated statistical and systematic errors, which are retention time, mass-to-charge ratio, intensity, spectral FWHM, and chromatographic FWHM.

As described above, the statistical component of measurement error, or precision, in retention time and m/z depends on the respective peak widths and intensities. For a peak that has a high SNR, the precision can be substantially less than the FWHM of the respective peak widths. For example, for a peak that has a FWHM of 20 milli-amu and high SNR, the precision can be less than 1 milli-amu. For a peak that is barely detectable above the noise, the precision can be 20 milli-amu. For purposes of the present discussion of statistical error, the FWHM is considered to be the FWHM of the peak in the LC/MS chromatogram prior to convolution.

Precision is proportional to the peak width and inversely proportional to peak amplitude. Generally, the relationship between precision, peak width and peak amplitude can be expressed as:

$$\sigma_m = k \frac{w_m}{h_p}.$$

In this relationship, $\sigma_m$ is the precision of the measurement of m/z (expressed as a standard error), $w_m$ is the width of the peak (expressed in milli-amu at the FWHM), $h_p$, is the intensity of the peak (expressed as a post-filtered, signal to noise ratio) and k is a dimensionless constant on the order of unity. The exact value for k depends on the filter method used. This expression shows that $\sigma_m$ is less than $w_m$. Thus, the present invention allows estimates of m/z for a detected ion to be made with a precision that is less than the FWHM of the m/z peak width as measured in the original LC/MS data.

Similar considerations apply with respect to the measurement of retention time. The precision to which retention time of a peak can be measured depends on the combination of peak width and signal intensity. If the FWHM max of the peak is 0.5 minutes, the retention time can be measured to a precision, described by a standard error, of 0.05 minutes (3 seconds). Using the present invention, estimates of retention time for a detected ion can be made with a precision that is less than the FWHM of the retention time peak width as measure in the original LC/MS data.

Step 6: Store Extracted Parameters

As described above, one output of embodiments of the present invention is a table or list of parameters corresponding to detected ions. This ion parameter table, or list has a row corresponding to each detected ion, wherein each row comprises one or more ion parameters and, if desired, their associated error parameters. In one embodiment of the present invention, each row in the ion parameter table has three such parameters: retention time, mass-to-charge ratio and intensity. Additional ion parameters and associated errors can be stored for each detected ion represented in the list. For example, a detected ion's peak width as measured by its FWHM or its zero-crossing width in the chromatographic and/or spectral directions also can be determined and stored.

The zero-crossing width is applicable when filtering is performed with a second derivative filter. The zero value of the second derivative occurs at inflection points of a peak on both the up-slope and down-slope sides of the peak. For a Guassian peak profile, the inflection points occur at +/1 standard deviation distance from the peak apex. Thus the width as measured by the inflection points correspond to the 2-standard deviation width of the peak. Thus the zero-crossing width is a height-independent measure of peak width corresponding to approximately 2 standard deviations. In an embodiment of the present invention, the number of rows in the table corresponds to the number of ions detected.

The present invention also provides a data compression benefit. This is because the computer memory needed to store the information contained in the ion parameter table is significantly less than the memory needed to store initially generated original LC/MS data. For example, a typical injection that contains 3600 spectra (for example, spectra collected once per second for an hour), with 400,000 resolution elements in each spectrum (for example, 20,000:1 MS resolution, from 50 to 2,000 amu) requires in excess of several gigabytes of memory to store the LC/MS data matrix of intensities.

In a complex sample, using embodiments of the present invention, on the order of 100,000 ions can be detected. These detected ions are represented by a table having 100,000 rows, each row comprising ion parameters, corresponding to a detected ion. The amount of computer storage required to store the desired parameters for each detected ion is typically less than 100 megabytes. This storage amount represents only a small fraction of the memory needed to store the initially generated data. The ion parameter data stored in the ion parameter table can be accessed and extracted for further processing. Other methods for storing the data can be employed in embodiments of the present invention.

Not only are storage requirements significantly reduced, but computational efficiency of post-processing LC/MS data is significantly improved if such analysis is performed using the ion parameter list rather than the originally produced LC/MS data. This is due to the significant reduction in number of data points that need to be processed.

Step 7: Simplify Spectra and Chromatograms

The resulting ion list or table can be interrogated to form novel and useful spectra. For example, as described above, selection of ions from the table based upon the enhanced estimates of retention times produces spectra of greatly reduced complexity. Alternatively, selection of ions from the table based upon the enhanced estimates of m/z values produces chromatograms of greatly reduced complexity. As described in more detail below, for example, a retention time window can be used to exclude ions unrelated to the species of interest. Retention-time selected spectra simplify the interpretation of mass spectra of molecular species, such as proteins, peptides and their fragmentation products, that induce multiple ions in a spectrum. Similarly an m/z window can be defined to distinguish ions having the same or similar m/z values.

Using the concept of a retention window, simplified spectra from an LC/MS chromatogram can be obtained. The width of the window can be chosen to be no larger than the FWHM of the chromatographic peak. In some cases, smaller windows such as one tenth the FWHM of a peak are selected. The retention-time window is defined by selecting a particular retention time, which is generally associated with the apex of a peak of interest, and then choosing a range of values about the chosen particular retention time.

For example, the ion having the highest intensity value can be selected and retention time recorded. A retention time window is selected around the recorded retention time.

Then, the retention times stored in the ion parameter table are examined. Only those ions having retention times falling within the retention time window are selected for inclusion in the spectrum. For a peak having a FWHM of 30 seconds, a useful value of retention time window can be as large as +/−15 seconds or as small as +/−1.5 seconds.

The retention time window can be specified to select ions that elute nearly simultaneously, and are thus candidates for being related. Such a retention time window excludes unrelated molecules. Thus, the spectra obtained from the peak list using the retention window contains only the ions corresponding to the species of interest thereby, significantly simplifying the produced spectrum. This is a large improvement over spectra generated by conventional techniques, which typically contain ions unrelated to the species of interest.

Using the ion parameter table also provides a technique for analyzing chromatographic peak purity. Peak purity refers to whether a peak is due to a single ion or the result of co-eluting ions. For example, by consulting the ion parameter list generated by embodiments of the present invention an analyst can determine how many compounds or ions elute within the time of a principle peak of interest. A method for providing a measure or metric of peak purity is described with reference to FIG. 21.

In step 2102, a retention time window is chosen. The retention time window corresponds to the lift off and touch down of the peak corresponding to the ion of interest. In step 2104, the ion parameter table is interrogated to identify all ions eluting within the chosen retention time window. In step 2106, the intensities of the identified ions (including the ion of interest) are summed. In step 2108, a peak purity metric is calculated. The peak purity metric can be defined in a number of ways. In one embodiment of the present invention, the peak purity metric is defined as:

purity=100*(intensity of peak of interest)/(sum of intensity of all peaks in retention window).

Alternatively, in another embodiment of the present invention, peak purity is defined as:

purity=100*(intensity of most intense)/(sum of intensity of all peaks in retention window).

In both definitions of peak purity, the peak purity is expressed as a percent value.

The spectra simplifying properties of the present invention can also be used to study biological samples more easily. Biological samples are an important class of mixtures commonly analyzed using LC/MS methods. Biological samples generally comprise complex molecules. A characteristic of such complex molecules is that a singular molecular species may produce several ions. Peptides occur naturally at different isotopic states. Thus, a peptide that appears at a given charge will appear at several values of m/z, each corresponding to a different isotopic state of that peptide. With sufficient resolution, the mass spectrum of a peptide exhibits a characteristic ion cluster.

Proteins, which typically have high mass, are ionized into different charge states. Although isotopic variation in proteins may not be resolved by a mass spectrometer, ions that appear in different charge states generally can be resolved. Such ions produce a characteristic pattern that can be used to help identify the protein. The methods of the present invention would then allow one to associate those ions from a common protein because they have a common retention time. These ions then form a simplified spectrum that can be analyzed by for example, the method disclosed in U.S. Pat. No. 5,130,538 to Fenn et al.

Mass spectrometers measure only the ratio of mass-to-charge, not mass by itself. It is possible however, to infer the charge state of molecules such as peptides and protein from the pattern of ions they produce. Using this inferred charge state, the mass of the molecule can be estimated. For example, if a protein occurs at multiple charge states, then it is possible from the spacing of m/z values to infer the charge, to calculate the mass of each ion knowing the charge and ultimately to estimate the mass of the uncharged parent. Similarly, for peptides, where the m/z charges are due to charge in the isotopic value for a particular mass m, it is possible to infer the charge from the spacing between adjoining ions.

There are a number of well-known techniques that use the m/z values from ions to infer the charge and parent mass. An exemplary such technique is described in U.S. Pat. No. 5,130,538, which is hereby incorporated by reference herein in its entirety. A requirement for each of these techniques is selection of the correct ions and the use of accurate values for m/z. Ions represented in the detected ion parameter table provide high precision values that can be used as inputs to these techniques to produce results with enhanced precision.

In addition, several of the cited methods attempt to reduce the complexity of spectra by distinguishing between ions that may appear in a spectrum. Generally, these techniques involve selecting a spectrum centered on a prominent peak or combing spectra associated with a single peak, to obtain a single extracted MS spectra. If that peak were from a molecule that produced multiple, time-coincident ions, the spectra would contain all those ions including ions from unrelated species.

These unrelated species can be from ions that elute at the exact same retention time as the species of interest or, more commonly, the unrelated species are from ions that elute at different retention times. However, if these different retention times are within a window of approximately the FWHM of the chromatographic peak width, the ions from the front or tails of these peaks are likely to appear in the spectrum. The appearance of the peaks associated with unrelated species requires subsequent processing to detect and remove them. In some instances where they coincide, they may be biasing measurements.

Figure 22A:
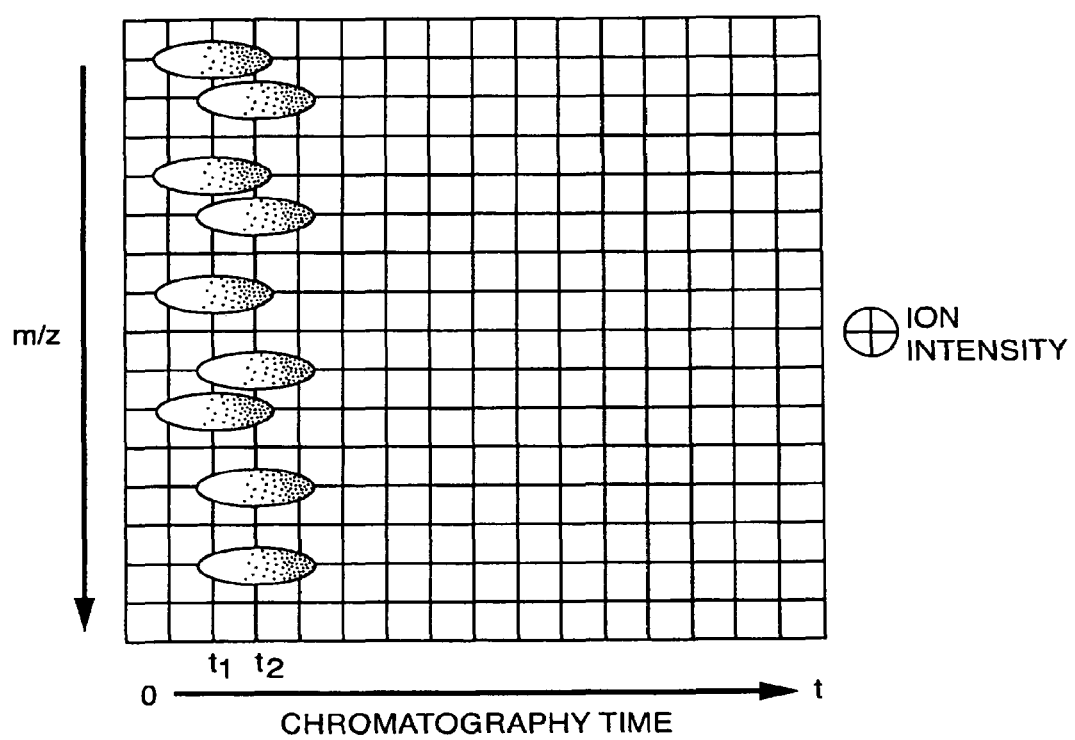
FIG. 22A illustrates an exemplary LC/MS data matrix resulting from two parent molecules and the resulting multiplicity of molecules.
Figure 22B:
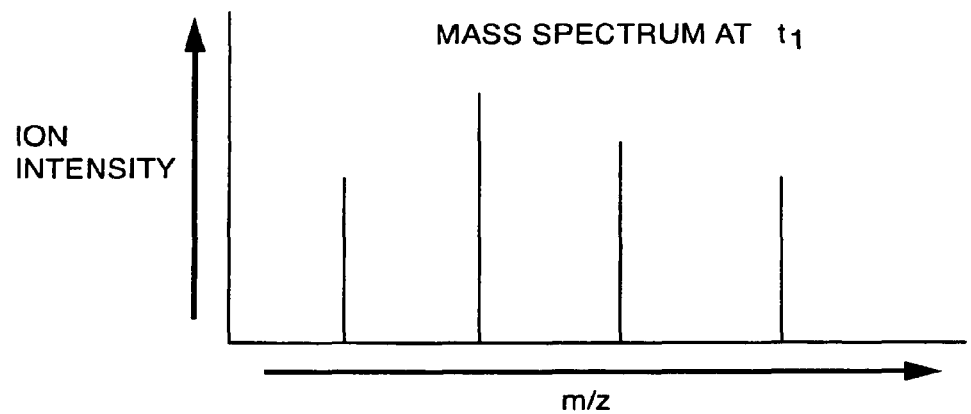
FIG. 22B illustrates an exemplary complex spectrum corresponding to the data of FIG. 22A at a time t1.
Figure 22C:
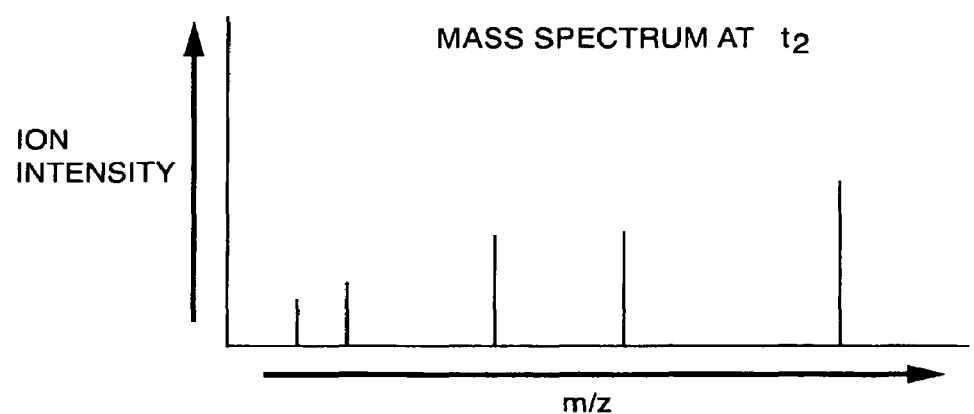
FIG. 22C illustrates an exemplary complex spectrum corresponding to the data of FIG. 22A at a time t2.

FIG. 22A illustrates an exemplary LC/MS data matrix that results from two parent molecules, and the resulting multiplicity of ions. In this example a species elutes at time t1 producing 4 ions and another species elutes at time t2 producing 5 ions in the LC/MS data matrix. Even though there are two distinct species, if a spectrum were to be extracted at time t1 or time t2, the result spectrum would contain nine peaks one from each of the nine ions. However the present invention would obtain 9 accurate retentions times (as well as m/z and intensities) for each of these 9 ions. If a spectrum were then constructed only of ions that had retention times substantially equal to t1, then only four ions would be present. This simplified spectrum appears in FIG. 22B. Similarly, tf a spectrum were then constructed only of ions that had retention times substantially equal to t2, then only five ions would be present. This simplified spectrum appears in FIG. 22C.

Applications

As a sample is collected with an LC/MS system, a plurality of spectra is typically collected across the chromatographic peak in order for the retention time to be accurately inferred. For example, in embodiments of the present invention 5 spectra per FWHM are collected.

It is possible to alternate the configuration of an LC/MS system on a spectrum by spectrum basis. For example, all even spectra can be collected in one mode and all odd interleaving spectra can be collected with the MS configured to operate in a different mode. An exemplary dual mode collection operation can be employed in LC/MS alternating with LC/MSE where in one mode (LC/MS) unfragmented ions are collected and in the second mode (LC/MSE), fragments of the unfragmented ions collected in the first mode are collected. The modes are distinguished by the level of a voltage applied to ions as they traverse a collisional cell. In the first mode the voltage is low, and in the second mode, the voltage is elevated. (Bateman et al.)

In such a system, the fragments or ions collected with the system in one mode appear with a chromatographic profile having the same retention time as the unmodified ions. This is because the unfragmented and fragmented ions are common to the same molecular species, so the elution profile of the molecule is imprinted upon all unfragmented and fragmented ions that derive from it. These elution profiles are substantially in time alignment because the extra time required to switch between modes in online MS is short as compared to the peak width or FWHM of a chromatographic peak. For example, the transit time of a molecule in an MS is typically on the order of milli- or micro-seconds, while the width of a chromatographic peak is typically on the order of seconds or minutes. Thus, in particular, the retention times of the unfragmented and fragmented ions are substantially identical. Moreover, the FWHM of the respective peaks will be the same, and further, the chromatographic profiles of the respective peaks will be substantially the same.

The spectra collected in the two modes of operation can be divided into two independent data matrices. The operations of convolution, apex detection, parameter estimation and thresholding described above can be applied independently to both. Although such analysis results in two lists of ions, the ions appearing in the lists bear a relationship to one another. For example, an intense ion having a high intensity that appears in the list of ions corresponding to one mode of operation may have counterpart in the list of modified ions collected according to the other mode of operation. In such a case, the ions will typically have a common retention time. To associate such related ions with one another for analysis, a window restricting retention time as described above can be applied to ions found in both data matrices. The result of applying such a window is to identify ions in the two lists having a common retention time and are therefore likely to be related.

Even though the retention times of these related ions are identical, the effects of detector noise will result in the measured values of retention time of these ions to differ somewhat. This difference is a manifestation of statistical error and measures the precision of the measurement of retention time of an ion. In the present invention, the difference in estimate retention times of ions will be less than the FWHM of the chromatographic peak width. For example if the FWHM of a peak is 30 seconds, the variation in retention times between ions will be less than 15 seconds for low-intensity peaks, and less then 1.5 seconds for high-intensity peaks. The window widths used to collect ions of the same molecule (and to reject unrelated ions) can the be as large as +/−15 seconds or as small as +/−1.5 seconds in this example.

Figure 23A:
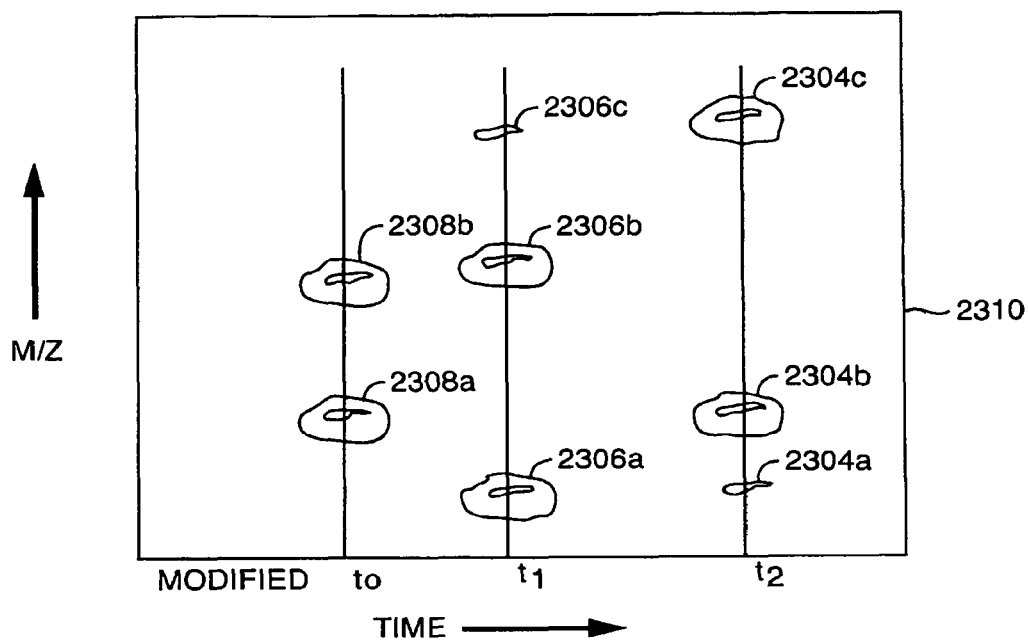
FIGS. 23A-23B are graphical charts illustrating how related ions can be identified in the unmodified and modified ion lists generated by an embodiment of the present invention.
Figure 23B:
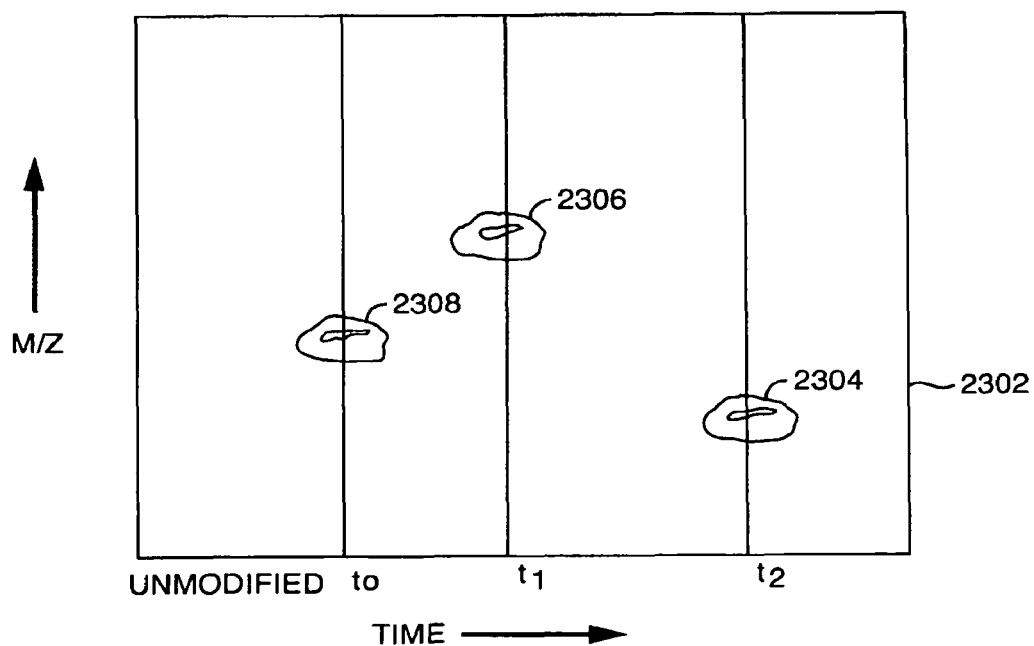

FIGS. 23A-23B are graphical charts illustrating how related ions can be identified in the unmodified and modified ion lists generated by an embodiment of the present invention. Data matrix 2302 shows three precursor ions 2304, 2306 and 2308 that are detected in spectra resulting from an unmodified MS experiment. Data matrix 2310 shows eight ions that result from an experiment after the MS is modified for example as described above to cause fragmentation. Ions in data matrix 2302 that are related to those in the data matrix 2310 appear at the same retention time, as indicated by the three vertical lines labeled t0, t1, and t2. For example, ions 2308a and 2308b in data matrix 2310 are related to ion 2308 in data matrix 2302. Ions 2306a, 2306b, and 2306c in data matrix 2310 are related to ion 2306 in data matrix 2302. Ions 2304a, 2304b and 2304c in data matrix 2310 are related to ion 2304 in data matrix 2302. These relationships can be identified by retention time windows with appropriate widths centered at time t0, t1, and t2 respectively.

The ion parameter list can be used for a variety of analyses. One such analysis involves fingerprinting or mapping. There are numerous examples of mixtures that are, on the whole well characterized, and have essentially the same composition, and whose components exist in the same relative amounts. Biological examples include the end products of metabolism such as urine, cerebrospinal fluid, and tears. Other examples are the protein contents of cell populations found in tissues and blood. Other examples are the enzymatic digests of protein contents of cell populations found in tissues and blood. These digests contain mixtures peptides that can by analyze by dual mode LC/MS and LC/MSE. Examples in industry include perfumes, fragrances, flavors, fuel analysis of gasoline or oils. Environmental examples include pesticides, fuel and herbicides, and contamination of water and soil.

Abnormalities from what would be expected to be observed in these fluids include xenobiotics in the case of products of metabolism that result from ingestion or injection of drugs or drug substances; evidence of drugs of abuse in metabolic fluids; adulteration in products such as juices, flavors, and fragrances; or in fuel analysis. The ion parameter list generated according to embodiments of the present invention can be used as an input to methods known in the art for fingerprint or multi-variate analysis. Software analysis packages such as SIMCA (Umetrics, Sweden), or Pirouette (Infometrix, Woodenville, Washington, USA) can be configured to use fingerprint or multi-variate techniques to detect such abnormalities, by identifying changes in ions between sample populations. These analyses can determine the normal distribution of entities in a mixture, and then identify those samples that deviation from the norm.

The synthesis of a compound may produce the desired compound together with additional molecular entities. These additional molecular entities characterize the synthetic route. The ion parameter list in effect becomes a fingerprint that can be used to characterize the synthetic route of the synthesis of a compound.

Another important application to which the present invention is applicable is biomarker discovery. The discovery of molecules whose change in concentration correlates uniquely with a disease condition or with the action of a drug is fundamental to the detection of disease or to the processes of drug discovery. Biomarker molecules can occur in cell populations or in the products of metabolism or in fluids such as blood and serum. Comparison of the ion parameter lists generated for control and disease or dosed states using well known methods can be used to identify molecules that are markers for the disease or for the action of a drug.

N-Dimensional Data and LC/IMS/MS

Some embodiments of the invention involve higher dimensional data than that obtained from LC/MS instruments. Some of these embodiments involve LC/IMS/MS instruments. Although the following description is directed primarily at LC/IMS/MS data, one of skill will understand that the principles described herein have broader applicability to a variety of instruments that provide three- and higher-dimensional data.

Some of these embodiments include an LC module, an IMS module and a TOF-MS module. An example of such an instrument, with which some embodiments of the invention are suitably implemented, is described in US Patent Publication 2003/01084 to Bateman et al., published on Jan. 2, 2003.

First, for a broader context of some aspects of the invention, the collection of data of different numbers of dimensions is described. For a single-channel detector, as found, for example, in a LC-only or MS-only instrument, the one-dimensional data is typically displayed in a two-dimensional plot. One must then locate all peaks in the plot.

In the case of LC, typical detectors implement ultraviolet/visible (UV/Vis) light absorbance detection. The peak parameters are the retention time and absorbance of the peak as it elutes from the column.

In the case of MS, as performed, for example, with a quadrupole- or TOF-based MS, electromagnetic forces serve to separate ions of different m/z ratio, and a detector provides a value of ion intensity as a function of the m/z ratio. A routine is required to locate the peaks in the two-dimensional plot of the intensity versus m/z data. In combined LC/MS, peaks must be located, i.e., distinguished from artifacts in the data plotted in three dimensions (ion intensity versus retention time and m/z.).

In some LC/EMS/NIS-related embodiments, described below, three separation-related dimensions are associated with ion-intensity values. The three dimensions of separation—liquid chromatography, followed by ion mobility, followed by mass spectrometry—measure three corresponding properties of the ions: retention time, ion mobility, and mass-to-charge ratio. The MS module locates an ion in its m/z value in association with the ion's peak. The peak is associated with, for example, the integrated number of ion counts of the ion's peak, as measured by a micro-channel plate.

Table 3 provides a summary of the different numbers of dimensions of data provided by some embodiments of the invention. The first column lists some specific analytical techniques and a more general reference to any technique having N dimensions of data associated with N separations. N is optionally equal to as much as three or more. The second column lists the number of dimensions of a convolution filter that is utilized, in accordance with some embodiments of the invention, to reduce artifacts and help distinguish overlapping peaks. In some preferred implementations, the number of dimensions of a convolution filter matches the number of separations.

For definitional purposes, if one chooses to treat ion intensity as a dimension of data, in addition to the dimensions of separation, the data are optionally then referred to as having a dimension one greater than the number of separation dimensions.

After convolution, peaks associated with local maxima are located in the convolved data. For example, a local maximum in a three-dimensional space is suitably defined as the data point (also referred to herein as data element) that has a value greater than all of its neighbors. For example, an element in a three-dimensional separation space has $3 \times 3 \times 3 - 1 = 26$ neighbors. So, locating a local maximum generally requires a comparison of a central element to 26 neighboring elements.

The third column of Table 3 lists the number of comparisons to be made to establish that a point is a local maximum.

The remaining columns list the separation dimensions. The local maximum identifies the apex of the peak. Each apex corresponds to an ion. The remainder of this Detailed Description will focus on LC/IMS/MS and greater dimensions of separation.

TABLE 3

| Analytic Method | Convolution Filter applied to data | Comparisons to find local maximum | Dimension of data | | |
|---|---|---|---|---|---|
| | | | Axis-1 | Axis-2 | Axis-3 |
| LC | 1-D | $3 - 1 = 2$ | LC-time | | |
| MS | 1-D | $3 - 1 = 2$ | m/z | | |
| LC/MS | 2-D | $3^2 - 1 = 8$ | LC-time | m/z | |
| LC/IMS/MS | 3-D | $3^3 - 1 = 26$ | LC-time | ion mobility | m/z |
| N separations | N-D | $3^N - 1$ | N axes of separation | | |

Figure 24:
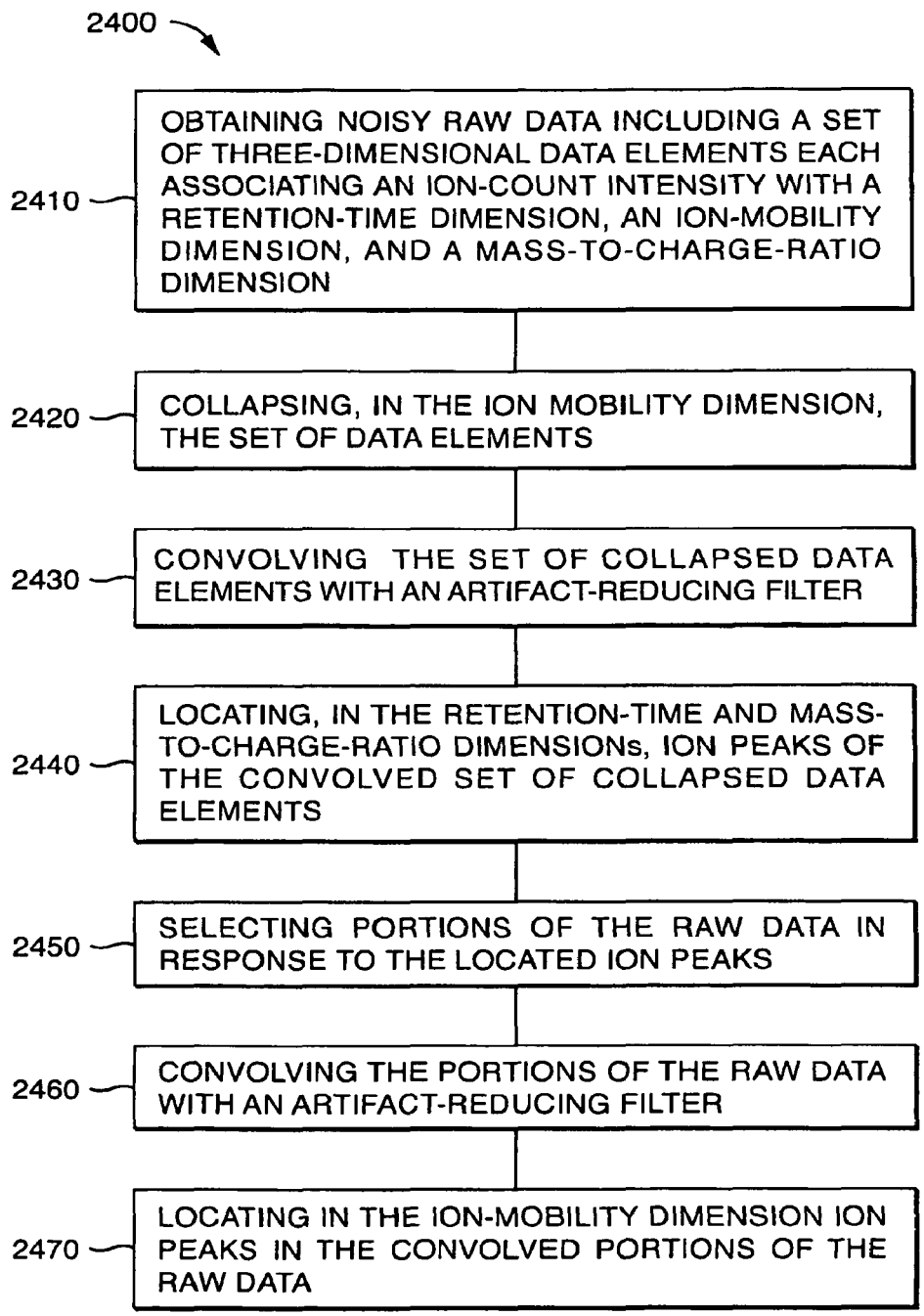
FIG. 24 is a flow diagram of a method of analysis, in accordance with one embodiment of the invention.

FIG. 24 is a flow diagram of a method 2400 of LC/IMS/MS analysis, according to one illustrative embodiment of the invention. The method 2400 includes obtaining 2410 noisy raw data from a sample. The data includes a set of three-dimensional data elements, which each associate an ion-count intensity with a retention-time dimension, an ion-mobility dimension, and a mass-to-charge-ratio dimension. The method 2400 further includes: collapsing 2420, in the ion mobility dimension, the set of data elements to obtain a set of collapsed data elements, which each associate a combined ion-count intensity with the retention-time and mass-to-charge-ratio dimensions; and convolving 2430 the set of collapsed data elements with an artifact-reducing filter that is associated, for example, with a two-dimensional matrix. The method 2400 further includes: locating 2440, in the retention-time and mass-to-charge-ratio dimensions, ion peaks of the convolved set of data elements; and, in response to the located ion peaks, selecting 2450 one or more portions of the noisy raw for further analysis. The method 2400 further includes convolving 2460 the selected portions of the noisy raw data with an artifact-reducing filter that is associated, for example, with a three-dimensional matrix; and locating 2470, in retention-time, ion mobility and mass-to-charge-ratio dimensions, ion peaks in the convolved raw data.

The one or more portions of the raw data selected 2450 for further analysis are selected in response to the located 2440 ion peaks of the convolved set of collapsed data elements. The locations, in the retention-time and mass-to-charge-ratio dimensions, of the ion peaks of the convolved collapsed set of data elements indicate locations, in the retention-time and mass-to-charge-ratio dimensions, of interest in the raw data.

Thus, suitably, the portions selected for further analysis include the full ion-mobility dimension of the raw data, but only restricted regions of the retention-time and mass-to-charge-ratio dimensions of the raw data. These restricted regions include the locations indicated by the convolved collapsed set of data elements. The portions of the raw data are then selected, for example, to be substantially centered on the located ion peaks. Thus, one avoids inefficient analysis of portions of data space that do not contain meaningful data or data of interest. Moreover, the size of the selected portions is optionally chosen in response to a peak width, as observed or predetermined. Preferably, the size of the selected portion, in each dimension, is greater than the peak width, in that dimension.

As mentioned, convolving 2460 entails a three-dimensional convolution of the raw data. For peak-information determination, local maxima are located 2440, optionally, by a search in three dimensions (retention time, ion mobility, and ion m/z); the location of a local maximum associates the three separation-related ion properties—retention time, mobility, and m/z—with an ion's intensity (corresponding to a number of ions detected via MS.) The value of the apex of a peak provides the integrated ion intensity over a whole ion peak, if a convolution filter is appropriately normalized.

Next referring to Table 4, the method 2400 exploits the different levels of resolution of the raw data in the three different dimensions (relatively high-resolution in m/z, relatively poor resolution in ion mobility, and intermediate in retention time.) Table 4 illustrates these differences in resolution. For the three dimensions, Table 4 lists a typical measurement range, sampling period, number of elements (i.e., range divided by sampling period) peak full-width half maximum (in terms of time) peak full-width half maximum (in terms of data point elements) and resolution (in terms of number of resolvable peaks.)

TABLE 4

| Separation Dimension | Range | Sampling period | Number of Array Elements | Peak FWHM | Peak FWHM | Resolution |
|---|---|---|---|---|---|---|
| m/z | 75 μsec | 0.5 ns | 150,000 | 4 ns | 8 elem. | 18,000 |
| Retention | 100 min | 4 sec | 1500 | 30 sec | 7.5 elem | 200 |
| Mobility | 20 ms | 0.1 ms | 200 | 0.7 ms | 7 elem | 30 |

The MS resolution of 18,000 corresponds to 150,000 channels of intensities, with a peak width (FWHM) of 8 channels. The second highest resolution is the chromatographic dimension, with a 100 minute separation and a peak width of 30 seconds (corresponding to 7.5 scans). The lowest resolution is given by ion mobility. Assuming the illustrated example of a FWHM of 7 elements, the IMS resolution is 30 peaks for a 200 channel spectrum. This idealized example ignores the typical variation of peak width with mass and mobility.

In more detail, the method 2400 is optionally implemented as follows. Raw data from the various scans are assembled into a three dimensional data array, where one axis is the time of a scan set corresponding to chromatographic retention time, a second axis corresponds to the scan number in the scan set corresponding to mobility drift time, and the third axis is channel number, corresponding to mass-to-charge ratio. A three-dimensional convolution is applied to the three-dimensional data array. Local maxima in the three dimensions locate ion peaks. The value of the apex of the peak provides the fourth ion property, the intensity integrated over the whole body of the peak, if a convolution filter is normalized for this purpose.

The three-dimensional convolution utilizes, for example, smoothing or $2^{nd}$ derivative filters, or combinations of such filters. A convolution filter's coefficients are optionally chosen to maximize a signal-to-noise ratio, minimize statistical-error properties, remove baseline backgrounds, and/or mitigate effects of ion interference. For more efficient computation, as indicated in the above description of the method 2400, the three-dimensional convolution is optionally applied to sub-volumes of the raw data. The sub-volumes are selected in response to the LC/MS data. The collapsed 2420 data are obtained by combining (such as adding) all mobility spectra. Optionally, dead-time corrections and lock mass corrections are incorporated into the method 2400, as are auto peak-width computations for each dimension.

The method 2400 is extensible to N sequential separations that produce N dimensions of separation-related data. Such data are optionally assembled as a N-dimensional hyper-cube, and a N-dimensional convolution is applied to all points in the hyper cube. Local maxima are found, for example, by comparing the intensity of a point to $3^N$ neighboring elements centered on each element in the N-dimensional space. Interpolation formulas locate the N-dimensional parameters of each peak, and the value at the N-dimensional peak apex is the intensity of the peak that accounts for all the counts or signal associated with the peak after the N-dimensional separation.

The method 2400 is optionally applied to centroid data. In a centroid approach, the only information recorded for a scan, in a scan set, is the peak information, where each peak is described by a mass and intensity. Each mass-intensity pair is replaced with a Gaussian peak whose width corresponds to the mass spectrometric resolution, e.g., a continuum representation of each spectrum is reconstructed from a peak list. The reconstructed, continuum spectra are assembled into a cube and analyzed.

As noted above, for reasons of efficiency, one optionally chooses not to apply a three-dimensional convolution filter to an entire volume of raw data; an operation-count needed to manipulate the data increases as the power of the number of dimensions. Using presently available processing equipment, a general three-dimensional convolution applied to all of the data obtained in a single LC/IMS/MS-based system injection would require, for example, days of computational time. The method 2400 potentially reduces the computation time to, for example, less than 1 hour, while providing results comparable to that obtained from a complete three-dimensional convolution. Additional computational efficiency is obtained, optionally, by approximating both two-dimensional and three-dimensional convolution filters with one-dimensional filters applied in sequence to linear arrays extracted from the data.

The following is an example of data calculation for an LC/IMS/MS-based system. Ion intensities are organized in a three-dimensional volume, where each data element is an intensity, measured as counts (C), and each element is subscripted by three variables, corresponding to retention time (T), mobility (D), and mass-to-charge ratio μ. Mathematically, each element of this three-dimensional data is labeled by three indices. Chemists generally refer to such data as "four-dimensional" data, thus regarding intensity as an extra dimension of data. The notation used for each data element in this example is $C_{i,j,k}$, where C is the counts measured at a data element specified by integer indices i, j, k. These indices correspond to scan number (retention time, $T_i$), scan set number (mobility, $D_j$), and channel number (mass-to-charge, $\mu_k$). Thus, we have that $$C_{i,j,k} = C(T_i, D_j, \mu_k).$$

In this example, the response of an ion in an LC/IMS/MS system is approximated as a Gaussian peak in three dimensions, where each ion produces counts that spread across characteristic peak widths.

The width of a peak in each of the three directions is a property of the modes of separation. The standard-deviation peak widths are $\sigma_T$, $\sigma_D$, $\sigma_\mu$ for the chromatographic, mobility, and mass spectral directions. The counts are distributed over data elements as $$C_{i,j,k} = \frac{C_V}{(2\pi)^{3/2}\sigma_T\sigma_D\sigma_\mu} \exp\left(-\frac{1}{2}\left[\left(\frac{i-i_o}{\sigma_T}\right)^2 + \left(\frac{j-j_o}{\sigma_D}\right)^2 + \left(\frac{k-k_o}{\sigma_\mu}\right)^2\right]\right)$$

where $C_V$ is the integrated volume counts, and the i,j,k indices correspond to chromatographic scan time, mobility scan time, and mass-to-charge channel, respectively. The Gaussian peak is centered on $i_o$, $j_o$, and $k_o$ (which takes on a fractional value.) The relationship between apex counting rate and integrated volume counting rate is $$C_A = \frac{C_V}{(2\pi)^{3/2}\sigma_T\sigma_D\sigma_\mu}.$$

To detect ions in such data and measure their properties, i.e., to infer $i_o$, $j_o$, $k_o$, and $C_V$ from the array $C_{i,j,k}$ in this example, one estimates these parameters using a convolution filter. The local maxima of the convolved data locate the ions and estimate their intensity.

Given a set of filter coefficients, $F_{l,m,n}$, the output of a three-dimensional convolution is a three-dimensional volume, given by $$R_{i,j,k} = \sum_{l=-L}^{L} \sum_{m=-M}^{M} \sum_{n=-N}^{N} F_{l,m,n} C_{i-l,j-m,k-m}.$$

where $R_{i,j,k}$ as a convolution element.

The filter coefficients $F_{l,m,n}$ span a three-dimensional volume, where the width of each dimension is associated with the width of the peak in each dimension. The indices of F are symmetric about 0, and the number of elements in each dimension is (2L+1), (2M+1), and (2N+1).

In this example, the widths of $F_{l,m,n}$ are adjusted to match the changing peak widths over the MS and IMS dimensions. The computation of each output value $R_{i,j,k}$ requires as many multiplications as there are filter coefficients.

As indicated by the convolution expression, a value of $R_{i,j,k}$ is obtained by centering the coefficients $F_{l,m,n}$ on the element $C_{i,j,k}$, and performing the indicated multiplications and additions. Generally, there are as many output values $R_{i,j,k}$ as there are input values $C_{i,j,k}$.

In a three-dimensional application, $R_{i,j,k}$ is a local maximum if its value exceeds the value of all of its neighbors. That is, if $R_{i,j,k}$ is in the center of a (3×3×3=27) element cube, the value for $R_{i,j,k}$ is a maximum if its ion-peak intensity value exceeds that of its 26 nearest neighbors. A normalization coefficient is obtained by convolving the un-normalized filter with a model Gaussian peak; the peak widths of the model Gaussian peak correspond to the physically expected peak widths. An ion is detected if the value of the convolution maximum exceeds a suitably selected threshold. A value for threshold detection is set at, for example, 100 counts or less.

Given a peak-detection, the location of its apex in three-dimensions is obtained, for example, by fitting a three-dimensional quadratic curve to the 27 elements near the maximum. The interpolated index values of the maximum give the peak's properties, yielding fractional indices corresponding to retention time, mobility, and mass-to-charge ratio of the ion. Generally, spectra are uncalibrated, so the mass-to-charge is uncalibrated.

The operation count for convolution is proportional to the product of the number of acquired intensities times the number of filter coefficients. The operation count increases as the power of the dimensionality of the data. A convolution approach to a LC/IMS/MS-based system then optionally must contend with a potentially large operation count.

As mentioned above, one way to reduce the number of operations of a computation is to implement three-dimensional convolution filters as a series of one-dimensional convolution filters. Multiple applications of one-dimensional filters implements, as an approximation, a two-dimensional or three-dimensional filter matrix, as described above with reference to FIGS. 1-23. For example, a 21×21 element two-dimensional convolution matrix is replaced with four one-dimensional convolutions, two in the spectral direction and two in the retention time dimension. In the case of a three-dimensional convolution, a 21×21×21 three-dimensional convolution filter is replaced with nine one-dimensional convolutions, three one-dimensional convolutions in each dimension. This approach reduces calculation time, for example, by a factor of 6 in the two-dimensional case and a factor of 48 in the three-dimensional case.

As described above, one need not compute convolution elements for all raw data points to provide ion detection. Preferably, one only calculates enough values for $R_{i,j,k}$ to locate the local maximum of each ion. The minimum number is, for example, a cube of 3×3×3 values of $R_{i,j,k}$ for each ion. A local maximum is found if the value of $R_{i,j,k}$ in the center of that cube is greater than all surrounding 26 values. Thus, in principle, if there are 100,000 ions to be found, one only needs about 3,000,000 elements, or less than 0.01% of the 4.5×10$^{10}$ total number of potential convolution elements, in one illustrative example. The computation of these critical convolution values optionally requires a few seconds. In practice, more elements than this minimum are calculated. Thus, the invention, in some embodiments, exploits the realization that the addition of an IMS module to an LC/MS system optionally greatly increases the number of measured data points, most of which do not provide required information.

In this example, the raw data is collapsed in the ion-mobility dimension by constructing a two-dimensional LC/MS data matrix from the three-dimensional LC/IMS/MS data. An element $\hat{C}_{i,k}$ of the two-dimensional LC/MS matrix is obtained by summing intensities from all mobilities measured at the same chromatographic scan time and mass spectral channel, as follows, $$\hat{C}_{i,k} = \sum_{j=0}^{N_j} C_{i,j,k}.$$

As described above, one preferably sums over the mobility dimension because this dimension has the lowest resolution or peak capacity; the resulting T×µ two-dimensional array then has more resolution elements than the other two possible pairs of dimensions.

A two-dimensional convolution is applied to this collapsed array to determine an array of convolved elements $\hat{R}_{i,k}$ where $$\hat{R}_{i,k} = \sum_{l=-L}^{L} \sum_{n=-N}^{N} \hat{F}_{l,n} \hat{C}_{i-l, k-m}.$$

Here, $\hat{F}_{l,n}$ is a two-dimensional convolution filter, and $\hat{R}_{i,k}$ is the two-dimensional convolution element. The local maxima of $\hat{R}_{i,k}$ locates the retention time and m/z of each two-dimensional ion found in the two-dimensional matrix.

The present example utilizes the assumption that all ions are accounted for by these two-dimensional ion peaks (which may arise from more than one ion due to similar ion motilities.) Thus, the results of the two-dimensional convolution indicates where to apply the three-dimensional convolution, and each two-dimensional ion peak will correspond to one or more three-dimensional ions. If there is no ion interference for a particular two-dimensional ion peak, then the corresponding three-dimensional volume will yield a single ion detection with its location in the ion-mobility dimension.

For each two-dimensional ion-peak location determination, a set of three-dimensional convolution elements are calculated. In the present example, for each located peak, these elements span a three-dimensional volume that is centered on the retention time and m/z of the two-dimensional peak location and spans all 200 mobility spectra.

Thus, the three-dimensional data provide the ions' mobility characteristics, while the retention time, m/z, and/or intensity information was already provided by the convolved two-dimensional data or, preferably, also provided, more accurately, by the original three-dimensional data. Thus, it is sufficient to compute a limited selection of three-dimensional convolution elements.

To accommodate peaks, located in convolved two-dimensional data, that may include multiple ions whose apices are distributed over a width of the located peak, the following scheme is optionally adopted. Convolution elements are computed over a volume of 11 retention time elements by 11 mass-to-charge elements by 200 ion-mobility elements, centered on each two-dimensional ion detection. For this example, assuming 200 million calculational operations per second, approximately 38 minutes of processing time provides the retention time, ion mobility, mass-to-charge ratio, and ion intensity for all ions in a single sample injection in an LC/IMS/MS system. Reducing the volume over which three-dimensional convolution elements are computed additionally reduces computation time (by another factor of 20, for example) to a manageable level.

Raw data, such as spectra and/or chromatograms, output by a mass spectrometer may be subsequently processed for further analysis as described above to identify peak lists and properties of identified peaks. As will be described in following paragraphs, an embodiment of the techniques herein may perform processing such as described above using serial and parallel processing performed by processing units. For example, an embodiment may perform serial processing using a CPU (central processing unit) of a computer system which executes code serially (e.g., one instruction at a time) and by programming a parallel processing unit, such as a graphics processing unit (GPU) which can execute multiple instructions at a time. The GPU may be included in a computer system which analyzes the raw data output by an LC/MS or LC/IMS/MS system. In one embodiment, the raw data, such as scans or spectra produced by the LC/MS or LC/IMS/MS system, may be stored on a storage device. At a later point time, the raw data may be further analyzed in a post-processing step performed by executing code on a computer system including one or more GPUs. The code, when executed on the one or more GPUs, may perform at least some of the processing steps as described above in a parallel fashion. In another embodiment performing at least some of the processing steps described above for peak list detection and property computation in parallel, the raw data may be analyzed in real time as generated by the LC/MS or LC/IMS/MS system. Thus, the peaks list may be generated in real-time as the MS scan data is produced. In this latter embodiment in which the peak list is generated in real time as the MS scan data is produced, the scan data does not have to be stored in a form of non-volatile storage for post processing.

As described above, the raw data may include a sequence of scans and, using the techniques described above, peaks in the raw data may be identified and may be output in a list, the peak list. In one form, the peak list may be a list or table of data. For each peak, processing may also be performed to determine characteristics or properties of the identified peaks in the list. Such properties may include, for example, properties characterizing the peak shape, retention time (RT), m/z and intensity at the peak apex, the area or volume of the peak, coordinates of where the peak starts and ends, up-slope and down-slope, peak width, and the like. Part of the processing described above includes various filtering steps. Processing to perform this filtering, generate the peak lists and associated properties is computationally intensive and, in one embodiment, may be performed by the GPU or other parallel processing unit using parallel programming. In one embodiment of the techniques herein, not all processing steps may be performed by code executed by the GPU. Rather, as described below, an embodiment may select to perform processing steps which are computationally intensive and amenable for parallelization using the GPU while performing other processing serially in the CPU. For example, an embodiment in accordance with techniques herein may perform steps related to filtering, peak list generation, and peak property generation in parallel using the GPU while executing other processing steps serially using a CPU. Both the CPU and one or more GPUs may be included in the same system as described in more detail in exemplary embodiments elsewhere herein. Code that executes in the GPU may be programmed, for example, using the CUDA programming language designed to exploit parallel processing characteristics of the GPU. The GPU can handle thousands of concurrent programming threads, each running one element of a parallel computation. To facilitate parallel programming, CUDA organizes these threads in blocks, and the threads blocks are organized in a grid. The threads in a thread block can be indexed in one, two, or three dimensions, and the grid can be indexed in one or two dimensions. In an embodiment described herein in following paragraphs, the function calls that run in the GPU are called "kernels", and are launched from the CPU. Each kernel corresponds to a portion of parallel code that may be executed by multiple threads, where such threads are organized into a number of blocks. A "grid" of blocks may be run as a unit of computation on the GPU where all threads in the grid may executed concurrently.

Figure 25A:
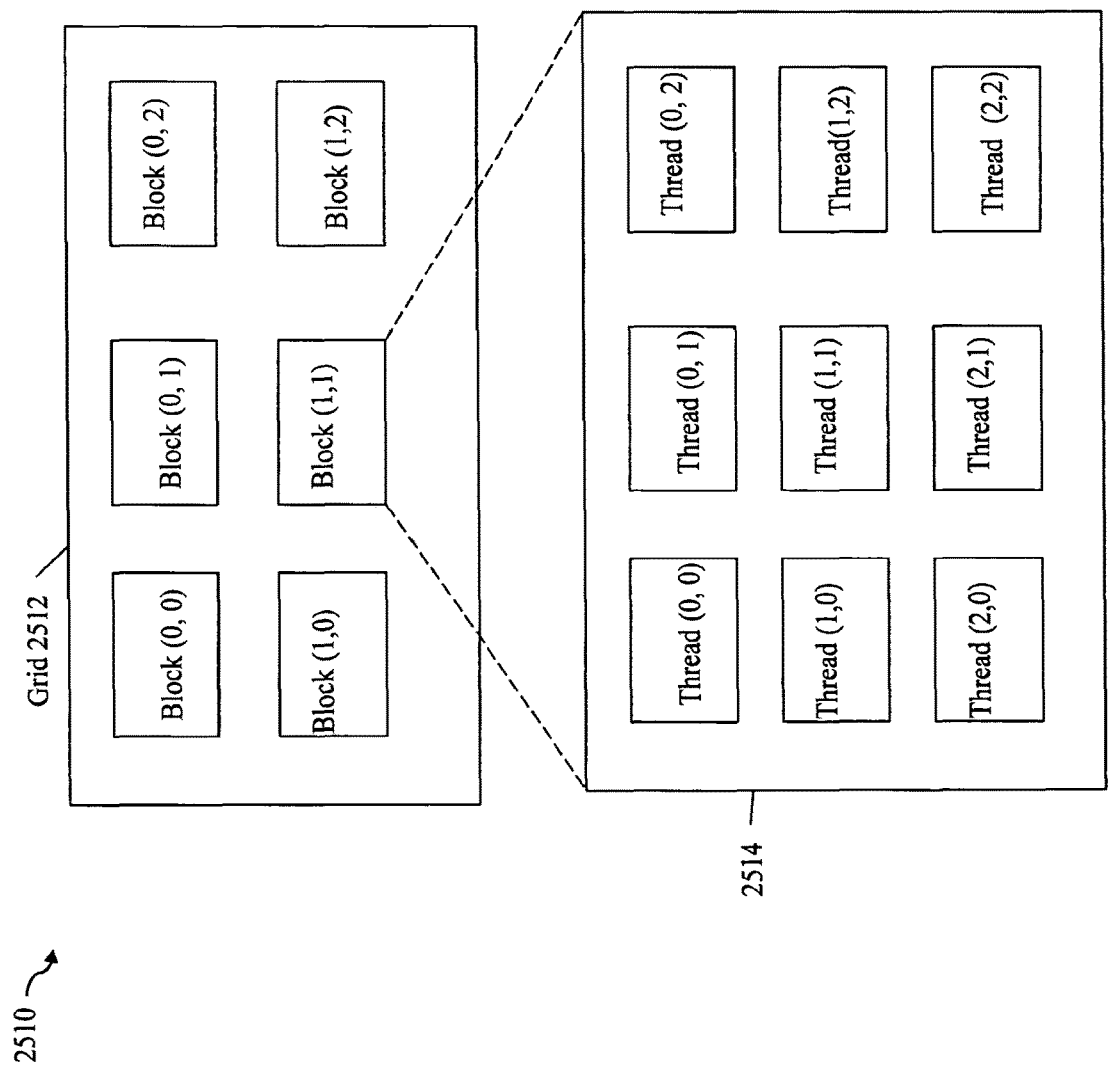
FIG. 25A is an example illustrating a thread hierarchy as may be used in an embodiment in accordance with techniques herein

Referring to FIG. 25A, shown is an example illustrating the foregoing thread hierarchy that may be used in an embodiment in accordance with techniques herein. The example 2510 provides a general representation of the thread hierarchy that includes a grid 2512 of thread blocks. Each thread block in 2512 may include multiple threads as illustrated by 2514. All threads in a block run the same kernel or set of instructions. A thread block may have one, two or three dimensions although two dimensions are illustrated in connection with 2514. The maximum number of threads in a block may vary with the particular system. All thread blocks in the grid 2512 have the same size and run the same kernel. Thus, all threads in a grid executing a same kernel may be executed in parallel. A grid may have one or two dimensions although two dimensions are illustrated in 2510. The foregoing is a general representation of the thread hierarchy. Additional details regarding the particular dimensions and sizes of blocks and grids, what instructions are included in a single kernel performed in parallel, and the like, as may be included in an embodiment in accordance with techniques herein are described in more detail below.

In accordance with one aspect of the techniques described herein, an embodiment may process raw data from an LC/NIS system to identify peaks characterized with respect to a number of dimensions and corresponding properties. Such an embodiment may perform at least some of the steps using parallel programming techniques such as using the GPU. In one embodiment, peaks may be identified with respect to three such dimensions—intensity, retention time, and mass or mass to charge (m/z) ratio. An embodiment using an LC/IMS/MS-based system may additionally include a fourth such dimension—ion mobility also referred to drift. The techniques in following paragraphs are described first with respect to an embodiment using the three dimensions of intensity, retention time, and mass to charge ratio. An embodiment using the techniques herein with respect to the foregoing three dimensions and additionally a fourth dimension of ion mobility is then also described. In such an embodiment using the fourth dimension of ion mobility, processing may first be performed as described for the three dimensions (e.g., of intensity, retention time (or time) and mass to charge ratio (or mass)) and then perform additional processing with respect to the fourth dimension. It should be noted that the foregoing notion of three dimensions (3D) and four dimensions (4D) which consider intensity as a dimension are referred to in following paragraphs. Following paragraphs set forth exemplary embodiments utilizing parallel processing and, as will be appreciated by those of ordinary skill in the art, may be more generally applied for use with a different number of dimensions, by varying the partitioning of processing performed by the CPU (e.g., serially) and by the GPU (e.g, in parallel), using a different number of GPUs, and the like.

What will first be described is an exemplary embodiment in accordance with techniques herein with respect to the three dimensions of intensity, retention time, and mass to charge ratio. The processing may include main processing steps as summarized below in Table 5.

TABLE 5

| Processing steps | Serial Computation | Parallel and serial computation | |
| --- | --- | --- | --- |
| A. Pre-processing step | Run once per invocation | Run once per invocation | CPU |
| B Read data from the raw data file | One scan at a time | One scan at a time | CPU |

TABLE 5-continued

| Processing steps | Serial Computation | Parallel and serial computation | |
|---|---|---|---|
| C. Filter data in time and mass axes | One scan at a time | Many scans at a time | GPU |
| D. Peak detection | One scan at a time | Many scans at a time | GPU |
| E. Peak properties computation | One scan at a time | Many scans at a time | GPU |
| F. Write the peak list file | Run once per invocation | Run once per invocation | CPU |

Table 5 includes six processing steps denoted A-F in the first column. The second column indicates particulars of each processing step in an embodiment which performs all steps serially. The third column indicates particular processing for each step in an embodiment in which some steps are performed serially and other steps are performed in parallel. It should be noted that a single scan or one scan of data referenced in Table 5 refers to a single scan of MS data that may be obtained for a single retention time (e.g, point in time) and includes all m/z values at that particular retention time. Steps A and F may be performed once for each invocation of a program that performs the techniques herein when processing data. The pre-processing step A may include general initialization processing, for example, such as data structure initialization, computation of filter coefficients, calibration of data, and the like. As indicated by column 3, an embodiment in accordance with techniques herein may perform steps C, D and E in parallel using the GPU operating on many scans at a time, and may perform steps A, B and F serially using the CPU. The GPU may perform steps C, D and E in parallel operating on many scans at a time in groups called scan packs.

In one embodiment in accordance with techniques herein, the filtering of the raw data (step C) involves five convolution filters, and a total of eight types of data when considering all filter inputs and outputs. This is described below in more detail.

Figure 25B:
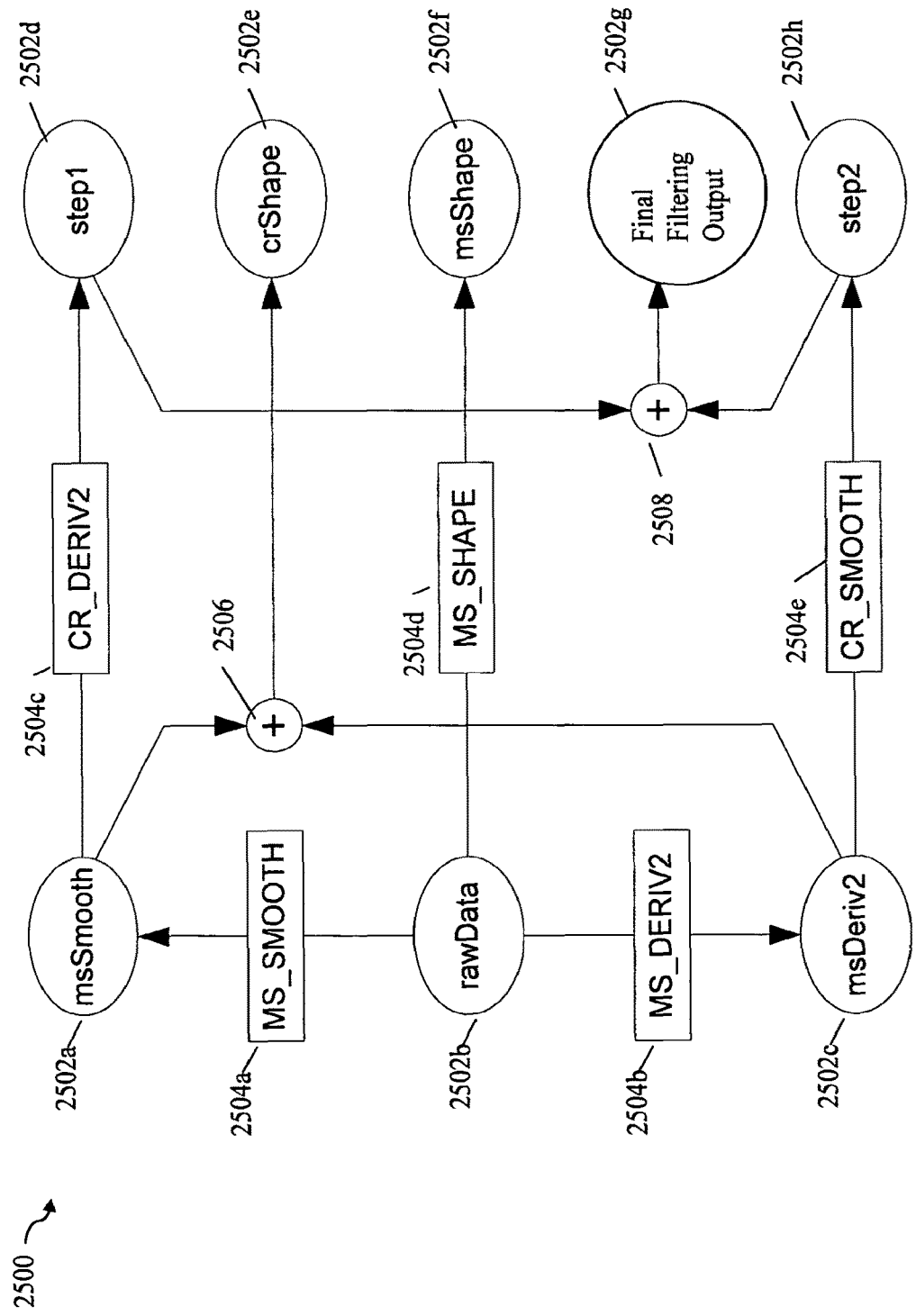
FIGS. 25B and 26 are flow diagrams illustrating processing that may be performed used in an embodiment in accordance with techniques herein

Referring to FIG. 25B, shown is an example of a data flow diagram of the raw data filtering that may be performed in an embodiment in accordance with techniques herein. FIG. 25B provides additional detail regarding processing comprising step C of Table 5 above. The rectangles 2504a-e in the example 2500 represent the convolution filters, the elliptical elements 2502a-h represent the different data types, and the circles with a plus sign (as indicated by 2506 and 2508) represent the average of the two inputs. The two filters —2504a and 2504b—that take the "rawData" data type 2502b as input filter the raw data in the mass or m/z axis and are referred to herein as "ms" filters. The other three filters —2504c, d and e (at the center of the figure)—filter their input data in the retention time, time or chromatographic axis and may be referred to herein as "chrom" or "Cr" filters. The type of filter (the filtering effect) is determined by the set of filter coefficients used by each filter in Table 6 below Table.

TABLE 6

| Filter name | Filter axis | Filter type |
|---|---|---|
| MS_SMOOTH | Mass | Smoothing |
| MS_DERIV2 | Mass | Second derivative |
| CR_SMOOTH | Chromatographic | Smoothing |
| CR_DERIV2 | Chromatographic | Second derivative |
| MSSHAPE | Chromatographic | Combined |

In Table 6, each filter name corresponds to a filter denoted in FIG. 25B. Each filter name indicates the filter type (e.g., SMOOTH for a smooth filter, DERIV2 for a second derivative filter, and SHAPE for a filter that uses filtering coefficients based on a combination of smoothing and second derivative). The raw data 2502b may represent the raw scan data as output by the LC/MS or LC/IMS/MS system for further processing. It should also be noted that both crShape data 2502e and msShape data 2502f may represent filtered outputs regarding peak shape as described elsewhere herein.

The filter processing representing by FIG. 25B includes:

Step S1: Filter the raw data 2502b in the mass direction using smoothing filter MS_SMOOTH 2504a generating data of type 2502a msSmooth.

Step S2: Filter the raw data 2502b in the mass direction using second derivative filter MS_DERIV2 2504b generating data of type 2502c msDeriv2.

Step S3: Filter intermediate output msSmooth 2502a (generated by step S1) in the time direction using second derivative filter CR DERIV2 2504c generating data of type step1 2502d.

Step S4: Filter data of type msDeriv2 2502c (generated by step S2) in the time direction using smoothing filter CR_SMOOTH 2504e generating data of type step2 2502h.

Step S5: Filter the raw data 2502b in the time direction using the MS_SHAPE filter 2504d generating data of type msShape 2502f. It should be noted that the coefficients in connection with the MS_SHAPE filter 2504d are selected for use in identifying or detecting the shape of the peaks. Filter 2504d may utilize coefficients selected based on a combination of smoothing and second derivative filtering.

Step S6: Take the average 2506 of outputs msSmooth 2502a and msDeriv2 2502c and produce data of type crShape 2502e.

Step S7: Take the average 2508 of outputs step1 2502d (generated by S3) and step2 2502h (generated by S4) and produce data of type final filtering output 2502g. As noted below, 2502g is the final filtering output used as an input to peak detection processing.

With reference to FIG. 25B, the "rawData" 2502b data type is the initial input to the filtering step, the five data types 2502d-h (e.g., at the right of FIG. 25B) are outputs of the filtering step used by the subsequent peak detection and peak properties computation steps, and the other two data types 2502a, 2502c are intermediate outputs which are not further utilized than as illustrated in FIG. 25B. The "final filtering output"2502g data type is the final filter output used in peak detection.

The foregoing presents an overview of filter processing (step C of table 5) including substeps S1-S7. In an embodiment in accordance with techniques herein as described below, processing for each of the filtering substeps may be performed in parallel.

Figure 26:
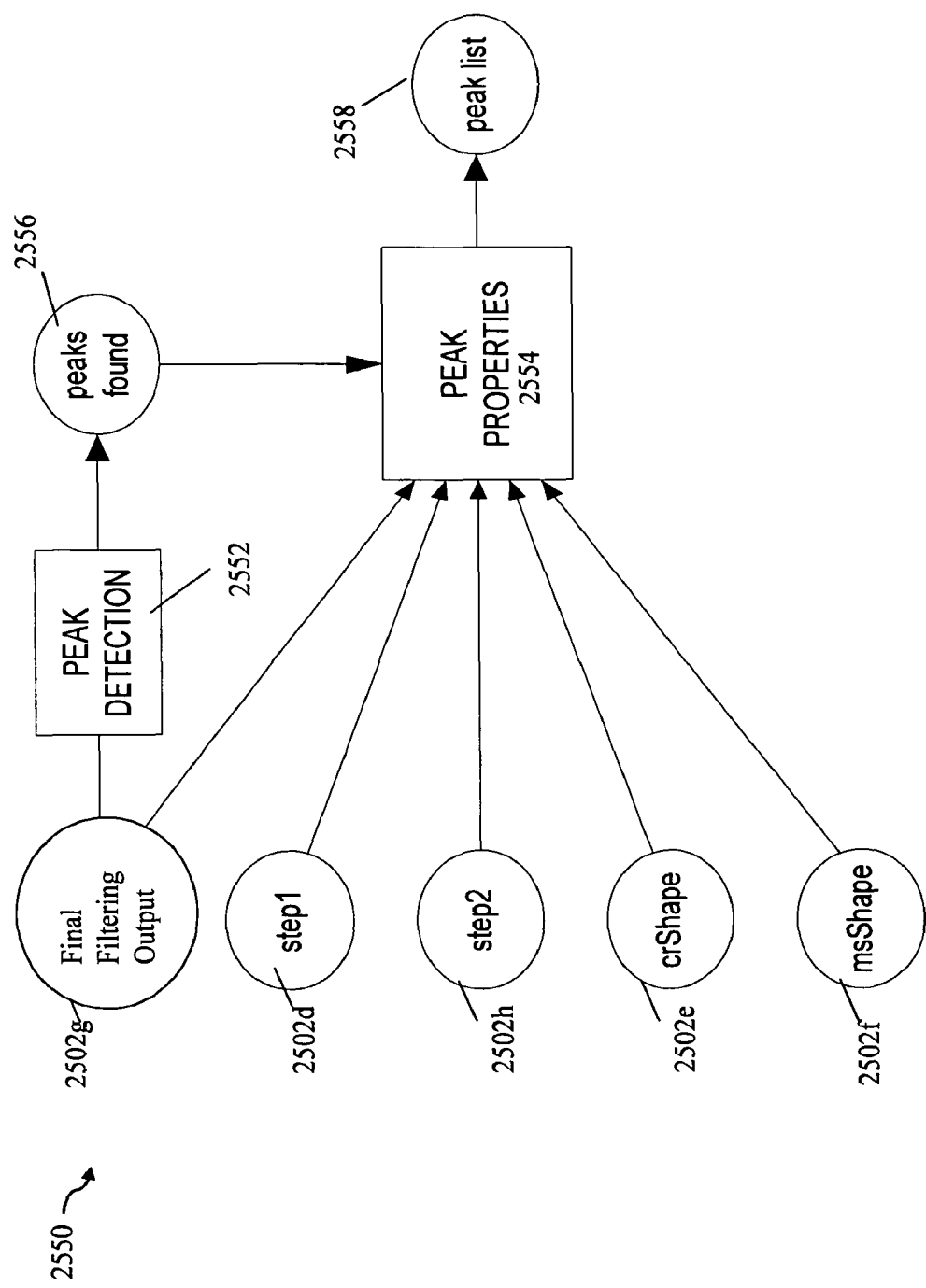

Referring to FIG. 26, shown is an example of a data flow diagram of the peak detection and peak properties steps that may be performed in an embodiment in accordance with techniques herein. FIG. 26 illustrates processing related to steps D and E of table 5 above. The example 2550 includes the five data types 2502d, e, f, g, and h generated by the filtering step and illustrate how the foregoing are used as inputs in connection with peak detection 2552 and peak properties 2554 computation steps. The "final filtering output" data type 2502g is used as input to the peak detection step 2552 to determine the peaks denoted by 2556. Once the peaks in the data have been found in 2556, all five filter outputs 2052e-h are used to compute peak properties 2554 on the detected peaks of 2556, and to generate the peak list 2558. The peak list 2558 collectively represents the identified peaks 2556 and associated properties 2554. In one embodiment as described herein, a peak may be identified by step 2552 by providing coordinates of the peak's apex in terms of retention time, m/z and intensity.

As noted above, processing may be performed in a parallel manner which processes one scan pack of multiple scans at a time (in parallel) rather than a single scan at a time. For example, all the scans may be partitioned into two scan packs and one type of filtering may be performed for both scan packs. The filtering, peak detection and peak property computation may be performed for the first scan pack to produce the peak list (including any desired peak properties) for the first scan pack. Once the first scan pack is complete, the same filtering, peak detection and peak property processing may be performed for the second scan pack. In connection with the foregoing filtering, for example, each thread executed in parallel for a single scan pack may determine the filtered output for a single input point. Thus, an embodiment my concurrently compute multiple filtered output points for a single scan pack, or portion thereof. In a similar manner, processing included in each of peak detection and/or peak property computation may perform such processing in parallel with respect to a single scan pack. With reference to table 5, an embodiment may perform the steps of filtering, peak detection and peak property generation for a single scan pack prior to commencing filtering for the next scan pack.

A scan pack may be read one scan at a time and stored in memory prior to the GPU commencing processing of the scan pack. In following paragraphs, the computer where the CPU is located may also be referred to as the "host", and the GPU may be located, for example, on a plug-in card of the computer referred to as the "device". Thus, the CPU and GPU may be included in the same system (such as the same computer system) and may communicate, for example, using a bus such as a PCIe (Peripheral component interconnect express). The device may have different types of memory each with different size, speed, and usage. For example, the following may be types of memory of the device: device or global memory, shared memory, constant memory, and texture memory. Of the foregoing types of memory, the device or global memory may be the most abundant, may be uncached and may typically be the slowest memory type to access. Constant memory is read-only for kernels. The constant memory may have data stored therein cached, may be written to only by the host (not the device because it is constant) and may be persistent across kernel calls within the same application. Graphics processors provide texture memory to accelerate frequently performed operations such as, for example, mapping, or deforming, a 2D "skin" onto a 3D polygonal model. Since optimized data access is very important to GPU performance, the use of texture memory may provide a large performance increase when used in connection with techniques herein. Data stored in texture memory may be initially read and then cached so that subsequent accesses do not incur additional data access costs. The backing store for texture memory may be included in the same hardware as global memory and the cached texture data may be optimized for 2D spatial locality Shared memory may be characterized as an area of memory that is uncached and shared across a block of threads.

Typical data flow between the CPU and GPU may include the CPU copying data to the GPU, usually to the GPU's device or global memory. Instructions such as those included in the kernel may also be copied to shared memory of the GPU. The GPU then asynchronously executes code of the kernel (e.g. multiple threads concurrently execute the same portion of code corresponding to the kernel). When the host makes a call to copy data from GPU memory back to host memory, the call will block until all threads have completed processing and the output data is available. At this point, the results, such as the output data, are transmitted from the GPU to the CPU.

In one, embodiment in accordance with techniques herein, the CPU reads a scan pack of raw data one scan at a time, and saves it into host memory. Then, the entire scan pack is copied from the host or CPU memory into device memory of the GPU to start processing the scan pack in the GPU. From this point, all processing on the scan pack is done in the GPU and all intermediate and final results produced are saved into device memory of the GPU. When all scan packs have been processed in the GPU (e.g, filtering, peak list detection and property computation for all scan packs), the final results (e.g., peak list including peaks and associated peak properties) are copied from device memory of the GPU to the CPU's host memory, and the peak list file is written. Many processing steps in connection with techniques herein also produce an output in the form of a scan pack. For example, a filter step that takes a scan pack of raw data as input, outputs a scan pack of filtered data. A second filter step may take that scan pack of filtered data as input and produce a different scan pack of filtered data as output. Also, some processing steps in connection with techniques herein, such as included in filtering, require data contained in the previous and/or the next scan pack in order to process the current scan pack. Therefore, for these steps, two or three consecutive input scan packs are maintained in memory as needed for processing.

Described in following paragraphs are considerations and techniques that may be used in connection with scan pack memory allocation in an embodiment.

Figure 27:
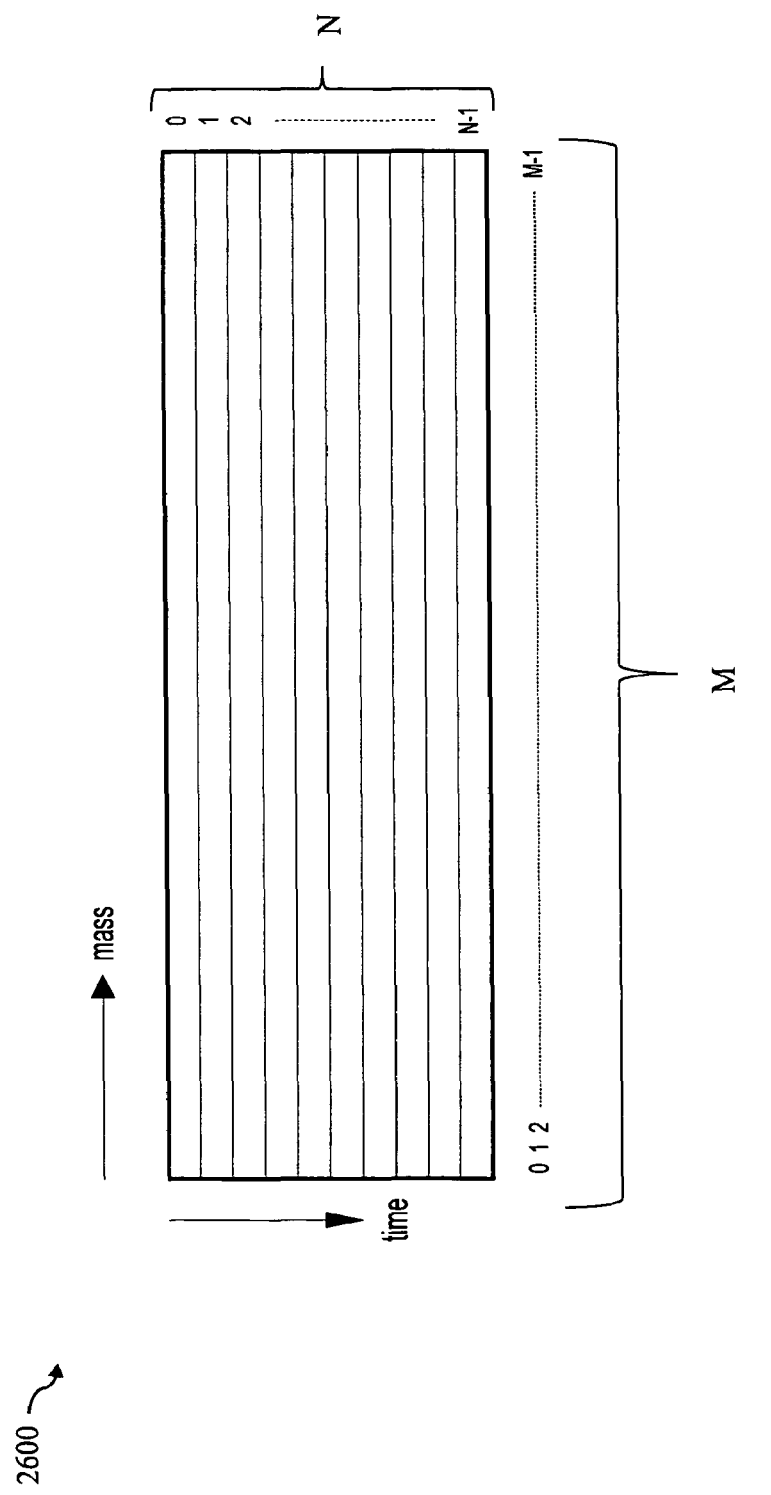
FIG. 27 is an example of a scan pack that may be used in an embodiment in accordance with techniques herein.

Referring to FIG. 27, shown is an example of a scan pack containing a number of N scans, each with a number of M mass values. To compute one output data point, the convolution filters use the corresponding input data point and a number of adjacent input data points according to the number of filter coefficients used. Filtering of a single input point may be performed with respect to a filtering window of a certain size spanning a number of input points before and/or after the single input point. For example, assume a filtering window size of 21 which includes the input point and the next subsequent 20 input data points. In order to generate a filtered output point for the single input point, 21 input data points are needed. Furthermore, 20 of those points occur after the input data point. To further illustrate with an example having a lesser number of coefficients, assume a five coefficient filter ($C_{-2}$ to $C_2$) running in the mass axis, produces an output value "$o_i$" from an input mass value "$m_i$" according to. Equation 1A. In this case, the filtering window includes the input data point to be filtered and also the previous two input data points (denoted by −2 and −1 subscripts) and the next, or subsequent two input data points (denoted by +1 and +2 subscripts).

$$o_i = C_{-2} \cdot m_{i-2} C_{-1} \cdot m_{i-1} + C_0 \cdot m_i + m_{i+1} + C_2 \cdot m_{i+2} \qquad \text{Equation 1A}$$

An embodiment may use an odd number of coefficients where the coefficients values are symmetrical over the center coefficient. In the example of Equation 1A, $C_0$ is the center coefficient, coefficients $C_1$ and $C_{-1}$ are the same, and coefficients $C_2$ and $C_{-2}$ are the same. Alternately, we can rename the input values with an indexing shifted by half the number of coefficients, resulting in Equation 2A.

$$o_i = C_{-2} \cdot m_i + C_{-1} \cdot m_{i+1} + C_0 \cdot m_{i+2} + C_1 \cdot m_{i+3} + C_2 \cdot M_{i+4} \qquad \text{Equation 2A}$$

It should be noted that in this alternate index naming method, the input values are not shifted. It is just that they are labeled with a shifted index. In a manner similar to that of Equation 2A, the five coefficient filter example running in the time axis, produces an output value "$o_i$" from an input time value "$t_i$" according to Equation 3A.

$$o_i = C_{-2} \cdot t_i + C_{-1} \cdot t_{i+1} + C_0 \cdot t_{i+2} + C_1 \cdot t_{i+3} + C_2 \cdot t_{i+4} \qquad \text{Equation 3A}$$

As will be described in more detail elsewhere herein, the computation of each filtered data point may be performed by a different one of the threads. Assuming Equation 3A represents coefficients using in connection with one of the chrom filters, when we run a chrom filter on a scan pack, in order to filter the last scans in the scan pack, input data is needed from scans contained in the next subsequent scan pack. For this reason, all chrom filters need two scan packs of their input data in memory, the current scan pack (the scan pack being filtered) and the next.

Figures 28A, 28B, 28C:
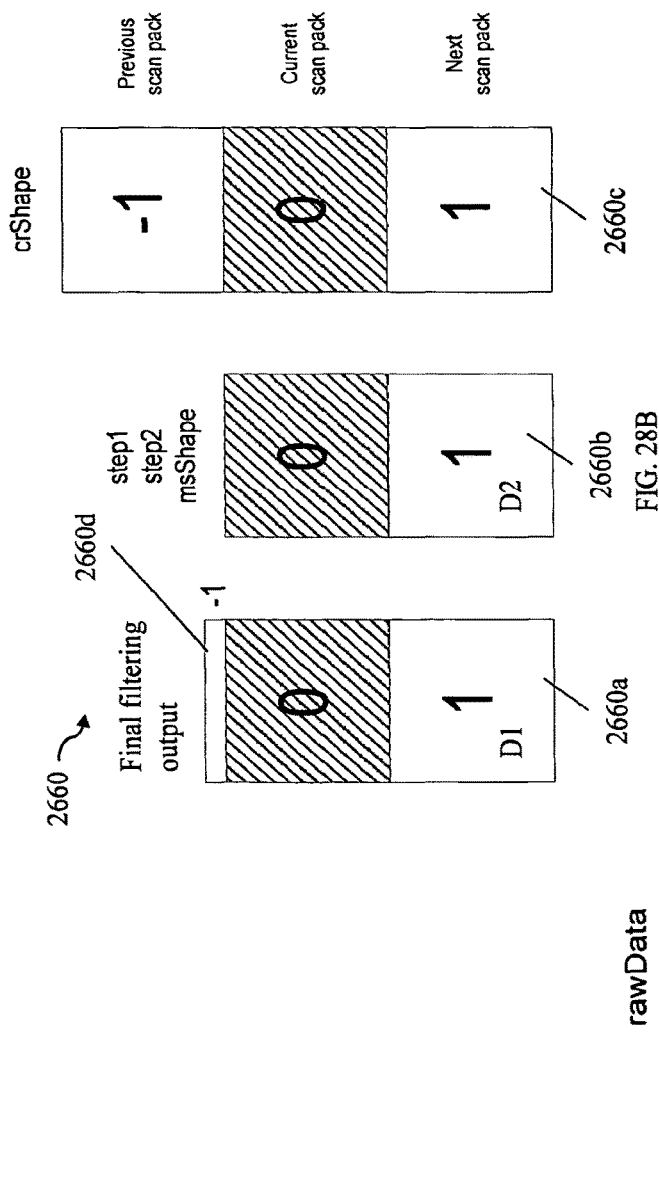

FIG. 28A illustrates the foregoing for the three data types from FIG. 25B that may be inputs to a chrom or cr filter that performs filtering with respect to the retention time dimension. The example 2650 illustrates that for the current scan pack denoted as 0, input data from both the current scan pack 0 and next scan pack 1 is needed to perform chrom or CR filtering.

In one embodiment, N, the size of a scan pack, may be at least the size of the largest filter window−1. N may also be subject to other conditions and sizes for performance reasons. For example, an embodiment may require N to have a minimum size for performance reasons and efficiency of data transfer between the host CPU and the GPU.

With reference to FIG. 28B, shown is an example of scan packs that may be stored in memory for processing in connection with performing peaks detection and peak properties processing (e.g., processing illustrated in FIG. 26) for an entire current scan pack 0. With reference to 2660c, to compute some of the peak properties on a detected peak, the peak properties algorithm may use a number of "crShape" type data points in scans adjacent to the current scan 0 where the detected peak is located. Therefore, in order to compute these peak properties on detected peaks that are located near the first and the last scan of the scan pack, we need "crShape" data points in scans contained, respectively, in the previous (−1) and the next (+1) scan pack. For this reason, three scan packs of "crShape" data as illustrated by 2660c are maintained in memory when determining peak properties for the entire current scan pack 0—the current scan pack (the scan pack being filtered), the previous scan pack (−1), and the next scan pack (+1).

Given that we need to have the next scan pack of "crShape" in memory, the peak properties computation for the current scan pack may be delayed one scan pack while the next scan pack is buffered. As a consequence of this, the other four data types involved in the peak properties computation (final filtering output, step 1, step2, and msShape) may also be delayed one scan pack so the peak properties algorithm is able to perform processing using all five input data types. Therefore, these other four data types are stored for the current scan pack and also for the next scan pack (+1) in memory (as illustrated by the +1 scan packs of 2660a and 2660b), even if such next scan packs are not needed in peak property computation processing for the current scan pack (0). In other words, FIG. 28B illustrates data that may be stored in memory when performing peak detection and properties computation processing for a current scan pack. However, data denoted by D1 and D2 are not actually used in connection with such processing for the current scan pack. Rather, data denoted by D1 and D2 may be stored in memory as a result of the embodiment described herein which generates a set of filter outputs of the five data types (e.g., final filtering output, step1, step2, crShape, and msShape) for both the current and next scan packs (since all five are computed for a single scan pack simultaneously), even if not all such outputs for the next scan pack are used to perform the peak detection and properties processing for the current scan pack.

The peak detection step 2552 of FIG. 26 takes the "final filtering output" data type as input. To run the peak detection on a data point of the "final filtering output" scan pack in one embodiment, eight neighboring points are needed where some of these neighboring points are located prior to the data point and some of the neighboring points are located subsequent to the data point. This means that performing peak detection for points located in the first and last scan of the current "final filtering output" scan pack uses, respectively, points located in the previous and next "output" scan packs. For the reasons explained above, the next scan pack of final filtering output data is in memory. However, for purposes of peak detection, we do not need to maintain in memory the entire previous scan pack, but just the previous scan (e.g., the last scan of the previous scan pack). The foregoing is illustrated in 2660a as a smaller rectangle 2660d.

Given that the "final filtering output" data type is the average of the "step1" and the "step2" data types, an embodiment does not need to maintain all three in memory, but just two of the foregoing types and may compute the third when needed. This may be done to save device memory. To make the peak detection simpler, the filter step in an embodiment may save in memory the "final filtering output" and the "step 1" data types but not the "step 2" data type. The "step2" data type may be computed from the 'final filtering output" and the "step1" data during the peak properties computation.

Table 7 summarizes the memory allocation needed for each data type in FIG. 25B, where N represents the number of scans in a scan pack, and the plus sign in the final filtering output data type represents the single previous scan needed in the prior scan pack (e.g., as represented by 2660d of FIG. 28B).

TABLE 1

| Data type | Host memory (CPU) | Device memory (GPU) |
| --- | --- | --- |
| rawData | N | 2N |
| msSmooth | — | 2N |
| msDeriv2 | — | 2N |
| step1 | — | 2N |
| step2 | — | — |
| Final filtering output | — | 2N+ |
| msShape | — | 2N |
| crShape | — | 3N |

A convolution filter boundary is defined as half the number of coefficients used by the particular filter. According to Equation 1A, to filter data points at the extremes of the data (e.g., beginning and end of the entire data set of all scan packs being analyzed), we need additional input data points that do not exist. Any one of a variety of different techniques may be used to generate this additional input data which is needed for processing. For example, in the case of the ms filters, the non-existent data points are replaced with zero values. For the chrom filters, the non-existent data points may be computed such as by generating a reflection of existing data points. This is described in more detail below. In either case, the actual number of data points is augmented by twice the filter boundary to account for the generated data points at the beginning and end of all the scan data.

Reflected scans may be used if we need to process scans beyond the limits of the scan data. If the user selects a scan range from available raw scan data for processing with the starting scan after the first scan, or the ending scan before the last scan, reflection might not be needed. Each point (at a given mass value) in a reflected scan is computed from the corresponding points in real scans at the ends of the data. For example, with reference to FIG. 28C, illustrated are points in four reflected scans (denoted as points −1, −2, −3 and −4) and points in corresponding data scans (denoted as points 0, 1, 2, 3 and 4). The mirror point 2672 (denoted as the 0 point) may represent the first scan in the available raw data. If scan data prior to the mirror point is needed, such data may be reflection points that are artificially generated based on existing data. Points 1 through 4 (for scans 1 through 4) are included in the existing scan data from which reflective data points −1 through −4 (for scan −1 through scan −4), respectively, may be generated.

With reference to FIG. 29A, shown is a general illustration of the total input data of one of the types included in 2706 used by one of the chrom filters 2707 to generate the total output data 2705 of one of the types included in 2708. The total input data for one of the chrom filters 2707 includes the data scans 2703 and the extra scans that may be computed by reflection at the beginning 2702 and end 2704 of all scan data (e.g. all scan packs being processed). In accordance with FIG. 25B, element 2706 represents the three possible input data types to a chrom filter and elements 2708 represents the different possible output types of a chrom filter. Element 2707 represents the three chrom filters (e.g, CR_SMOOTH, CR_DER1V2 and MS_SHAPE described above such as in connection with FIG. 25B). The number of scans to add depends on the largest boundary of the three chrom filters 2707 (e.g., elements 2504c, d and e of FIG. 25B). The output of each chrom filter, however, has only the original number of scans in the input data 2703. The example 2700 corresponds to the filtering described, for example, in connection with FIG. 25B.

FIG. 29B is an example illustrating the data of different scan packs used in the filtering, peak detection and peak properties processing in an embodiment in accordance with techniques herein. Element 2750 illustrates how all data scans are distributed in scan packs of the same size (the same number of scans). In this example, all scans 2752a plus the added scans 2752 (e.g. generated and collectively representing the total amount of 2702 and 2704 of FIG. 29A) fit into four scan packs (scan packs number 0 to 3), although the last scan pack is not completely full. Element 2751a represents the amount of the 4 scan packs used to store data for any one of the data types 2756 which serve as inputs to a chrom filter. Element 2751b represents the amount of the 4 scan packs used to store data for any one of the data types 2758 which serve as filtering outputs. Element 2751c represents the amount of the 4 scan packs used for peak detection and peak property computation.

FIG. 29B includes arrows showing the relationship and alignment between the scan packs at the different processing steps of filtering (e.g., scan packs used as filtering inputs 2751a, scan packs used as filtering outputs 2751b) and peak detection and property computation (scan packs of filtering outputs 2751b used as inputs for peak detection and property computation processing in each scan pack 2751c). For example, with reference back to FIG. 28A, to generate scan pack number 1 of any of the chrom filter outputs (ar the center of FIG. 29B, element 2751b), we need scan packs number 1 and 2 of the corresponding filter input (left of FIG. 29B, element 2751a). The other scan packs of 2751b are generated in a similar fashion as illustrated by the arrows between various ones of the scan packs of 2751a and 2751b. Notice that in this example, the last scan pack of all chrom filter outputs 2751b is not full. Now, with reference back to FIG. 28B, to compute the peak properties of detected peaks in scan pack number 1 (right of FIG. 29B, element 2751c), we need scan packs numbered 0, 1, and 2 of the chrom filter outputs (center of FIG. 29B, element 2751b). Peak detection and peak property computation processing for the other scan packs of 2751c are similarly illustrated by the arrows between various scan packs of 2751b and 2751c.

FIGS. 30A and 30B illustrate a variation in the amount of data scans from that described in connection with FIG. 29B. Referring to FIG. 30A, shows is an example where the number of data scans fit into four scan packs (scan packs number 0 to 3), but with the added scans 2802, a fifth scan pack is needed. This applies to the chrom filter inputs only 2804, as the chrom filter outputs 2806 still fit into four scan packs, with the last scan pack not completely full. Referring to FIG. 30B, show is an example where the number of data scans fit exactly into four scan packs (scan packs number 0 to 3). With the added scans 2852, we need a fifth scan pack for the chrom filter inputs only 2854. The chrom filter outputs 2856 fit exactly into four scan packs (the last scan pack is completely full).

Figure 31:
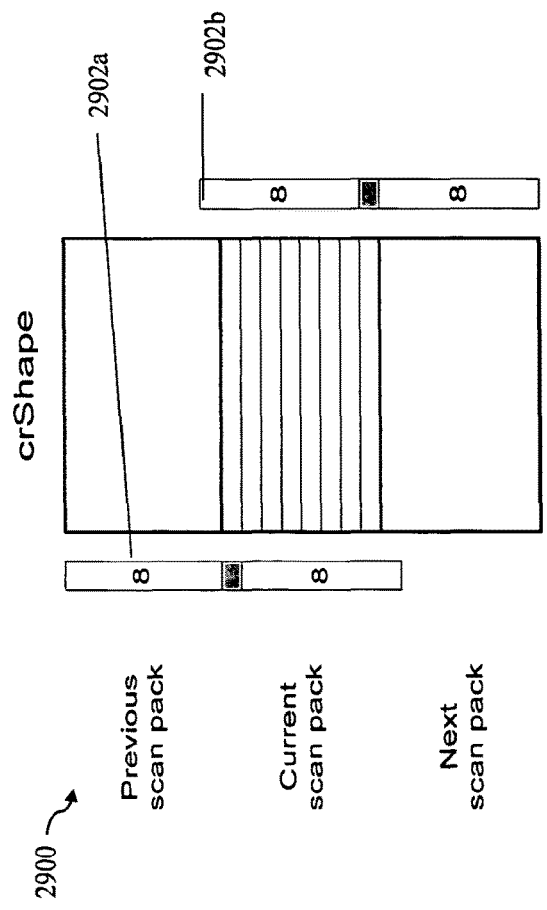

The number of scans, N, in a scan pack may be computed at run time and, as noted above, may depend on the number of coefficients used by the chromatographic filters and the number of scans of "crShape" used by the peak properties computation. The scan pack size should be at least equal to the maximum number of coefficients used by any one of the filters minus 1. This guarantees that the last scan in scan pack can be filtered correctly in the chrom direction. As there are three chrom filters, the filter with the most coefficients is selected for this determination. In accordance with FIG. 28B and associated text, the scan pack size should be at least half the number of "crShape" data points required to compute the peak properties. This guarantees that peak properties can be computed for peaks that are detected in the first or the last scan in the scan pack. For example, reference is made to FIG. 31. In the example 2900, 17 "crShape" data points may be used for peak properties computation as represented by the windows 2902a and b. In the example 2900, to compute peak properties in a detected peak on the first scan of the current scan pack, data points represented by 2902a are used and indicate that the previous scan pack size should be at least 8 scans. A similar reasoning applies for detected peaks on the last scan of the current scan pack. Window 2902b represents the window of data points used for peak property computation for detected peaks in the last scan of the current scan pack. Given that the size of all scan packs is the same, the minimum size of the scan pack may be determined as 8 scans. Furthermore, N may be at least a threshold number of scans, such as 64 scans, for efficient memory transfers between the host/CPU and GPU. As mentioned previously, each scan pack is read by the CPU and saved into host memory. Then, the entire scan pack is copied into device memory of the GPU such as using a bus. Due to the overhead of the memory transfer operations, it is more efficient to transfer large amounts of data between host memory and the GPU.

It should be noted that the amount of device memory used by all scan packs described in connection with the Table 7 may be substantial if N is large, as determined in connection with scan pack size processing described herein, and/or the number of mass values M in each scan is large as shown in FIG. 27. If the amount of device memory required by all scan packs is greater than what it is available in the GPU device, processing will fail. In this case, processing may optionally be performed to break the scan packs into mass sectors as described below. The number of mass values in the scan packs is reduced to cover only a sector of the entire mass range. This reduces the amount of device memory required by sizing the sector size appropriately. All the scan packs, from first to last, for a mass sector, are processed before the scan packs for the next mass sector are processed. For example, and referring to FIG. 27, if the scan packs are partitioned into two mass sectors, all scan packs will be processed for the first mass sector (mass values from 0 to M/2−1), and then all scan pack will be processed again for the second mass sector (mass values from M/2 to M−1). However, due to mass filter boundary and ms shape computation requirements, there must be some overlapping of mass values between the mass sectors. Therefore, in the previous example, the first mass sector will include some mass values above M/2−1, and the second mass sector will include some mass values below M/2.

What will now be described is an example of how thread blocks may be configured for use in an embodiment in accordance with techniques herein. As noted above, the GPU can handle thousands of concurrent programming threads. To perform filtering for any of the filters described herein on a scan pack, one thread may be used to compute one filtered data point of the scan pack. For example if the scan pack size is 64 scans and the scans have 100,000 mass values, we need 64*100,000 or 6.4 million threads to compute the entire filtered scan pack concurrently. These threads are organized in thread blocks of certain size, where the thread block size may be limited to a maximum of 512 threads for certain GPUs. The thread blocks are organized in a grid of the necessary size to account for all required threads. In our example, if each thread block includes 512 threads, a grid of 12,500 thread blocks may be used to account for the 6.4 million threads needed. Generally, the threads in a thread block are indexed in one, two, or three dimensions to adapt the thread block to the data. In one embodiment in accordance with techniques herein, two-dimensional thread blocks may be used such that the "x" dimension of the thread block covers a number of mass values, and the "y" dimension covers a number of scans. The thread blocks in a grid of thread blocks are indexed in one or two dimensions only. In one embodiment, a two-dimensional grid of thread blocks may be used such that the "x" dimension indexes thread blocks along the mass axis, and the "y" dimension indexes thread blocks along the time axis.

Figure 32:
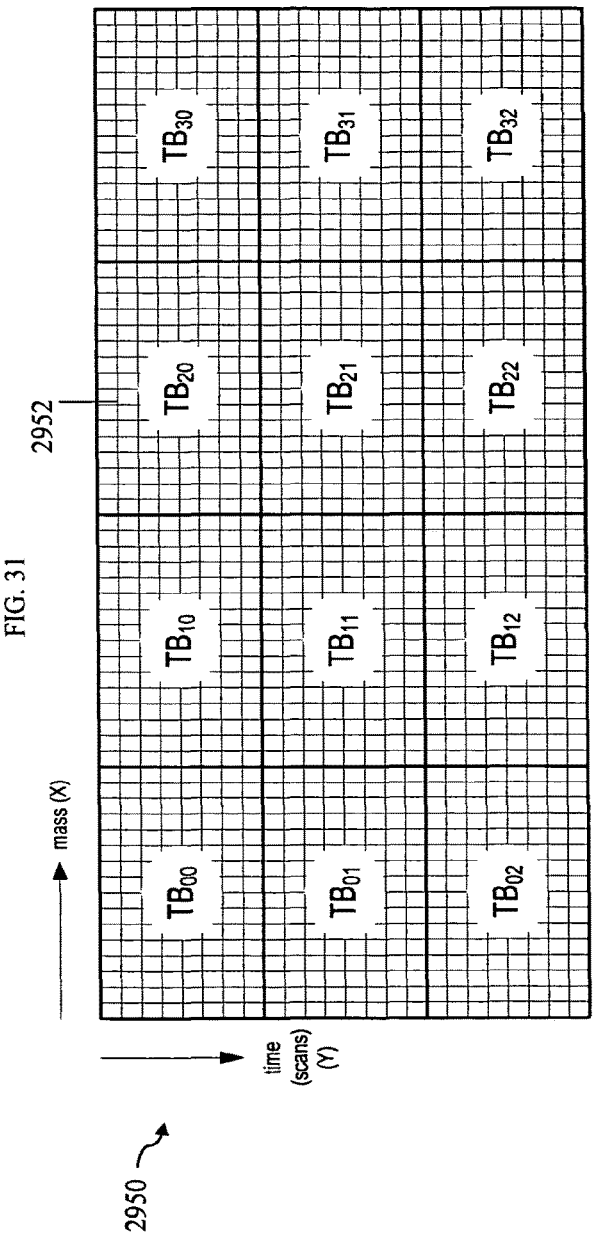
FIG. 32 illustrates an example of a grid of thread blocks that may be used in an embodiment in accordance with techniques herein
Figure 33:
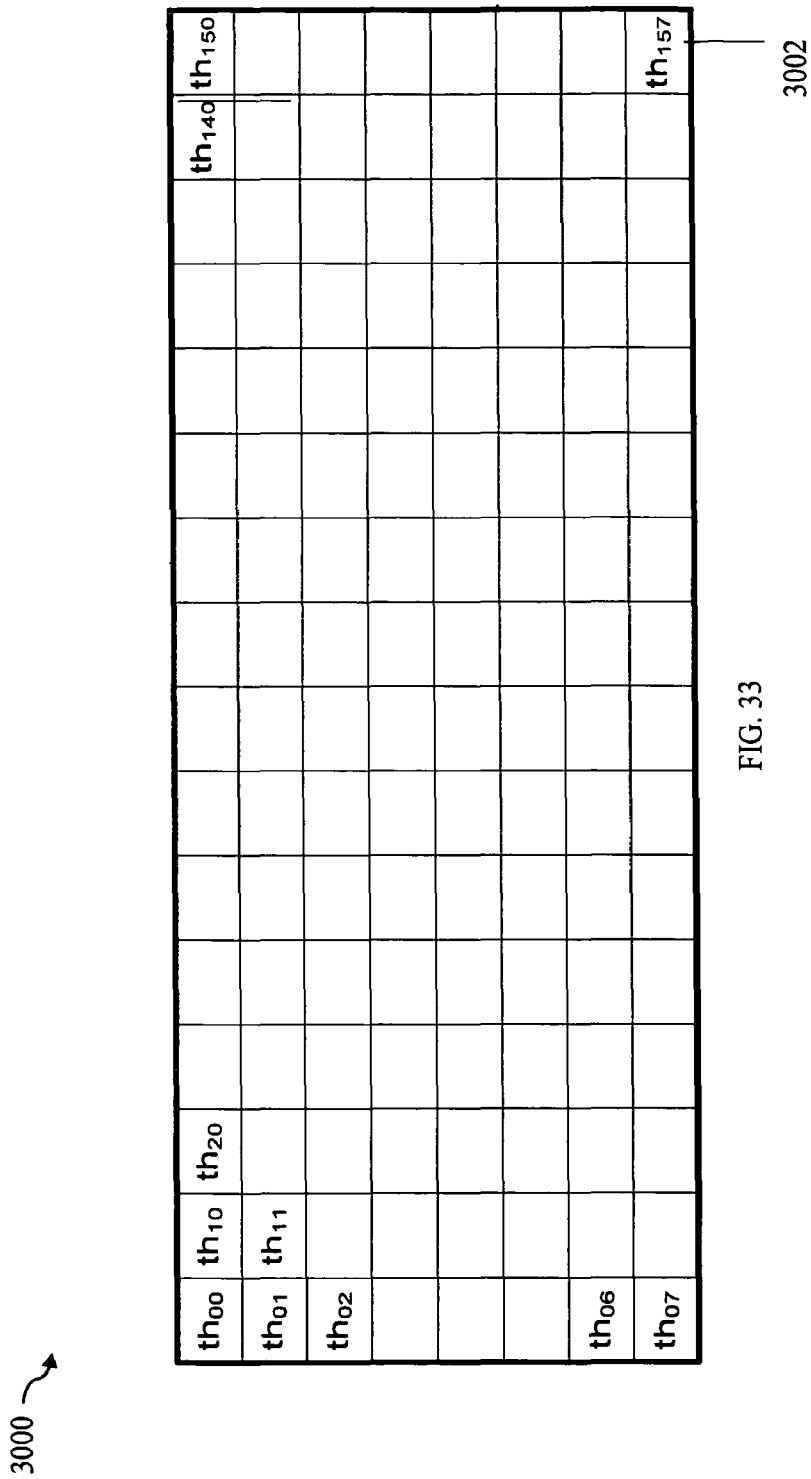
FIG. 33 illustrates an example of threads included in a thread block in an embodiment in accordance with techniques herein.

Referring to FIG. 32, shown is an example of thread blocks corresponding to a scan pack of 24 scans, where each scan includes 64 mass values. In this example, a single thread may be mapped to a single input point in the scan pack (of 64*24-1536 points) for which a single corresponding output point is generated. In this example 2950, the thread blocks for the scan pack include 1,536 threads organized in a grid of 12 thread blocks of 128 threads each. Both the thread blocks and the grid are two-dimensional. Each thread block may include an arrangement of threads having 16 columns and 8 rows. The grid may be organized to include an arrangement of thread blocks having 4 columns and 3 rows. As illustrated in FIG. 32 and described above, a first pair of indices identifies each thread block within the grid. In this example 2950, the "x" coordinate of a thread block (TB) may identify the TB column and the "y" coordinate of the TB may identify the TB row within the grid. For example element 2952 identifies a TB within the grid having block indices of X=2, Y=0. Additionally, as illustrated in FIG. 33, a second pair of indices may identify each thread within a thread block. For example, element 3002 denotes a thread within the illustrated TB where the thread has thread indices of X=15, Y=7, and where the X coordinate denotes the column and the Y coordinate denotes the row within the TB.

As noted above, a kernel is the name given to a function that runs in the GPU to perform a certain operation. The thread block dimensions and the grid dimensions are known as the kernel's execution configuration. When a kernel is launched, a number of threads are created according to the execution configuration (e.g., 1,536 in our example). Each thread runs the same kernel code, although the data used by each thread is different. Each thread knows its block index/indices and its thread index/indices within the block, as well as the block and grid dimensions. This information may be used by the thread to identify the individual point in the scan pack the thread is operating on. For example, in the case of a kernel that filters a scan pack, the kernel allows a thread to read the pertinent data point from the input scan pack and to write the filtered data point in the output scan pack, where the location of the data point from the input scan pack and the location in the output scan pack for the filtered (output) data point may be determined using Equation 4A below. Equation 4A shows the relation between the thread and block indices and the local coordinates (m, s) of a point in the scan pack, where "s" identifies the scan within the scan pack and "m" is the mass coordinate into the scan "s" for the desired data point.

$$m = \text{blockIdx}.x * \text{blockDim}.x + \text{threadIdx}.x$$

$$s = \text{blockIdx}.y * \text{blockDim}.y + \text{threadIdx}.y \quad \text{Equation 4A}$$

In Equation 4A, m (mass coordinate) and s (scan coordinate) are the local coordinates of a point within the scan pack, blockIdx.x and blockIdx.y are, respectively, the x and y coordinates of the block index, blockDim.x and blockDim.y are the x and y dimensions of the block, and threadIdx.x and threadIdx.y are the x and y coordinates of the thread within the block. The foregoing may be used by a thread which determines a single output point for a corresponding single input point. Rather than have each thread compute a single output point, a kernel may be used such that each thread computes more than one point in the scan pack. This can be advantageous in some cases as the kernel overhead is distributed across the computation of multiple points. In this case the grid is reduced in size and techniques other than the particular mapping expressed in Equation 4A may be used to determined the particular data points for which the thread performs processing.

Described in following paragraphs are considerations for use when selecting thread block dimensions or sizes and also the scan pack size. Generally, such dimensions regarding thread blocks may be selected to facilitate data sharing by threads. The scan pack size as well as various thread block dimensions described herein may be determined at run time. For example, these parameters as well as other described herein in connection with 3D and 4D processing may be performed as part of preprocessing by the CPU.

Figure 34A:
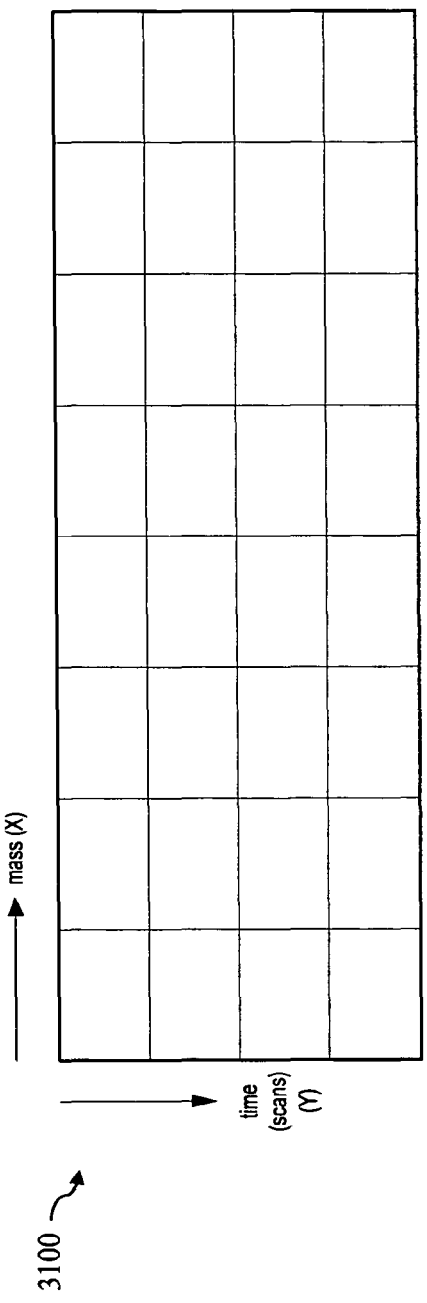
FIGS. 34A and 34B illustrate examples of thread block configurations in an embodiment in accordance with techniques herein.

First, consider ms filter thread blocks. With reference back to Equation 2A, to filter one data point, k, in the mass direction we need access to a number of the next mass data points. To filter the next mass data point, k+1, access is needed to most of the same data points (e.g., all of the same data points minus one). Therefore, filtering consecutive data points involves accessing the same data points several times. In an embodiment, threads may share their input data using "shared" memory (one of the memory types of the device) in order to avoid possibly performing additional memory accesses to obtain the data points. However, only threads within a thread block can share data. Therefore, to maximize this feature, it is preferred that the thread blocks used in the ms filter have the dimension in the mass axis (x) greater than the dimension in the time axis (y) as shown in FIG. 34A. Each cell or element in the example 3100 represents a single thread block.

Two additional concepts are relevant for following discussion—the GPU occupancy and the warp size. The GPU occupancy is a measure of the GPU load imposed by a kernel, given the block size and the GPU resources used by the kernel. The GPU occupancy may be expressed as a percent of the full GPU utilization. A warp is a group of 32 threads that the GPU multiprocessors create and that start execution synchronously. For various reasons as will be appreciated by those skilled in the art, it may be preferred to have a GPU occupancy above 25% and to set the dimensions of the thread block to multiples or submultiples of a warp. A GPU occupancy of 0% will make the kernel to fail. To set the actual thread block dimensions, the GPU occupancy may be computed for various blocks of different size and shape. Then, the block with the largest dimension in x and the highest GPU occupancy is selected. Also, the block size must be under the maximum number of threads per block (512 threads). Blocks having an "x" dimension that is a multiple of half a warp (e.g., 16), and a "y" dimension that is a multiple of a quarter warp (e.g., 8) may be tested until we exceed the maximum number of threads per block (512 threads). Table 8 below shows the order in which the thread blocks may be tested.

TABLE 8

| | msBlock.x | msBlock.y | Num threads | GPU occupancy |
|---|---|---|---|---|
| 1 | 16 | 8 | 128 | — |
| 2 | 16 | 16 | 256 | — |
| 3 | 16 | 24 | 384 | — |
| 4 | 16 | 32 | 512 | — |
| 5 | 32 | 8 | 256 | — |
| 6 | 32 | 16 | 512 | — |
| 7 | 48 | 8 | 384 | — |
| 8 | 64 | 8 | 512 | — |

Once the GPU occupancy for all blocks in Table 8 is computed, the GPU occupancies obtained may be examined starting from the last block (#8 in the table) going backwards. The block dimensions associated with the maximum GPU occupancy may be selected (e.g., the entry in table 8 having the maximum GPU occupancy is determined and this entry's block dimensions may be selected). It should be noted that the block having the largest "x" dimension may be selected if two blocks tie at the maximum GPU occupancy number.

Figure 34B:
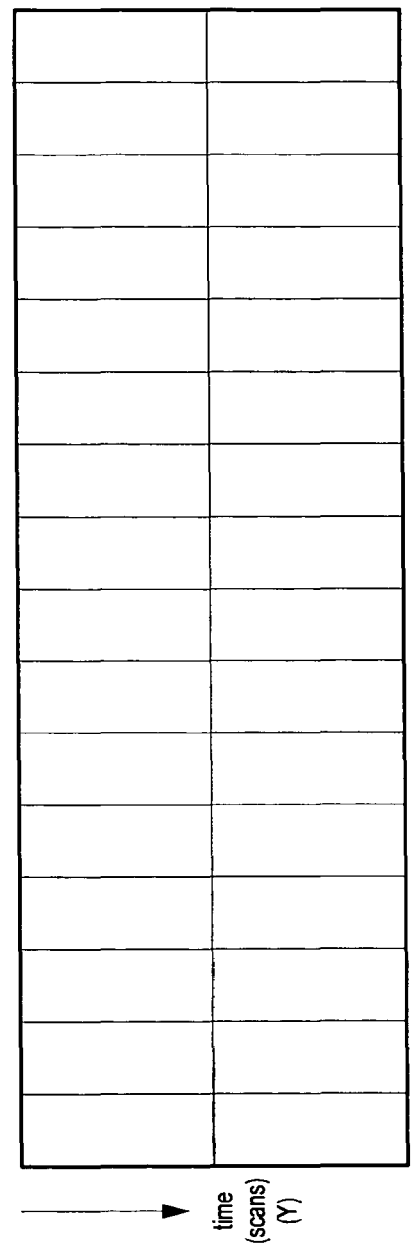

The discussion above regarding considerations for MS filter thread blocks is also applicable to the chrom filter thread blocks. With reference back to Equation 3A, to filter one data point in the time direction we need access to a number of the next time data points. To filter the next time data point we need access to most of the same data points (e.g., all of the same minus one). Therefore, filtering consecutive data points involves accessing the same data points several times. As described above, threads may share their input data using shared memory. However, only threads within a thread block can share data. Therefore, to maximize this feature, it is preferred that the thread blocks used in the chrom filter have the dimension in the time axis (y) greater than the dimension in the mass axis (x) as shown in FIG. 34B. Each cell or element in the example 3150 represents a single thread block.

In a manner similar to that as described above for the MS filter thread blocks, to set the actual thread block dimensions, the GPU occupancy may be computed for various blocks of different size and shape. Then, the block with the largest "y" dimension and the highest GPU occupancy is selected. Also, the block size is under the maximum number of threads per block (512 threads). Blocks may be tested having an "x" dimension that is a multiple of half a warp (e.g. 16), and a "y" dimension that is a multiple of a quarter warp (e.g., 8), until we exceed the maximum number of threads per block (512 threads). Table 9 below shows the order in which the thread blocks are tested.

TABLE 9

| | msBlock.x | msBlock.y | Num threads | GPU occupancy |
|---|---|---|---|---|
| 1 | 16 | 8 | 128 | — |
| 2 | 32 | 8 | 256 | — |
| 3 | 48 | 8 | 384 | — |
| 4 | 64 | 8 | 512 | — |
| 5 | 16 | 16 | 256 | — |
| 6 | 32 | 16 | 512 | — |
| 7 | 16 | 24 | 384 | — |
| 8 | 16 | 32 | 512 | — |

Once the GPU occupancy for all blocks in Table Table 9 is computed, the GPU occupancies obtained may be examined starting from the last block (#8 in the table) going backwards. The block dimensions having the maximum GPU occupancy may be selected. It should be noted that the block having the largest "y" dimension may be selected if two blocks tie at the maximum GPU occupancy number.

The thread block dimensions computed as described above for MS filter thread blocks may not make an integer number of blocks fit exactly into the scan pack (at the scan pack boundaries) as shown in FIG. 34A. Similarly, the thread block dimensions computed as described above for chrom filter thread blocks may not allow for fitting an integer number of blocks exactly into the scan pack as shown in FIG. 34B. In such cases, each scan can be padded with a number of zero values at the end, and by increasing the scan pack size a number of scans. However, the expanded scan pack dimensions may be different in both of the foregoing cases for MS filter thread blocks and chrom filter thread blocks. To set the scan pack dimensions such that it fits an integer number of ms filter blocks and also an integer number of chrom filter blocks, an embodiment may compute a block with dimensions that are the least common multiple of the respective dimensions of both the ms and chrom filter blocks. Subsequently, the scan pack dimensions as described above may be expanded but using the least common multiple block dimensions. Thus, the least common multiple block and associated dimensions may not replace the ms and chrom filter block dimensions determined above, but may rather be used to dimension the scan pack. The foregoing determination of dimensions for the scan pack, ms filter block and chrom filter block may be performed as part of the preprocessing step A described above (e.g, in Table 5). To further illustrate determining scan pack dimensions by determining the LCM for each dimension with respect to the ms filter thread block and the chrom filter thread block, consider an example as follows. The MS filter thread block has an x or mass dimension of 6 and a scan, time or y dimension of 3. The chrom filter thread block has an x or mass dimension of 6 and a scan, time or y dimension of 4. It may be determined that the LCM of the x or mass dimension=LCM(6, 6)=6. It may then be determined that the LCM of the scan, time or y dimension=LCM (3, 4)=12. Thus, the imaginary LCM thread bock has an x or mass dimension of 6 and a scan, time or y dimension of 12. Assume the current scan pack size in terms of number of scans is currently 33 (e.g., such as may be determined based on other factors such as number of filter coefficients). The foregoing LCM in the y dimension of 12 may be used to determine that the scan pack size, in terms of number of scans per scan pack, should be a multiple of 12 and the number of scans per scan pack may be determined as 36 scans (e.g., 3*12, the next multiple of 12 greater than the current scan pack size of 33). Now consider the x or mass dimension. Currently the scan pack has a mass or x dimension of 50. The foregoing LCM in the x dimension of 6 may be used to determine that the number of masses or x dimension should be a multiple of 6. In this case, it may be determined that the number of masses or x dimension should be adjusted to 54 (e.g., the next multiple of 6 which is greater than 50). Thus, each scan of data is augmented to include 4 additional masses which may be padded such as with zeroes. In this way, an integer number of the imaginary LCM thread blocks are able to fit into the scan pack and that guarantees that the scan pack will fit both an integer number of chrom and ms filter thread blocks.

As described above in connection with scan packs memory allocation, an odd number of symmetrical coefficients may be used in connection with filters used in an embodiment in accordance with the technique herein. The CPU may compute the filter coefficients in the pre-processing step (e.g., step A of table 5). The ms filters may use a different set of coefficients for each mass point value, and the number of coefficients used increases with increasing mass point values. The coefficients are arranged in a matrix with a row for each mass point and a column for each coefficient. The number of columns is determined by the maximum number of coefficients, and unused coefficient positions are set to zero. There is also an array containing the number of coefficients used in each mass point. Table 10 shows an example for 12 mass points illustrating that the coefficients vary with mass point and also that the number of coefficients used also increases with the mass point index.

TABLE 10

| Mass point | Coefficients matrix | | | | | | | Num coeffs |
|---|---|---|---|---|---|---|---|---|
| 0  | $C0_{-1}$  | $C0_0$  | $C0_1$  | 0 | 0 | 0 | 0 | 3 |
| 1  | $C1_{-1}$  | $C1_0$  | $C1_1$  | 0 | 0 | 0 | 0 | 3 |
| 2  | $C2_{-1}$  | $C2_0$  | $C2_1$  | 0 | 0 | 0 | 0 | 3 |
| 3  | $C3_{-1}$  | $C3_0$  | $C3_1$  | 0 | 0 | 0 | 0 | 3 |
| 4  | $C4_{-2}$  | $C4_{-1}$  | $C4_0$  | $C4_1$ | $C4_2$ | 0 | 0 | 5 |
| 5  | $C5_{-2}$  | $C5_{-1}$  | $C5_0$  | $C5_1$ | $C5_2$ | 0 | 0 | 5 |
| 6  | $C6_{-2}$  | $C6_{-1}$  | $C6_0$  | $C6_1$ | $C6_2$ | 0 | 0 | 5 |
| 7  | $C7_{-2}$  | $C7_{-1}$  | $C7_0$  | $C7_1$ | $C7_2$ | 0 | 0 | 5 |
| 8  | $C8_{-3}$  | $C8_{-2}$  | $C8_{-1}$ | $C8_0$ | $C8_1$ | $C8_2$ | $C8_3$ | 7 |
| 9  | $C9_{-3}$  | $C9_{-2}$  | $C9_{-1}$ | $C9_0$ | $C9_1$ | $C9_2$ | $C9_3$ | 7 |
| 10 | $C10_{-3}$ | $C10_{-2}$ | $C10_{-1}$ | $C10_0$ | $C10_1$ | $C10_2$ | $C10_3$ | 7 |
| 11 | $C11_{-3}$ | $C11_{-2}$ | $C11_{-1}$ | $C11_0$ | $C11_1$ | $C11_2$ | $C11_3$ | 7 |

In table 10, it should be noted that a first coefficient having a subscript of "−n", n not equal to 0, is the same as a second coefficient having the subscript "+n". Given the foregoing in that the coefficients are symmetrical over the center coefficient (denoted with a zero (0) subscript), a simplified coefficient matrix called an aligned coefficient matrix may be used to reduce the amount of memory used for coefficient storage. In this reduced size matrix, the coefficients in the first half of each set of coefficients are given the same name as those in the second half (removing the negative indices). Then, the second half of each set of coefficients is omitted and all center coefficients are aligned in the last column of the matrix. This leaves only the first half of each set of coefficients and the center coefficient as illustrated in Table 11 below. Thus, a coefficient having a subscript "n" in Table 11 is used for two coefficient values having subscripts "+n" and "−n".

TABLE 11

| Mass point | Aligned coefficients matrix | | | | | Num coeffs |
|---|---|---|---|---|---|---|
| 0  | 0 | 0 | 0 | $C0_1$ | $C0_0$ | 3 |
| 1  | 0 | 0 | 0 | $C1_1$ | $C1_0$ | 3 |
| 2  | 0 | 0 | 0 | $C2_1$ | $C2_0$ | 3 |
| 3  | 0 | 0 | 0 | $C3_1$ | $C3_0$ | 3 |
| 4  | 0 | 0 | $C4_2$ | $C4_1$ | $C4_0$ | 5 |
| 5  | 0 | 0 | $C5_2$ | $C5_1$ | $C5_0$ | 5 |
| 6  | 0 | 0 | $C6_2$ | $C6_1$ | $C6_0$ | 5 |
| 7  | 0 | 0 | $C7_2$ | $C7_1$ | $C7_0$ | 5 |
| 8  | 0 | $C8_3$ | $C8_2$ | $C8_1$ | $C8_0$ | 7 |
| 9  | 0 | $C9_3$ | $C9_2$ | $C9_1$ | $C9_0$ | 7 |
| 10 | 0 | $C10_3$ | $C10_2$ | $C10_1$ | $C10_0$ | 7 |
| 11 | 0 | $C11_3$ | $C11_2$ | $C11_1$ | $C11_0$ | 7 |

The aligned coefficient matrix of table 11 may be stored in host memory as computed by the CPU. In order to use the data of table 11 in the ms filter kernel in the GPU, the coefficient matrix of table 11 may be copied to device memory of the GPU. The ms filter kernel, however, may be designed to work with a transposed coefficient matrix as shown in Table 12 for memory access performance reasons.

TABLE 12

| Num coeffs | 3 | 3 | 3 | 3 | 5 | 5 | 5 | 5 | 7 | 7 | 7 | 7 |
|---|---|---|---|---|---|---|---|---|---|---|---|---|
| Aligned coefficients matrix (transposed) | 0 | 0 | 0 | 0 | 0 | 0 | 0 | 0 | $C8_3$ | $C9_3$ | $C10_3$ | $C11_3$ |
| | 0 | 0 | 0 | 0 | $C4_2$ | $C5_2$ | $C6_2$ | $C7_2$ | $C8_2$ | $C9_2$ | $C10_2$ | $C11_2$ |
| | $C0_1$ | $C1_1$ | $C2_1$ | $C3_1$ | $C4_1$ | $C5_1$ | $C6_1$ | $C7_1$ | $C8_1$ | $C9_1$ | $C10_1$ | $C11_1$ |
| | $C0_0$ | $C1_0$ | $C2_0$ | $C3_0$ | $C4_0$ | $C5_0$ | $C6_0$ | $C7_0$ | $C8_0$ | $C9_0$ | $C10_0$ | $C11_0$ |
| Mass point | 0 | 1 | 2 | 3 | 4 | 5 | 6 | 7 | 8 | 9 | 10 | 11 |

As mentioned above, a texture is a type of data arrangement used by the GPU (and also inherited from computer graphics) to access data with certain performance benefits. Data stored as a texture can be arranged in memory in 1D, 2D, or 3D, and data reads are cached. Textures are more efficient than regular memory to read data when data accesses are repetitive or local to each other, as it is the case for our aligned coefficients matrix. Data stored in device memory can be declared as a texture (bound to a texture in GPU terminology) and the GPU uses texture coordinates to access (fetch in GPU terminology) the texture elements. For performance reasons, the transposed aligned coefficients matrix may be bound to a 2D texture used by the ms filter kernel. In one version of CUDA, 2D textures can only be bound to data stored in device memory as CUDA arrays (a type of data construction in CUDA). Therefore, the device memory copy of the transposed aligned coefficients matrix, as in the example of Table 12, is stored in a CUDA array with a width equal to the number of mass points, and a height equal to half the maximum number of coefficients plus one.

The maximum size of a CUDA array is 65536 (width) by 32768 (height). The maximum height size is fine to accommodate the coefficients dimension described above, which is much smaller than 32768, but the maximum width size, however, is not enough for the number of mass points, which is typically much greater than 65536. Therefore, a single CUDA array is normally not enough to hold the entire transposed aligned coefficients matrix. As a solution, an embodiment may partition the matrix into as many CUDA arrays as necessary to cover all coefficients. All CUDA arrays have the maximum width (65536) except for the last one that may have a smaller width. The CUDA arrays width (array Width) may be a multiple of the ms filter thread block x dimension. This guarantees that an integer number of ms filter thread blocks fit in array Width.

Figure 35:
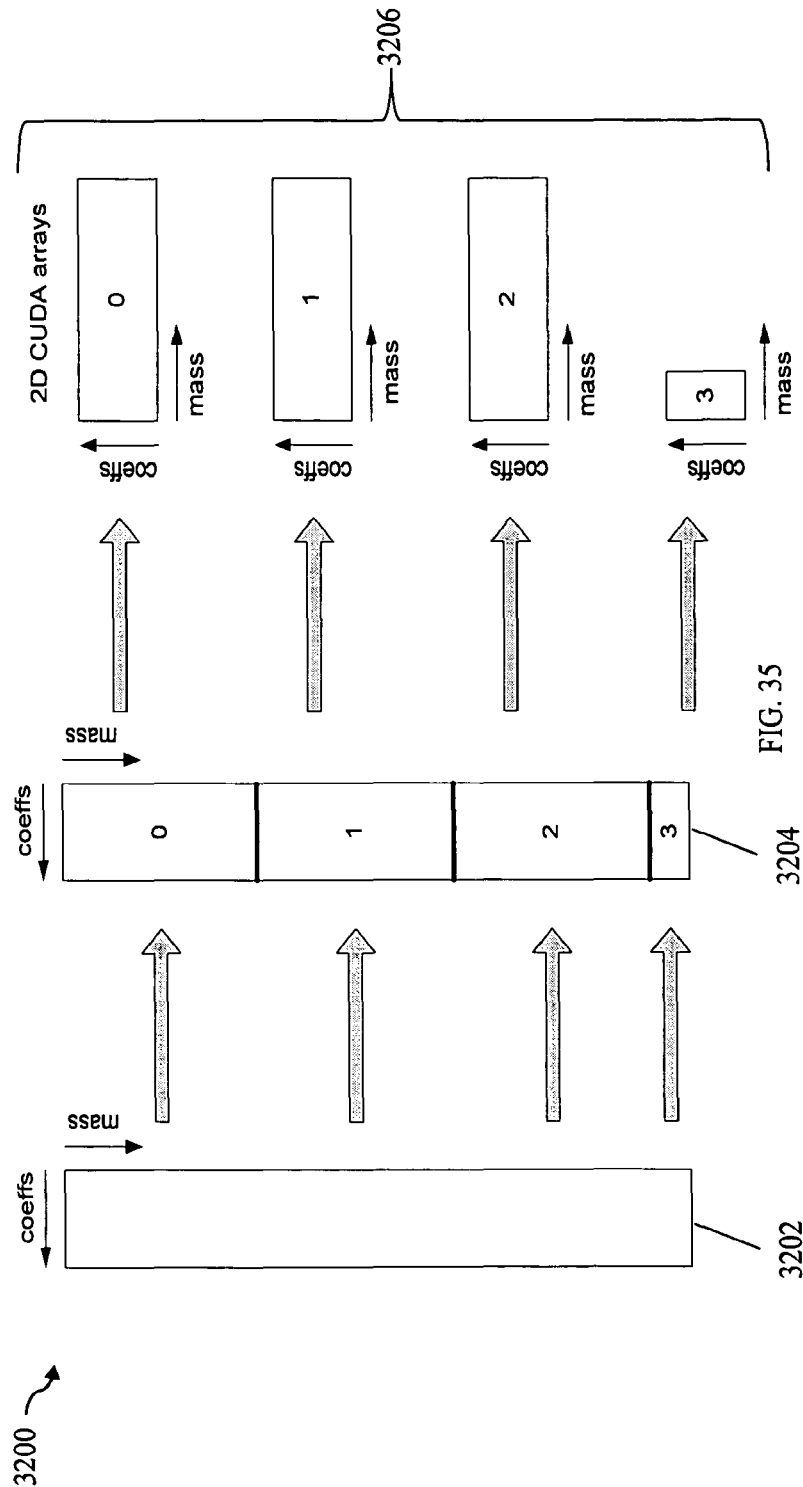
FIGS. 35 and 36 are examples illustrating use of coefficients in an embodiment in accordance with techniques herein.

Referring to FIG. 35, shown is an example illustrating how the foregoing CUDA arrays of coefficient data may be created in an embodiment in accordance with techniques herein. The example 3200 includes the coefficient matrix 3202, such as the aligned coefficients matrix data of table 11 described above stored in host memory. The data of 3202 may be partitioned into multiple portions in 3204 where each such portion has appropriate sizes/dimensions for the CUDA arrays as described above. As illustrated by 3204, the aligned coefficients matrix in host memory may be partitioned, for example, into portions corresponding to sub matrices. Portions or submatrices 0-3 are included in 3204 and each such portion or submatrix may have a number of rows=array Width with the exception of the last such sub matrix (e.g., denoted by the submatrix or portion"3" in 3204) that may have fewer rows. Once the foregoing partitioning is performed, each of the portions of 3204 may be transposed resulting in 3206 (e.g., data described above in connection with table 12). Each sub matrix is transposed, and then copied into a CUDA array in device memory of the GPU.

It should be noted that an embodiment described herein may use two different ms filters—the ms smooth and the ms second derivative (see, for example, MS_SMOOTH and MS_DER1V2 of FIG. 25B) As such, there are two sets of these CUDA arrays, one for each filter.

Alternatively, the ms filter coefficients may be stored in device memory as may be performed in connection with 4D processing described elsewhere herein and illustrated in Table 16. The foregoing of storing the ms filter coefficients in device memory may be preferred when the scan packs are broken into mass sectors as described elsewhere herein What will now be described is an MS filter kernel that may be used in an embodiment in accordance with techniques herein. The ms filter kernel may run both ms filters—the ms smooth and second derivative filters which perform filtering with respect to the mass-to-charge or mass dimension—in the GPU in the same kernel invocation. Generally, a thread running the kernel, and which generates a filtered output point may read in the corresponding single input point, read other inputs points used for filtering, read filtering coefficients, perform computations (e.g., multiplications and additions) to generate the filtered output point, and write the filtered output point to the appropriate output scan pack location. For the MS filter kernel, the kernel reads a "rawData" scan pack from device memory as the input to both filters (ms smooth and ms second derivative), and writes "msSmooth" and "msDeriv2" scan packs to device memory as outputs (See FIG. 25B). The kernel reads the coefficients from 2D textures bound to the 2D CUDA arrays described above. Running both filters on the same kernel avoids reading the rawData scan pack twice as would occur if each filter was run by separate kernels. Reading device memory is a comparatively slow operation inside a kernel. Therefore, it is advantageous to read the rawData scan pack only once.

Figure 36:
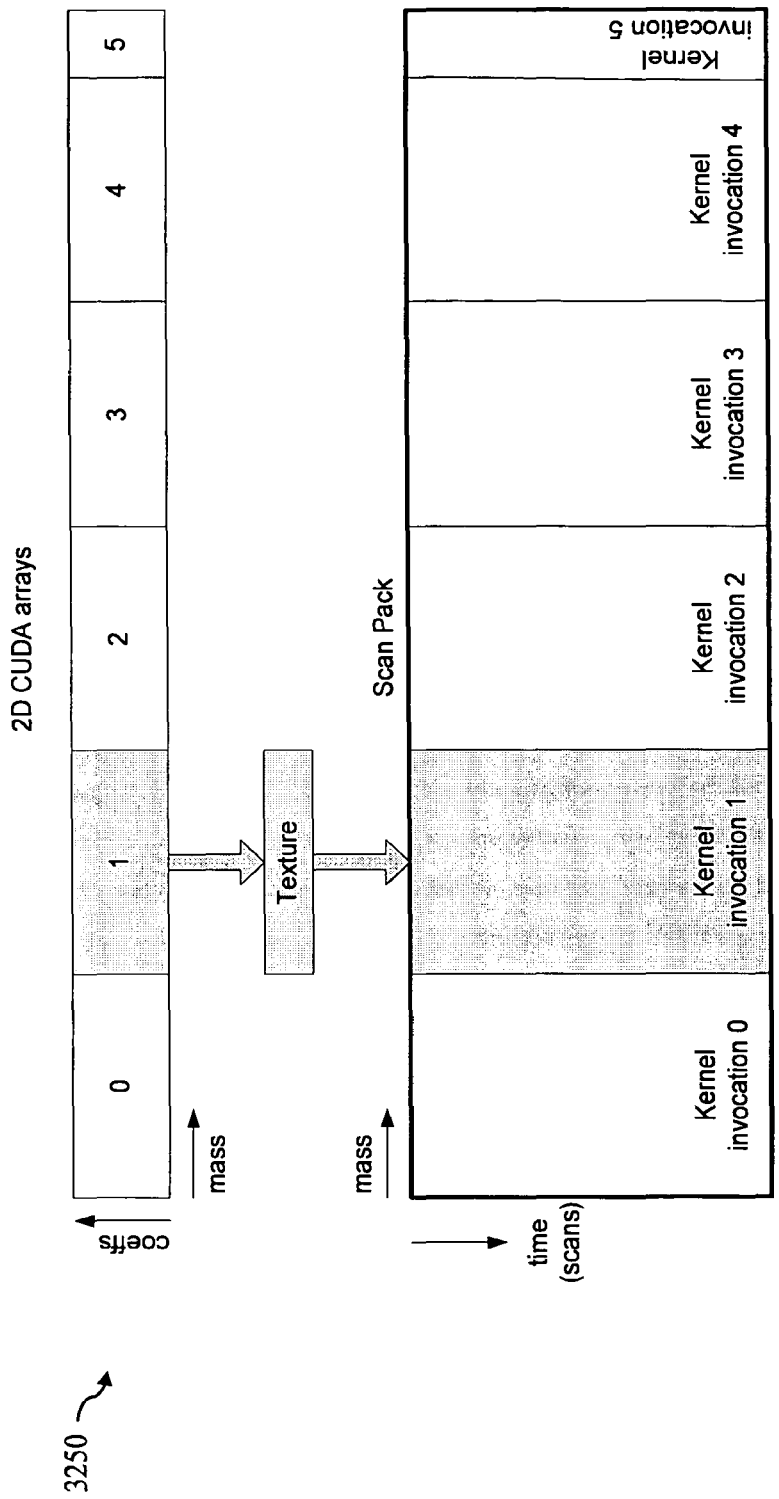

As described above regarding the MS filter thread bocks and illustrated in FIG. 34A, the MS filter kernel uses two-dimensional thread blocks and a two-dimensional grid that covers the entire scan pack. Each thread within the blocks may compute one point in each of the two output scan packs. To bind the 2D CUDA arrays to textures, we need as many texture references (texture names) as there are arrays, and each kernel thread must use the correct texture depending on the mass point it is filtering. This presents two problems. One is that the number of CUDA arrays needed is not known until run time because that depends on the ms data. Therefore, it is not know beforehand how many texture references are going to need. This, however, can be solved by having a large number of texture references available and only use those needed. The second problem is how a kernel thread chooses the correct texture to use, which involves some conditional execution statement. This may cause a longer computation time than desired. As a result, an embodiment may utilize a different approach that overcomes both of the foregoing problems and uses only one texture reference per filter. The kernel is invoked as many times as there are CUDA arrays per filter. In each invocation, we bind to a texture only one CUDA array (e.g., one 64k portion of the coefficient matrix) and compute the filter only on the mass points for which the currently bound CUDA array covers (array Width). This is illustrated in Error Reference source not found. FIG. 36 that shows six 2D CUDA arrays denoted 0-5 (for one of the two ms filters) while kernel invocation 1 is running. With reference to FIG. 36 with 6 invocations, the current scan pack is effectively partitioned for processing into 6 portions of different mass points (across all scans in the current scan pack) and a different portion of the mass points is processed with each of the denoted 6 kernel invocations.

Each MS filter kernel invocation in such an embodiment may run a smaller number of thread blocks compared to the number of thread blocks that cover the entire scan pack. Therefore, the grid used to run each of these kernel invocations is reduced from the scan pack grid. Alternatively, if the ms filter coefficients are not stored in 2D CUDA arrays, but in a device memory matrix as shown in Table 16, the coefficients may be bound to a linear texture and a single kernel invocation is done per scan pack. This may be preferred when the scan packs are broken into mass sectors as described elsewhere herein.

Each thread running the kernel may use Equation 5A described above to determine the local coordinates (m, s) within the scan pack of the point the thread computes. If the coefficients are stored in 2D CUDA arrays, the local coordinates computation also takes into account that the kernel invocation only filters a section of the scan pack. Each thread uses the local coordinates to read one point from the "rawData" scan pack, and to write the corresponding filtered point into the "msSmooth" and the "msDeriv2" scan packs.

As mentioned in above in connection with the MS filter thread blocks, the ms filter kernel uses "shared" memory to minimize the adverse effect of having to read from device memory the same raw data point several times. Shared memory is much faster than device memory, and it is accessible to all threads within a block regardless of which thread wrote to the shared memory. Therefore, if a thread reads one raw data point from device memory and writes it to a shared memory location, all other threads in the same block can read that raw data point from shared memory instead of form device memory taking advantage of the faster memory. The ms filter kernel has some amount of shared memory allocated for this purpose, such that each thread in the block reads one raw data point from device memory and writes it to shared memory. The size of the shared memory allocation depends on the number of threads in the block, the number of filter coefficients, and the size of one data point in bytes.

Figure 37:
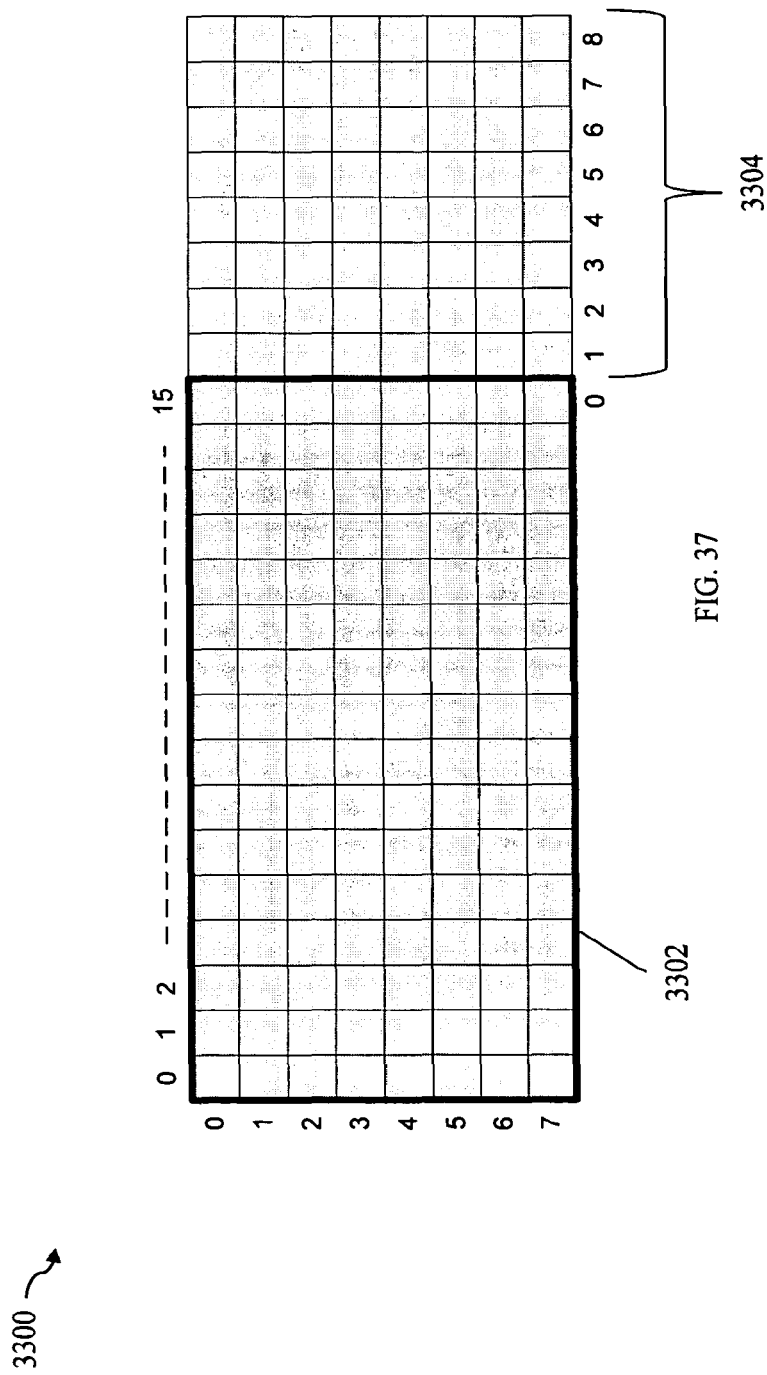
FIGS. 37 and 38 are examples of shared memory as may be used by a thread block in an embodiment in accordance with techniques herein.

Referring to FIG. 37, shown is an example of the shared memory required for a thread block of 16×8 and for 9 filter coefficients as may be used in an embodiment in accordance with techniques herein with MS filtering. The number of coefficients considered here is the maximum of the two MS filters. In FIG. 37, the total shaded area represents the shared memory elements required (e.g., 192=24*8), which are more than the number of threads in the block (e.g. 128) as denoted by 3302. As represented by 3304, there are 8 more columns of shared memory data points (number of coefficients minus one). If the data points are four bytes floats, the size of the shared memory allocation is 192×4=768 bytes.

According to Equation 2A above, to filter one data point, we need some of the next data points depending on the number of coefficients used. Therefore, in connection with ms filtering to filter raw data points handled by threads in the last columns in the block, we need to have in shared memory some raw data points beyond those copied into shared memory by the threads in the block (e.g., which may copy only a single such point each). This is the reason the shared memory extends beyond the boundary of the block in FIG. 37. To fill those extra shared memory data points as represented by 3304, the threads at the first columns of the block may write more than one raw data point into shared memory. Given that a thread can read data from all shared memory locations, not just from the point or points written by that thread, we need to wait until all threads finish writing to shared memory before the data in shared memory can be used. This is accomplished with a synchronization instruction to ensure that all input data points are read into shared memory prior to commencing any use of the data. The kernel also uses shared memory to store the number of coefficients array shown in Table 12. To compute a filtered output point, each thread reads the necessary data points from shared memory, reads the required filter coefficients from the coefficients texture, and computes the filter output according to Equation 2A.

The chrom filters and chrom filter kernel that may be used in an embodiment in accordance with techniques herein will now be described. The chrom filters may use the same set of filter coefficients for all data points, but each chrom filter uses a different coefficient set. The coefficients sets for all three chrom filters (e.g., see FIG. 25B) are stored in constant memory in sequence. As the total number of coefficients stored this way is small, constant memory may be used instead of a texture like it is done with the ms filter coefficients. Constant memory is one of the types of device memory that has the advantage of cached reads.

In connection with the chrom filters, two kernels may be used to compute all three chrom filters. Referring back to FIG. 25B, the first kernel computes the "step1" and "step2" scan pack outputs from the "msSmooth" and "msDeriv2" scan pack inputs, computes the "final filtering output" scan pack, and also computes the "crShape" scan pack by taking the average of "msSmooth" and "msDeriv2" scan pack inputs. The second kernel computes the "msShape" output scan pack from the "rawData" input scan pack.

As described in connection with the chrom filter thread blocks and illustrated in FIG. 34B, the chrom filter kernels may use two-dimensional thread blocks and a two-dimensional grid that covers the entire scan pack. Each thread within the blocks computes one point in the output scan pack, and may use Equation 5A to determine the local coordinates, (m, s), within the scan pack of the point it computes. The local coordinates are used to read one point from the input scan pack, and to write the corresponding filtered point into the output scan pack. The chrom filter kernel uses "shared" memory to minimize the adverse effect of having to read from device memory the same raw data point several times. Shared memory is much faster than device memory, and it is accessible to all threads within a block regardless which thread wrote to the shared memory. Therefore, if a thread reads one raw data point from device memory and writes it to a shared memory location, all other threads in the same block can read that raw data point from shared memory instead of form device memory taking advantage of the faster memory. The chrom filter kernels have some amount of shared memory allocated for this purpose, such that each thread in the block reads one raw data point from device memory and writes it to shared memory. The size of the shared memory allocation depends on the number of threads in the block, the number of filter coefficients, and the size of one data point in bytes.

Figure 38:
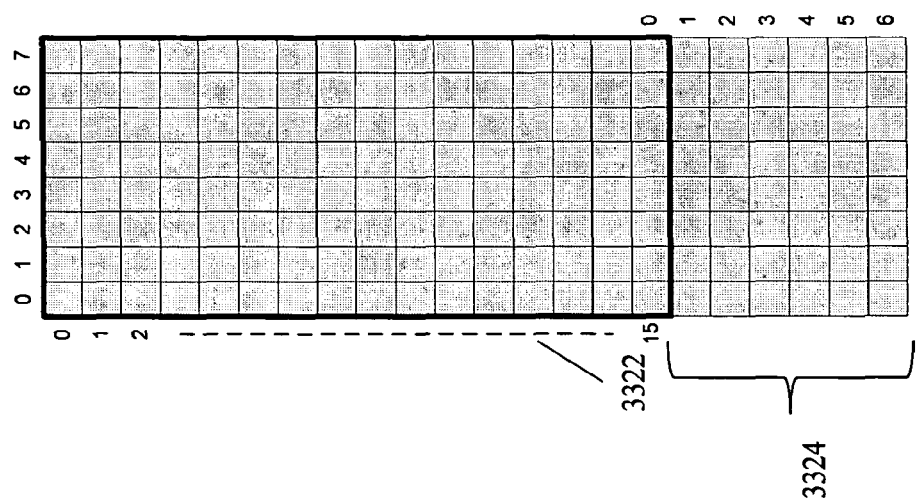

Referring to FIG. 38, shown is an example of the shared memory required for a block of 8×16 and for 7 filter coefficients as may be used in an embodiment in accordance with techniques herein in connection with chrom filtering. The number of coefficients considered may be the maximum of the three filters. In FIG. 38, the entire shaded area of cells illustrated represents the shared memory elements required (176), which is more than the number of threads in the block (128). Element 3222 represents the 128 shared memory elements of input data that may be read by the 128 threads, with each thread reading one corresponding input point into the shared memory. However, there are 6 more rows of shared memory data points (number of coefficients minus one) as denoted by 3324 which also need to read into the shared memory. If the data points are four bytes floats, the size of the shared memory allocation is 176×4=704 bytes.

In connection with chrom filtering ad according to Equation 3A, to filter one data point, some of the next data points may be needed depending on the number of coefficients used. Therefore, to filter raw data points handled by threads in the last rows in the block, we need to have in shared memory some raw data points beyond those copied into shared memory by the threads in the block. This is the reason the shared memory extends beyond the boundary of the block in FIG. 38. To fill those extra shared memory data points represented by 3324, the threads at the first rows of the block may write more than one raw data point into shared memory. Given that a thread can read data from all shared memory locations, not just from the point written by that thread, we need to wait until all threads finish writing to shared memory before the data in shared memory can be used. This is accomplished with a synchronization instruction. To compute a filtered output point with respect to the retention time dimension in connection with chrom filtering, each thread reads the necessary data points from shared memory, reads the filter coefficients from constant memory, and computes the filter output according to Equation 3A.

What will now be described is additional detail of the peak detection step that may be performed in an embodiment in accordance with techniques herein. The peak detection step reads a scan pack of filtered data (e.g. final filtering output data type) as shown in FIG. 26, and finds all peak apices in the scan pack. A peak apex is determined by finding a local maxima, i.e., a point with an intensity value greater than the intensity of its eight neighbor points, and greater than a certain intensity threshold. When a peak apex is found, its local coordinates within the scan pack ("m" or mass coordinate and "s" or scan coordinate) are saved to a detected peak array, and a detected peak counter is incremented. The location assigned to the peak coordinates in the detected peak array is used to identify the peak in subsequent processing steps.

As mentioned above, each point in the scan pack uses its eight neighbors to determine if its intensity value is a local maxima with respect to its neighbors. This is illustrated in FIG. 39A which shows a point "X" and its eight neighbor points "0". Looking from other perspective, FIG. 39B shows that a point "0" may also be used by eight points "X" in their respective determination of local maxima. However, this is only true if point "0" is a position in the thread block and is surrounded by other neighboring threads having corresponding points denoted by the Xs (e.g., not located at an edge or corner of a thread block as noted below). If point "0" is at an edge of the thread block, such as depicted in FIG. 39C, the point "0" may be used by only five "X" points in their respective determination of local maxima. If point "0" is at a corner of the thread block, such as illustrated in FIG. 39D, the point "0" may be used by only three "X" points in their respective determination of local maxima.

Given that each point in a thread block is used (read) multiple times during this peak detection step, a thread block form factor may be determined which maximizes the reuse of points read. From the above discussion, it may be noted that for a given number of threads, this happens when the thread block is a square, because it maximizes the points at the middle as in FIG. 39B. For example a 32×8 thread block (256 threads) has 180 (30×6) points at the middle, but a 16×16 thread block (256 threads) has 196 (14×14) points at the middle. Therefore, to set the thread block dimensions, various blocks of different sizes and shapes may be tested, such that an integer number of blocks fit inside the scan pack as in FIG. 40. Then, we choose in this order, the thread block with the highest GPU occupancy, the thread block having the greatest number of threads per block, and the thread block having dimensions which best approximate a square shape. It should be noted that a square shape may not be possible because at this point in the computation since the scan pack size has been determined in accordance with the filters. An embodiment may elect to vary the scan pack size, as described elsewhere herein, in accordance with the thread block dimensions used in connection with filtering but may not do so to achieve a square thread block for peak detection processing.

Figure 40:
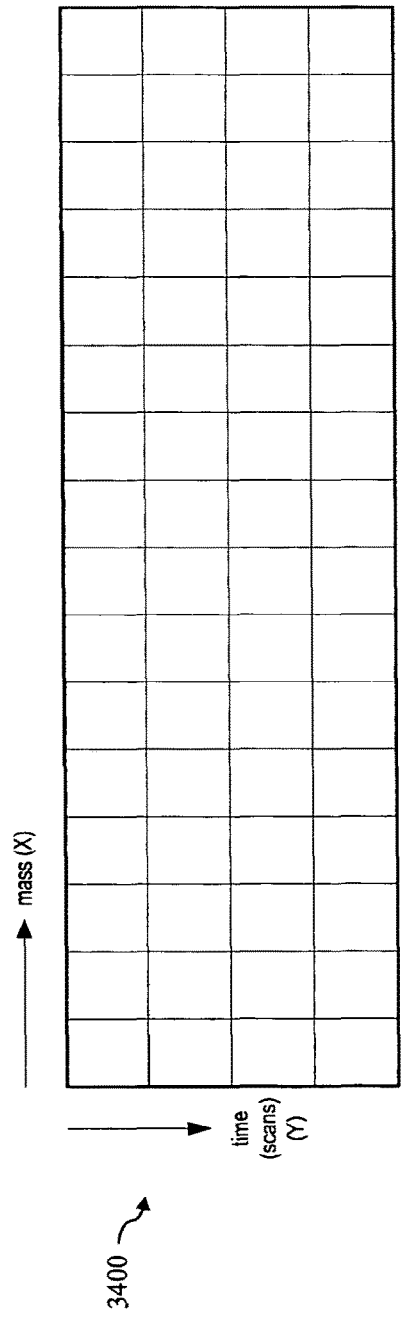
FIG. 40 illustrates an arrangement of thread blocks that may be used in an embodiment in accordance with techniques herein.

In connection with peak detection, an embodiment may use a single kernel to detect all peaks in the scan pack. As described elsewhere herein in connection with peak detection thread blocks and as illustrated in FIG. 40, the kernel uses two-dimensional thread blocks and a two-dimensional grid that covers the entire scan pack. Each thread within the blocks computes one point in the scan pack, and uses Equation 5A to get the local coordinates within the scan pack of the point it computes. Unlike in the case of the ms and chrom filter kernels, the peak detection kernel does not use shared memory to read input scan pack data. Instead, the input scan pack data is bound to a texture and the threads fetch data points from the texture. Four textures may be used in the peak detection kernel—a first texture that is bound to the current filtered "final filtering output" data scan pack, two textures for the scans before (e.g., denoted elsewhere herein using a −1) and after (e.g, denoted elsewhere herein using +1) the current scan pack, and a fourth texture is bound to the array of intensity thresholds used (one threshold per mass index). The textures bound to the preceding and subsequent scans (with respect to the scan pack) are used by threads that compute points located at the first and last scan of the scan pack, respectively. It should be noted that the foregoing textures may be implemented as 1-dimensional textures having different constraints and varying performance from the 2-dimensional textures that may be used in connection with other data. For example, the 1-dimensional texture may be cached and not have a restriction regarding size or dimensions that may be applicable for a 2-dimensional texture.

As mentioned elsewhere herein in one embodiment, a thread executing the kernel for peak detection may perform processing for a single one of the filtered output points (e.g., single point in a scan pack of data type "final filtering output") to determine whether that particular point is a peak or local maxima. Once the thread finds a peak, it increments a counter of detected peaks in device memory, and saves the peak's local coordinates within the scan pack to an array of detected peaks data, also in device memory. The incremented value of the counter is the location in the detected peak's array where the peak's coordinates are saved. Given that all threads in the thread block run in parallel, the order in which those threads that find a peak increment the counter and write to the array, is not deterministic.

Furthermore, as the counter increment operation involves three steps—reading the current value of the counter in device memory, incrementing the value, and writing the updated incremented counter value back to device memory—there is a risk of a corrupted counter value if one thread tries to increment the counter while another thread has read the counter but not written the incremented value yet. To avoid this problem, the counter increment is done using an "atomic" operation that combines the three steps described above into a single step. This provides for exclusive access to the shared data element, the counter, which can be accessed by multiple threads for write access. The foregoing guarantees that a thread can't increment the counter while another thread is incrementing it. With this method, it is guaranteed that the incremented value of the counter obtained by each thread is unique, and that unique value can be safely used to index the location in the detected peak array where the peak's coordinates are saved.

Figure 41:
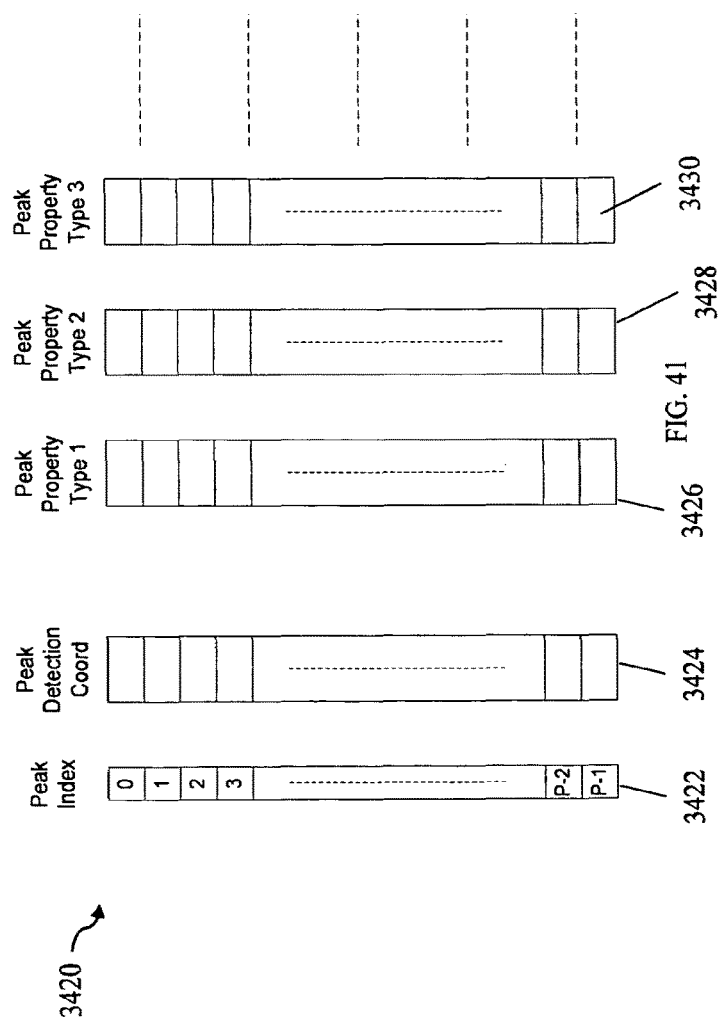
FIG. 41 is an example arrangement of detected peaks and peak property information in an embodiment in accordance with techniques herein.

Referring back to FIG. 26, the peak properties computation step 2554 uses the array of detected peak data 2556 generated by the peak detection step 2552 and all five filtered output scan packs 2502*d-h* to compute peak properties for each of the detected peaks in the current scan pack. The peak properties that may computed include, for example, the retention time and mass index of the apex, the start and stop retention time, the start and stop mass index, and the full width at half maxima (FWHM) in retention time and in mass index. The peak properties may be saved in device memory arrays such that there is one array for each type of peak property. Therefore, each peak property array contains the same type of property for all detected peaks in sequence. The order in which the property value of each peak is saved in the corresponding array is the same as the order in which the peak's coordinates were saved in the peak detection array. This is illustrated in FIG. 41 that shows "P" detected peaks 3424 and three peak properties arrays 3426, 3428 and 3430. Element 3424 may identify the coordinate of each detected peak which is a local maxima. Element 3422 may represent a peak index identifying one of the detected peaks 3424.

In one embodiment, the peak detection array 3424 may contain peak coordinates for all peaks detected within the current scan pack only, but the peak properties arrays 3426, 3428 and 3430 may contain peak properties for all detected peaks in all scan packs. The peak detection array 3424 may be reused on each scan pack. The peak properties for peaks detected in a scan pack are located within the various peak properties arrays 3426, 3428 and 3430 after the peak properties for peaks in the previous scan pack. Therefore, the peak index 3422 shown in FIG. 40 may index into the peak detection array 3424 directly and index the peak properties arrays from the first empty location in the arrays. The peak detection array 3424 may have a size in accordance with the worst case or largest number of peaks possible according to the scan size and the scan pack size. The peak property arrays may be initialized to a fixed peak capacity, and re-allocated to a larger capacity, if necessary, before computing each scan pack's peak properties. It should be noted that the arrangement of FIG. 41 is only one way in which the data may be organized. The data structures that may be used may be selected in accordance with certain advantages, such as performance reasons, that may vary with embodiment. For example, with reference to C language constructs, and embodiment may use structure of arrays to store the data represents in FIG. 41 with each of the arrays (e.g., each of elements 3422, 3424, 3426, 3428 and 3430) being an array within the structure data type. The foregoing arrangement may provide performance advantages and more efficient memory access in some parallel processing embodiments using the GPU as described herein.

To compute some of the peak properties (e.g., such as related to the shape of the peak), data may be read from the "crShape" and the "msShape" scan packs (e.g., see FIG. 26) near the location of each detected peak (e.g., such as multiple consecutively located data points located near the peak). In order to compute several of these peak properties in parallel efficiently, the scan packs may not be read directly. Rather, the required data portions for each peak may be extracted from the appropriate scan packs and copied into a device memory buffer that groups this data for several peaks in sequence. In a manner that is similar to the peak properties arrays, the order in which this shape data is stored in the buffer is the same as the order in which the peak's coordinates are saved in the peak detection array 3424 of FIG. 41.

Referring to FIG. 42, shown is an example illustrating how the foregoing data may be stored in peak shape buffers for use in peak property computation in an embodiment in accordance with techniques herein. The example 3460 illustrates that "P" detected peaks (denoted by the peaks indices 0 . . . p−1, inclusively, as included in 3462) and a shape buffer 3464 with a capacity of "S" points per peak. To improve device memory access, "S" may be rounded up to the next multiple of half a warp.

An embodiment may use multiple ones of the foregoing shape buffers to compute peak properties. In one embodiment, five of these shape buffers are used when computing peak properties that use data in the "crShape" scan pack and another five shape buffers are used when computing peak properties that use data in the "msShape" scan pack. However, an embodiment may reuse some of the buffer space. For example, in one embodiment, a total of six shape buffers may be used since some of the buffers may be reused for "msShape" related peak properties after the "crShape" peak properties are computed.

It should be noted that the number of peaks that will be detected in any given scan pack is data dependent, varies and is not known prior to performing peak detection processing. Therefore, given that it is not known beforehand how many peaks are going to be detected in a scan pack, the size of the shape buffers may not be implemented using a fixed peak capacity unless such capacity assumes worst case or maximum size (e.g., such as may be done in connection with the peak detection array). Assuming worst case or maximum fixed size for the buffers may not be practical in that an unacceptable amount of device memory may be used. An alternate approach that may be used in an embodiment is to size the shape buffers to an initial peak capacity, and resize them if a scan pack requires a larger peak capacity. The foregoing may be performed dynamically, for example, by performing successive steps of memory allocations and/or de-allocations as needed for the capacity variations over time. As another alternative, an embodiment may size the shape buffers to a reasonable fixed peak capacity that never changes. If a scan pack has more detected peaks than the shape buffers peak capacity, the number of detected peaks may then be partitioned into groups, where each such group has a size equal to the shape buffer's peak capacity. The peak properties of each group of peaks may then be computed in sequence. To improve kernel execution in a sequence of these groups, the shape buffers peak capacity may be set to a multiple of a warp or other alignment boundary.

An embodiment may also utilize a different shape buffer layout than as illustrated in FIG. 42. For example, an embodiment may use an alternate layout of the shape buffers as illustrated in FIG. 43 where the peak shape data, and associated peak index vector, are stored in columns rather than rows. In other words the data layout of FIG. 42 may be transposed so that each row of data from the arrangement of FIG. 42 is now a column of data as illustrated in FIG. 43. The layout of FIG. 43 may be preferred in some embodiments by providing a performance increase due to an improved device memory access if each thread reads from only one of the columns. Thus, the data structures of FIGS. 42 and 43 include extracted portions of data from shape data scan packs used in processing. Such data structures may include data stored therein which is memory aligned and may provide increased efficiency during processing rather than repeatedly access selective portions of data in the scan packs which may be unaligned. Processing that may be performed to load the peak shape buffers is described below in connection with a "load peak shape data" processing step of the peak properties computation.

The peak properties computation for one scan pack comprises several sub-steps described in the following paragraphs in which peak properties may be computed in groups. The particular number of groups and properties in each group may vary with embodiment. For example, in one embodiment, properties computed may form three groups. Each of the groups may include properties related in some way. For example, properties included in a same group may be determined using one or more of more of the same inputs. In one embodiment as described below, the peak properties computation processing may include a "peak properties group 1" step (which computes a first group of properties) and a "peak properties group 2" step (which computes a second group of properties), where each of the foregoing may be performed once. Peak property computation may also include computing a third group of properties as determined in a "peak properties group 3" step. In one embodiment, the third group of properties may be determined a first time with respect to chrom shape data and a second time for ms shape data. In connection with loading and filtering each of the ms shape data and the chrom shape data, steps described below of "load peak shape data" and "filter peak shape data" may also be performed. It should be noted that the steps of "load peak shape data" and "filter peak shape data" are performed twice—a first time for the chrom shape data and a second time for the ms shape data. Each of these steps comprising peak properties computation may use one or more kernels.

The "peak properties group 1" step may include determining, for example, the peak's intensity and whether the peak is marked as an "excluded" peak as described below. Peaks which are marked as excluded may not be considered for one or more subsequent processing steps. Peaks may be considered as excluded for one or more reasons one of which relates to intensity values as described below. In connection with determining the first group of properties, various data inputs such as illustrated in FIG. 26 and described above may be used. For example, determining the first group of properties may require reading the intensity value at the peak apex of each detected peak as may be included in the "final filtering output" scan pack. Also, values of the "step 1" and "step2" scan packs corresponding to a particular peak (e.g., averaged to produce the "final filtering output data" in which the detected peak is included) may be examined to determine whether to mark the peak for exclusion. A peak may be marked as "excluded", for example, if one or more of the values of the step1" and "step2" data type scan packs corresponding to a peak are under a certain threshold. In an embodiment as described above where the "step2" scan pack may not be saved, the "step 2" scan pack data may be computed from corresponding values in the "final filtering output" and "step 1" scan packs.

One kernel may be used to perform the peak properties group 1 processing. This kernel may use one-dimensional thread blocks and a one-dimensional grid covering all peaks in the peak detection array, or in a group of peaks if the number of detected peaks is greater than the peak capacity of the shape buffers. The thread block dimension may be a multiple of two warps under the maximum threads per block that produces the highest GPU occupancy. Each thread within the blocks may compute group 1 properties for one peak in the group, and may use Equation 6A to determine the index of the detected peak for which such computation is performed by the thread.

$$i = blockIdx.x * blockDim.x + threadIdx.x \quad \text{Equation 6A}$$

In Equation 6A, i is the peak index within the group of detected peaks, blockIdx.x is the x coordinate of the block index, blockDim.x is the x dimension of the block, and threadIdx.x is the x coordinate of the thread within the block. Peak properties in group1 may use, for example, the "final filtering output" and "step1" scan packs which may be bound to respective textures and the threads fetch data from these textures as needed during processing. Each thread uses the peak index obtained from Equation 6A to read the peak's coordinates within the scan pack from the peak detection array and to write pertinent peak properties to the peak properties arrays. The peak's coordinates are used to fetch the peak's intensity values as may be included, for example, in the "final filtering output" and the "step1" textures. The "step2" value may also be computed from the foregoing two points of the "final filtering output" and "step 1" data. Each thread uses the peak index to write the peak's three intensity values (e.g., as obtained from the "step 1", "step 2" and "final filtering output" data) to the corresponding peak property array containing peak intensity values. Also, each thread uses the peak index to write to the exclusion peak property array indicting this peak as an excluded peak if either the "step1" or the "step2" values are below, certain threshold values.

The "peak properties group 2" step may include determining, for example, the mass fractional index and the retention time at the apex of each detected peak. A three point interpolation may be used to compute these values. To compute the mass fractional index (e.g., resulting from interpolation), the intensity value from the "final filtering output" scan pack and the mass index value for the peak and for the points before and after the peak in mass may be used. The mass index is an index related to data acquisition in the mass spectrometer, from which actual mass values can be derived after mass calibration. It should be noted that the foregoing fractional indices are described elsewhere herein in more detail. To compute the retention time, the intensity value from the "final filtering output" scan pack and the retention time value for the peak, and for the points before and after the peak in time may be used. Therefore, computing the second group of peak properties for any peak included in a current "final filtering output" scan pack uses the current, previous, and next "final filtering output" scan packs. The second group of properties may be determined using one kernel. The kernel may use one-dimensional thread blocks and a one-dimensional grid following the same criteria as described above when determining the first group of peak properties. Each thread within the blocks computes group 2 properties for one detected peak and uses Equation 6A to determine the index of the detected peak. The current, previous, and next "final filtering output" scan packs, as well as other data used such as an array of retention times, may be bound to respective textures and the threads fetch data from these textures. Each thread may use the peak index obtained from Equation 6A to read the peak's coordinates within the scan pack from the peak detection array and to write pertinent peak properties to the various peak properties arrays. The peak's coordinates (e.g., such as produced previously by peak detection and stored in the array 3424 of FIG. 41) are used to fetch intensity values from the current, previous, and next "final filtering output" textures, as well as to fetch retention time values from another appropriate texture containing such values. Each thread computes the mass fractional index and time values of the peak, and uses the peak index to write the two values to the corresponding peak property arrays.

As noted above, the steps of "load peak shape data", "filter peak shape data" and "peak properties group 3" may be performed in sequence twice—once for chrom shape data and a second time for ms shape data. The "load peak shape data" step will now be described. In this step, the shape buffers are loaded with data from the "crShape" scan pack or the "msShape" scan pack depending on which type of shape data is going to be processed by the foregoing sequence. According to FIG. 42, the buffers have a capacity of "S" data points per peak. However, not all of them are used to save shape data because the number of points required for chrom shape data processing (crS) and for ms shape data processing (msS) is different. An embodiment may track which locations in the buffers are unused (e.g., save an ending location in the buffer of the last element containing valid data, pad unused elements with zeroes or another special value, and the like). One kernel is used to load the peak shape data into the buffers. The kernel uses two-dimensional thread blocks and a two-dimensional grid that covers all used peak locations and all "S" data points per peak in the shape buffers. Dimension x of the blocks and grid cover all "S points", and dimension y of the blocks and grid cover all used peak locations in the shape buffers up to the maximum "P" peaks (see FIG. 42). The thread block dimensions are chosen following the same criteria described above as related to the MS filter thread blocks. Each thread within the blocks loads into the shape buffers one shape point for one peak, and uses Equation 7A to obtain the coordinates within the buffer of the point it loads.

$p = blockIdx.x * blockDim.x + threadIdx.x$ $i = blockIdx.y * blockDim.y + threadIdx.y$   Equation 7A In Equation 7A, p is the index to the point within the "S" data points available per peak, i is the peak index within the buffer, blockIdx.x and blockIdx.y are the x and y coordinates of the block index, blockDim.x and blockDim.y are the x and y dimensions of the block, and threadIdx.x and threadIdx.y are the x and y coordinates of the thread within the block.

The shape data loaded into the buffer is a number of shape data points at both sides of the detected peak. For chrom shape data, this means that points may be needed which are located in the previous or the next scan pack if the peak is located near the first or last scan in the "crShape" scan pack. The "msShape" or the "crShape" scan pack, depending on the type of shape data being loaded, is bound to a texture and the threads fetch data from this texture. In the case of the chrom shape data, the previous and the next chrom shape scan packs, as well as retention time values in an array, are also bound to respective textures. Two shape buffers are loaded by the kernel. One contains the intensity values of the shape data, and the other contains the displacement values of the shape data, i.e., time for chrom shape data, and mass index for ms shape data. As described elsewhere herein, the shape data may be two-dimensional data with intensity in the y-axis and time or mass index in the x-axis. Each thread uses the peak index "i" obtained from Equation 7A to read the peak's coordinates within the scan pack from the peak detection array, and uses both indices from "i" and "p" from Equation 7A to write the corresponding shape data point into the shape buffers. The shape data point corresponding to the peak's apex is loaded at the center of the "msS" or "crS" shape data points, and shape data points at both sides of the peak's apex are loaded at both sides of the center point in "msS" or "crS". Therefore, each thread uses index "p" also as an offset into the peak's coordinates to fetch the correct point from the "msShape" or the "crShape" scan pack textures.

The "filter peak shape data" step will now be described. As noted above, this step runs twice, one for chrom shape data and a second time for ms shape data. In this step, the shape buffer containing intensity data is filtered with three different types of filters and the filtered data is saved in three new shape buffers. The three filters are smooth, first derivative, and second derivative type filters as described above. One kernel is used in this filtering step. The kernel uses two-dimensional thread blocks and a two-dimensional grid following the same criteria as in above in the step of "load peak shape data". Each thread within the blocks performs the three types of filtering for one point for one peak in the shape buffer (e.g., generates three filtered output points for the one input point). The thread may use Equation 7A to determine the coordinates within the buffer of the point that it filters.

The filter coefficients are different for each type of filter, and each thread may require a different number of coefficients to run the filter. Given that the same set of coefficients may be used by many threads, the coefficients are stored in constant memory to take advantage that constant memory is cached. The coefficient sets are made of an odd number of coefficients and are symmetrical about the center coefficient as described above. Therefore, to save memory, only the center coefficient and the second half of the coefficients are stored in constant memory. Multiple coefficient sets, enough to guarantee current filtering needs, are stored in an array in sequence.

Referring to FIG. 44, shown is an example with first four coefficients sets, and their distribution in the coefficient array (coeff array) as may be used in an embodiment in accordance with techniques herein. In the example 3500, table 3510 indicates the four set of filtering coefficients. Rather than store the coefficients and information as in the arrangement of 3510, an embodiment may store the coefficients in an array as represented by 3520 and use Equation 8A described below to index into the array and obtain the appropriate coefficients needed for filtering a particular input point. It should be noted that there are three coefficients arrays, one for each type of filter, since the coefficients vary with each filter. Given the number of coefficients required, each thread uses Equation 8A to find the location in the array of the center coefficient of the set to be used for filtering. In Equation 8A, iC is the location of the center coefficient in the array and hC is half the number of coefficients (number in the second half of coefficients). Equation 8A is:

$$iC(hC) = \frac{(hC-1)*(hC+2)}{2}$$

The kernel uses shared memory when performing the filtering. Each thread reads one or more shape points from the buffer in device memory and copies them into shared memory. The threads wait until all threads have finished loading data into shared memory before they start running the filters. Each thread reads the required shape data from shared memory, reads the appropriate filter coefficients from constant memory, and runs all three filters in sequence. Then, it writes each filter output to the corresponding filtered shape data buffer.

The "peak properties group 3" step will now be described. As noted above, this step is performed twice—once for chrom shape data and a second time for ms shape data. In this step, all five shape buffers, two output from the step of "load peak shape data" and three output from "filter peak shape data"—are used to compute the last or third group of peak properties in one embodiment described herein. Three kernels are used in this step. Each such kernel uses one-dimensional thread blocks and a one-dimensional grid following the same criteria as in connection with the step "peak properties group1". Each thread within the blocks performs processing related to computing a portion of third group of properties for one peak in the shape buffers, and uses Equation 6A to obtain the index within the buffers of the peak for which it computes these properties. This index is also the peak index used by the thread to write the computed peak properties into the peak properties arrays. In one embodiment, the shape buffers may not be bound to textures but may rather be read directly from device memory.

In the first kernel, each thread reads its assigned peak's shape data from three shape buffers: the intensity values buffer, the displacement values buffer (time or mass index), and the second derivative filtered data buffer. With this data, each thread in the first kernel finds the position of the shape peak apex, and computes the displacement value of the peak apex and the displacement values of the peak's inflection points. Each thread of the first kernel then writes these three values to the corresponding three peak properties arrays. Also, the first kernel computes the intensity value of the peak apex and saves it to a temporary array, which will be used by the third kernel.

In the second kernel, each thread reads its assigned peak's shape data from two shape buffers: the smooth filtered data buffer, and the first derivative filtered data buffer. With this data, each thread in the second kernel computes the position within the shape data of the peak's liftoff (e.g., peak start) and touchdown (e.g., peak end) points. Each such thread of the second kernel then writes these two positions to temporary arrays, which will be used by the third kernel.

In the third kernel, each thread reads its assigned peak's shape data from two shape buffers: the intensity values buffer, and the displacement values buffer (time or mass index). It also reads corresponding data saved in temporary arrays by the first and second kernels. With this data, each thread in the third kernel computes the displacement values of the peak's liftoff and touchdown points, the area of the peak, the peak's FWHM (full width at half maxima), and the peak's minimum area background. Then it writes these five values to the corresponding five peak properties arrays.

After all scan packs have been processed, the properties arrays contain the peak properties for all detected peaks. The location of each peak data in the arrays is determined by the peak index found by the peak detection kernel. The data in the peak properties arrays, however, is not ordered in any particular way, because the peak detection step runs multiple threads in parallel and the order in which the threads finish running the peak detection kernel is not deterministic. At this point, the peak properties arrays may be sorted by retention time. Sorting is done using any technique and may be implemented using one or more kernels. In one embodiment, the peak properties values may not actually be stored in a sorted ordering but rather another peak property of sorted indices is created. In other words, the sorted index list is a list of indices for the peaks where the indices are ordered based on the retention times of the peaks. If two or more peaks have the same retention time, they may be further ordered by mass index. An alternate sorting method may be used to sort, by retention time, the actual values in all peak properties arrays instead of using the sorted indices described above. This may provide an advantage of speeding-up the computation in the masked peaks exclusion, as the additional addressing required by the sorted indices is eliminated.

At this point, a masked peak exclusion step may be performed to finds peaks that are too close to a larger peak. To be masked by a larger peak, the peak apex may be within one sigma in time and one sigma in mass index of the larger peak. If a peak is found to be masked by another peak, it is marked as masked by writing a flag to its exclusion peak property. Also, the index into the arrays of the masking peak is written to the peak's masking ion peak property. One kernel is used to perform processing to exclude masked peaks. The kernel uses one-dimensional thread blocks and a one-dimensional grid that covers all peaks in the peak properties arrays. However, if the number of peaks exceeds the maximum grid size in one dimension, the grid dimension is reduced and the kernel is launched several times until all peaks are processed. The thread block dimension is the multiple of two warps under the maximum threads per block that produces the highest GPU occupancy. Each thread within the blocks processes one peak in the peak properties arrays, and uses Equation 6A to determine the index within the arrays of the peak it processes (referred as the current peak in the following discussion). Data from five peak properties arrays are required for this computation: peak time, peak mass index, peak intensity, peak's chrom FWHM, and sorted index. The foregoing arrays may be bound to respective textures and the threads fetch data from them when performing processing to exclude masked peaks. Alternatively, if the values in the peak properties arrays are sorted by retention time, the sorted index peak property array is unnecessary and may thereby improve performance of the kernel computations as the additional addressing required by the sorted indices is eliminated.

Each thread reads from the textures the current peak time and mass index, and computes a masking window around the current peak. This window is +/− one sigma in time and +/− one sigma in mass index. Then, the thread tests all peaks with a peak time that falls within the masking window in time. It first tests sorted peaks going backward in time until the end of the masking window, and then going forward in time until the end of the masking window. For each tested peak, the thread reads from the textures the peak mass index and the peak intensity. Then, if the test peak mass index falls within the masking window in mass index, and the test peak intensity is lower than the current peak intensity, the test peak is determined as being masked by the current peak. In this case, the thread writes a masked flag to the exclude peak property array, at the location of the tested peak, and also writes the current peak index to the masking ion peak property array, at the location of the tested peak.

Following paragraphs will now describe the additional steps required to process LC/IMS/MS data, i.e., data with ion mobility (drift). When the data includes ion mobility, it becomes four-dimensional (4D) because each data point has mobility in addition to the three dimensions (3D) discussed above of retention time, mass index, and intensity. To process 4D data, all 3D processing steps described above are done first, then, 4D specific steps are done to complete processing. To run the 3D processing steps on 4D data having the additional ion mobility dimension, the 4D data is reduced to 3D by summing all intensity values along the ion mobility axis and performing 3D processing as described above. For example, 3D processing may denote a peak based on 3 coordinates in the mass or m/z dimension, retention time dimension and intensity. When the data being processed is 4D data, the foregoing intensity as used in 3D processing has a value which is the sum of all intensity values along the ion mobility axis. After 3D processing is done, the non-excluded peaks found by 3D processing may be used as the starting point for peaks used in connection with 4D processing. These non-excluded peaks identified as a result of 3D processing (e.g., peaks which have not had the excluded property set) are called parent peaks in the 4D processing steps described below. It should be noted that peaks may have been excluded for one or more reasons based on previous 3D processing steps above. For example, a peak may be excluded as result of performing masked peak exclusion processing.

For each parent peak, a volume of 4D data associated with the parent peak is determined and such data is processed in 4D processing. The volumes dimensions are determined by the liftoff (e.g., peak start) and touchdown (e.g., peak end) points in time and in mass index found during 3D processing, and by the entire drift range.

Figure 45:
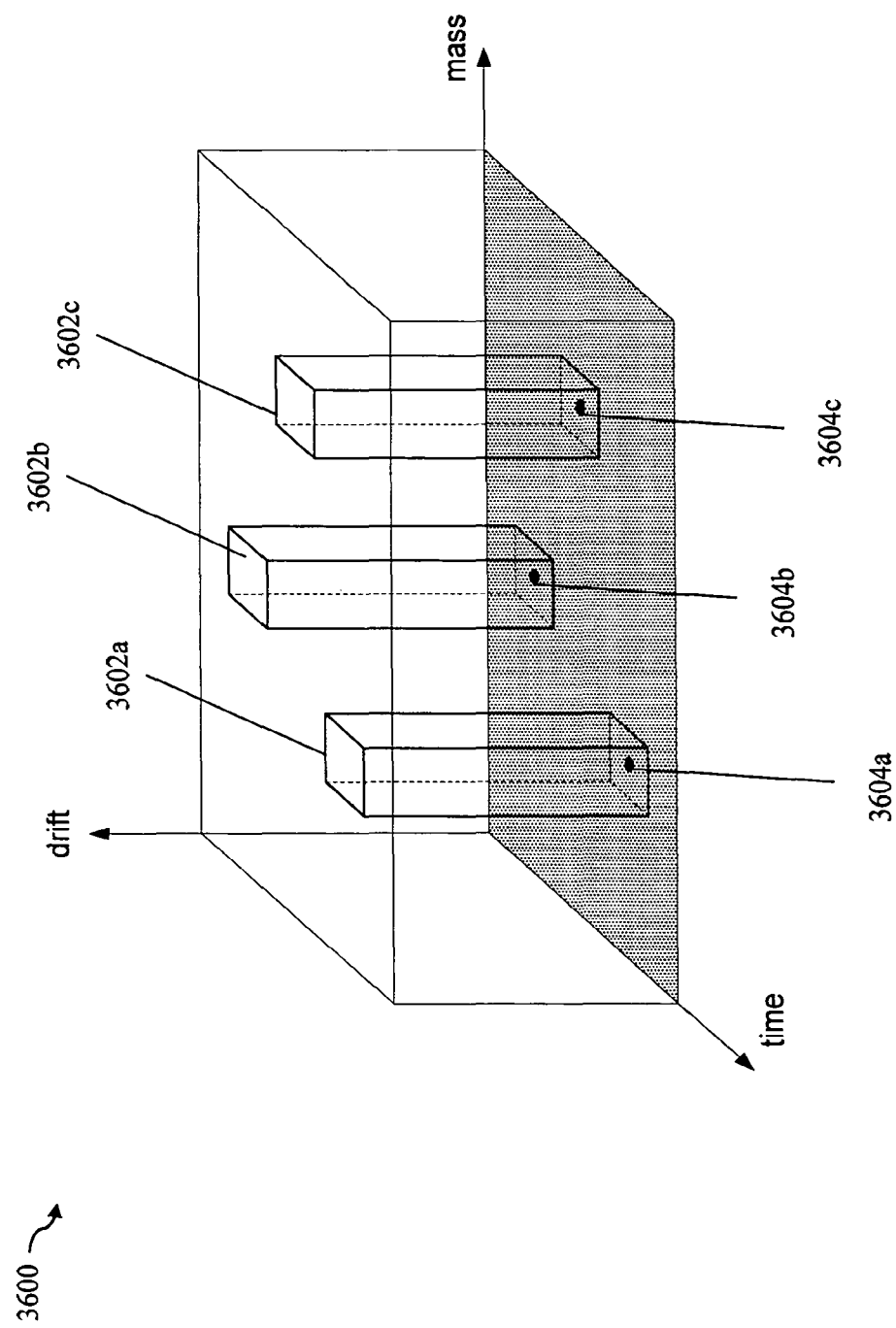

Referring to FIG. 45, shown is an example of illustrating data for three parent peaks as may be used in an embodiment in accordance with techniques herein. The parent peaks have their respective positions in the mass-time plane marked with black dots denoted 3604a-c. The volumes associated with the three parent peaks are denoted 3602a-c.

Figure 46:
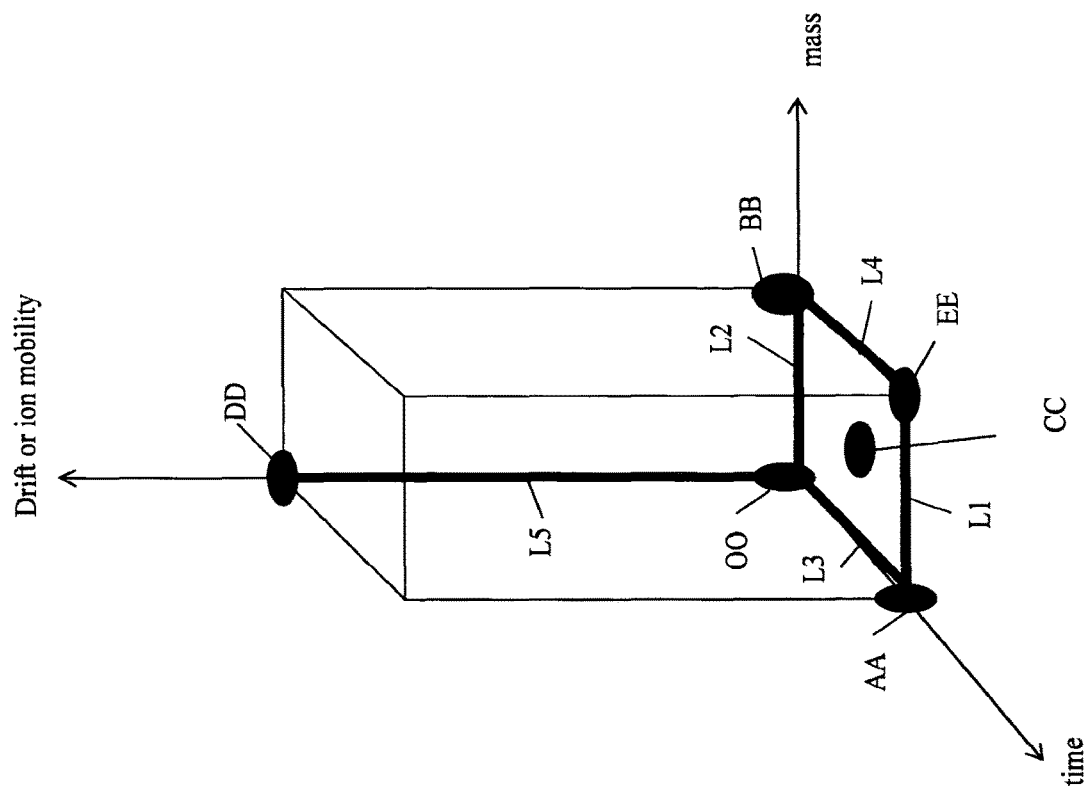

Referring to FIG. 46, shown is an enlarged view of the volume for one of the parent peaks with point CC denoting the peak's position in the mass-time plane, the line L1 (formed by points AA and EE) denotes the peak end time, the line L2 (formed by points OO (origin of the axes) and BB) denotes the peak start time, the line L3 (formed by points OO and AA) denotes the peak's starting mass, line L4 (formed by points BB and EE) denotes the peak's ending mass, and the line L5 (formed by points OO and DD) denotes the entire ion mobility or drift range. In an embodiment in accordance with techniques herein, there are two types of volumes that may be associated with each parent peak: the "data" volume and the "output" volume. The "output" volume dimensions are set as described above and illustrated in FIGS. 45 and 46 (e.g., from liftoff to touchdown in time and in mass index, and covering the entire drift range). The "data" volume is larger than the "output" volume, as it includes extra data points in each axis to account for the filter boundaries. In other words, the foregoing output volume may be augmented in size to include additional input data used in connection with different filters. The "data volume" may have a size that collectively represents the augmented size of the output volume to accommodate for the additional volume of the additional input data used by all the filtering steps. As described above, the portion and size of additional input data may vary with each type of filtering performed.

Referring to FIG. 47, shown is an example illustrating the data and output volumes described above connection with filtering in an embodiment performing 4D processing as described herein. FIG. 47 is an illustration with respect to a single data volume for a single peak. At the start of 4D processing, each parent peak "data" volume 3652 is filled with raw data. As described in more detail below, the data volume 3652 is then filtered in each axis—by applying a chrom filter, ms filter and drift filter with respect to each axis—thereby reducing the volume dimension from "data" to "output" 3658 in the axis of the filter. Hence the name "output", as it refers to the volume dimension after performing all filtering steps. The example 3650 illustrates the foregoing volume reduction process. Element 3652 represents the data volume, the set of all input data used by the filtering processes performed and which represents the dimensions of data input to the filter, described in more detail below for 4D processing. Element 3654 represents the volume output by chrom filtering plus additional raw data needed for ms and/or drift filtering. Element 3656 represents the volume output by ms filtering plus the additional raw data needed by the drift filter. Element 3658 represents the output volume produced by the drift filtering.

In connection with an embodiment herein, multiple such data volumes may be processed in parallel to filter and then determine child peaks. As described in more detail below, a child peak of a parent peak may be a peak located within the parent peak's corresponding volume as described in connection with FIGS. 45 and 46. To simply the processing for multiple parent peak data volumes in parallel, where the parent peak volumes are grouped together in device memory of the GPU, a third type of volume called the "buffer" volume may be determined. The "buffer" volume dimensions are the same for all parent peaks and are larger than the dimensions of the largest "data" volume. Each dimension of the buffer volume may have a size which is the maximum across all data volumes. It should be noted that a single data volume may not have the largest or maximum size for each of the three volume dimensions. As such, the size of each dimension of the buffer volume may be determined as a maximum across all possible data volumes. In addition, an embodiment may improve device memory accesses by also setting the "buffer" volume dimensions to the next greater multiple of half a warp for alignment. Thus, for simplicity, an embodiment may allocate storage in accordance with the buffer volume dimensions for each parent peak's data volume and such allocation is guaranteed to accommodate storage needs for all such data volumes.

As part of initialization or pre-processing step of 4D processing, code executed by the GPU and/or CPU may be executed to determine the dimensions of the buffer volume and allocate storage in the GPU device memory for storing the data volumes. Since storage of each buffer volume may not be completely utilized for each parent peak, an embodiment may track where each peak's data volume is actually located within the buffer volume. All parent peaks "data" and "output" volume dimensions, as well as the "data" volume start and stop coordinates (lower and upper corners) are saved to respective arrays indexed by parent peak index. The foregoing four pieces of information for each buffer volume may be stored in four arrays—one array for each of data volume dimensions, output volume dimensions, data volume start coordinates and data volume stop coordinates. In connection with 4D processing as described in more detail below, data regarding the parent peaks (e.g., parent peak coordinates, properties, and the like) may be read and sorted by retention time, therefore, this same ordering may be applied to the foregoing four arrays. The size of the arrays is the number of parent peaks. Such arrays may be initially stored in host memory and then copied to the GPU's device memory to be used during processing by the GPU. Each element in the foregoing four arrays has four values (x, y, z, and w coordinates). In the case of the "data" and "output" volume dimensions arrays, the four values for an array element are: mass index (x), drift (y), time (z), and parent index in the 3D peak properties arrays (w). For the array containing the start point of the "data" volumes, each array element has the following four values: mass index (x), drift (y), time (z), and ms filter boundary at the start point (w). For the array containing the stop point of the "data" volumes, each array element has the following four values: mass index (x), drift (y), time (z), and ms filter boundary at the stop point (w).

The parent peaks are processed in order as they appear in the list (the four arrays described above) and are sorted by retention time. Like in 3D processing, 4D processing is done in scan packs, although the criteria to choose the size of the scan packs is different. The intent is to read a pack of raw data scans and process in order as many parent peaks as possible with the data contained in the scan pack. In following paragraphs, a scan is referred as the group of 200 sub-scans, or drift scans, that determine the 200 possible drift values. In other words, 200 drift scans may be included within a "regular" scan of raw data as output by the LC/IMS/MS system.

To determine the number of scans in a scan pack, an embodiment may perform processing (such as by code executing on the CPU and/or GPU) to determine the number of scans contained in the largest "data" volume in time, and set the scan pack size to twice that number of scans. This guarantees that all parent peak volumes assigned to a scan pack can be processed with the current and the previous scan packs as explained below. The number of scan packs required is determined based on the total number of scans to process.

Given a scan pack size, a 4D preprocessing step may include determining the first and last parent peak index in the list of parent peaks that are assigned to each scan pack. The foregoing parent peak indices may then be save in respective arrays, one containing the peak indices of every first parent in a scan pack, and other containing the peak indices of every last parent in a scan pack. The size of these arrays is the number of scan packs.

Since a parent peak's data volume may actually span scan packs, an embodiment may use criteria based in the parents' data volumes stop time to determine the parent peaks assigned to each scan pack. As long as consecutive parent peaks' data volume stop times fall within the scan pack, those peaks are assigned to, and also processed during, the scan pack. The last parent peak assigned to a scan pack is one before the first parent peak in the list with a data volume stop time beyond the scan pack. This is not necessarily the same as the last peak with a data volume stop time within the scan pack as explained below. Of all parent peaks assigned to a scan pack, the current scan pack, many have a data volume start time also falling within the scan pack. However, it is also possible that there are one or more parent peaks assigned to a scan pack where each such parent peak has its data volume's start time falling within the previous scan pack. Thus, since a parent peak's data volume may span multiple scan packs, two scan packs may be stored in memory in connection with 4D processing described herein and the scan packs may be sized as described above. As mentioned previously, the parent peaks are sorted in ascending order of retention time and so are their data volumes. However, as each data volume dimension in time is different, the data volumes are not necessarily sorted by data volume stop time. It is guaranteed, though, that a peak's volume stop time is always greater than any prior peak's data volume start time. Based on the above, it is possible that a peak that would have normally been assigned to a scan pack due to its stop time, may be assigned to the next scan pack because it is located in the list after another peak with greater stop time. This, however, does not represent a problem because the peak assigned to the next scan pack will be processed in the next scan pack but using data from the previous scan pack.

An alternative method to distribute parent peaks in the scan packs is to sort them by stop time. Therefore, a peak is assigned to a scan pack if its stop time is within the scan pack. The scan pack sizing criterion described above still applies, and guarantees that each parent peak volume can be processed using only the current and the previous scan packs. This method of parent peak distribution enables the alternate method of duplicate peak exclusion described in processing for excluding identical duplicate 4D peaks elsewhere herein.

To process all parent peaks assigned to a scan pack in parallel, the parent peaks' "buffer" volumes are set together in device memory for processing by various CUDA kernels. However, if the number of parent peaks assigned to the scan pack is larger than a threshold number, the amount of device memory required may be prohibitive. Therefore, an embodiment may partition all parent peaks assigned to a scan pack into groups of parent peaks. As such, the parent peaks assigned to a scan pack may be concurrently processed by group rather than process all parent peaks within a single scan pack concurrently. The number of parent peaks in a group may be selected such that all the "buffer" volumes for the group use a reasonable or acceptable amount of device memory. It should be noted that the collective or total amount of memory which is acceptable for a peak group may vary with embodiment.

There are several device memory allocations needed for 4D processing. An amount of device memory in the GPU may be allocated to store the current and the previous scan packs of raw data. For each, there is memory allocated for consecutive blocks of compressed mass indices and compressed intensity values. This is described in more detail below in connection with processing to read 4D raw data. The largest allocation is for a device memory buffer to hold the "buffer" volumes of all parent peaks in a group. In one embodiment, three of these buffers are needed for 4D processing due to the various filtering steps. In one embodiment, these three buffers—referred to as B1, B2 and B3 below—may be reused several times during the filtering steps. Each of the buffers B1-B3 may have the same size and may be organized as a matrix where each row contains the data points of the "buffer" volume of one parent peak.

FIG. 48 shows an example of a device memory buffer containing the "buffer" volumes of "P" parent peaks in a group, where each volume contains "B" data points. With reference to FIG. 48, the data points of each buffer volume are distributed linearly in the buffer, with each row of the matrix containing data for one of the buffer volumes. The linear indexing precedence is x axis first (volume mass index), y axis second (volume drift), and z axis last (volume time). Equation 9A given below may be used to find the linear index p in the buffer, corresponding to a point in the parent peak data volume with volPointLocal coordinates, where volDimBuffer are the dimensions of the "buffer" volume.

$$p = volPointLocal.z * volDimBuffer.y * volDimBuffer.x +$$
$$volPointLocal.y * volDimBuffer.x + volPointLocal.x$$
EQUATION 9A An alternate layout for these buffers illustrated in FIG. 48 may be to set the buffer volume data in columns instead of rows. This layout may result in a performance increase due to improved device memory access if each thread reads data from only one of the columns. Other alternatives may include, for example, binding each buffer volume to a 3D texture to take advantage of the texture cache and easy texture addressing. However, the number of textures that can be bound at any given time may be limited and may also therefore limit the number of parent peaks that can be computed in parallel.

What will now be described are thread blocks that may be used in an embodiment in connection with 4D processing. Most of the kernels used in 4D processing use three-dimensional thread blocks to cover the "buffer" volume of each parent peak in a group of parent peaks. The thread block dimensions may be set to cover the "buffer" volume dimensions with an integer number of thread blocks, and their form factor (relative thread block dimension in each axis) may be selected to favor the specific computation performed in each kernel. The number of threads per block are set below the maximum (as may vary with embodiment) and the GPU occupancy is computed. If the GPU occupancy is below a set threshold, the largest thread block dimension may be reduced in half.

A peak's linearly arranged buffer volume may be mapped to threads included in multiple 3D thread blocks. Thus, for each kernel using 3D thread blocks, the "buffer" volume dimension in terms of thread blocks is computed and used to reference a thread's to corresponding buffer volume point (e.g., point in the buffer volume processed by the thread). Each thread may also perform processing for more than one buffer volume point in each axis to reduce kernel overhead and improve performance. The grid of thread blocks used may be two-dimensional, such that the parent peaks in a group are distributed along the y dimension, and all the blocks from each parent peak "buffer" volume are aligned linearly along the x dimension.

Figure 49:
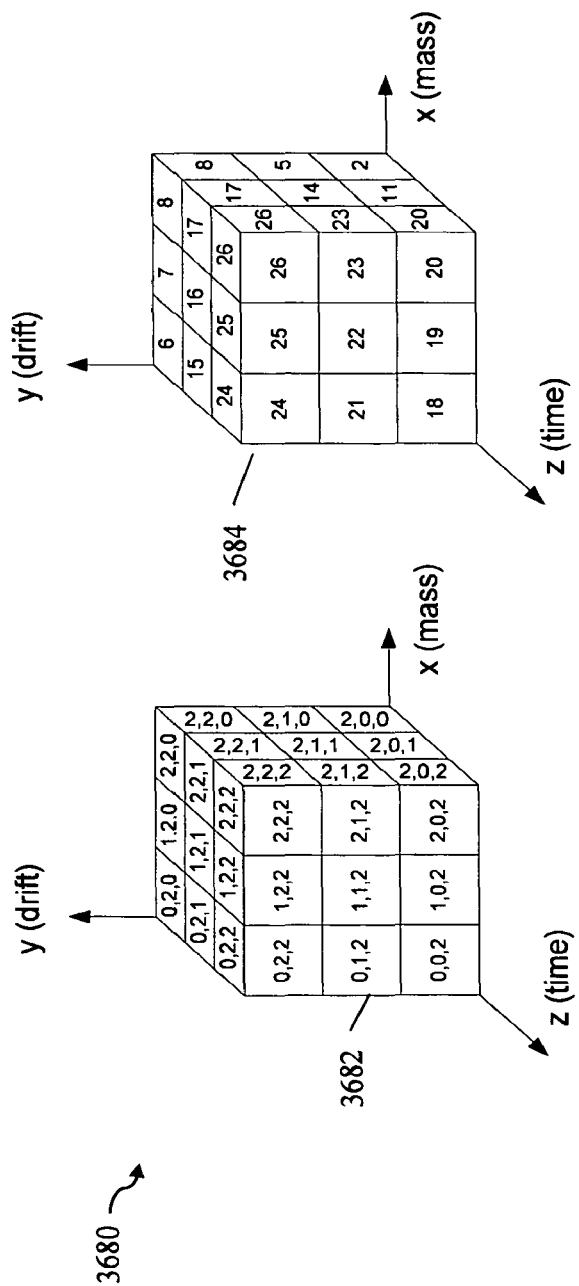
FIG. 49 is an example of thread block indices in an embodiment in accordance with techniques herein.

Referring to FIG. 49, shown is an example of a "buffer" volume covered by 27 thread blocks with three-dimensional, or volumetric, indices shown on the left 3682, and the corresponding linear indices shown on the right in 3684. In connection with 3684, linear block 0 is at the lowest values corner, and block 26 is at the highest values corner. The linear block indexing precedence is x axis first (mass index), y axis second (drift), and z axis last (time). The three-dimensional block indices used in connection with 3682 form an imaginary three-dimensional grid, and the linear block indices form the actual grid used. The 3D grid 3682 may be used in connection with threads identifying the volume point processed by each thread.

Table 13 shows how the thread blocks from P parent peaks as in the example of FIG. 49 are distributed in the actual 2D grid of thread blocks.

TABLE 13

| Parent peak index | Blocks' linear indices | | | | | | | |
|---|---|---|---|---|---|---|---|---|
| 0 | 0 | 1 | 2 | 3 | 4 | — | 25 | 26 |
| 1 | 0 | 1 | 2 | 3 | 4 | — | 25 | 26 |

TABLE 13-continued

| Parent peak index | Blocks' linear indices | | | | | | | |
|---|---|---|---|---|---|---|---|---|
| 2 | 0 | 1 | 2 | 3 | 4 | — | 25 | 26 |
| — | 0 | 1 | 2 | 3 | 4 | — | 25 | 26 |
| P-1 | 0 | 1 | 2 | 3 | 4 | — | 25 | 26 |

In one embodiment, P parent peaks may be processed concurrently. Each thread finds the parent peak index of the buffer volume point it processes reading blockIdx.y, the y coordinate of the actual 2D grid of thread blocks. To identify the buffer volume point (within the volume buffer of the parent peak, blockIdx.y) each thread processes, the thread first finds the linear index of the thread block reading blockIdx.x, the x coordinate of the actual 2D grid, and computes the corresponding three-dimensional block index in the imaginary 3D grid (e.g., element 3682 of FIG. 49). The "buffer" volume in terms of thread blocks is used in this computation The thread then uses Equation 10A below to compute the local coordinates of the volume point within the "buffer" volume.

$$volPointLocal.x = volBlockIdx.x * blockDim.x * ptsPerThread.x + threadIdx.x$$

$$volPointLocal.y = volBlockIdx.y * blockDim.y * ptsPerThread.y + threadIdx.y$$

$$volPointLocal.z = volBlockIdx.z * blockDim.z * ptsPerThread.z + threadIdx.z$$
Equation 10A In Equation 10A, volPointLocal are the local coordinates of the point in the data volume, volBlockIdx is the three-dimensional block index computed (e.g., as described above in connection with an example of an imaginary 3D volume 3682), blockDim are the thread block dimensions, ptsPerThread are the number of points processed by each thread in each axis, and threadIdx is the thread index within the block. Once the thread has the local coordinates of the data volume point as determined in accordance with Equation 10A, the thread may then use Equation 9A to find the location of the point's data within the buffers (e.g., as expressed linearly). The thread uses this location to perform read/write operations on the point's data as stored in the one-dimensional array of a data volume buffer.

It should be noted that an embodiment may use other techniques to map one or more data points processed to a particular thread than as described herein.

What will now be described is a summary of steps performed in connection with 4D processing. In following paragraphs, a "child" peak is a peak found as a consequence of 4D processing on a parent peak. A parent peak can have one or more child peaks, or none in some cases. Due to volume data overlapping among parent peaks, some parent peaks may find the same child peak. This is considered an identical duplicate child peak, and all but one of them is excluded from the list of child peaks. The processing sequence in an embodiment may include the following:

1. Read the next scan pack of raw data
  1.1 Process the next group of parent peaks assigned to the current scan pack by performing, for all parent peaks in the current group:
    Fill parent peak data volumes with raw data
    Filter data volumes to generate output volumes
    Run peak detection on output volumes to find child peak 1.2 Go to 1.1 if there are remaining parent peaks to process in the current scan pack
2. Go to 1 if there are remaining scan packs to process
3. Compute peak properties in all child peaks found
4. Sort child peak list by retention time
5. Exclude duplicate child peaks In the foregoing sequence, the last 3 steps may be performed after all child peaks of all parent peaks have been identified. An alternative variation to the foregoing that may be performed in an embodiment may be to run the peak properties computation step 3 and the exclude duplicates step 5, after each group of parent peaks have been processed. This may decrease the amount of memory required to save identical duplicate child peaks, which can be substantial if the number is excessive. In connection with this alternative sequence, an embodiment would then run the exclude duplicate step 5 a second time at the end after all child peaks have been found because there may be identical duplicate child peaks found in different groups of parent peaks.

In connection with reading the 4D raw data, an embodiment may store the 4D raw data in a compressed form which may be uncompressed for processing using techniques herein. Such decompression may be performed by the GPU. In one embodiment, for example, the raw data may be a compressed form which stores all non-zero intensity values. It is assumed that if a particular 4D raw data point has no intensity specified, then it is zero. The decompression may be performed concurrently with a thread performing decompression with respect to one or more points. In one embodiment, the 4D raw data file contains compressed scan data packed in blocks. There are two types of blocks, one packs all non-zero intensity values from all 200 drift scans in a regular scan, and the other type of block packs the mass indices values where those intensities are located. A first file may store the two type of blocks of each regular scan in sequence as shown in FIG. 50A, where N is the number of regular scans in the file. Another file (not shown) may include the size of the blocks and the number of points in each drift scan in each block. To decompress the blocks using the GPU, we read the blocks for all the scans in a scan pack. The scan pack data may then be stored in two arrays illustrated in FIG. 50B. Array 3722 contains all mass indices blocks in sequence, and the other array 3724 contains all intensity blocks in sequence, where S is the number of scans in the scan pack. Another two arrays may be created and used for fast addressing of the blocks. One contains the number of points in each drift scan in the blocks, and the other contains the offset to each drift scan from the start of the arrays of blocks. Within GPU memory, there are two sets of these four arrays—one for the current scan pack and other for the previous scan pack. Both sets are copied to device memory of the GPU to be used in connection with processing to fill the data volumes of parent peaks.

In connection with filling the "data" volumes of all parent peaks in a group with raw data to start processing, the raw data is read from the device memory arrays described above and may be decompressed in the GPU while the volumes are being filled. Only buffer B1 of the three buffers described above is filled with data. One kernel may be used to perform processing to fill the data volumes. The kernel may use three-dimensional thread blocks and a two-dimensional grid as described above in connection with thread blocks for 4D processing (e.g., FIG. 49). Each thread fills one or more data volume points into a buffer for one parent peak. Raw data is not read directly from the eight device memory arrays created above (e.g., four for the current scan pack and four for the previous scan pack). Instead, the foregoing arrays of raw scan pack data may be bound to respective textures and the threads fetch data from the textures. The kernel uses the arrays of start and stop points of the "data" volumes, also bound to textures. Each thread uses Equation 10A to find the local coordinates within the volume of the point it is processing. Then, the thread uses the data volume start point to convert the local coordinates into global coordinates (e.g., position with respect to the mass, drift, and time axes) within the raw data. For example, a thread may use Equation 10A to obtain local coordinates of a point (e.g., within the volume such as illustrated by FIG. 46). However to read and identify points in the raw data, global coordinates of the point (e.g., within the entire raw data set) may be used. A thread may determine such global coordinates by adding a volume's starting point coordinates (e.g., lower left corner of the volume or point of origin of the axes) to the local coordinates. With reference to FIGS. 45 and 46, the local coordinates may identify a location of a point with one of the illustrated volumes and the global coordinates for the point may be with respect to the entire data set including other volumes such as illustrated in FIG. 45. These global coordinates can only fall within the current or the previous scan pack according to how the scan packs are sized and how parent peaks are assigned to a scan pack. In an embodiment in which one thread processes a single data point, there may be as many threads as points in the "buffer" volume, but only those threads handling a point within the "data" volume process the point. Given the global coordinates, each thread may identify the drift scan that contains the intensity and the mass index of the point it handles. Using the array of drift scan offsets and the array of number of points in each drift scan, the thread may determine the begin and end points of the drift scan within the array of intensities blocks and within the array of mass index blocks as illustrated in FIG. 50B.

It should be noted that the drift scan may not be entirely decompressed. Rather, an embodiment may perform decompression of the drift scan as needed on a per point basis. In one embodiment, the thread may use a binary search to find, within the mass index values of the drift scan, the mass index of the point it handles. If it finds a match, the intensity of the point is at the corresponding location within the intensities values of the drift scan. Otherwise, the intensity of the point is zero. If the point handled by the thread is beyond the limits of the data, the intensity of the point may be computed using reflection as described above in connection with 3D processing. Reflection may be used as a technique to generate data with respect to the drift and time axes. Points beyond the mass axis limits may be set to zero. The thread may use Equation 9A to write the intensity of the point to the corresponding location within buffer B 1.

In this step, the "data" volumes of all parent peaks in a group are filtered to prepare them for peak detection. The volumes are filtered in each axis with smooth and second derivative type filters that may be generally summarized in 3 filtering sequences as follows. Within a single sequence, the output of the previous step serves as input to the next step in the sequence with the first step in the sequence using the uncompressed raw data as input.

Filtering sequence 1:
  i. Perform filtering of data volume in the time dimension using the second derivative filter.
  ii. Perform filtering of i) output in the mass dimension using a smooth filter.
  iii. Perform filtering of ii) output in the drift dimension using a smooth filter producing output A1.

Filtering sequence 2:
  i. Perform filtering of data volume in the mass dimension using the second derivative filter.
  ii. Perform filtering of i) output in the time dimension using a smooth filter.
  iii. Perform filtering of ii) output in the drift dimension using a smooth filter producing output A2.

Filtering sequence 3:
  i. Perform filtering of data volume in the drift dimension using the second derivative filter.
  ii. Perform filtering of i) output in the time dimension using a smooth filter.
  iii. Perform filtering of ii) output in the mass dimension using a smooth filter producing output A3.

The final filtering output may be the average of the above-noted intermediate outputs A1, A2 and A3.

An embodiment may perform a variation of the foregoing generalization of 9 filtering steps so that only 8 filtering steps included in 3 sequences is performed. As explained above and illustrated in connection with FIG. 47, the data volume dimensions are reduced from the "data" dimension to the "output" dimension in the axis of the filter after each filtering step of a sequence. Therefore, a second stage or filtering step within a sequence does not have to filter the entire "data" volume, but only part of it because the volume has been reduced by the first stage or step within a sequence in one of its axis. The same applies to a third stage or filtering step within a sequence. As such with respect to a sequence of filtering steps or stages, an embodiment may use in the first stage the filter in the axis of the smallest "data" volume dimension followed by successively filtering with respect to the remaining axes in the order in which dimensions of the data volume increase. This typically corresponds to the order: chrom filter==>ms filter==>drift filter, as the volumes normally have less points in the time axis and the most points in the drift axis. The final filter result is the same regardless of the order in which the filtering is performed but a preferred ordering achieves the result with less computation and 8 filtering steps described below in more detail.

The three buffers B1, B2 and B2 described above are used for filtering, and B1, which contains raw data, is the starting point for the filter sequence. The three buffers are reused several times during when performing filtering either as input or output of a filter step.

Figure 51:
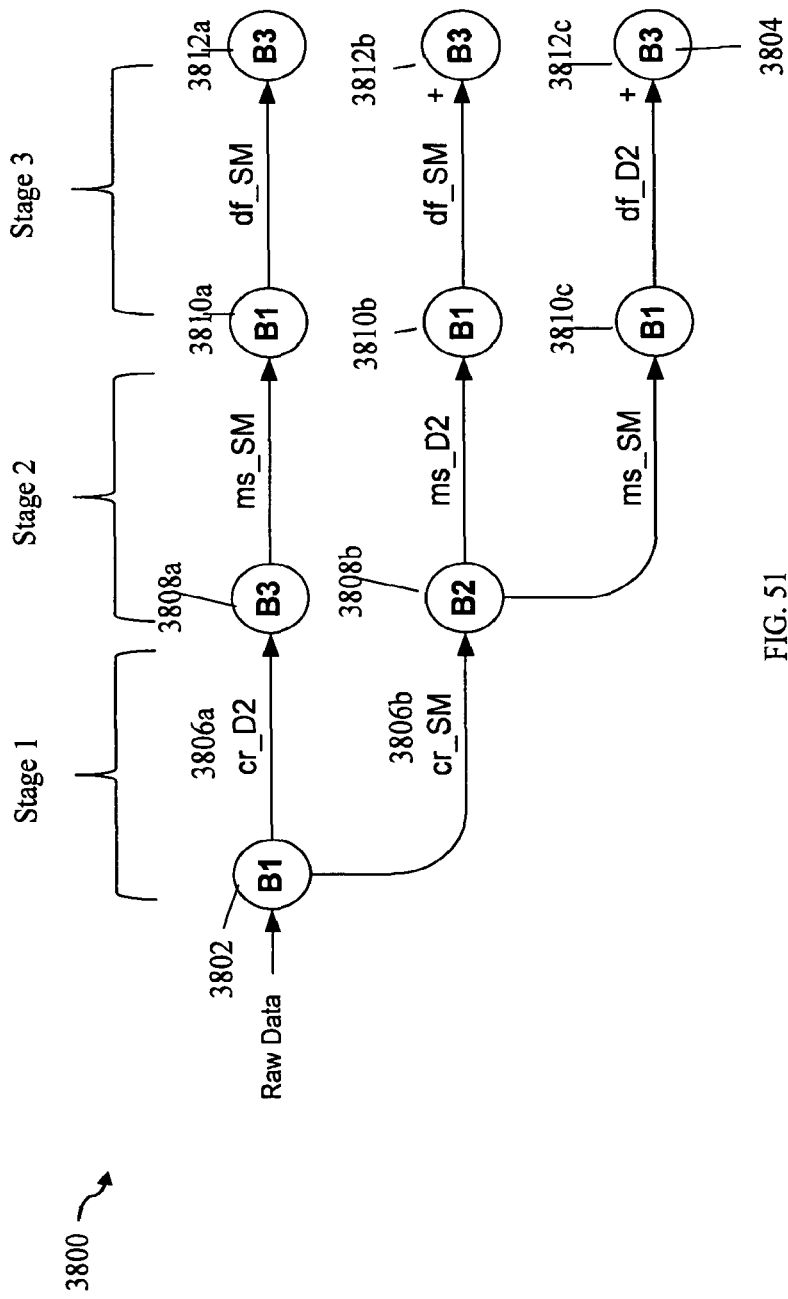
FIG. 51 is an example illustrating filtering steps that may be performed in an embodiment in accordance with techniques herein.

Referring to FIG. 51, shown is an example of filtering steps that may be performed in an embodiment in accordance with techniques herein. In the example 3800, the arrows connecting the circles represent filter steps, and the circles represent the input and output buffer used by a filter step. In an embodiment using the three buffers described above as B1, B2 and B3, the particular buffers used with each filtering step are so denoted. Each filter step name is labeled over the arrows of FIG. 51 where the filter step name has a general form of "prefix_suffix", where prefix denotes the axis of the filter, and the name suffix denotes the type of filter:

| | | |
|---|---|---|
| cr | Chrom filter | (time axis) |
| ms | Ms filter | (mass axis) |
| df | Drift filter | (drift axis) |
| SM | Smooth type filter | |
| D2 | Second derivative type filter | |

The "+" sign next to a buffer denotes that the filter step does not overwrite the output buffer, but instead it accumulates the filter output with the current content of the buffer.

In connection with FIG. 51, several items may be noted. In an embodiment which performs filtering as illustrated in FIG. 51, there are a total of eight filter steps (rather than 9) and three is the minimum number of buffers required. There are three filter sequences (three rows) and three filter steps or stages in each sequence (from raw data to output). Each sequence has a filter in each axis and only one second derivative type filter. In each sequence, the chrom filter is first, followed successively by the ms filter and the drift filter. Buffer B1 at 3802 is the input to the entire filtering process and contains raw data as explained above in connection with filling the buffer volumes with raw data. Buffer B3 at 3804 is the final output of the filter sequence and contains the average of the outputs from the three sequences To run the foregoing 8 filtering steps, both chrom filter steps (3806a, 3806b) are run first to free buffer B1. Then, the remaining steps of each of the three sequences are completed in order, i.e., from top to bottom according to FIG. 51 (e.g., filtering then proceeds as ms_SM, df SM, ms_D2, df SM, ms_SM, df SM).

What will now be described is the kernel used in connection with performing chrom filtering of the data volumes (e.g. filtering with respect to the time dimension). The chrom filter step (cr) filters in the time axis an input buffer containing volume data from all parent peaks in a group and is the first stage in the filter sequence of FIG. 51, so the input buffer is buffer B1 containing raw data volumes. Both types of chrom filters, smooth and second derivative, are computed at once in this first stage and their outputs are stored in buffers B2 3808b and B3 3808a respectively. The raw data input volumes have the "data" dimension in all three axes, as they include filter boundary points. Note, however, that as a result of each filtering step, the output volumes are smaller than the corresponding input volumes (See, for example, FIG. 47). As illustrated in FIG. 51, the order in which the filters are run is: Time axis==>Mass axis==>Drift axis. Each filter receives the input volumes with "data" dimension in the axis of the filter, but outputs the volumes with "output" dimension in that axis, leaving the dimensions in other two axes unmodified. Therefore, the volume dimensions before and after a chrom filter step are as shown in Table 14

TABLE 14

| Volume dimensions | Time axis | Mass axis | Drift axis |
|---|---|---|---|
| Input volume | data | data | data |
| Output volume | output | data | data |

The chrom filters use the same set of filter coefficients for all data points, but each chrom filter type (smooth SM or second derivative 2D) uses a different coefficient set. The coefficients sets are stored in constant memory.

Only one kernel is used to compute both chrom filters (cr_D2 3806a and cr_SM 3806b) in the same kernel launch. Therefore, the input buffer is read only once. The kernel uses three-dimensional thread blocks and a two-dimensional grid as described in above in connection with thread blocks for 4D processing (see, for example, FIG. 49 and discussion above). Each thread may perform filtering of one or more volume points for one parent peak. The input buffer is not read directly from device memory, but it may be bound to a texture and the threads fetch data from the texture. The kernel uses the array of "data" volumes dimensions and the array of "output" volume dimensions as described above and which may also be bound to textures. Each thread uses Equation 10A to find the local coordinates within the volume of the point it is processing. There are as many threads as points in the "buffer" volume, but only those threads handling a point within the "output" volume dimension in the time axis, and within the "data" volume dimension in the mass and drift axes, process the point. These are the threads that produce a point in the output buffers (see Table 14 above). Each thread that produces an output point, fetches the necessary data points from the input buffer texture, reads the filter coefficients from constant memory for each of the two filters, and computes each filter output point according to Equation 3A. Finally, the thread uses Equation 9A to write each filtered output points to the corresponding location within the buffers B2 and B3.

What will now be described is the kernel used in connection with performing ms filtering of the data volumes (e.g. filtering in the mass or m/z dimension). The ms filter step filters, in the mass dimension or axis, an input buffer containing volume data from all parent peaks in a group. This is the second stage of FIG. 51, so the input buffer is either buffer B2 3808b or buffer B3 3808a containing chrom filtered data volumes. The filter is of the smooth or second derivative type depending on the sequence, but the output is always stored in buffer B1 (e.g. as denoted by 3810a-c). The raw data input volumes have the "data" dimension in all three axes, as they include filter boundary points. Note, however, that as a result of each filter action, the output volumes are smaller than the corresponding input volumes as described above (e.g., see FIG. 47). The order in which the filters are run is: Time axis==>Mass axis==>Drift axis. Each filter receives the input volumes with "data" dimension in the axis of the filter, but outputs the volumes with "output" dimension in that axis, leaving the dimensions in other two axes unmodified. Therefore, the volume dimensions before and after a ms filter step are as shown in Table 15:

TABLE 15

| Volume dimensions | Time axis | Mass axis | Drift axis |
| --- | --- | --- | --- |
| Input volume | output | data | data |
| Output volume | output | output | data |

As described above in connection with the 3D ms filter, the 4D ms filter uses a different set of coefficients for each mass index value. The coefficients are organized in a matrix of aligned coefficients as in Table 11 but with each row reversed as shown in Table 16 below, which shows an example with 12 coefficient sets. Each row has the center coefficient followed by the second half of the coefficients in Table 16.

TABLE 16

| Mass point | Reversed coefficients matrix | | | | Num coeffs |
| --- | --- | --- | --- | --- | --- |
| 0 | $C0_0$ | $C0_1$ | 0 | 0 | 3 |
| 1 | $C1_0$ | $C1_1$ | 0 | 0 | 3 |
| 2 | $C2_0$ | $C2_1$ | 0 | 0 | 3 |
| 3 | $C3_0$ | $C3_1$ | 0 | 0 | 3 |
| 4 | $C4_0$ | $C4_1$ | $C4_2$ | 0 | 5 |
| 5 | $C5_0$ | $C5_1$ | $C5_2$ | 0 | 5 |
| 6 | $C6_0$ | $C6_1$ | $C6_2$ | 0 | 5 |
| 7 | $C7_0$ | $C7_1$ | $C7_2$ | 0 | 5 |
| 8 | $C8_0$ | $C8_1$ | $C8_2$ | $C8_3$ | 7 |
| 9 | $C9_0$ | $C9_1$ | $C9_2$ | $C9_3$ | 7 |
| 10 | $C10_0$ | $C10_1$ | $C10_2$ | $C10_3$ | 7 |
| 11 | $C11_0$ | $C11_1$ | $C11_2$ | $C11_3$ | 7 |

There are two coefficient matrices for use with ms filtering, one for the smooth filter type and other for the second derivative filter type. Both matrices are copied to device memory, as well as the respective arrays of number of coefficients shown in the example of Table 16.

An embodiment may use one kernel to compute the ms filters. The kernel computes either a smooth filter type or a second derivative filter type depending on the coefficient matrix passed to the kernel. The kernel uses three-dimensional thread blocks and a two-dimensional grid as described above in connection with thread blocks for 4D processing. Each thread filters multiple volume points for one parent peak. The input buffer is not read directly from device memory, but may rather be bound to a texture. The threads may fetch data from this texture. The kernel uses the array of "data" volumes dimensions, the array of "output" volume dimensions, and the array of start points of the "data" volumes as described above where the foregoing may also be bound to textures. The kernel uses shared memory to read the array of number of coefficients, and the matrix of coefficients is bound to a texture. Each thread uses Equation 10A to find the local coordinates within the volume of the point it is processing. There are as many threads as points in the "buffer" volume, but only those threads handling a point within the "output" volume dimension in the time and mass axes, and within the "data" volume dimension in the drift axis, process the point. These are the threads that produce a point in the output buffer (see Table 15). Each thread that produces an output point fetches the necessary data points from the input buffer texture, reads the required number of coefficients from shared memory, fetches the required filter coefficients from the coefficients texture, and computes the filter output point according to Equation 2A. The thread uses Equation 9A to write the filtered output point to the corresponding location within the output buffer (buffer B1 as denoted in 3810a-c).

What will now be described is the kernel used in connection with performing drift filtering of the data volumes (e.g. filtering in the ion mobility or drift dimension). The drift filter step filters, in the drift axis, an input buffer containing volume data from all parent peaks in a group. This is the third stage as denoted in FIG. 51 where the input buffer is buffer B1 containing chrom and ms filtered data volumes. The filter is of the smooth or second derivative type depending on the sequence, but the output is always stored in buffer B3 (e.g., see 3812a-c). The first sequence writes to buffer B3 (3812a), and the second and third sequences accumulate to buffer B3 (see 3812b and c respectively). The raw data input volumes have the "data" dimension in all three axes, as they include filter boundary points. Note, however, that as a result of each filter action, the output volumes are smaller than the corresponding input volume (see, for example, FIG. 47). The order in which the filters are run is: Time axis==>Mass axis==>Drift axis. Each filter receives the input volumes with "data" dimension in the axis of the filter, but outputs the volumes with "output" dimension in that axis, leaving the dimensions in other two axes unmodified. Therefore, the volume dimensions before and after a drift filter step are as shown in Table 17

TABLE 17

| Volume dimensions | Time axis | Mass axis | Drift axis |
|---|---|---|---|
| Input volume | output | output | data |
| Output volume | output | output | output |

Similar to the ms filter, the drift filter uses a different coefficient set for each drift value. The coefficients are organized in a matrix as in the example of Table 16, where each row has the center coefficient followed by the second half of the coefficients. There are two coefficient matrices, one for the smooth filter type and other for the second derivative filter type. Both matrices are copied to device memory, as well as the respective arrays of number of coefficients shown in the example of Table 16.

An embodiment may use one kernel to compute the drift filters. The kernel computes either a smooth filter type or a second derivative filter type depending on the coefficient matrix passed to the kernel. The kernel uses three-dimensional thread blocks and a two-dimensional grid as described in connection with thread blocks for 4D processing elsewhere herein. Each thread may filter one or more volume points for one parent peak. The input buffer is not read directly from device memory, but may rather be bound to a texture and the threads may fetch data from the texture. The kernel uses the array of "output" volume dimensions, and the array of start points of the "data" volumes, as described above, which may also be bound to textures. The kernel may use shared memory to read the array of number of coefficients, and the matrix of coefficients is bound to a texture. Each thread uses Equation 10A to find the local coordinates within the volume of the point it is processing. There are as many threads as points in the "buffer" volume, but only those threads handling a point within the "output" volume dimension in all three axes process the point. These are the threads that produce a point in the output buffer (see Table 17). Each thread that produces an output point fetches the necessary data points from the input buffer texture, reads the required number of coefficients from shared memory, fetches the required filter coefficients from the coefficients texture, and computes the filter output point according to an equation equivalent to Equation 2A. The thread may use Equation 9A to write or accumulate the filtered output point to the corresponding location within the output buffer (buffer B3).

What will now be described is 4D peak detection. The peak detection in 4D reads the final filter output buffer (e.g., B3 3804 of FIG. 51)) containing filtered volume data from all parent peaks in a group, and finds all peak apices inside each parent volume. These are the child peaks of each parent peak. A peak apex is determined by finding a local maxima, i.e., a point with an intensity value greater than the intensity of its 26 neighbor points in the volume, and greater than a certain intensity threshold. When a peak apex is found, its global coordinates within the data (e.g., position or coordinates with respect to the mass, drift, and time axes) are saved to a detected peak array in device memory, and a detected peak counter is incremented. The location assigned to the peak coordinates in the detected peak array is used to identify the peak in subsequent processing steps. The detected peak array elements have four values (x, y, z, w). The first three coordinates are used to save the detected peak global coordinates, and the w coordinate is used to save the parent peak index, or alternatively, the parent peak index within the 3D peak properties arrays. Two other device memory arrays are used to save data required for peak properties computation. Both arrays contain elements with four values (x, y, z, w). The elements of one of these arrays contain the intensity of the low neighbor point in each axis, mass index (x), drift (y), and time (z), and the central point intensity in the w coordinate. The elements of the other array contain similar information but for the high neighbor point in each axis, and the distance to the parent peak apex in the w coordinate. It should be noted that the foregoing information regarding the low and high neighbors may be used in connection with performing 3-point interpolation described below. One last device memory array may be used to save the number of child peaks found per parent peak. The size of this array is the number of parent peaks.

An embodiment may use one kernel to run 4D peak detection in a group of parent peak volumes. The kernel uses three-dimensional thread blocks and a two-dimensional grid as described in connection with thread blocks for 4D processing elsewhere herein. Each thread may process one or more volume points for one parent peak. An embodiment may bound the input buffer to a texture rather than read the input buffer directly from device memory. In this case, the threads fetch data from the texture. The kernel may use the array of "output" volume dimensions, and the array of start points of the "data" volumes described above which may also be bound to textures. Each thread uses Equation 10A to find the local coordinates within the volume of the point it is processing. In an embodiment processing one point per thread, there may be as many threads as points in the "buffer" volume, but only those threads handling a point within the "output" volume dimension in all three axes process the point. Threads handling points at the borders of the volume may not process the point because they do not have a neighbor beyond the volume data. Each thread that processes a point fetches the central point from the input buffer texture. If the point intensity is above a given threshold, the thread fetches the 26 neighbor points and finds if the central point is a local maxima. If a local maxima is found, the central point is the location of a child peak. As mentioned above, once a thread finds a peak, it increments the counter of detected peaks and saves the peak's global coordinates to the array of detected peaks. The incremented value of the counter is the location in the array where the peak's coordinates are saved. Given that all threads in the thread block run in parallel, the order in which those threads that find a peak increment the counter and write to the array, is not deterministic. Furthermore, as the counter increment operation involves three steps: reading the current value of the counter in device memory, increment the value, and write the incremented value back to device memory, there is a risk of corrupted counter value if one thread tries to increment the counter while another thread has read the counter but not written the incremented value yet. To avoid this problem, the counter increment is done using an "atomic" operation that combines the three steps described above into a single step. This guarantees that a thread can't increment the counter while another thread is incrementing the counter. The foregoing guarantees that the incremented value of the counter obtained by each thread is unique, and that unique value can be safely used to index the location in the detected peak array where the peak's coordinates are saved. Finally, the thread writes the low and high neighbor arrays, as well as the array of number of child peaks per parent peak, described above.

What will now be described is the 4D peak properties computation step which uses the arrays of detected peaks data generated by 4D peak detection, to compute peak properties for all detected child peaks from all parent peaks. 4D peak properties are saved in device memory arrays in a similar manner as performed for 3D peak properties (e.g., using one array per peak property as illustrated in FIG. 41. In this case, however, in an embodiment in which the 4D peak properties computation step runs after all parent peaks from all scan packs have been processed, we know the peak properties arrays size is the total number of detected child peaks, so we need to allocate memory for the arrays only once. Alternatively, the 4D peak properties may be computed per scan pack, similar to what may be performed in connection with 3D processing. Processing per scan pack may provide an advantage of reduced device memory usage if processing to exclude identical duplicate 4D peaks (described elsewhere herein) is performed per scan pack before the peak properties computation.

The properties of each peak are stored in the peak properties arrays at the same index location the peak's coordinates were saved in the peak detection array. The peak properties computed are the mass fractional index, the time, and the drift at the apex of each detected peak. These values are computed with a three point interpolation using the arrays of low and high neighbor data created in 4D peak detection. Other peak properties saved to arrays are: the intensity at the peak apex, the parent peak index in the 3D properties arrays, and the chrom FWHM of the parent peak.

An embodiment may use one kernel to compute 4D peak properties for all child peaks from all parent peaks. The kernel uses one-dimensional thread blocks and a one-dimensional grid to cover all detected child peaks. However, if the number of peaks exceeds the maximum grid size in one dimension (x), the grid is made two-dimensional, with the y dimension as large as necessary. This 2D grid, though, is used as a long 1D grid by the kernel. Each thread computes the peak properties for one peak, and uses Equation 11A to get the index within the arrays of the peak it computes.

$$i = (blockIdx.y * gridDim.x + blockIdx.x) * blockDim.x + threadIdx.x \quad \text{Equation 11A}$$

In Equation 11A, i is the peak index within the arrays, blockIdx.x and blockIdx.y are the x and y coordinates of the block index, gridDim.x is the x dimension of the grid, blockDim.x is the x dimension of the block, and threadIdx.x is the x coordinate of the thread within the block. Each thread uses the peak index obtained from Equation 11A to read the peak's global coordinates and the low and high neighbor data from the peak detection arrays obtained in connection with peak detection in 4D, and computes the three point interpolation in each axis. Finally, with the index obtained from Equation 11A, the thread writes the peak properties to the corresponding peak properties arrays.

What will now be described is processing performed to sort and exclude duplicate 4D peaks. The data in the peak properties arrays is not ordered in any particular way, because the peak detection step runs multiple threads in parallel and the order in which the threads finish running the peak detection kernel is not deterministic. To compute the next steps the peak properties arrays may be sorted by retention time. Sorting may be performed using any known technique and may be implanted using one or more kernels as appropriate for the particular techniques selected. In one embodiment, the peak properties values may not actually be sorted, but rather another peak property of sorted indices is created (e.g. the order of the peak indices indicate the sorted order). This property is used to address all other peak properties in sorted order. If two or more peaks have the same retention time, they may be further order by mass index. There are two types of peak exclusion in 4D processing: exclusion of identical duplicate peaks, and exclusion of masked peaks. An identical duplicate peak is the same child peak found by more than one parent peak, and all but one of them must be excluded. A masked peak, just like in 3D processing, is a peak that is deemed "too close" to a larger peak. An embodiment may use an alternate sorting method to sort, by retention time, the actual values in all peak properties arrays instead of using the sorted indices described above. This may provide an advantage of improving performance in connection with the computations in the masked peaks exclusion, as the additional addressing required by the sorted indices is eliminated.

What will now be described is processing in connection with excluding identical duplicate 4D peaks. It should be noted that two parent peaks volumes may overlap and, as a result, a child peak may be duplicated if such a child peak is determined for both the first and second parent peaks. As such, a child peak may be detected for both parent peaks even though there is actually a single child peak with respect to the raw input data. Given that the time value of identical duplicate child peaks is the same, such identical duplicate are located next to each other when the peaks are sorted by retention time. This makes easy to find them, but the mass index, the drift, and the intensity values must also be the same to identify two peaks as identical duplicates. One kernel may be used to exclude identical duplicate peaks in the peak properties. The kernel uses one-dimensional thread blocks and a one-dimensional grid to cover all peaks in the peak properties arrays. However, if the number of peaks exceeds the maximum grid size in one dimension (x), the grid is made two-dimensional, with the y dimension as large as necessary. This 2D grid, though, may be used as a long 1D grid by the kernel. Data from five peak properties arrays are needed for this computation: peak time, peak mass index, peak drift, peak intensity, and sorted index. They are bound to respective textures and the threads fetch data from them. Each thread tests one peak for exclusion, and uses Equation 11A to determine the index within the arrays of the peak to process. With that index, the thread fetches from the sorted index texture, the index of the peak it tests (the current peak), and the index of the next peak. Then, the thread uses those sorted indices to fetch from the other textures the time, mass index, drift, and intensity values of the current peak, and those values of the next peak. If both peaks have the same four values, the next peak is marked as an identical duplicate. In this case, a flag is written to the exclude peak property array at the location of the excluded peak.

Alternatively, the identical duplicate peaks may be excluded per scan pack instead of after all scan packs have been processed. In this case, identical duplicate peaks may be excluded before the peak properties computation, using the peak detection global coordinates as exclusion criteria, instead of the time, mass index, and drift values. If two or more child peaks have the same peak detection global coordinates, it is the same peak found multiple times. An additional advantage of this identical duplicate exclusion method is that it allows for specific peak exclusion, such that we can choose which identical duplicate peaks are excluded and which peak is retained. The exclusion criterion is based on the distance from each child peak to its parent peak. Using the time and mass global coordinates only, we may retain the identical duplicate peak closer to its parent. The distance from each child peak to its parent peak is saved in one of the peak detection arrays as it is described in connection with 4D peak detection elsewhere herein. A single kernel may be used for this alternate method of identical duplicate peak exclusion. Given how the parent peaks are distributed in scan packs as described in connection with scan packs for 4D processing herein, child peaks in a scan pack can have a duplicate in the next scan pack. Therefore, we have to wait until the detected peaks in the next scan pack are available before we can run identical duplicate peak exclusion in a scan pack. The kernel combines all child peaks found in the current and the next scan packs into a common array of peaks. Then, the child peaks in the common array are sorted in this order: by time coordinate first, then by mass coordinate, then by drift coordinate, and finally by the distance between the peak and its parent peak apex. After this sorting, all identical duplicate peaks are grouped together with the peak closer to its parent located first in the group. The kernel then keeps the first duplicate in each group of duplicates and removes all other duplicates from the common array. Finally, the kernel assigns to the current scan pack all peaks in the common array with a time coordinate falling within the current scan pack, and assigns to the next scan pack all other peaks in the common array.

What will now be described is processing that may be performed in connection with excluding masked 4D peaks. The masked peak exclusion processing finds peaks that are deemed as too close to a larger peak. To be masked by a larger peak, the peak apex must be within a threshold with respect to a larger peak. For example, to be masked by a larger peak, a peak may be within one sigma in time, one sigma in mass index, and one sigma in drift of the larger peak. If a peak is found to be masked by another peak, it is marked as masked by writing a flag to its exclusion peak property. Also, the index into the arrays of the masking peak is written to the peak's masking ion peak property.

An embodiment may use one kernel for performing processing to exclude masked 4D peaks. The kernel uses one-dimensional thread blocks and a one-dimensional grid that covers all peaks in the peak properties arrays. However, if the number of peaks exceeds the maximum grid size in one dimension, the grid dimension is reduced and the kernel is launched several times until all peaks are processed. Each thread within the blocks may process one peak in the peak properties arrays, and uses Equation 6A to obtain the index within the arrays of the peak it processes (also referred as the current peak). Data from six peak properties arrays are used to determine masked 4D peaks for exclusion: peak time, peak mass index, peak drift, peak intensity, peak's chrom FWHM, and sorted index. The foregoing are bound to respective textures and the threads fetch data from these textures. Alternatively, if the values in the peak properties arrays are sorted by retention time, the sorted index peak property array may be eliminated and may thereby improve performance in connection with kernel computations as the additional addressing required by the sorted indices is eliminated. Each thread reads from the textures the current peak time, mass index, and drift, and computes a masking volume around the current peak. This masking volume may be, for example, +/− one sigma in time, +/− one sigma in mass index, and +/− one sigma in drift. The thread then tests all peaks with a peak time that falls within the masking volume in time. It first tests sorted peaks going backward in time until the end of the masking volume, and then going forward in time until the end of the masking volume. For each tested peak, the thread reads from the textures the peak mass index, the peak drift, and the peak intensity. If the test peak mass index falls within the masking volume in mass index, the peak drift falls within the masking volume in drift, and the test peak intensity is lower than the current peak intensity, the test peak is determined as being masked by the current peak. In this case, the thread writes a masked flag to the exclude peak property array, at the location of the tested peak, and also writes the current peak index to the masking ion peak property array, at the location of the tested peak.

In connection with any of the threads described herein, it should be noted that an embodiment may have any such thread process one or more points. Although exemplary embodiments are described herein which may compute particular peak properties, it should be noted that an embodiment may also determine other properties, alone or in combination with, those described herein.

As described above in an embodiment in accordance with techniques herein, parallel processing may be performed using the GPU where the GPU may be programmed to perform multiple non-dependent operations in parallel. For example, in one embodiment, computation of each filtered data point (or a group of data points) may be performed by a different one of the threads since each such filtered data point (or group of data points) may be computed independent of the others. Although examples may be described herein with respect to a single GPU, an embodiment may also utilize more than one GPU or other hardware component that performs parallel processing.

In an embodiment in accordance with techniques herein, a GPU may be used to execute code for parallel processing where the code is written using CUDA. In accordance with CUDA, CUDA threads may be grouped into blocks of threads. However, other programming languages and associated constructs may also be used and may vary with embodiment.

Figure 52:
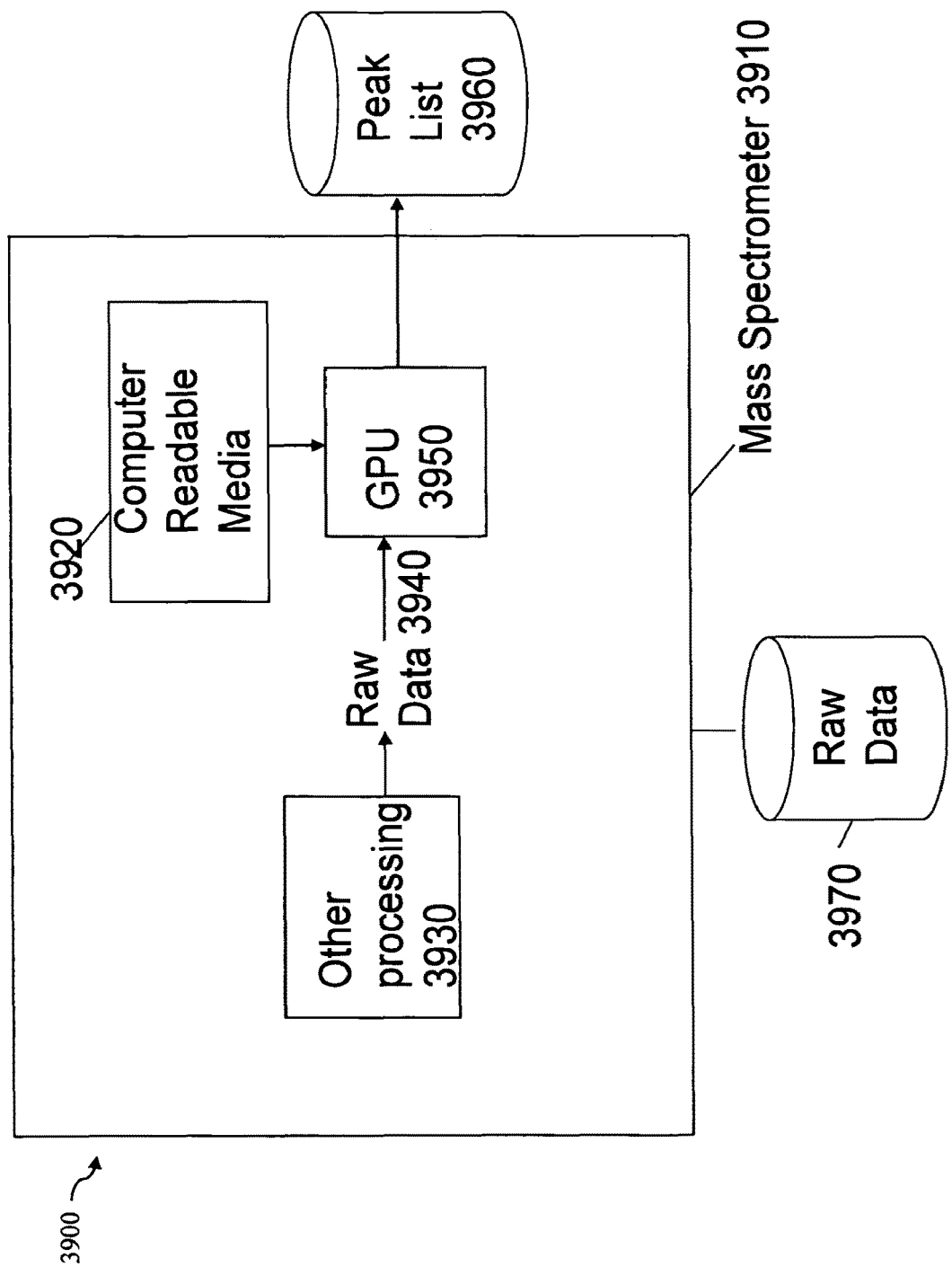
FIGS. 52 and 53 are examples of systems and components that may be used in an embodiment in accordance with techniques herein.

In an embodiment in accordance with the techniques herein such as illustrated in FIG. 52, one or more parallel processing units, such as GPUs 3950, may be embedded or incorporated in the instrument 3910 performing mass spectrometry. Additionally, the instrument 3910 may have included therein a computer readable medium 3920. The computer readable medium 3920 may have code stored thereon which, when executed using the GPU(s) 3950 or other parallel processing unit(s), performs processing as described herein in parallel using the parallel processing unit(s) to generate a peak list 3960. In this embodiment, the raw data 3940 typically produced as an output after performing mass spectrometry (such as with an LC/MS or LC/IMS/MS system) may be analyzed in real-time to generate the peak list 3960 using the techniques herein. In this case, the output of the instrument 3910 performing mass spectrometry, such as included in an LC/MS system, may be the peak list 3960. It should be noted that the raw data 3940 is not required to be stored on permanent or non-volatile storage. Rather, the raw LC/MS data may be stored temporarily, such as in a form of memory or volatile storage, for the duration of time during which such data is need for peak list detection and computation processing. After such processing, the data may be discarded. Thus, the MS instrument may include code for performing the foregoing peak list generation in real time that produces as a final output the peak list rather than the raw LC/MS scan data. However, an embodiment in accordance with techniques herein may also provide an option to store the raw data, such as on external storage 3970 (e.g., a form of non-volatile storage), even though it is analyzed in real-time to output the peak list 3960. It should be noted that the mass spectrometer 3910 includes other components not illustrated to perform the other processing 3930 and generate the raw data 3940.

Figure 53:
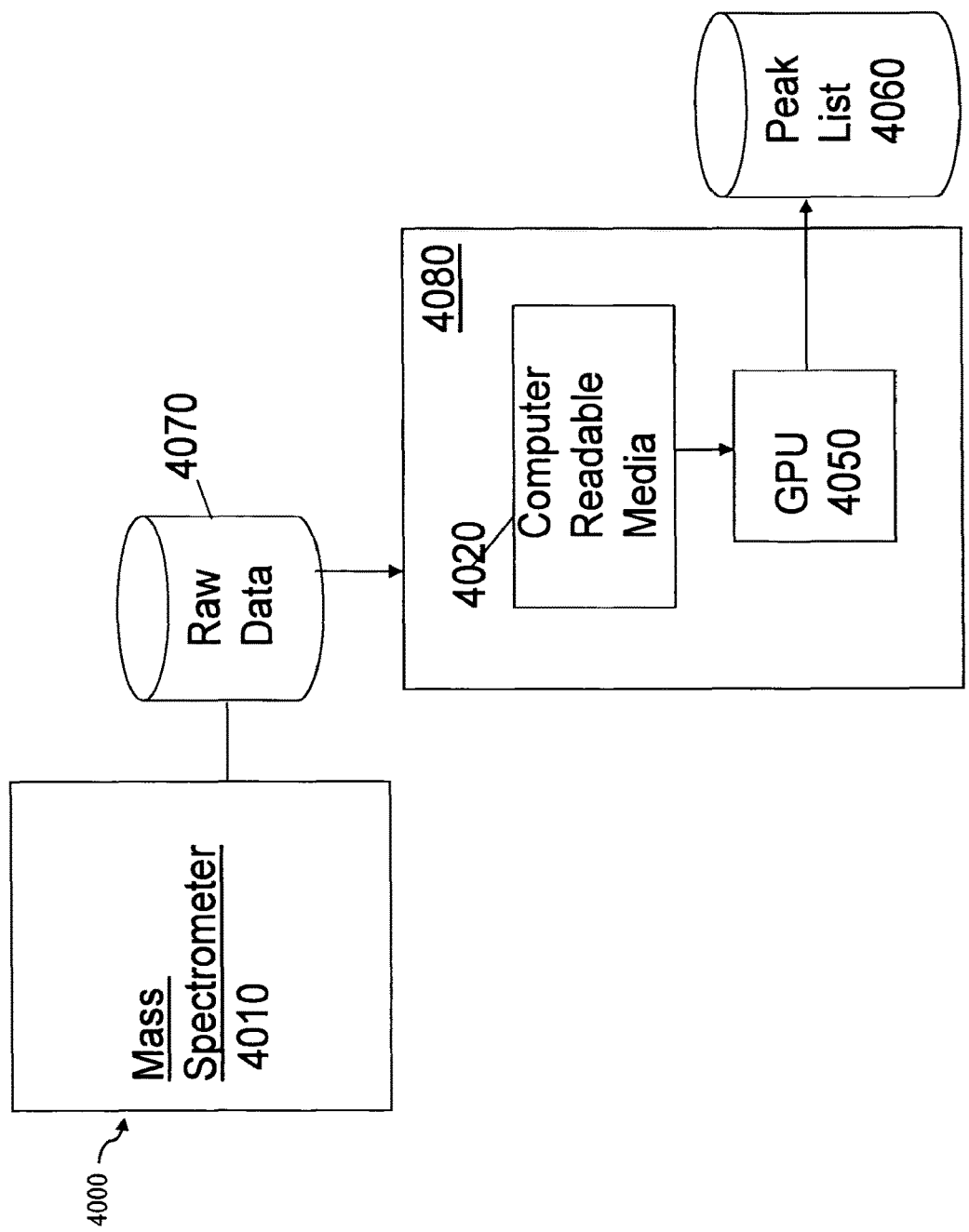

Referring to FIG. 53, shown is an example 4000 of another embodiment of components that may be included in a system in accordance with techniques herein. In FIG. 53, the mass spectrometer 4010 outputs the raw data 4070 to storage where the computer system 4080 may be used to perform processing offline or in a post processing step subsequent. The computer 4080 may include a computer readable medium 4020 comprising code as described in FIG. 52 and one or more GPUs 4050 or other parallel processing units to generate the peak list 4060. In the embodiment of FIG. 53, the computer readable medium 4020 and GPU 4050 are included in a computer system, such as a personal or desktop computer, rather than being included in the mass spectrometer 4010.

It should be noted that the embodiment of FIG. 52 provides for performing analysis of the raw mass spectra data by components included in the mass spectrometer. Thus, a general approach is illustrated in connection with FIG. 52 having post-processing of mass spectra or raw data performed by components included in the mass spectrometer. An embodiment may also have the components of the mass spectrometer perform other post-processing of the raw data and/or peak list. For example, the computer readable medium may also include code which further processes the peak list and/or other portions of the raw data such as to identify proteins in accordance with matching precursors and associated fragments using a protein database. Such other post processing may be performed by parallel programming using the GPU and/or using a CPU (also included in the mass spectrometry) which performs sequential or non-parallel processing.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
retrieving, from a memory, one or more spectra produced as a result of mass analyzing a sample;
performing peak detection to identify one or more peaks in the one or more spectra;
generating one or more peak properties on the one or more peaks; and
writing the one or more peaks into a peak list in a memory and writing the peak properties information to the memory,
wherein the retrieving and writing are configured to be performed by code executing in a serial processor and wherein the performing peak detection and generating one or more peak properties are configured to be performed by code executing in a parallel processor.

2. The method of claim 1, wherein the parallel processor is configured to perform the peak detection in real-time as the mass analyzing is performed by an acquisition device.

3. The method of claim 1, wherein performing peak detection comprises performing filtering on the one or more spectra, the filtering comprising applying a smoothing filter, by a plurality of parallel threads, configured to smooth a first input point in a mass-to-charge ratio dimension of the one or more spectra.

4. The method of claim 1, wherein performing peak detection comprises performing filtering on the one or more spectra, the filtering comprising applying a filter, by a plurality of parallel threads, in a mass-to-charge ratio dimension of the one or more spectra.

5. The method of claim 1, further comprising:
performing first processing by a first plurality of parallel threads, the first processing comprising applying a smoothing filter to a first input point in a mass-to-charge ratio dimension of the one or more spectra to produce a first filtered output point and applying a second derivative filter to the first input point in a mass-to-charge ratio dimension of the one or more spectra to produce a second filtered output point; and
performing second processing by a second plurality of parallel threads, the second processing comprising applying the smoothing filter to a second input point in the mass-to-charge ratio dimension to produce a third filtered output point and applying the second derivative filter to the second input point in the mass-to-charge ratio dimension to produce a fourth filtered output point,
wherein the first thread and the second thread execute concurrently and the first thread and the second thread are included in a same block of threads accessing a plurality of input points including the first point and the second point from a portion of memory shared by the block of threads.

6. The method of claim 1, the retrieving comprises reading the one or more spectra, storing the one or more spectra in a first memory that is configured for access by the serial processor and is not configured for access by the parallel processor, and copying the one or more spectra from the first memory to a second memory included on a device comprising the parallel processor.

7. The method of claim 1, wherein the peak list is stored to non-volatile memory, and wherein the one or more spectra are stored in volatile memory while performing the peak detection, and the one or more spectra are not stored to non-volatile memory for output as a result of the performing.

8. A non-transitory computer-readable storage medium, the computer-readable storage medium including instructions that when executed by a computer, cause the computer to:
- retrieve, from a memory, one or more spectra produced as a result of mass analyzing a sample;
- perform peak detection to identify one or more peaks in the one or more spectra;
- generate one or more peak properties on the one or more peaks; and
- write the one or more peaks into a peak list in a memory and writing the peak properties information to the memory,
- wherein the retrieving and write are configured to be performed by code executing in a serial processor and wherein the performing peak detection and generating one or more peak properties are configured to be performed by code executing in a parallel processor.

9. The computer-readable storage medium of claim 8, wherein the parallel processor is configured to perform the peak detection in real-time as the mass analyze is performed by an acquisition device.

10. The computer-readable storage medium of claim 8, wherein performing peak detection comprises perform filtering on the one or more spectra, the filtering comprising applying a smoothing filter, by a plurality of parallel threads, configured to smooth a first input point in a mass-to-charge ratio dimension of the one or more spectra.

11. The computer-readable storage medium of claim 8, wherein performing peak detection comprises perform filtering on the one or more spectra, the filtering comprising applying a filter, by a plurality of parallel threads, in a mass-to-charge ratio dimension of the one or more spectra.

12. The computer-readable storage medium of claim 8, wherein the instructions further configure the computer to:
- perform first processing by a first plurality of parallel threads, the first processing comprising applying a smoothing filter to a first input point in a mass-to-charge ratio dimension of the one or more spectra to produce a first filtered output point and applying a second derivative filter to the first input point in a mass-to-charge ratio dimension of the one or more spectra to produce a second filtered output point; and
- perform second processing by a second plurality of parallel threads, the second processing comprising applying the smoothing filter to a second input point in the mass-to-charge ratio dimension to produce a third filtered output point and applying the second derivative filter to the second input point in the mass-to-charge ratio dimension to produce a fourth filtered output point,
- wherein the first thread and the second thread execute concurrently and the first thread and the second thread are included in a same block of threads access a plurality of input points including the first point and the second point from a portion of memory shared by the block of threads.

13. The computer-readable storage medium of claim 8, the retrieving comprises read the one or more spectra, storing the one or more spectra in a first memory that is configured for access by the serial processor and is not configured for access by the parallel processor, and copying the one or more spectra from the first memory to a second memory included on a device comprising the parallel processor.

14. The computer-readable storage medium of claim 8, wherein the peak list is stored to non-volatile memory, and wherein the one or more spectra are stored in volatile memory while perform the peak detection, and the one or more spectra are not stored to non-volatile memory for output as a result of the performing.

15. A computing apparatus comprising:
- a processor; and
- a memory storing instructions that, when executed by the processor, configure the apparatus to:
- retrieve, from a memory, one or more spectra produced as a result of mass analyzing a sample;
- perform peak detection to identify one or more peaks in the one or more spectra;
- generate one or more peak properties on the one or more peaks; and
- write the one or more peaks into a peak list in a memory and writing the peak properties information to the memory,
- wherein the retrieving and write are configured to be performed by code executing in a serial processor and wherein the performing peak detection and generating one or more peak properties are configured to be performed by code executing in a parallel processor.

16. The computing apparatus of claim 15, wherein the parallel processor is configured to perform the peak detection in real-time as the mass analyze is performed by an acquisition device.

17. The computing apparatus of claim 15, wherein performing peak detection comprises perform filtering on the one or more spectra, the filtering comprising applying a smoothing filter, by a plurality of parallel threads, configured to smooth a first input point in a mass-to-charge ratio dimension of the one or more spectra.

18. The computing apparatus of claim 15, wherein performing peak detection comprises perform filtering on the one or more spectra, the filtering comprising applying a filter, by a plurality of parallel threads, in a mass-to-charge ratio dimension of the one or more spectra.

19. The computing apparatus of claim 15, wherein the instructions further configure the apparatus to:
- perform first processing by a first plurality of parallel threads, the first processing comprising applying a smoothing filter to a first input point in a mass-to-charge ratio dimension of the one or more spectra to produce a first filtered output point and applying a second derivative filter to the first input point in a mass-to-charge ratio dimension of the one or more spectra to produce a second filtered output point; and
- perform second processing by a second plurality of parallel threads, the second processing comprising applying the smoothing filter to a second input point in the mass-to-charge ratio dimension to produce a third filtered output point and applying the second derivative filter to the second input point in the mass-to-charge ratio dimension to produce a fourth filtered output point,
- wherein the first thread and the second thread execute concurrently and the first thread and the second thread are included in a same block of threads access a plurality of input points including the first point and the second point from a portion of memory shared by the block of threads.

20. The computing apparatus of claim 15, the retrieving comprises read the one or more spectra, storing the one or more spectra in a first memory that is configured for access by the serial processor and is not configured for access by the parallel processor, and copying the one or more spectra from the first memory to a second memory included on a device comprising the parallel processor.

* * * * *